US012708128B2

(12) United States Patent
Shi et al.

(10) Patent No.: US 12,708,128 B2
(45) Date of Patent: Aug. 18, 2026

(54) SWEETENER AND FLAVOR COMPOSITION COMPRISING GLYCOSYLATED HIGH PURITY STEVIOL GLYCOSIDES

(71) Applicant: EPC Natural Products Co., Ltd., Beijing (CN)

(72) Inventors: Jingang Shi, Beijing (CN); Hansheng Wang, Beijing (CN); Xiaorui Zhang, Beijing (CN); Weiyao Shi, Beijing (CN); Thomas Eidenberger, Weis (AT)

(73) Assignee: EPC Natural Products Co., LTD, Beijing (CN)

( * ) Notice: Subject to any disclaimer, the term of this patent is extended or adjusted under 35 U.S.C. 154(b) by 753 days.

(21) Appl. No.: 18/053,593

(22) Filed: Nov. 8, 2022

(65) Prior Publication Data

US 2023/0157339 A1 May 25, 2023

Related U.S. Application Data

(63) Continuation of application No. PCT/CN2022/130555, filed on Nov. 8, 2022.

(60) Provisional application No. 63/382,322, filed on Nov. 4, 2022, provisional application No. 63/264,006, filed on Nov. 12, 2021.

(51) Int. Cl.

| | |
|---|---|
| ***A23L 27/30*** | (2016.01) |
| ***A23L 2/60*** | (2006.01) |
| ***A23L 27/21*** | (2016.01) |
| ***A23L 27/29*** | (2016.01) |
| ***A23L 33/20*** | (2016.01) |

(52) U.S. Cl.

CPC ................ *A23L 27/36* (2016.08); *A23L 2/60* (2013.01); *A23L 27/215* (2016.08); *A23L 27/29* (2016.08); *A23L 33/20* (2016.08)

(58) Field of Classification Search

CPC .......... A23L 2/60; A23L 27/36; A23L 27/215
See application file for complete search history.

(56) References Cited

U.S. PATENT DOCUMENTS

| | | | | |
|---|---|---|---|---|
| 5,141,858 | A | 8/1992 | Paul et al. | |
| 7,439,049 | B2 | 10/2008 | Bozonnet et al. | |
| 9,567,619 | B2 | 2/2017 | Mao et al. | |
| 10,602,762 | B2 * | 3/2020 | Purkayastha | A23L 27/36 |

(Continued)

FOREIGN PATENT DOCUMENTS

| | | |
|---|---|---|
| CN | 105283464 | 1/2016 |
| CN | 112312773 | 2/2021 |

(Continued)

OTHER PUBLICATIONS

International Search Report and Written Opinion, issued in International Patent Application No. PCT/CN2022/130555, mail date Jan. 18, 2023.

(Continued)

*Primary Examiner* — Jenna A Watts
(74) *Attorney, Agent, or Firm* — Michael Ye; Kalos Athena Wang PLLC

(57) ABSTRACT

Compositions comprising high purity glycosylated steviosides and/or Maillard reaction products thereof are described. These compositions provide improved taste profiles and can be used as sweeteners or flavorants in consumable products, including foods and beverages.

16 Claims, 12 Drawing Sheets

(56) References Cited

U.S. PATENT DOCUMENTS

| | | | |
|---|---|---|---|
| 2009/0123448 | A1 | 5/2009 | Bozonnet et al. |
| 2020/0054056 | A1 | 2/2020 | Shi et al. |

FOREIGN PATENT DOCUMENTS

| | | |
|---|---|---|
| CN | 112367854 | 2/2021 |
| CN | 112512337 | 3/2021 |
| WO | 2013096420 | 6/2013 |
| WO | 2014197898 | 12/2014 |
| WO | 2015126876 | 8/2015 |
| WO | 2017106577 | 6/2017 |
| WO | 2018102447 | 6/2018 |
| WO | 2017218036 | 12/2018 |

OTHER PUBLICATIONS

European Search Report, Issued in International Patent Application No. 19870718.4-1105/ 3863428 PCT/CN2019116381 mailed on Feb. 20, 2023.

European Search Report, Issued in International Patent Application No. 19799045.0-1105/ 3813545 PCT/US2019031183 mailed on Feb. 20, 2023.

* cited by examiner

A

B

C

A

B

C

D

A

B

C

D

A

B steviol

A

B

C

D

SWEETENER AND FLAVOR COMPOSITION COMPRISING GLYCOSYLATED HIGH PURITY STEVIOL GLYCOSIDES

This application claims priority from U.S. Provisional Patent Application No. 63/264,006, filed Nov. 12, 2021; U.S. Provisional Patent Application No. 63/382,322, filed Nov. 4, 2022, and PCT Application No. PCT/CN2022/130555, filed Nov. 8, 2022. These applications are incorporated herein by reference.

FIELD

The present disclosure relates generally to a sweetener or flavoring composition containing glycosylated steviol glycosides and Maillard reaction products therefrom and their use in food and beverage products.

BACKGROUND

Dietary sugar has become a much debated health issue, since high consumption of sugars is associated with common "acquired civilization diseases," including obesity, diabetes, and cardiovascular disease. In recent decades, health policies in the industrialized world have aimed to put forward measures to reduce sugar consumption. Sugar reduction has become a major challenge for food and especially beverage producers. Sugar reduction strategies to e.g., offer less sweet foods and drinks are part of a long term process as they involve consumer education to change consumption patterns for sugar intake and changes in consumer's flavor preferences. In addition, these strategies face challenges and risks associated losses in value and demand of conventional branded products.

The replacement of sugars with high intensity sweeteners (HIS) has a long history. The first commercial applications lead back to the first World War. Saccharin was introduced in Great Britain due to shortages in sugar imports overseas. Saccharin was then primarily used from the 1960's and onward as a sugar replacement for diabetics and in the newly evolving niche of the first small groups of dieters preferring the zero-calorie properties of saccharin. With the broader use of saccharin, prices of saccharin dropped rapidly. Consequently, replacement of sugars with saccharin provided cost reductions to manufacturers. These developments have influenced general attitudes about HIS use up to the present day. However, despite the cost reductions associated with replacement of sugars in favor of HIS, such replacements have not sufficiently considered the sensory attributes of HIS in these replacements.

From a historical perspective, the history of "artificial sweeteners" is not based on sugar reduction, but on sugar replacement due to disease or shortages of sugar. This may explain why the properties of HIS have until now focused on sugar replacement, rather than sugar reduction. Sugar-free foods and beverages do not compete with the sugar alternatives, but themselves. While products containing aspartame and Ace-K may taste better than saccharin, sucralose might be the best solution for sugar-free products. However, all of these "solutions" fail in any comparison to sugar.

Presently, sugar reduction or replacement strategies with HIS need a realignment for the targets. The sensory benchmarks associated with products containing HIS, including the so-called natural HIS sweeteners (e.g., steviol glycosides, thaumatin, mogrosides etc.), are predicated on the taste of sugar sweetness, rather than the sensation and perception of sugar sweetness. To successfully accomplish the foregoing challenges, there is need for developing solutions that mimic sensory properties of sugar sweetness perception.

SUMMARY

An aspect of the application is a glycosylated steviol glycoside (GSG) composition, comprising GSG in a total amount of 40-99.9 wt % of the GSG composition.

Another aspect of the application is a sweetener or flavoring agent composition, comprising the GSG composition as described herein in an amount of 0.0001-99.5 wt % of the sweetener or flavoring composition.

Another aspect of the application is a Maillard reaction product (MRP) composition, prepared from a reaction mixture comprising (1) the GSG composition as described herein and (2) an amine donor.

Another aspect of the application is a sweetener or flavoring agent composition, comprising the MRP composition as described herein in an amount of 0.0001-99.5 wt % of the sweetener or flavoring composition.

Another aspect of the application is a method of improving taste profile or mouth feel of a consumable product, comprising the step of adding to the consumable product, a sufficient amount of the GSG composition as described herein, the MRP composition as described herein, and the sweetener or flavoring agent composition as described herein.

Another aspect of the application is a consumable prepared by the method described herein.

Another aspect of the application is a method of improving taste profile or mouth feel of a sweetener, comprising the step of adding to the sweetener a sufficient amount of the GSG composition as described herein or the MRP composition as described herein.

Another aspect of the application is a method of reducing calorie of a sugar-based sweetener, comprising the step of adding to the sweetener a GSG composition as described herein or the MRP composition as described herein, wherein the addition of the GSG composition and/or the MRP composition maintains the taste profile of the sugar-based sweetener.

One of ordinary skill will understand that the differing embodiments disclosed in this application can all be used either independently or in combination with each other and there is no limitation implied on such combinations by the order or manner in which embodiments are disclosed.

BRIEF DESCRIPTION OF DRAWINGS

While the present disclosure will now be described in detail, and it is done so in connection with the illustrative embodiments, it is not limited by the particular embodiments illustrated in the figures and the appended numbered paragraphs.

*Stevia* extract samples. Panel B shows the ESI EIC (1127.47) MS amplification spectra from the RD, GRA100 (product 1-6 in Ex. 1), LGRA100 (product 6-1 in Ex. 6), SGRA100 (product 4-1 in Ex. 4) and *Stevia* extract samples. Panel C shows the ESI EIC (1289.53) MS spectra at 1289.53 from the *Stevia* extract, RM, GRA100 (product 1-6 in Ex. 1), LGRA100 (product 6-1 in Ex. 6), and SGRA100 (product 4-1 in Ex. 4) samples. Panel D shows the ESI EIC (1289.53) MS amplification spectra from the *Stevia* extract and GRA100 (product 1-6 in Ex. 1) samples.

Figure 6:
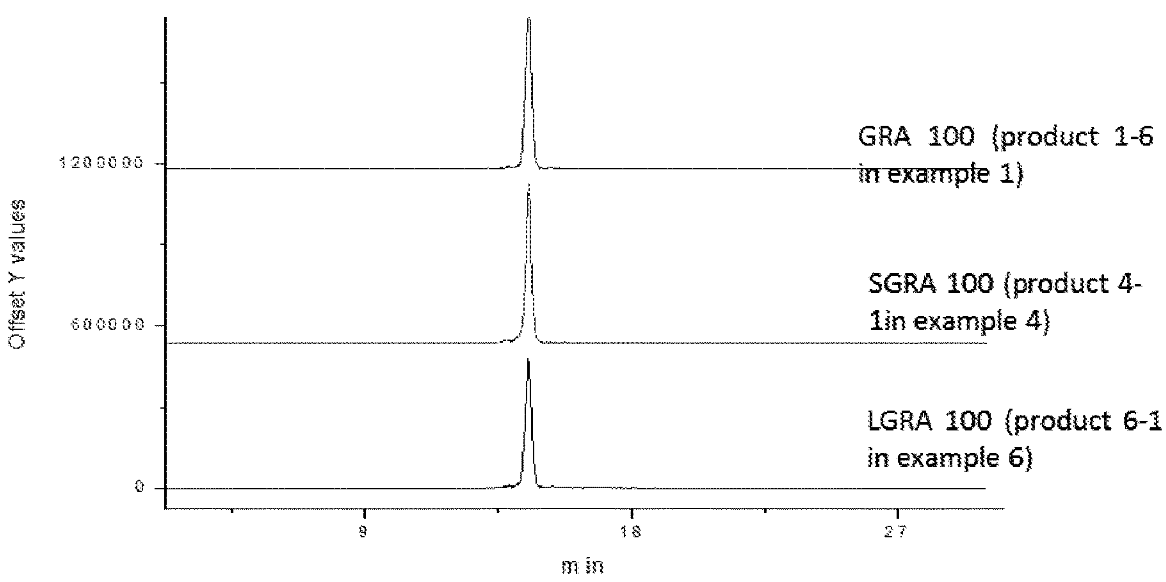
Figure 6:
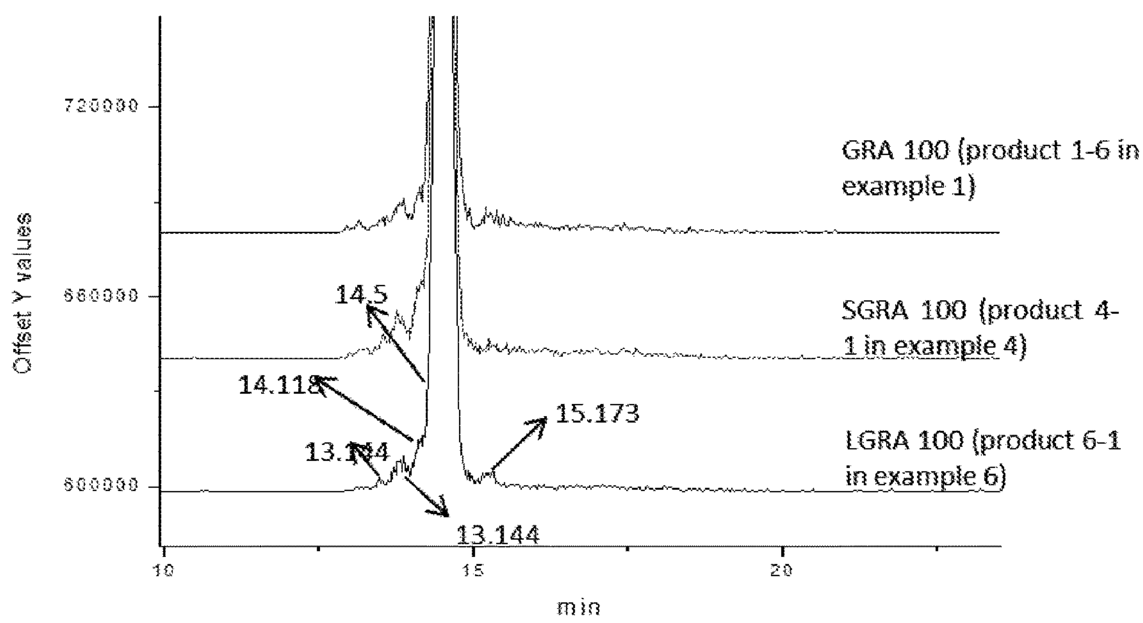
Figure 6:
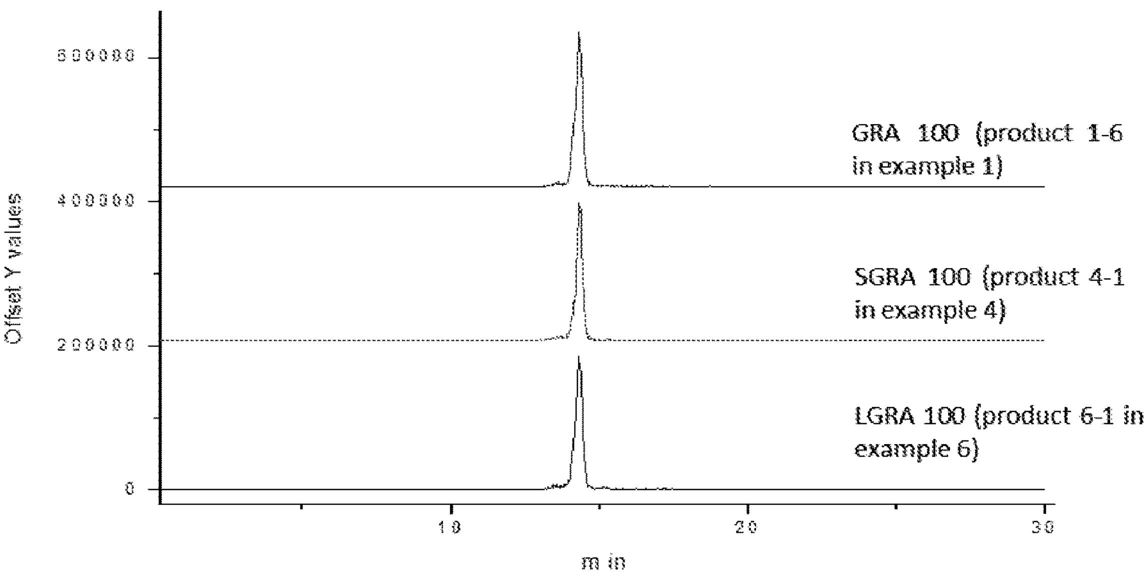
Figure 6:
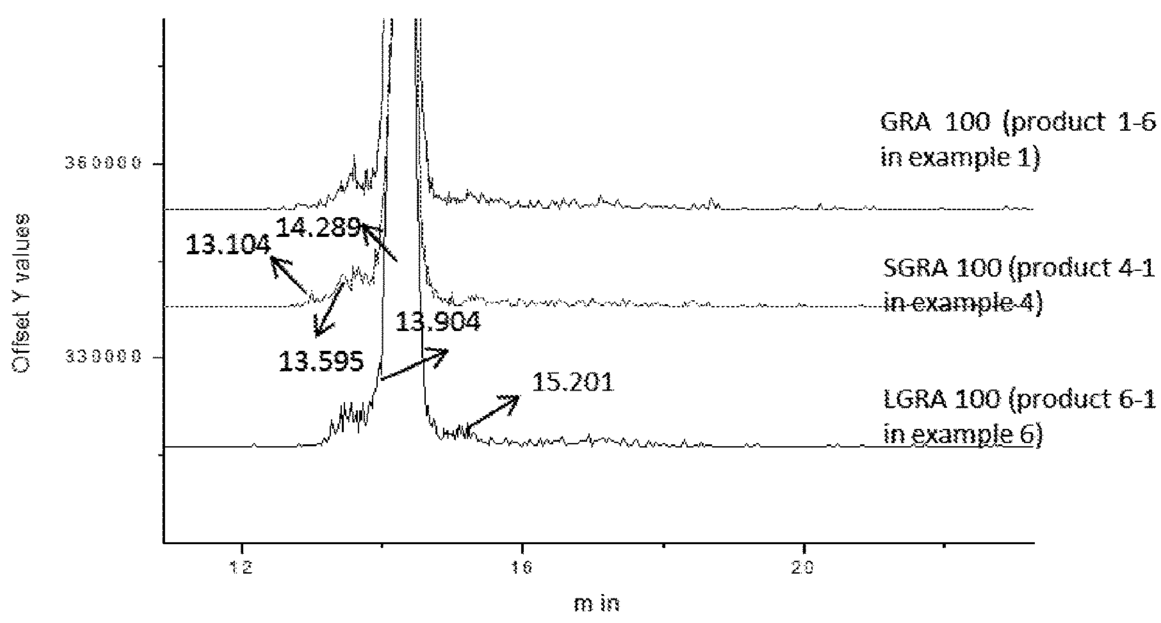

FIG. 6, Panel A shows ESI EIC (1451.58) MS spectra at 1451.58 from the GRA100 (product 1-6 in Ex. 1), LGRA100 (product 6-1 in Ex. 6), and SGRA100 (product 4-1 in Ex. 4) samples. Panel B shows ESI EIC (1451.58) MS amplification spectra from the GRA100 (product 1-6 in Ex. 1), LGRA100 (product 6-1 in Ex. 6), and SGRA100 (product 4-1 in Ex. 4) samples. Panel C shows the ESI EIC (1613.64) MS spectra at 1613.64 from the RA100 (product 1-6 in Ex. 1), LGRA100 (product 6-1 in Ex. 6), SGRA100 (product 4-1 in Ex. 4) samples. Panel D shows the ESI EIC (1613.64) MS amplification spectra from the GRA100 (product 1-6 in Ex. 1), LGRA100 (product 6-1 in Ex. 6), and SGRA100 (product 4-1 in Ex. 4) samples.

Figure 7:
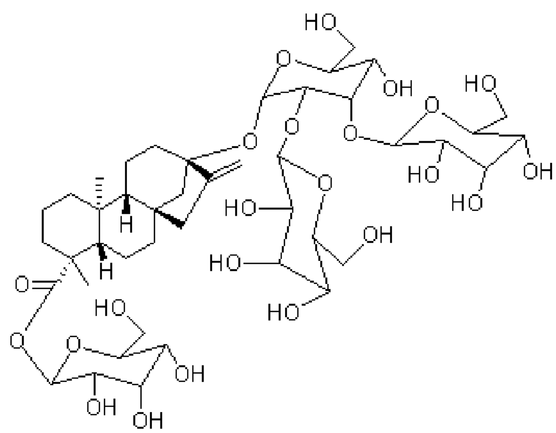
Figure 7:
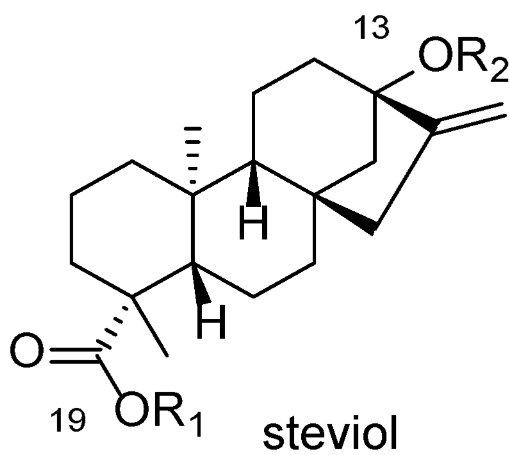

FIG. 7, Panel A shows that RA has four glucosyl groups. Panel B shows the aglycone of RA and RD.

Figure 8:
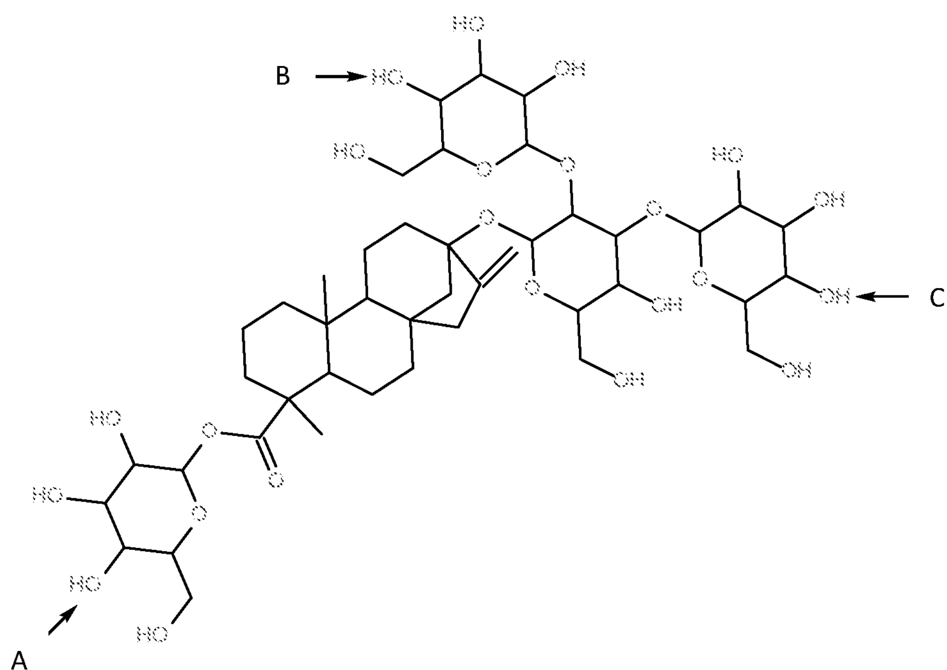

FIG. 8 shows positions available for (a 1-4) glucosidic bonds in Rebaudioside A (marked by arrows).

Figure 9:
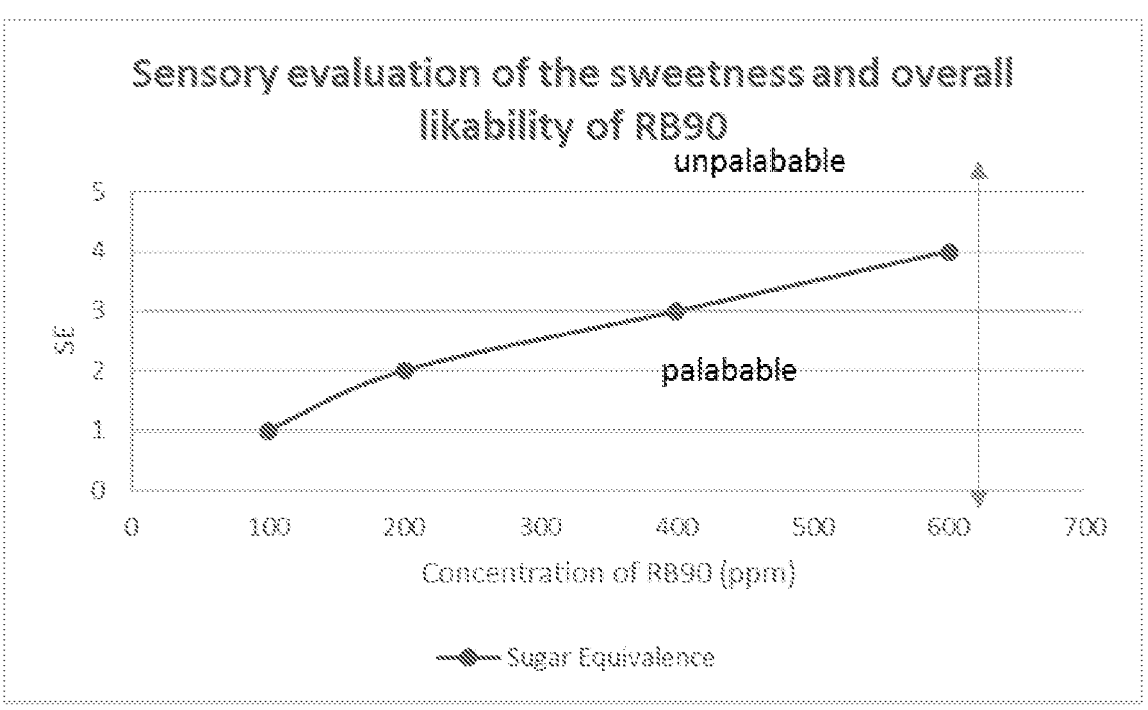
Figure 9:
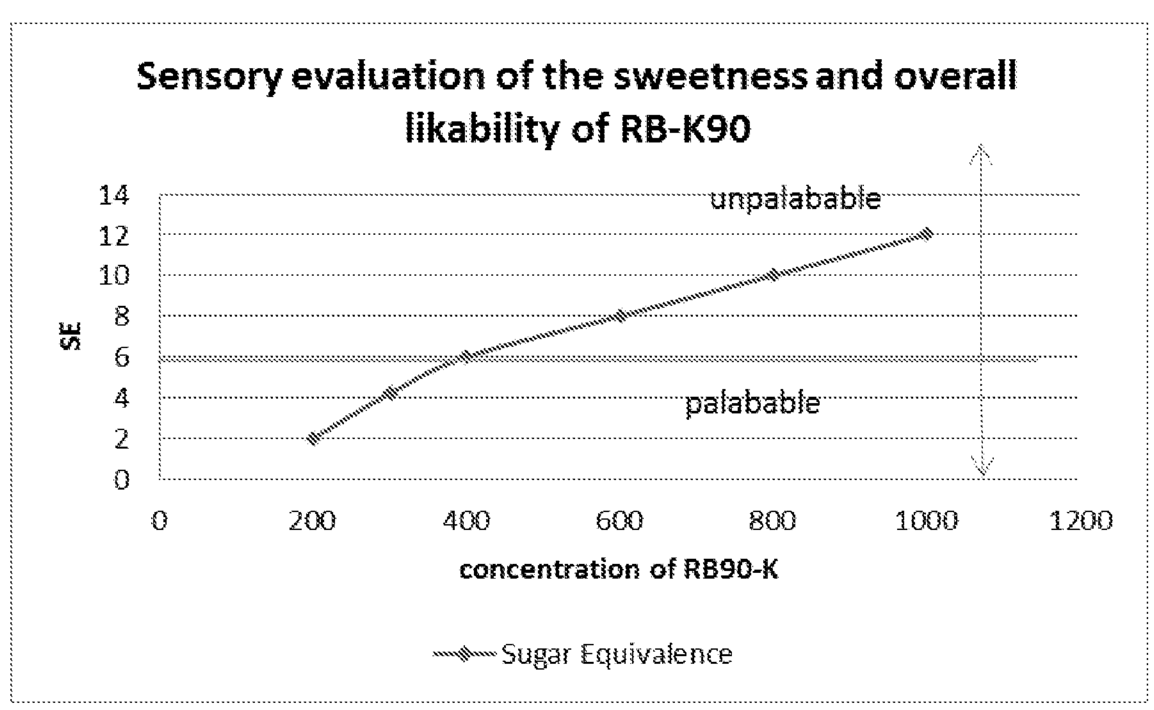
Figure 9:
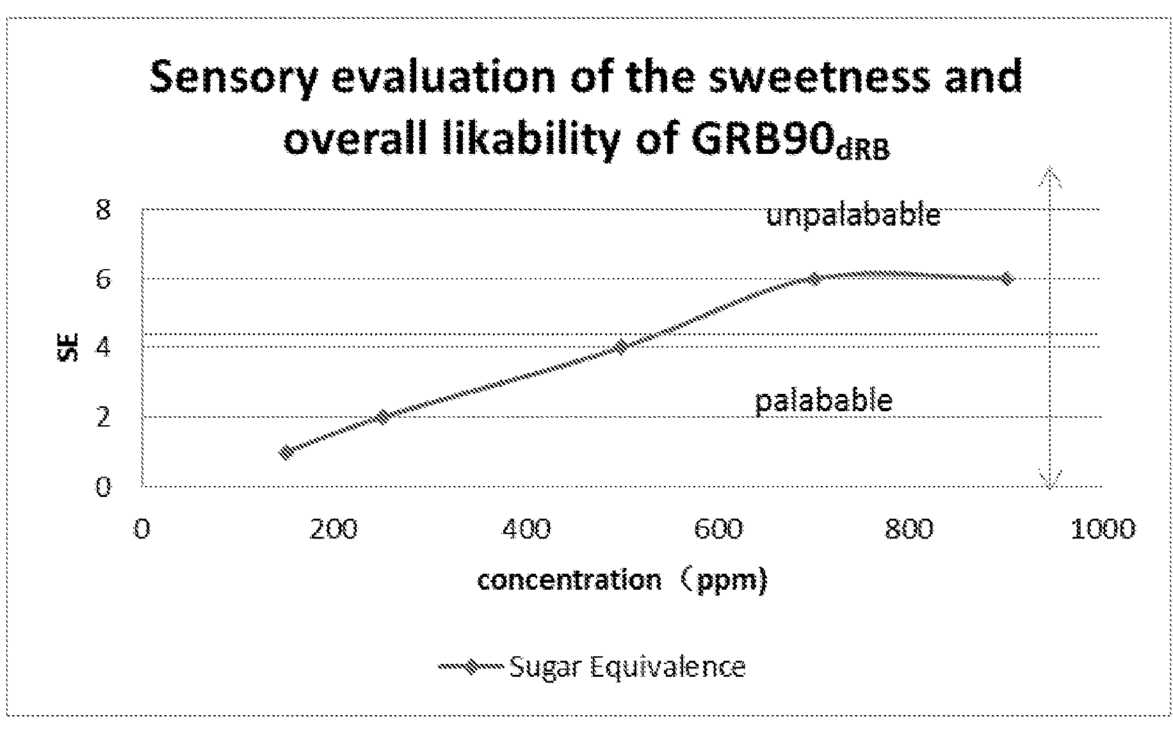
Figure 9:
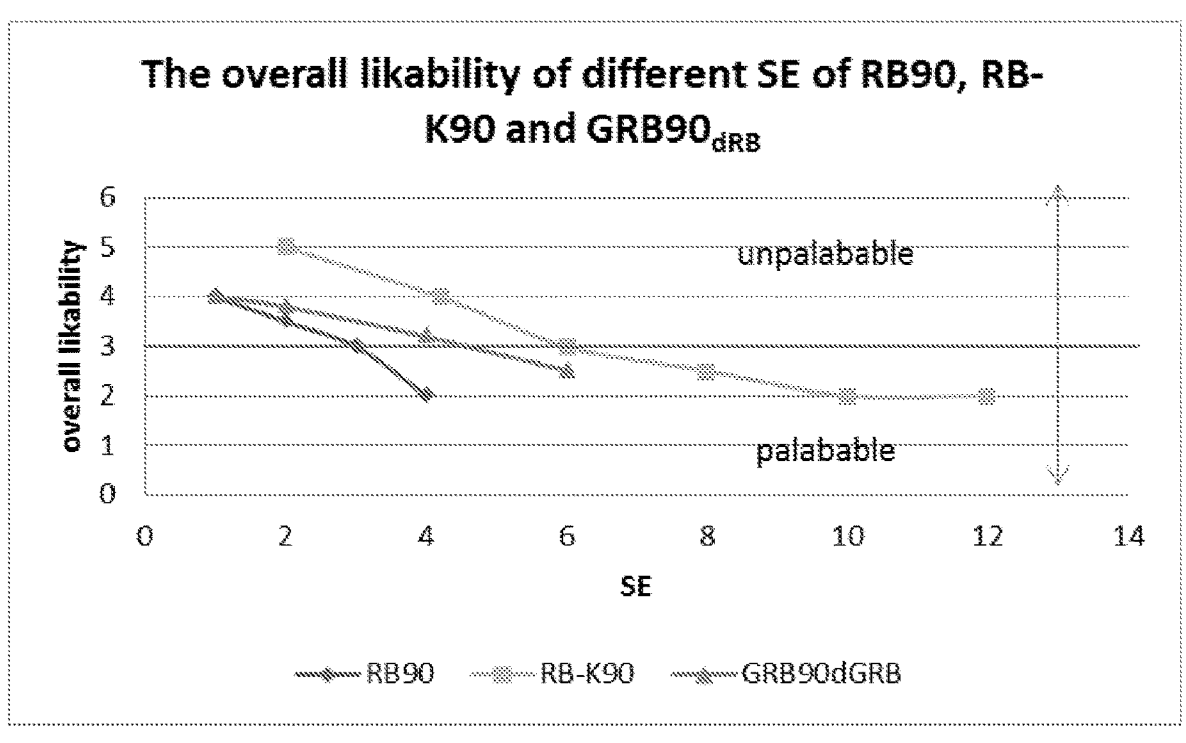

FIG. 9, Panel A shows sensory evaluation of the sweetness and overall likability of RB90. Panel B shows sensory evaluation of the sweetness and overall likability of RB90. Panel C shows sensory evaluation of the sweetness and overall likability of $GRB90_{dRB}$. Panel D shows the overall likability of different SugarE of RB90, RB-K90 and $GRB90_{dRB}$.

Figure 10:
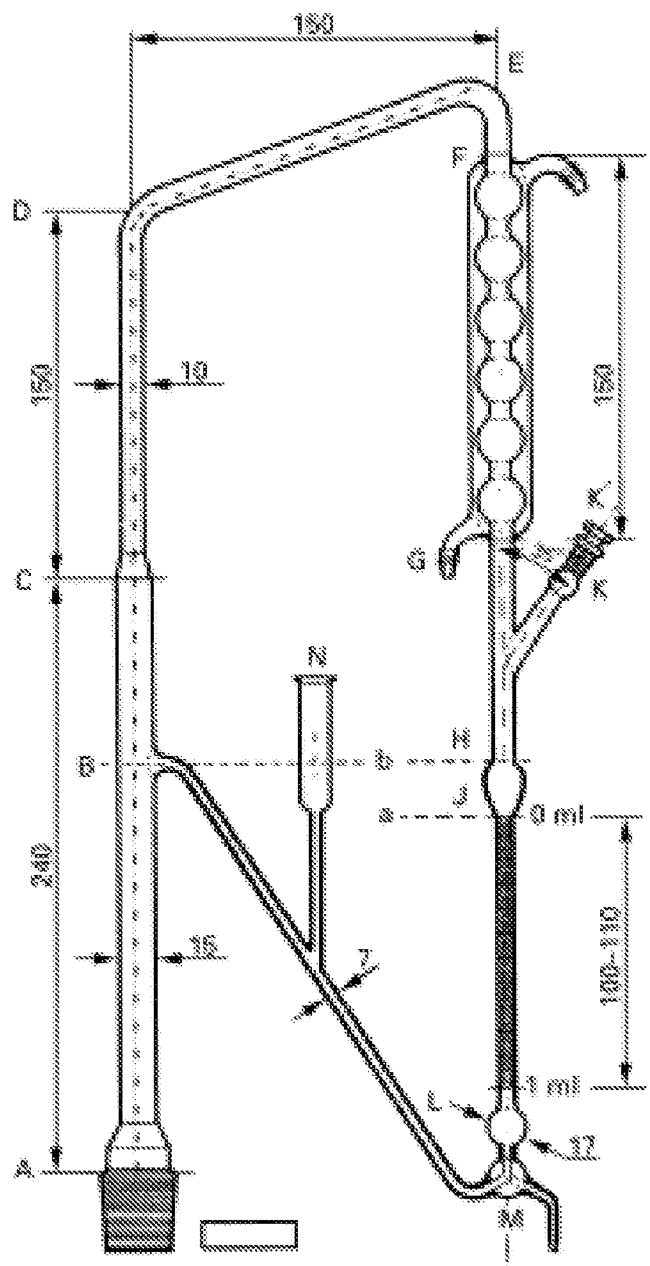

FIG. 10 shows combined water steam distillation and solvent extraction/concentration process.

DETAILED DESCRIPTIONS

I. Definitions

Unless defined otherwise, all technical and scientific terms used herein have the same meanings as commonly understood by one of ordinary skill in the art to which this application belongs. All publications and patents specifically mentioned herein are incorporated by reference in their entirety for all purposes including describing and disclosing the chemicals, instruments, statistical analyses and methodologies which are reported in the publications which might be used in connection with the application. All references cited in this specification are to be taken as indicative of the level of skill in the art. Nothing herein is to be construed as an admission that the application is not entitled to antedate such disclosure by virtue of prior invention.

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a," "an," and "the" include plural reference unless the context clearly dictates otherwise. Further, the terms "a" (or "an"), "one or more" and "at least one" can be used interchangeably herein. It is also to be noted that the terms "comprising," "including," "characterized by" and "having" can be used interchangeably. Further, any reactant concentrations described herein should be considered as being described on a weight to weight (w/w) basis, unless otherwise specified to the contrary (e.g., mole to mole, weight to volume (w/v), etc.).

As used herein, the term "glycoside" refers to a molecule in which a sugar (the "glycone" part or "glycone component" of the glycoside) is bonded to a non-sugar (the "aglycone" part or "aglycone component") via a glycosidic bond.

The terms "steviol glycoside" and "SG" are used interchangeably with reference to a glycoside of steviol, a diterpene compound shown in Formula I, wherein one or more sugar residues are attached to the steviol compound of Formula I.

Formula I

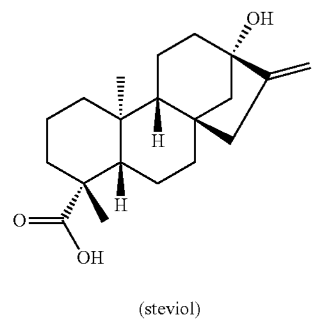

(steviol)

Steviol glycosides also include glycosides of isomers of steviol (isosteviol) as depicted in Formula II below, and derivatives of steviol, such as 12α-hydroxy-steviol and 15α-hydroxy-steviol.

Formula II

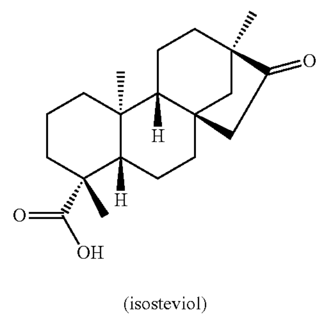

(isosteviol)

The terms "glycosidic bond" and "glycosidic linkage" refer to a type of chemical bond or linkage formed between the anomeric hydroxyl group of a saccharide or saccharide derivative (glycone) and the hydroxyl group of another saccharide or a non-saccharide organic compound (aglycone) such as an alcohol. The reducing end of the di- or polysaccharide lies towards the last anomeric carbon of the structure, whereas the terminal end lies in the opposite direction.

By way of example, a glycosidic bond in steviol and isosteviol involves the hydroxyl-group at the sugar carbon atom numbered 1 (so-called anomeric carbon atom) and a hydroxyl-group in the C19 carbonyl group of the steviol or isosteviol molecule building up a so-called O-glycoside or glycosidic ester. Additional glycosidic ester linkages can be formed at the hydroxyl group at C13 of steviol and at the carbonyl oxygen at C16 of isosteviol. Linkages at carbon atoms in the C1, C2, C3, C6, C7, C1, C12 and C15 positions of both steviol and isosteviol yield C-glycosides. In addition, C-glycosides can also be formed at the 2 methyl groups at C18 and C20 in both steviol and isosteviol.

The sugar part can be selected from any sugar with 3-7 carbon atoms, derived from either a dihydroxy-acetone (ketose) or a glycerin-aldehyde (aldose). The sugars can occur in open chain or in cyclic form, as D- or L-enantiomers and in α- or β-conformation.

Representative structures of possible sugar (Sug) conformations exemplified by glucose include D-glucopyranose and L-glucopyranose in which the position 1 is determinative of the α- or β-conformation:

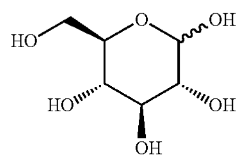

D-Glucopyranose

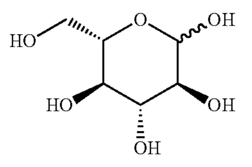

L-Glucopyranose

Pos 1: α- or β-conformation

The steviol glycosides for use in the sweetener or flavor composition of the present application include glycosylated rebaudioside A compounds with or without other steviol glycosides having structures depicted in Table A. Exemplary steviol glycosides are depicted in Table B.

TABLE A

Possible positions of sugar (Sug) molecules linked to steviol/isosteviol.

| Aglycone | Position | Sugar (Sug) | Conjugation | Category |
|---|---|---|---|---|
| Steviol | 13 | D- α | D-Sug α (1-13) | O-glucoside |
| | | D- β | D-Sug β (1-13) | |
| | | L- α | L-Sug α (1-13) | |
| | | L- β | L-Sug β (1-13) | |
| Isosteviol | 16 | D- α/β | D-Sug α/β (1-16) | O-glucoside (after reduction of keto-group) |
| | | L- α/β | L-Sug α/β (1-16) | |
| Steviol Isosteviol | 19 | D/L- α/β | D/L-Sug α/β (1-19) | Glucose-ester |
| Steviol | 1 | D/L- α/β | D/L-Sug α/β (1-1) | C-glucoside |
| | 2 | | D/L-Sug α/β (1-2) | |
| | 3 | | D/L-Sug α/β (1-3) | |
| | (5) | | D/L-Sug α/β (1-5) | |
| | 6 | | D/L-Sug α/β (1-6) | |
| | 7 | | D/L-Sug α/β (1-7) | |
| | (9) | | D/L-Sug α/β (1-9) | |
| | 11 | | D/L-Sug α/β (1-11) | |
| | 12 | | D/L-Sug α/β (1-12) | |
| | 14 | | D/L-Sug α/β (1-14) | |
| | 15 | | D/L-Sug α/β (1-15) | |
| Steviol | (18) | D/L- α/β | D/L-Sug α/β (1-18) | Methylen-glucoside |
| | (20) | | D/L-Sug α/β (1-20) | |
| Isosteviol | 1 | D/L- α/β | D/L-Sug α/β (1-1) | C-glucoside |
| | 2 | | D/L-Sug α/β (1-2) | |
| | 3 | | D/L-Sug α/β (1-3) | |
| | (5) | | D/L-Sug α/β (1-5) | |
| | 6 | | D/L-Sug α/β (1-6) | |
| | 7 | | D/L-Sug α/β (1-7) | |
| | (9) | | D/L-Sug α/β (1-9) | |
| | 11 | | D/L-Sug α/β (1-11) | |
| | 12 | | D/L-Sug α/β (1-12) | |
| | (13) | | D/L-Sug α/β (1-12) | |
| | 14 | | D/L-Sug α/β (1-14) | |
| | 15 | | D/L-Sug α/β (1-15) | |
| Isosteviol | (18) | D/L- α/β | D/L-Sug α/β (1-18) | Methylen-glucoside |
| | (20) | | D/L-Sug α/β (1-20) | |

TABLE B

Exemplary steviol glycosides

| SG Name | MW | # Added Glucose moieties mw = 180 | # Added Rhamnose/ Deoxy-hexose moieties mw = 164 | # Added Xylose/ Arabinose moieties mw = 150 | R1 (C-19) | R2 (C-13) | Backbone |
|---|---|---|---|---|---|---|---|
| Related SvGn#l | 457 | — | | | | | |
| Steviol-monoside | 479 | 1 | | | H- | Glcβ1- | Steviol |
| Steviol-monoside A | 479 | 1 | 1 | | Glcβ1- | H- | |
| SG-4 | 611 | 1 | | 1 | H- | Xylβ(1-2)Glcβ1- | Steviol |
| Dulcoside A1 | 625 | 1 | 1 | | H- | Rhaα(1-2)Glcβ1- | Steviol |
| Iso-steviol-bioside | 641 | 2 | | | H- | Glcβ(1-2)Glcβ1- | Isosteviol |
| Reb-G1 | 641 | 2 | | | H- | Glcβ(1-3)Glcβ1- | Steviol |
| Rubusoside | 641 | 2 | | | Glcβ1- | Glcβ1- | Steviol |
| Steviolbioside | 641 | 2 | | | H- | Glcβ(1-2)Glcβ1- | Steviol |
| Related SvGn#3 | 675 | — | | | | | |
| Reb-F1 | 773 | 2 | | 1 | H- | Xylβ(1-2)[Glcβ(1-3)]Glcβ1- | Steviol |
| Reb-R1 | 773 | 2 | | 1 | H- | Glcβ(1-2)[Glcβ(1-3)]Xylβ1- | Steviol |

TABLE B-continued

| Exemplary steviol glycosides | | | | | | | |
|---|---|---|---|---|---|---|---|
| SG Name | MW | # Added Glucose moieties mw = 180 | # Added Rhamnose/ Deoxy-hexose moieties mw = 164 | # Added Xylose/ Arabinose moieties mw = 150 | R1 (C-19) | R2 (C-13) | Backbone |
| Stevioside F (SG-1) | 773 | 2 | | 1 | Glcβ1- | Xylβ(1-2)Glcβ1- | Steviol |
| SG-Unk1 | 773 | 2 | | 1 | — | — | Steviol |
| Dulcoside A | 787 | 2 | 1 | | Glcβ1- | Rhaα(1-2)Glcβ1- | Steviol |
| Dulcoside B (JECFA C) | 787 | 2 | 1 | | H- | Rhaα(1-2)[GlcP(1-3)]Glcβ1- | Steviol |
| SG-3 | 787 | 2 | 1 | | H- | 6-deoxyGlcβ(1-2)[Glcβ(1-3)]Glcβ1- | Steviol |
| Stevioside D | 787 | 2 | 1 | | Glcβ1- | Glcβ(1-2)6-deoxyGlcβ1- | |
| Iso-Reb B | 803 | 3 | | | H- | Glcβ(1-2)[Glcβ(1-3)]Glcβ1- | Isosteviol |
| Iso-Stevioside | 803 | 3 | | | Glcβ1- | Glcβ(1-2)Glcβ1- | Isosteviol |
| Reb B | 803 | 3 | | | H- | Glcβ(1-2)[Glcβ(1-3)]Glcβ1- | Steviol |
| Reb G | 803 | 3 | | | Glcβ1- | Glcβ(1-3)Glcβ1- | Steviol |
| Reb-KA | 803 | 3 | | | Glcβ(1-2)Glcβ1- | Glcβ1- | Steviol |
| SG-13 | 803 | 3 | | | Glcβ1- | Glcβ(1-2)Glcβ1- | Isomeric steviol (12α-hydroxy) |
| Stevioside | 803 | 3 | | | Glcβ1- | Glcβ(1-2)Glcβ1- | Steviol |
| Stevioside B (SG-15) | 803 | 3 | | | Glcβ(1-3)Glcβ1- | Glcβ1- | Steviol |
| Reb F | 935 | 3 | | 1 | Glcβ1- | Xylβ(1-2)[Glcβ(1-3)]Glcβ1- | Steviol |
| Reb R | 935 | 3 | | 1 | Glcβ1- | Glcβ(1-2)[Glcβ(1-3)]Xylβ1- | Steviol |
| SG-Unk2 | 935 | 3 | | 1 | — | — | Steviol |
| SG-Unk3 | 935 | 3 | | 1 | — | — | Steviol |
| Reb F3 (SG-11) | 935 | 3 | | 1 | Xylβ(1-6)Glcβ1- | Glcβ(1-2)Glcβ1- | Steviol |
| Reb F2 (SG-14) | 935 | 3 | | 1 | Glcβ1- | Glcβ(1-2)[Xylβ(l-3)]Glcβ1- | Steviol |
| Reb C | 949 | 3 | 1 | | Glcβ1- | Rhaα(1-2)[Glcβ(1-3)]Glcβ1- | Steviol |
| Reb C2/Reb S | 949 | 3 | 1 | | Rhaα(1-2)Glcβ1- | Glcβ(1-2)Glcβ1- | Steviol |
| Stevioside E (SG-9) | 949 | 3 | 1 | | Glcβ1- | 6-DeoxyGlcβ(1-2)[Glcβ(1-3)]Glcβ1- | Steviol |
| Stevioside E2 | 949 | 3 | 1 | | 6-DeoxyGlcβ1- | Glcβ(1-2)[Glcβ(1-3)]Glcβ1- | |
| SG-10 | 949 | 3 | 1 | | Glcβ1- | Glcα(1-3)Glcβ(1-2)[Glcβ(1-3])Glcβ1- | Steviol |
| Reb L1 | 949 | 3 | 1 | | H- | Glcβ(1-3)Rhaα(1-2)[Glcβ(1-3)]Glcβ1- | Steviol |
| SG-2 | 949 | 3 | 1 | | Glcβ1- | 6-deoxyGlcβ(1-2)[Glcβ(1-3)]Glcβ1- | Steviol |
| Reb A3 (SG-8) | 965 | 4 (1 Fru) | | | Glcβ1- | Glcβ(1-2)[Fruβ(1-3)]Glcβ1- | |
| Iso-Reb A | 965 | 4 | | | Glcβ1- | Glcβ(1-2)[Glcβ(1-3)]Glcβ1- | Isosteviol |
| Reb A | 965 | 4 | | | Glcβ1- | Glcβ(1-2)[Glcβ(1-3)]Glcβ1- | Steviol |
| Reb A2 (SG-7) | 965 | 4 | | | Glcβ1- | Glcβ(1-6)[Glcβ(1-2)]Glcβ1- | Steviol |
| Reb E | 965 | 4 | | | Glcβ(1-2)Glcβ1- | Glcβ(1-2)Glcβ1- | Steviol |
| Reb H1 | 965 | 4 | | | H- | Glcβ(1-6)Glcβ(1-3)[Glcβ1-3)]Glcβ1- | Steviol |
| Related SvGn#2 | 981 | — | | | | | |
| Related SvGn#5 | 981 | — | | | | | |
| RebU2 | 1097 | 4 | | 1 | Xylβ(l-2)[Glcβ(1-3)]Glcβ1- | Glcβ(1-2)Glcβ1- | |
| Reb T | 1097 | 4 | | 1 | Xylβ(1-2)Glcβ1- | Glcβ(1-2)[Glcβ(1-3)]Glcβ1- | |
| Reb W | 1097 | 4 | | 1 | Glcβ(1-2)[Araβ(l-3)]Glcβ1- | Glcβ(1-2)Glcβ1- | |

TABLE B-continued

| Exemplary steviol glycosides | | | | | | | |
|---|---|---|---|---|---|---|---|
| SG Name | MW | # Added Glucose moieties mw = 180 | # Added Rhamnose/ Deoxy-hexose moieties mw = 164 | # Added Xylose/ Arabinose moieties mw = 150 | R1 (C-19) | R2 (C-13) | Backbone |
| Reb W2 | 1097 | 4 | | 1 | Araβ(1-2)Glcβ1- | Glcβ(1-2)[Glcβ(1-3)]Glcβ1- | |
| Reb W3 | 1097 | 4 | | 1 | Araβ(1-6)Glcβ1- | Glcβ(1-2)[Glcβ(1-3)]Glcβ1- | |
| Reb U | 1097 | 4 | | 1 | Araα(1-2)-Glcβ1- | Glcβ(1-2)[Glcβ(1-3)]Glcβ1- | Steviol |
| SG-12 | 1111 | 4 | 1 | | Rhaα(1-2)Glcβ1- | Glcβ(1-2)[Glcβ(1-3)]Glcβ1- | Steviol |
| Reb H | 1111 | 4 | 1 | | Glcβ1- | Glcβ(1-3)Rhaα(1-2)[Glcβ(1-3)]Glcβ1- | Steviol |
| Reb J | 1111 | 4 | 1 | | Rhaα(1-2)Glcβ1- | Glcβ(1-2)[Glcβ(1-3)]Glcβ1- | Steviol |
| Reb K | 1111 | 4 | 1 | | Glcβ(1-2)Glcβ1- | Rhaα(1-2)[Glcβ(1-3)]Glcβ1- | Steviol |
| Reb K2 | 1111 | 4 | 1 | | Glcβ(1-6)Glcβ1- | Rhaα(1-2)[Glcβ(1-3)]Glcβ1- | Steviol |
| SG-Unk4 | 1111 | 4 | 1 | | — | — | Steviol |
| SG-Unk5 | 1111 | 4 | 1 | | — | — | Steviol |
| Reb D | 1127 | 5 | | | Glcβ(1-2)Glcβ1- | Glcβ(1-2)[Glcβ(1-3)]Glcβ1- | Steviol |
| Reb I | 1127 | 5 | | | Glcβ(1-3)Glcβ1- | Glcβ(1-2)[Glcβ(1-3)]Glcβ1- | Steviol |
| Reb L | 1127 | 5 | | | Glcβ1- | Glcβ(1-6)Glcβ(1-2)[Glcβ(1-3)]Glcβ1- | Steviol |
| Reb I3 | 1127 | 5 | | | [Glcβ(1-2)Glcβ(1-6)]Glcβ1- | Glcβ(1-2)Glcβ1- | |
| SG-Unk6 | 1127 | 5 | | | — | — | Steviol |
| Reb Q (SG-5) | 1127 | 5 | | | Glcβ1- | Glcα(1-4)Glcβ(1-2)[Glcβ(1-3)]Glcβ1- | Steviol |
| Reb I2 (SG-6) | 1127 | 5 | | | Glcβ1- | Glcα(1-3)Glcβ1-2[Glcβ1-3)]Glcβ1- | Steviol |
| Reb Q2 | 1127 | 5 | | | Glcα(1-2)Glcα(1-4)Glcβ1- | Glcβ(1-2)Glcβ1- | |
| Reb Q3 | 1127 | 5 | | | Glcβ1- | Glcα(1-4)Glcβ(1-3)[Glcβ(1-2)]Glcβ1- | |
| Reb Tl | 1127 | 5 (1 Gal) | | | Galβ(1-2)Glcβ1- | Glcβ(1-2)[Glcβ(1-3)]Glcβ1- | |
| Related SvGn#4 | 1127 | — | | | | | |
| Reb V2 | 1259 | 5 | | 1 | Xylβ(1-2)[Glcβ(1-3)]-Glcβ1- | Glcβ(1-2)[Glcβ(1-3)]Glcβ1- | Steviol |
| Reb V | 1259 | 5 | | 1 | Glcβ(1-2)[Glcβ(1-3)]Glcβ1- | Xylβ(l-2)[Glcβ(1-3)]-Glcβ1- | |
| Reb Y | 1259 | 5 | | 1 | Glcβ(1-2)[Araβ(l-3)]Glcβ1- | Glcβ(1-2)[Glcβ(1-3)]Glcβ1- | |
| Reb N | 1273 | 5 | 1 | | Rhaα(1-2)[Glcβ(1-3)]Glcβ1- | Glcβ(1-2)[Glcβ(1-3)]Glcβ1- | Steviol |
| Reb M | 1289 | 6 | | | Glcβ(1-2)[Glcβ(1-3)]Glcβ1- | Glcβ(1-2)[Glcβ(1-3)]Glcβ1- | Steviol |
| 15α-OH Reb M | 1305 | 6 | | | Glcβ1-2(Glcβ1-3)Glcβ1- | Glcβ(1-2)[Glcβ1-3]Glcβ1- | 15α-Hydroxy-steviol |
| Reb O | 1435 | 6 | 1 | | Glcβ(1-3)Rhaα(1-2)[Glcβ(1-3)]Glcβ1- | Glcβ(1-2)[Glcβ(1-3)]Glcβ1- | Steviol |
| Reb O2 | 1435 | 6 | 1 | | Glcβ(1-4)Rhaα(1-2)[Glcβ(1-3)]Glcβ1- | Glcβ(1-2)[Glcβ(1-3)]Glcβ1- | |

Legend:
SG-1 to 16: SGs without a specific name; SG-Unk1-6: SGs without detailed structural proof; Glc: Glucose; Rha: Rhamnose; Xyl: Xylose; Ara: Arabinose.

*Stevia* plants contain a variety of different SGs in varying percentages. The phrase "steviol glycoside" is recognized in the art and is intended to include the major and minor constituents of *Stevia*. These "SGs" include, for example, stevioside, steviolbioside, rebaudioside A (RA), rebaudioside B (RB), rebaudioside C (RC), rebaudioside D (RD), rebaudioside E (RE), rebaudioside F (RF), rebaudioside M (RM), rebaudioside O (RO), rebaudioside H (RH), rebaudioside I (RI), rebaudioside L (RL), rebaudioside N (RN), rebaudioside K (RK), rebaudioside J (RJ), rebaudioside U, rubusoside, dulcoside A (DA) as well as those listed in Tables A and B or mixtures thereof.

As used herein, the terms "rebaudioside A," "Reb A," "Reb-A" and "RA" are equivalent terms referring to the same molecule. The same condition applies to all lettered rebaudiosides with the exception of rebaudioside U, which may be referred to as Reb-U or Reb U, but not RU, so as to not be confused with rubusoside which is also referred to as RU.

Based on the type of sugar (i.e. glucose, rhamnose/deoxyhexose, xylose/arabinose) SGs can be grouped into three families (1) SGs with glucose; (2) SG with glucose and one rhamnose or deoxyhexose moiety; and (3) SGs with glucose and one xylose or arabinose moiety.

The steviol glycosides for use in the present application are not limited by source or origin. Steviol glycosides may be extracted from *Stevia* plants or sweet tea leaves, or produced by enzymatic processes, chemical syntheses, or fermentation.

The terms "glycosylated steviol glycoside" and "GSG" refer to a molecule that (1) contains a SG backbone and one or more additional sugar residues, and (2) is artificially produced by glycosylation, conversion, fermentation or chemical synthesis, including isomers therefrom. For example, GRB contains a RB backbone and may be produced by glycosylation of RB or by alkaline hydrolysis of GRA.

The term "RD isomers" or "RA-1Glu" refers to the mono-glycosylation product of RA that contains a glucose residue linked to a RA backbone through an a (4-1) glycosidic bond. RD isomers have the same molecular weight as RD. Examples of RD isomers include, but are not limited to, RD isomers RD01-RD08 described in Table 30-4.

The term "RM isomers" or "RA-2Glu" refers to the di-glycosylation product of RA that contains two glucose residues linked to a RA backbone through a (4-1) glycosidic bonds. RM isomers have the same molecular weight as RM. Examples of RM isomers include, but are not limited to, RM isomers RM04-RM08 described in Table 30-5.

The term "RO isomers" or "RA-3Glu" refers to the tri-glycosylation product of RA that contains three glucose residues linked to a RA backbone through a (4-1) glycosidic bonds. RO isomers have the same molecular weight as RO. Examples of RO isomers include, but are not limited to, RO isomers RO01-RO05 described in Table 31-3a.

The term "RSY isomers" or "RA-4Glu isomers" refers to the tetra-glycosylation product of RA that contains four glucose residues linked to a RA backbone through a (4-1) glycosidic bonds. Examples of RSY isomers include, but are not limited to, RSY isomers RSY01-RSY05 described in Table 31-4a.

The terms "non-steviol glycoside" or "non-SG", refers to glycosides that are not present in *Stevia* plants or *Stevia* extracts. Exemplary non-steviol glycosides include, but are not limited to suaviosides and mogrosides.

The phrases "natural non-*Stevia* glycoside sweetener", "natural non-SG sweetener", including glycosylated forms thereof, are more broadly used with reference to non-*Stevia* glycosides, as well as other natural sweeteners that are not derived from *Stevia* plants- or extracts, including but not limited to thaumatin, xylitol, monellin, brazzein, miraculin, curculin, pentadin, and mabinlin, and combination thereof. The phrase "non-*Stevia* sweetener" is more broadly used with reference to both natural non-SG sweeteners, as well as synthetic and semi-synthetic sweeteners as further described herein.

For example, as used herein, the phrase "total steviol glycosides" refers to the total amount (w/w %) of different SGs and/or GSGs in a composition, unless specific groups of SGs or GSGs are measured in the examples. Further, an acronym of the type "YYxx" is used herein with reference to an SG composition or a GSG composition formed therefrom, where YY refers to a given (such as RA) or collection of compounds (e.g., SGs), where "xx" is typically a percent by weight number between 1 and 100 denoting the level of purity of a given compound (such as RA) or collection of compounds, where the weight percentage of YY in the dried product is equal to or greater than xx.

The acronym "RA97" specifically refers to a composition where the amount of RA is ≥97 wt %, but <98 wt %; the acronym "RA100" specifically refers to a composition where the amount of RA is ≥99 wt %.

The term "non-RA SG" refers to any steviol glycoside that is not rebaudioside A. The term "non-RU SG" refers to any steviol glycoside that is not rebaudioside U.

The acronym "G-X" or "GX" refers to the glycosylation products of a composition "X", i.e., product prepared from an enzymatically catalyzed glycosylation process with X and one or more sugar donors as the starting materials. For example, GRA refers to the glycosylation product of RA. GRA97 refers to the glycosylation product of RA97. GRA100 refers to the glycosylation product of RA100. In some embodiments, the term "glycosylated XX" or "GXX" refers to molecules that is (1) contains a XX backbone and one or more additional sugar residues, and (2) is artificially produced by enzymatic conversion, fermentation or chemical synthesis. For example, glycosylated RB or GRB contains a RB backbone and may be produced by glycosylation of RB or by alkaline hydrolysis of glycosylated RA.

The term "high purity steviol glycoside" "high purity SG" or "hpSG" as used herein, refers to a purified or synthesized steviol glycoside (SG) composition with a particular SG (e.g., RA, RU, RD, RB or RM) content, or a total SG (e.g., TSG(9)) content of 95% or greater, 96% or greater, 97% or greater, 98% or greater, 99% or greater, or 99.5% or greater by weight of the composition.

As used herein, the term "high purity rebaudioside A," "high purity RA" or "hpRA" specifically refers to compositions that contain at least 95% RA by weight. In some embodiments, the term "high purity rebaudioside A," "high purity RA" or "hpRA" refers to compositions that contain at least 96 wt %, 97 wt %, 98 wt %, 99 wt % or 99.5 wt % of RA. Examples of hpRA include RA97 and RA100.

The term "GhpSG" refers the glycosylation product of a hpSG or conversion product from another GhpSG. For example, GhpRB may be produced by glycosylation of hpRB or by alkaline hydrolysis of GhpRA.

As used herein, the term "high purity GSG," or "hpGSG" refers to a highly purified GSG composition that contains at least 70%, 75%, 80%, 85%, 90%, 95%, 96 wt %, 97 wt %, 98 wt %, 99 wt % total GSGs by weight.

The term "non-glycosylated SG," "unreacted SG" or "residue SG" refers to SG molecules that are not subjected to an glycosylation reaction in an artificial setting.

As used herein, the term "short chain GRA" or "SGRA") refers a GRA composition that contains a high portion of monosaccharides and/or disaccharides at the glycosylation sites. In some embodiments, a SGRA contains monosaccharides and/or disaccharides at at least 30%, at least 40%, at least 50%, or at least 60% of all glycosylation sites. In some embodiments, SGRA can be obtained by subjecting GRA to further treatment of α-amylase (e.g., under conditions described in Example 4) to reduce the level of glycosylation on the GRA by shortening the length of saccharide side chains (e.g., converting a trisaccharide site chain into a disaccharide or monosaccharide side chain) at the existing glycosylation sites of the GRA.

Similarly, the term "short chain GSG" or "SGSG") refers a GSG composition that contains a high portion of monosaccharides and/or disaccharides at the glycosylation sites.

In some embodiments, a SGSG contains monosaccharides and/or disaccharides at at least 30%, at least 40%, at least 50%, or at least 60% of all glycosylation sites. In some embodiments, a SGSG is produced by subjecting a GSG to further treatment to reduce the level of glycosylation on the GSG by shortening the length of saccharide side chains (e.g., converting a trisaccharide site chain into a disaccharide or monosaccharide side chain) at the existing glycosylation sites of the GSG.

As used herein, the term "long chain GRA" or "LGRA") refers a GRA composition that contains a high portion of trisaccharides and/or polysaccharides (containing greater than three monosaccharides) at the glycosylation sites. In some embodiments, a LGRA contains trisaccharides and/or polysaccharides (containing greater than three monosaccharides) at at least 30%, at least 40%, at least 50%, or at least 60% of all glycosylation sites. In some embodiments, LGRA can be obtained by subjecting GRA to further treatment of CGTase and dextrin (e.g., under conditions described in Example 6) to increase the level of glycosylation on the GRA by increasing the length of saccharide side chains (e.g., converting a disaccharide or monosaccharide site chain into a trisaccharide side chain) at the existing glycosylation sites of the GRA.

Similarly, the term "long chain GSG" or "LGSG") refers a GSG composition that contains a high portion of trisaccharides and/or polysaccharides (containing greater than three monosaccharides) at the glycosylation sites. In some embodiments, a LGSG contains trisaccharides and/or polysaccharides at at least 30%, at least 40%, at least 50%, or at least 60% of all glycosylation sites. In some embodiments, a LGSG is produced by subjecting a GSG to further treatment to increase the level of glycosylation on the GSG by increasing the length of saccharide side chains (e.g., converting a disaccharide or monosaccharide site chain into a trisaccharide side chain) at the existing glycosylation sites of the GSG.

As used herein, a "small molecule weight steviol glycoside" or "SMW-SG" refers to a steviol glycoside having a molecular weight less than 965 daltons. As used herein, the term "SMW-SGs with carboxyl group" refers to SMW-SGs having a carboxyl group at C19 position. Examples of SMW-SGs with carboxyl group, include but are not limited to, steviol, isosteviol, steviolbioside and steviol monoside.

As used herein, a "high molecule weight steviol glycoside" or "HMW-SG" refers to a steviol glycoside having a molecular weight equal to, or greater than, 965 daltons. Examples of HMW-SGs include, but are not limited to, RA, RD, RE, RI, RM, RN and RO.

As used herein, the term "enzyme-mediated reaction" or "enzymatic reaction" refers to a reaction that is performed under the catalytic action of an enzyme, in particular of a glycosidase or a glycosyltransferase. The method can be performed in the presence of said glycosidase or glycosyltransferase in isolated (purified, enriched) or crude form.

The term "glycosyltransferase" (GT) refers to an enzyme that catalyzes the formation of a glycosidic linkage to form a glycoside. As used herein, the term "glycosyltransferase" also includes variants, mutants and enzymatically active portions of glycosyltransferases. Likewise, the term "glycosidase" also includes variants, mutants and enzymatically active portions of glycosidases.

The term "monosaccharide" as used herein refers to a single unit of a polyhydroxyaldehyde forming an intramolecular hemiacetal the structure of which including a six-membered ring of five carbon atoms and one oxygen atom. Monosaccharides may be present in different diasteromeric forms, such as α or β anomers, and D or L isomers. An "oligosaccharide" consists of short chains of covalently linked monosaccharide units. Oligosaccharides comprise disaccharides which include two monosaccharide units, as well as trisaccharides which include three monosaccharide units. A "polysaccharide" consists of long chains of covalently linked monosaccharide units.

As used herein, the term "Maillard reaction" refers to a non-enzymatic reaction of (1) one or more reducing and/or non-reducing sugars, and (2) one or more amine donors in the presence of heat, wherein the non-enzymatic reaction produces a Maillard reaction product and/or a flavor. Thus, this term is used unconventionally, since it accommodates the use of non-reducing sweetener agents as substrates, which were not heretofore thought to serve as substrates for the Maillard reaction.

The term "reaction mixture" refers to a composition comprising at least one amine donor and one sugar donor, wherein the reaction mixture is to be subjected to a Maillard reaction; a "reaction mixture" is not to be construed as the reaction contents after a Maillard reaction has been conducted, unless otherwise noted.

The term "sugar," as used herein, refers to a sweet-tasting, soluble carbohydrate, typically used in consumer food and beverage products.

The term "sugar donor," as used herein, refers to a sweet-tasting compound or substance from natural or synthetic sources, which can participate as a substrate in a Maillard reaction with an amine group-containing donor molecule.

The term "amine donor," as used herein, refers to a compound or substance containing a free amino group, which can participate in a Maillard reaction.

The term "Maillard reaction product" or "MRP" refers to any compound produced by a Maillard reaction between an amine donor and a sugar donor in the form of a reducing sugar, non-reducing sugar, or both. Preferably, the sugar donor includes at least one carbonyl group. In certain embodiments, the MRP comprises a compound that provides a flavor ("Maillard flavor"), a color ("Maillard color"), or both.

As used hereinafter, the term "standard MRP" or "conventional MRP (C-MRP)" refers to an MRP formed from a reaction mixture that contains (1) at least one reducing sugar as sugar donor and (2) one or more free amino acids as amine donor.

The term "SG-MRP" refers to an MRP prepared from a reaction mixture that contains one or more SGs.

The term "GSG-MRP" refers to an MRP prepared from a reaction mixture that contains one or more GSGs.

As used herein, the term "sweetener" generally refers to a consumable product, which produces a sweet taste when consumed alone. Examples of sweeteners include, but are not limited to, high-intensity sweeteners, bulk sweeteners, sweetener agents, and low sweetness products produced by synthesis, fermentation or enzymatic conversion methods.

As used herein the term "high-intensity sweetener," refers to any synthetic or semi-synthetic sweetener or sweetener found in nature. High-intensity sweeteners are compounds or mixtures of compounds which are sweeter than sucrose. High-intensity sweeteners are typically many times (e.g., 20 times and more, 30 times and more, 50 times and more or 100 times sweeter than sucrose). For example, sucralose is about 600 times sweeter than sucrose, sodium cyclamate is about 30 times sweeter, Aspartame is about 160-200 times sweeter, and thaumatin is about 2000 times sweeter then sucrose (the sweetness depends on the tested concentration compared with sucrose).

High-intensity sweeteners are commonly used as sugar substitutes or sugar alternatives because they are many times sweeter than sugar but contribute only a few to no calories when added to foods. High-intensity sweeteners may also be used to enhance the flavor of foods. High-intensity sweeteners generally will not raise blood sugar levels.

As used herein, the term "high intensity natural sweetener," refers to sweeteners found in nature, typically in plants, which may be in raw, extracted, purified, refined, or any other form, singularly or in combination thereof. High intensity natural sweeteners characteristically have higher sweetness potency, but fewer calories than sucrose, fructose, or glucose. Examples of high intensity natural sweetener include, but are not limited to, sweet tea extracts, *stevia* extracts, swingle extracts, steviol glycosides, suaviosides, mogrosides, mixtures, salts and derivatives thereof.

As used herein, the term "high intensity synthetic sweetener" or "high intensity artificial sweetener" refers to high intensity sweeteners that are not found in nature. High intensity synthetic sweeteners include "high intensity semi-synthetic sweeteners" or "high intensity semi-artificial sweeteners", which are synthesized from, artificially modified from, or derived from natural products. Examples of high intensity synthetic sweeteners include, but are not limited to, sucralose, aspartame, acesulfame-K, neotame, glycyrrhizic acid ammonium salt, sodium cyclamate, saccharin, advantame, neohesperidin dihydrochalcone (NHDC) and mixtures, salts and derivatives thereof.

As used herein, the term "sweetener agent" refers to a high intensity sweetener.

As used herein, the term "bulk sweetener" refers to a sweetener, which typically adds both bulk and sweetness to a confectionery composition and includes, but is not limited to, sugars, sugar alcohols, sucrose, commonly referred to as "table sugar," fructose, commonly referred to as "fruit sugar," honey, unrefined sweeteners, syrups, such as agave syrup or agave nectar, maple syrup, corn syrup and high fructose corn syrup (or HFCS).

As used herein, the term "sweetener enhancer" refers to a compound (or composition) capable of enhancing or intensifying sensitivity of the sweet taste. The term "sweetener enhancer" is synonymous with a "sweetness enhancer," "sweet taste potentiator," "sweetness potentiator," and/or "sweetness intensifier." A sweetener enhancer enhances the sweet taste, flavor, mouth feel and/or the taste profile of a sweetener without giving a detectable sweet taste by the sweetener enhancer itself at an acceptable use concentration. In some embodiments, the sweetener enhancer provided herein may provide a sweet taste at a higher concentration by itself. Certain sweetener enhancers provided herein may also be used as sweetener agents.

Sweetener enhancers can be used as food additives or flavors to reduce the amounts of sweeteners in foods while maintaining the same level of sweetness. Sweetener enhancers work by interacting with sweet receptors on the tongue, helping the receptor to stay switched "on" once activated by the sweetener, so that the receptors respond to a lower concentration of sweetener. These ingredients could be used to reduce the calorie content of foods and beverages, as well as save money by using less sugar and/or less other sweeteners. Examples of sweetener enhancers include, but are not limited to, brazzein, miraculin, curculin, pentadin, mabinlin, thaumatin, and mixtures thereof.

In some cases, sweetener agents or sweeteners can be used as sweetener enhancers or flavors when their dosages in food and beverage are low. In some cases, sweetener enhancers can be utilized as sweeteners where their dosages in foods and beverages are higher than dosages regulated by FEMA, EFSA or other related authorities.

As used herein, the phrase "low sweetness products produced by synthesis, fermentation or enzymatic conversion" refers to products that have less sweetness or similar sweetness than sucrose. Examples of low sweetness products produced by extraction, synthesis, fermentation or enzymatic conversion method include, but are not limited to, sorbitol, xylitol, mannitol, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, and mixtures thereof.

For example, "sugar alcohols" or "polyols" are sweetener and bulking ingredients used in manufacturing of foods and beverages. As sugar substitutes, they supply fewer calories (about a half to one-third fewer calories) than sugar, are converted to glucose slowly, and are not characterized as causing spiked increases in blood glucose levels.

Sorbitol, xylitol, and lactitol are exemplary sugar alcohols (or polyols). These are generally less sweet than sucrose, but have similar bulk properties and can be used in a wide range of food and beverage products. In some case, their sweetness profile can be fine-tuned by being mixed together with high-intensity sweeteners.

The terms "flavor" and "flavor characteristic" are used interchangeably with reference to the combined sensory perception of one or more components of taste, aroma, and/or texture.

The terms "flavoring agent", "flavoring" and "flavorant" are used interchangeably with reference to a product added to food or beverage products to impart, modify, or enhance the flavor of food. As used herein, these terms do not include substances having an exclusively sweet, sour, or salty taste (e.g., sugar, vinegar, and table salt).

The term "natural flavoring substance" refers to a flavoring substance obtained by physical processes that may result in unavoidable but unintentional changes in the chemical structure of the components of the flavoring (e.g., distillation and solvent extraction), or by enzymatic or microbiological processes, from material of plant or animal origin.

The term "synthetic flavoring substance" refers to a flavoring substance formed by chemical synthesis.

The term "enhance," as used herein, includes augmenting, intensifying, accentuating, magnifying, and potentiating the sensory perception of a flavor characteristic without changing the nature or quality thereof.

Unless otherwise specified, the terms "modify" or "modified" as used herein, includes altering, varying, suppressing, depressing, fortifying and supplementing the sensory perception of a flavor characteristic where the quality or duration of such characteristic was deficient.

The phrase "sensory profile" or "taste profile" is defined as the temporal profile of all basic tastes of a sweetener. The onset and decay of sweetness when a sweetener is consumed, as perceived by trained human tasters and measured in seconds from first contact with a taster's tongue ("onset") to a cutoff point (typically 180 seconds after onset), is called the "temporal profile of sweetness." A plurality of such human tasters is called a "sensory panel". In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness".

The phrase "sucrose equivalence" or "SugarE" is the amount of non-sucrose sweetener required to provide the sweetness of a given percentage of sucrose in the same food, beverage, or solution. For instance, a non-diet soft drink typically contains 12 grams of sucrose per 100 ml of water, i.e., 12% sucrose. This means that to be commercially accepted, diet soft drinks must generally have the same sweetness as a 12% sucrose soft drink, i.e., a diet soft drink must have a 12% SugarE. Soft drink dispensing equipment assume an SugarE of 12%, since such equipment is set up for use with sucrose-based syrups.

As used herein, the term "off-taste" refers to an amount or degree of taste that is not characteristically or usually found in a beverage product or a consumable product of the present disclosure. For example, an off-taste is an undesirable taste of a sweetened consumable to consumers, such as, a bitter taste, a licorice-like taste, a metallic taste, an aversive taste, an astringent taste, a delayed sweetness onset, a lingering sweet aftertaste, and the like, etc.

The term "orally consumable product" refers to a composition that can be drunk, eaten, swallowed, inhaled, ingested or otherwise in contact with the mouth or nose of man or animal, including compositions which are taken into and subsequently ejected from the mouth or nose. Orally consumable products are safe for human or animal consumption when used in a generally acceptable range.

The term "fruit juice" refers to a juice derived from one or more fruits. Fruit juices include freshly prepare fruit juices, concentrated fruit juices, and juices reconstituted from concentrated fruit juices.

The term "vegetable juice" refers to a juice derived from one or more vegetables. Vegetables juices include freshly prepare vegetables juices, concentrated vegetables juices, and juices reconstituted from concentrated vegetables juices.

The term "surfactant", or "surface-active agent" refers to compounds that lower the surface tension between two liquids or between a liquid and a solid. Examples of surfactant includes any agent linking oil and water in the composition in the form of emulsion. Surfactant includes non-ionic surfactant and ionic surfactants.

Non-limiting examples of ionic surfactants include, but not limited to, sodium lauryl sulfate, sodium laureth sulfate, ammonium lauryl sulfate, ammonium laureth sulfate, sodium stearate, and potassium cocoate.

Non-limiting examples of non-ionic surfactants include, but not limited to, alcohol ethoxylates, alkyl phenol ethoxylates, fatty acid ethoxylates, polyoxyethylene fatty ethers derived from lauryl, cetyl, and oleyl alcohols, including triethyleneglycol monolauryl ether; monoalkaolamide ethoxylates, sorbitan ester ethoxylates, fatty amine ethoxylates, and ethylene oxide-propylene oxide copolymers (also known as polymeric surfactants), including alkylphenyl ethers of poly(ethylene glycol), alkylethers of poly(ethylene glycol), alkylethers of poly(propylene glycol), and poly (ethylene glycol)/poly(propylene glycol)/poly(ethylene glycol) block copolymers. Non-ionic surfactants are characterized by its hydrophilic/lipophilic balance (HLB), which reflects the surfactant's (or emulsifier's) affinity toward water or oil. The HLB scale ranges from 1 (totally lipophilic) to 20 (totally hydrophilic), with 10 representing an equal balance of both characteristics. Lipophilic emulsifiers form water-in-oil (w/o) emulsions; hydrophilic surfactants form oil-in-water (o/w) emulsions. The HLB of a blend of two emulsifiers equals the weight fraction of emulsifier A times its HLB value, plus the weight fraction of emulsifier B times its HLB value (weighted average). In some embodiments, a single surfactant may suffice. In other embodiments, the sweetener or flavoring composition contains a combination of two or more surfactants.

The term "emulsifier' refers to a surfactant that stabilizes emulsions. Emulsifiers coat droplets within an emulsion and prevent them from coming together, or coalescing.

The term "sugar fatty acid ester" refers to a compound composed of sugar and fatty acids. In a preferred embodiment of the present invention, the sugar fatty acid ester of the present invention is composed of a sugar or sugar derivative esterified with medium chain fatty acids. Suitable sugars include, without limitation, monosaccharides (e.g., glucose, fructose, galactose, and mannose), disaccharides (e.g., sucrose, maltose, and lactose), oligosaccharides (e.g., fructo-oligosaccharide and galacto-saccharide), and sugar derivatives (e.g., erythritol, threitol, arabitol, xylitol, adonitol, fucitol, sorbitol, mannitol, galactitol, inositol, iditol, isomalt, maltitol, volemitol, and lactitol). Suitable medium chain fatty acids include, without limitation, caproic acid, caprylic acid, capric acid, lauric acid, and fatty acids with aliphatic tails of 6 to 12 carbons. The sugar fatty acid esters of a particular sugar can be produced with medium chain fatty acids with different chain lengths, and they can also be mixtures of esters with different fatty acid chain lengths. The sugar esters of the present invention may be one or a combination of more than one sugar fatty acid esters.

Unless otherwise noted, the term "ppm" (parts per million) means parts per million on a wt/wt basis.

II. Sweetener or Flavoring Compositions

One aspect of the present application relates to a sweetener or flavoring composition that comprises (1) one or more GSGs, (2) one or more SGs, and/or (3) a Maillard reaction product (MRP). In some embodiments, the sweetener or flavoring composition comprises one or more additional components, such as a residual sugar doner (e.g., dextrin or maltodextrin) from a glysosylation reaction, reisdual sugar donor and/or amine donor from an Maillard reaction, additional sweeteners (e.g., sugars and other high intensity sweeteners), fibers, thickeners, surfactants, flavorants, etc.

GSGs in the Sweetener or Flavoring Composition of the Present Application

In some embodiments, the one or more GSGs comprise one or more G-HMW-SGs, such as GRA, GRD, GRE, GRI, GRM, GRN and GRO. In some embodiments, the one or more G-HMW-SGs are the glycosylation products of high purity HMW-SGs, such as hpRA, hpRB, hpRD, hpRE, hpRI, hpRM, hpRN and hpRO. In some embodiments, the one or more G-HMW-SGs are the conversion product of an existing G-HMW-SG (e.g., GRE can be obtained from alkaline hydrolysis of GRD or GhpRD).

In some embodiments, the one or more GSGs comprise GRA or G-hp-RA.

In some embodiments, sweetener or flavoring composition that comprises (1) one or more GSGs the one or more GSGs comprise GRD or GhpRD.

In some embodiments, the one or more GSGs comprise GRE or GhpRE.

In some embodiments, the one or more GSGs comprise GRI or GhpRI.

In some embodiments, the one or more GSGs comprise GRM or GhpRM.

In some embodiments, the one or more GSGs comprise GRN or GhpRN.

In some embodiments, the one or more GSGs comprise GRO or GhpRO.

In some embodiments, the one or more GSGs comprise one or more G-SMW-SGs, such as GRB, GRC, GRF, glycosylated stevioside (GSTV), glycosylated dulcoside A (GDA), glycosylated rubusoside (GRU), glycosylated steviobioside (GSTB) and glycosylated steviol monoside (GSTM). In some embodiments, the one or more G-SMW-SGs are the glycosylation products of high purity SMW-SGs, such as hpRB, hpRC, hpRF, high purity stevioside (hpSTV), high purity dulcoside A (hpDA), high purity rubusoside (hpRU), high purity steviobioside (hpSTB) and high purity steviol monoside (hpSTM). In some embodiments, the one or more G-SMW-SGs are the conversion product of an existing GSG (e.g., GRB can be obtained from alkaline hydrolysis of GRA or GhpRA).

In some embodiments, the one or more GSGs comprise GRB or GhpRB.

In some embodiments, the one or more GSGs comprise glycosylated stevioside (GSTV) or glycosylated high purity stevioside (GhpSTV).

In some embodiments, the one or more GSGs comprise GRC or GhpRC.

In some embodiments, the one or more GSGs comprise GRF or GhpRF

In some embodiments, the one or more GSGs comprise glycosylated dulcoside A (GDA) or glycosylated high purity dulcoside (GhpDA).

In some embodiments, the one or more GSGs comprise glycosylated rubusoside (GRU) or glycosylated high purity rubusoside (GhpRU).

In some embodiments, the one or more GSGs comprise glycosylated steviobioside (GSTB) or glycosylated high purity steviobioside (GhpSTB).

In some embodiments, the one or more GSGs comprise glycosylated steviol monoside (GSTM) or glycosylated high purity steviol monoside (GhpSTM).

In some embodiments, the one or more GSGs comprise one or more glycosylated SMW-SGs with carboxyl group.

In some embodiments, the one or more GSGs comprise G-HMW-SGs and G-SMW-SGs at a G-HMW-SGs:G-SMW-SGs weight ratio in the range of 99:1 to 1:99, 90:1 to 1:99, 80:1 to 1:99, 70:1 to 1:99, 60:1 to 1:99, 50:1 to 1:99, 40:1 to 1:99, 30:1 to 1:99, 20:1 to 1:99, 10:1 to 1:99, 1:1 to 1:99, 99:1 to 1:90, 90:1 to 1:90, 80:1 to 1:90, 70:1 to 1:90, 60:1 to 1:90, 50:1 to 1:90, 40:1 to 1:90, 30:1 to 1:90, 20:1 to 1:90, 10:1 to 1:90, 1:1 to 1:90, 99:1 to 1:60, 90:1 to 1:60, 80:1 to 1:60, 70:1 to 1:60, 60:1 to 1:60, 50:1 to 1:60, 40:1 to 1:60, 30:1 to 1:60, 20:1 to 1:60, 10:1 to 1:60, 1:1 to 1:60, 99:1 to 1:30, 90:1 to 1:30, 80:1 to 1:30, 70:1 to 1:30, 60:1 to 1:30, 50:1 to 1:30, 40:1 to 1:30, 30:1 to 1:30, 20:1 to 1:30, 10:1 to 1:30, 1:1 to 1:30, 99:1 to 1:10, 90:1 to 1:10, 80:1 to 1:10, 70:1 to 1:10, 60:1 to 1:10, 50:1 to 1:10, 40:1 to 1:10, 30:1 to 1:10, 20:1 to 1:10, 10:1 to 1:10, 1:1 to 1:10.

Methods for producing the GSGs of the present application include, but not limited to, (1) enzyme-mediated glycosylation of a SG, (2) non enzyme-mediated glycosylation such as microwave-assisted glycosylation of a SG, (3) enzyme-mediated conversion from existing GSGs (e.g., subjecting an existing GSG composition to amylase/glycosyl hydrolase treatment to reduce the level of glycosylation or to CGTase/dextrin treatment to increase the level of glycosylation), and (4) non-enzyme mediated conversion from existing GSGs, such as alkaline or acid hydrolysis of a GSG (e.g., GRB produced from alkaline hydrolysis of GRA, GSTB produced from alkaline hydrolysis of GSTV, etc.) or microwave-assisted glycosylation of an existing GSG. As used herein, the term "existing GSG" refers to a starting material that already meets the definition of GSG of the present application.

In some embodiments, the sweetener or flavoring composition comprises one or more GSGs, individually or collectively, in an amount of 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % of the sweetener or flavoring composition.

In some embodiments, the sweetener or flavoring composition comprises one or more GSGs, individually or collectively, in an amount, equal to, or greater than, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 95 wt % of the sweetener or flavoring composition.

In some embodiments, the sweetener or flavoring composition comprises a GSG in an amount equals to, or is greater than, 40%, 50%, 60%, 65%, 70% or 80% by weight of the composition. In some embodiments, the GSG is GRA, GRB, GRC, GRD, GRE, GRF, GRI, GRM, GRN, GRO, GRU, GSTV, GDA, GSTB or GSTM.

In some embodiments, the sweetener or flavoring composition comprises monoglucose-glycosylated SG in an amount that equals to, or is greater than, 5%, 10%, 15%, 20%, 25%, 30%, 35% or 40% by weight of the composition. In some embodiments, the monoglucose-glycosylated SG is monoglucose-glycosylated RA, monoglucose-glycosylated RB, monoglucose-glycosylated RC, monoglucose-glycosylated RD, monoglucose-glycosylated RE, monoglucose-glycosylated RF, monoglucose-glycosylated RI, monoglucose-glycosylated RM, monoglucose-glycosylated RN, monoglucose-glycosylated RO, monoglucose-glycosylated RU, monoglucose-glycosylated STV, monoglucose-glycosylated DA, monoglucose-glycosylated STB or monoglucose-glycosylated STM.

In some embodiments, the sweetener or flavoring composition comprises diglucose-glycosylated SG in an amount that equals to, or is greater than, 5%, 10%, 15%, 20%, 25%, 30%, 35% or 40% by weight of the composition. In some embodiments, the diglucose-glycosylated SG is diglucose-glycosylated RA, diglucose-glycosylated RB, diglucose-glycosylated RC, diglucose-glycosylated RD, diglucose-glycosylated RE, diglucose-glycosylated RF, diglucose-glycosylated RI, diglucose-glycosylated RM, diglucose-glycosylated RN, diglucose-glycosylated RO, diglucose-glycosylated RU, diglucose-glycosylated STV, diglucose-glycosylated DA, diglucose-glycosylated STB or diglucose-glycosylated STM.

In some embodiments, the sweetener or flavoring composition comprises triglucose-glycosylated SG in an amount that equals to, or is greater than, 1%, 2%, 5%, 10%, 15%, 20%, 30% or 40% by weight of the composition. In some embodiments, the triglucose-glycosylated SG is triglucose-glycosylated RA, triglucose-glycosylated RB, triglucose-glycosylated RC, triglucose-glycosylated RD, triglucose-glycosylated RE, triglucose-glycosylated RF, triglucose-glycosylated RI, triglucose-glycosylated RM, triglucose-glycosylated RN, triglucose-glycosylated RO, triglucose-glycosylated RU, triglucose-glycosylated STV, triglucose-glycosylated DA, triglucose-glycosylated STB or triglucose-glycosylated STM.

In some embodiments, the sweetener or flavoring composition comprises tetraglucose-glycosylated SG in an amount that equals to, or is greater than, 1%, 2%, 5%, 10%, 15%, 20%, 30% or 40% by weight of the composition. In some embodiments, the tetraglucose-glycosylated SG is tetraglucose-glycosylated RA, tetraglucose-glycosylated RB, tetraglucose-glycosylated RC, tetraglucose-glycosylated RD, tetraglucose-glycosylated RE, tetraglucose-glycosylated RF, tetraglucose-glycosylated RI, tetraglucose-glycosylated RM, tetraglucose-glycosylated RN, tetraglucose-glycosylated RO, tetraglucose-glycosylated RU, tetraglucose-glycosylated STV, tetraglucose-glycosylated DA, tetraglucose-glycosylated STB or tetraglucose-glycosylated STM.

In some embodiments, the sweetener or flavoring composition comprises pentaglucose-glycosylated SG in an amount that equals to, or is greater than, 1%, 2%, 5%, 10%, 15%, 20%, 30% or 40% by weight of the composition. In some embodiments, the pentaglucose-glycosylated SG is pentaglucose-glycosylated RA, pentaglucose-glycosylated RB, pentaglucose-glycosylated RC, pentaglucose-glycosylated RD, pentaglucose-glycosylated RE, pentaglucose-glycosylated RF, pentaglucose-glycosylated RI, pentaglucose-glycosylated RM, pentaglucose-glycosylated RN, pentaglucose-glycosylated RO, pentaglucose-glycosylated RU, pentaglucose-glycosylated STV, pentaglucose-glycosylated DA, pentaglucose-glycosylated STB or pentaglucose-glycosylated STM.

In some embodiments, the sweetener or flavoring composition comprises (1) GSGs in an amount that equal to, or is more than, 60%, 65%, 70% or 80% by weight of the total amount of SGs and GSGs in the composition, and (2) SGs in an amount that equals to, or is less than, 20%, 15%, 10% or 5% by weight of the composition.

In some embodiments, the sweetener or flavoring composition comprises (1) GRA in an amount that equal to, or is more than, 60%, 65%, 70% or 80% by weight of the total amount of SGs and GSGs in the composition, and (2) RA in an amount that equals to, or is less than, 20%, 15%, 10% or 5% by weight of the composition.

In some embodiments, the sweetener or flavoring composition comprises (1) GRB in an amount that equal to, or is more than, 60%, 65%, 70% or 80% by weight of the total amount of SGs and GSGs in the composition, and (2) RB in an amount that equals to, or is less than, 20%, 15%, 10% or 5% by weight of the composition.

In some embodiments, the sweetener or flavoring composition comprises (1) GRC in an amount that equal to, or is more than, 60%, 65%, 70% or 80% by weight of the total amount of SGs and GSGs in the composition, and (2) RC in an amount that equals to, or is less than, 20%, 15%, 10% or 5% by weight of the composition.

In some embodiments, the sweetener or flavoring composition comprises (1) GRD in an amount that equal to, or is more than, 60%, 65%, 70% or 80% by weight of the total amount of SGs and GSGs in the composition, and (2) RD in an amount that equals to, or is less than, 20%, 15%, 10% or 5% by weight of the composition.

In some embodiments, the sweetener or flavoring composition comprises (1) GRE in an amount that equal to, or is more than, 60%, 65%, 70% or 80% by weight of the total amount of SGs and GSGs in the composition, and (2) RE in an amount that equals to, or is less than, 20%, 15%, 10% or 5% by weight of the composition.

In some embodiments, the sweetener or flavoring composition comprises (1) GRM in an amount that equal to, or is more than, 60%, 65%, 70% or 80% by weight of the total amount of SGs and GSGs in the composition, and (2) RM in an amount that equals to, or is less than, 20%, 15%, 10% or 5% by weight of the composition.

In some embodiments, the sweetener or flavoring composition comprises (1) GRU in an amount that equal to, or is more than, 60%, 65%, 70% or 80% by weight of the total amount of SGs and GSGs in the composition, and (2) RU in an amount that equals to, or is less than, 20%, 15%, 10% or 5% by weight of the composition.

In some embodiments, the sweetener or flavoring composition comprises (1) GSTV in an amount that equal to, or is more than, 60%, 65%, 70% or 80% by weight of the total amount of SGs and GSGs in the composition, and (2) STV in an amount that equals to, or is less than, 20%, 15%, 10% or 5% by weight of the composition.

In some embodiments, the sweetener or flavoring composition comprises (1) GDA in an amount that equal to, or is more than, 60%, 65%, 70% or 80% by weight of the total amount of SGs and GSGs in the composition, and (2) DA in an amount that equals to, or is less than, 20%, 15%, 10% or 5% by weight of the composition.

In some embodiments, the sweetener or flavoring composition comprises (1) GSTB in an amount that equal to, or is more than, 60%, 65%, 70% or 80% by weight of the total amount of SGs and GSGs in the composition, and (2) STB in an amount that equals to, or is less than, 20%, 15%, 10% or 5% by weight of the composition.

In some embodiments, the sweetener or flavoring composition comprises (1) GSTM in an amount that equal to, or is more than, 60%, 65%, 70% or 80% by weight of the total amount of SGs and GSGs in the composition, and (2) STM in an amount that equals to, or is less than, 20%, 15%, 10% or 5% by weight of the composition.

In some embodiments, the sweetener or flavoring composition comprises glycosylated non-RA SGs, non-glycosylated non-RU SGs, non-RA SGs and non-RU SGs in a total amount equal to, or less than, 0.1%, 0.5%, 1%, 2%, 3%, 5%, 10%, 20%, 30%, 50% or 60% by weight of the composition. In some embodiments, the total amount of glycosylated non-RA SGs and non-RA SGs equals to, or is less than, 0.1%, 0.5%, 1%, 2%, 3%, 5%, 10%, 20%, 30%, 50%, 60% by weight of the composition.

In some embodiments, the sweetener or flavoring composition that comprises a GhpRA composition, wherein the GhpRA composition comprises (1) one or more isomers of RD, and/or (2) one or more isomers of RM, and/or (3) one or more isomers of RO, and/or (4) one or more isomers of RA-4glu (also referred to as tetraglycosylated RA or RSY).

In some embodiments, the GhpRA is prepared from hpRA with a RA content of 95% or greater, 96% or greater, 97% or greater, 98% or greater, 99% or greater, or 99.5% or greater by weight of the hpRA. In some embodiments, the GhpRA comprises one or more isomers of RD and/or RM. In some embodiments, the GhpRA comprises one or more isomers of RD and/or RM in an amount, individually or collectively, that equals to, or greater than, 1%, 2%, 5%, 10%, 15%, 20%, 25%, 30%, 35%, 40%, 45%, 50%, 55%, 60%, 65%, 70%, 75%, 80%, 85%, 90% or 95% by weight.

In some embodiments, the GhpRA composition comprises RD isomers in a total amount in the range of 10-50 wt %, 10-45 wt %, 10-40 wt %, 10-35 wt %, 10-30 wt %, 10-25 wt %, 10-20 wt %, 10-15 wt %, 15-50 wt %, 15-45 wt %, 15-40 wt %, 15-35 wt %, 15-30 wt %, 15-25 wt %, 15-20 wt %, 20-50 wt %, 20-45 wt %, 20-40 wt %, 20-35 wt %, 20-30 wt %, 20-25 wt %, 25-50 wt %, 25-45 wt %, 25-40 wt %, 25-35 wt %, 25-30 wt %, 30-50 wt %, 30-45 wt %, 30-40 wt %, 30-35 wt %, 35-50 wt %, 35-45 wt %, 35-40 wt %, 40-50 wt %, 40-45 wt % or 45-50 wt % of the GhpRA composition. In some embodiments, the GhpRA composition comprises RD isomers in a total amount in the range of 26-30 wt %, 20-24 wt % or 34-38 wt % of the GhpRA composition. In some embodiments, the RD isomers comprise one or more of RD isomer structure I-IV (see, e.g., Table 32-1b of Example 32).

In some embodiments, the RD isomers comprise one or more of RD isomers RD01-08 (see, e.g., Table 30-4 of Example 30). In some embodiments, the RD isomers comprise RD isomers RD04-08. In some embodiments, the RD isomers comprise RD isomers RD04-07. In some embodiments, the RD isomers have different structures but a common molecular weight of 1127 dalton.

In some embodiments, the GhpRA composition comprises RM isomers in a total amount in the range of 10-40 wt %, 10-35 wt %, 10-30 wt %, 10-25 wt %, 10-20 wt %, 10-15 wt %, 15-40 wt %, 15-35 wt %, 15-30 wt %, 15-25 wt %, 15-20 wt %, 20-40 wt %, 20-35 wt %, 20-30 wt %, 20-25 wt %, 25-40 wt %, 25-35 wt %, 25-30 wt %, 30-40 wt %, 30-35 wt % or 35-40 wt %, of the G-hpRA composition. In some embodiments, the G-hpRA composition comprises RM isomers in a total amount in the range of 24-28 wt %, 19-23 wt % or 27-30 wt % of the G-hpRA composition. In some embodiments, the RM isomers comprise one or more of RM isomer structure I-X (see, e.g., Table 32-2b of Example 32). In some embodiments, the RM isomers comprise one or more RM isomers of RM01-08 (see, e.g., Table 30-5 of Example 30). In some embodiments, the RM isomers comprise RM isomers RM04-08. In some embodiments, the RM isomers have different structures but a common molecular weight of 1289 dalton.

In some embodiments, the GhpRA composition comprises RA-3Glu isomers in a total amount in the range of 5-25 wt %, 5-20 wt %, 5-15 wt %, 5-10 wt %, 10-25 wt %, 10-20 wt %, 10-15 wt %, 15-25 wt %, 15-20 wt % or 20-25 wt % of the G-hpRA composition. In some embodiments, the GhpRA composition comprises RA-3Glu isomers in a total amount in the range of 12-16 wt % or 10-13 wt % of the G-hpRA composition. In some embodiments, the RA-3Glu isomers comprise one or more of RA-3Glu isomers RO01-05 (see, e.g., Table 31-3a of Example 31). In some embodiments, the RA-3Glu isomers have different structures but a common molecular weight of 1451 dalton.

In some embodiments, the G-hpRA composition comprises RA-4Glu isomers in a total amount in the range of 1-15 wt %, 1-10 wt %, 1-8 wt %, 1-5 wt %, 1-3 wt %, 3-15 wt %, 3-10 wt %, 3-8 wt %, 3-5 wt %, 5-15 wt %, 5-10 wt %, 5-8 wt %, 8-15 wt %, 8-10 wt % or 10-15 wt % of the G-hpRA composition. In some embodiments, the G-hpRA composition comprises RA-4Glu isomers in a total amount in the range of 6-8 wt % or 5-7 wt % of the G-hpRA composition. In some embodiments, the RA-4Glu isomers comprise one or more of RSY isomers RSY01-05 (see, e.g., Table 31-4a of Example 31). In some embodiments, the RA-4Glu isomers have different structures but a common molecular weight of 1613 dalton.

In some embodiments, the sweetener or flavoring composition contains a short side chain glycosylated RA (SGRA) composition. In some embodiments, the SGRA composition is a SGRA100 composition. In some embodiments, greater than 80 wt %, greater than 85 wt %, greater than 90 wt %, or greater than 95% of the GRA molecules in the SGRA composition have a retention time that is between the retention time of RD (including the retention time of RD) and the retention time of RA (not including the retention time of RA) in an HPLC spectrogram generated under conditions described in Example 8 of this application.

In some embodiments, the sweetener or flavoring composition contains a long side chain glycosylated RA (LGRA) composition. In some embodiments, the LGRA composition is a LGRA100 composition. In some embodiments, 80 wt % or less, 75 wt % or less, 70 wt % or less, 65 wt % or less, 60 wt % or less, 55 wt % or less, or 50 wt % or less of the GRA molecules in the LGRA composition have a retention time that is between the retention time of RD (including the retention time of RD) and the retention time of RA (not including the retention time of RA) in an HPLC spectrogram generated under conditions described in Example 8 of this application.

In some embodiments, the composition comprises glycosylated high purity steviol glycoside (G-hpSG). The term "high purity steviol glycoside" or "hpSG" as used herein, refers to a purified or synthesized steviol glycoside (SG) composition with a particular SG (e.g., RA, RU, RD, RB or RM) content, or a total SG content of 95% or greater, 96% or greater, 97% or greater, 98% or greater, 99% or greater, or 99.5% or greater by weight of the composition. In some embodiments, the composition comprises (a) G-hpSG and (b) a hpSG. In some embodiments, the composition comprises (a) G-hpSTV and (b) hpSTV. In some embodiments, the composition comprises (a) G-hpRC and (b) hpRC. In some embodiments, the composition comprises (a) G-hpRD and (b) hpRD. In some embodiments, the composition comprises (a) G-hpRM and (b) hpRMIn some embodiments, the composition comprises (a) G-hpRA and (b) one or more SGs. In some embodiments, the composition comprises (a) G-hpRA and (b) hpRA. In some embodiments, the composition comprises G-hpRA and a high intensity sweetener (HIS). Examples of HIS are listed in the Definition section of this application. In some embodiments, the sweetener or flavoring composition contains a GRA-MRP formed from a reaction mixture comprising: (a) a G-hpRA; (b) an amine donor; and (c) a sugar donor.

SGs in the Sweetener or Flavoring Composition of the Present Application

In some embodiments, the one or more SGs comprise a SG component selected from *stevia* extracts (SEs), partially purified steviol glycosides such as RA20, RA25, RA30, RA40, RA50, RA60, RA70, RA80 and RA90, hpSGs such as RA97 and RA 100, and residual SGs from a glycosylation reaction or hydrolysis reaction with a SG as a starting reactant.

In some embodiments, the one or more SGs comprise a hpSG.

In some embodiments, the one or more SGs comprise hpRA.

In some embodiments, the one or more SGs comprise hpRB.

In some embodiments, the one or more SGs comprise hpRC.

In some embodiments, the one or more SGs comprise hpRD.

In some embodiments, the one or more SGs comprise hpRE.

In some embodiments, the one or more SGs comprise hpRC.

In some embodiments, the one or more SGs comprise hpRI.

In some embodiments, the one or more SGs comprise hpRM.

In some embodiments, the one or more SGs comprise hpRN.

In some embodiments, the one or more SGs comprise hpRU.

In some embodiments, the one or more SGs comprise hpDA.

In some embodiments, the one or more SGs comprise hpSTV.

In some embodiments, the one or more SGs comprise hpSTB.

In some embodiments, the one or more SGs comprise hpSTM.

In some embodiments, the one or more SGs are residue SGs from a glycosylation reaction.

In some embodiments, the sweetener or flavoring composition comprises one or more SGs, individually or collectively, in an amount of 0.1-75 wt %, 0.1-50 wt %, 0.1-25 wt %, 0.1-10 wt %, 0.1-5 wt %, 0.1-2 wt %, 0.1-1 wt %, 0.1-0.5 wt %, 1-75 wt %, 1-50 wt %, 1-25 wt %, 1-10 wt %, 1-5 wt %, 5-75 wt %, 5-50 wt %, 5-25 wt %, 5-10 wt %, 10-75 wt %, 10-50 wt %, 10-25 wt %, 10-15 wt %, 20-75 wt %, 20-50 wt %, 30-75 wt %, 30-50 wt %, 40-75 wt %, 40-50 wt %, 50-75 wt %, 60-75 wt %, or 70-75 wt % of the sweetener or flavoring composition.

In some embodiments, the sweetener or flavoring composition comprises one or more SGs, individually or collectively, in an amount greater than 0.01 wt %, but less than, 1 wt %, 2 wt %, 5 wt %, 7 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, or 75 wt % of the sweetener or flavoring composition. In some embodiments, the one or more SGs are residue SGs of a glycosylation reaction that generated the one or more GSGs of the sweetener or flavoring composition.

In some embodiments, the sweetener or flavoring composition comprises a detectable level of RA, wherein RA is present in an amount that equals to, or is less than, 20%, 15%, 10% or 5% by weight of the composition.

In some embodiments, the sweetener or flavoring composition comprises a detectable level of RB, wherein RB is present in an amount that equals to, or is less than, 5%, 2%, 1%, 0.5%, 0.2% or 0.1% by weight of the composition.

In some embodiments, the sweetener or flavoring composition comprises a detectable level of RC, wherein RC is present in an amount that equals to, or is less than, 1%, 0.5%, 0.2%, 0.1%, 0.05%, 0.02% or 0.02% by weight of composition.

In some embodiments, the sweetener or flavoring composition comprises a detectable level of RD, wherein RD is present in an amount that equals to, or is less than, 1%, 0.5%, 0.2%, 0.1%, 0.05%, 0.02% or 0.02% by weight of the composition.

In some embodiments, the sweetener or flavoring composition does not contain any detectable level of STV, STB, STM, RF, RU and/or DA.

In some embodiments, the sweetener or flavoring composition comprises a detectable level of residual SG, wherein the residue SG is present in a total amount that equals to, or is less than, 0.1%, 0.5%, 1%, 2%, 3%, 5%, 10%, 20% or 30% by weight of the composition.

In some embodiments, the sweetener or flavoring composition comprises detectable level of partially degraded SG, wherein the partially degraded SG is present in a total amount that equals to, or is less than, 0.1%, 0.5%, 1%, 2%, 3%, 5%, 10%, 20% or 30% by weight of the composition. As used hereinafter, the term "partially degraded SG" refers to degradation products of SG. For example, RB can be a partial degradation product of RA. GRB can be a partial degradation product of GRA by alkaline hydrolysis, as described in more detail in Section II(A)(2).

In some embodiments, the one or more SGs comprise HMW-SGs and SMW-SGs at a HMW-SGs:SMW-SGs weight ratio in the range of 99:1 to 1:99, 90:1 to 1:99, 80:1 to 1:99, 70:1 to 1:99, 60:1 to 1:99, 50:1 to 1:99, 40:1 to 1:99, 30:1 to 1:99, 20:1 to 1:99, 10:1 to 1:99, 1:1 to 1:99, 99:1 to 1:90, 90:1 to 1:90, 80:1 to 1:90, 70:1 to 1:90, 60:1 to 1:90, 50:1 to 1:90, 40:1 to 1:90, 30:1 to 1:90, 20:1 to 1:90, 10:1 to 1:90, 1:1 to 1:90, 99:1 to 1:60, 90:1 to 1:60, 80:1 to 1:60, 70:1 to 1:60, 60:1 to 1:60, 50:1 to 1:60, 40:1 to 1:60, 30:1 to 1:60, 20:1 to 1:60, 10:1 to 1:60, 1:1 to 1:60, 99:1 to 1:30, 90:1 to 1:30, 80:1 to 1:30, 70:1 to 1:30, 60:1 to 1:30, 50:1 to 1:30, 40:1 to 1:30, 30:1 to 1:30, 20:1 to 1:30, 10:1 to 1:30, 1:1 to 1:30, 99:1 to 1:10, 90:1 to 1:10, 80:1 to 1:10, 70:1 to 1:10, 60:1 to 1:10, 50:1 to 1:10, 40:1 to 1:10, 30:1 to 1:10, 20:1 to 1:10, 10:1 to 1:10, 1:1 to 1:10.

In some embodiments, the sweetener or flavoring composition comprises one or more GSGs and one or more SGs at a GSG:SG weight ratio in the range of 99:1 to 1:99, 90:1 to 1:99, 80:1 to 1:99, 70:1 to 1:99, 60:1 to 1:99, 50:1 to 1:99, 40:1 to 1:99, 30:1 to 1:99, 20:1 to 1:99, 10:1 to 1:99, 1:1 to 1:99, 99:1 to 1:90, 90:1 to 1:90, 80:1 to 1:90, 70:1 to 1:90, 60:1 to 1:90, 50:1 to 1:90, 40:1 to 1:90, 30:1 to 1:90, 20:1 to 1:90, 10:1 to 1:90, 1:1 to 1:90, 99:1 to 1:60, 90:1 to 1:60, 80:1 to 1:60, 70:1 to 1:60, 60:1 to 1:60, 50:1 to 1:60, 40:1 to 1:60, 30:1 to 1:60, 20:1 to 1:60, 10:1 to 1:60, 1:1 to 1:60, 99:1 to 1:30, 90:1 to 1:30, 80:1 to 1:30, 70:1 to 1:30, 60:1 to 1:30, 50:1 to 1:30, 40:1 to 1:30, 30:1 to 1:30, 20:1 to 1:30, 10:1 to 1:30, 1:1 to 1:30, 99:1 to 1:10, 90:1 to 1:10, 80:1 to 1:10, 70:1 to 1:10, 60:1 to 1:10, 50:1 to 1:10, 40:1 to 1:10, 30:1 to 1:10, 20:1 to 1:10, 10:1 to 1:10, 1:1 to 1:10.

MRPs in the Sweetener or Flavoring Composition of the Present Application

In some embodiments, the MRP is prepared from a reaction mixture that contains a high intensity sweetener selected from the group consisting of SGs, GSGs, *stevia* extracts, glycosylated *stevia* extracts, sweet tea extracts, glycosylated sweet tea extracts, suaviosides, glycosylated suaviosides, monk fruit extracts, glycosylated monk fruit extracts, mogrosides, glycosylated mogrosides, erythritol, licorice extracts, and combinations thereof.

In some embodiments, the MRP is prepared from a reaction mixture that contains a SG. In some embodiments, the SG undergoes Maillard reaction with an amine donor.

In some embodiments, the MRP is prepared from a reaction mixture that contains a hpSG. In some embodiments, the hpSG undergoes Maillard reaction with an amine donor.

In some embodiments, the MRP is prepared from a reaction mixture that contains a GSG. In some embodiments, the GSG undergoes Maillard reaction with an amine donor.

In some embodiments, the MRP is prepared from a reaction mixture that contains a GhpSG. In some embodiments, the GhpSG undergoes Maillard reaction with an amine donor.

In some embodiments, the MRP is prepared from a reaction mixture that contains both SG and GSG. In some embodiments, the SG and/or GSG undergo Maillard reaction with an amine donor.

In some embodiments, the MRP is a C-MRP.

In some embodiments, the sweetener or flavoring composition comprises the SG-MRP and/or GSG-MRP, individually or collectively, in an amount of 0.001-99 wt %, 0.001-75 wt %, 0.001-50 wt %, 0.001-25 wt %, 0.001-10 wt %, 0.001-5 wt %, 0.001-2 wt %, 0.001-1 wt %, 0.001-0.1 wt %, 0.001-0.01 wt %, 0.01-99 wt %, 0.01-75 wt %, 0.01-50 wt %, 0.01-25 wt %, 0.01-10 wt %, 0.01-5 wt %, 0.01-2 wt %, 0.01-1 wt %, 0.1-99 wt %, 0.1-75 wt %, 0.1 wt-50 wt %, 0.1-25 wt %, 0.1-10 wt %, 0.1-5 wt %, 0.1-2 wt %, 0.1-1 wt %, 0.1-0.5 wt %, 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % of the sweetener or flavoring composition.

In some embodiments, the sweetener or flavoring composition of the present application comprises one or more substances selected from the group consisting of SGs, GSGs, SG-derived Maillard reaction products (SG-MRPs) and GSG-derived Maillard reaction products (GSG-MRPs), wherein glycosylated non-RA SGs and non-RA SGs are present in a total amount that equals to, or is less than, 0.1%, 0.5%, 1%, 2%, 3%, 5%, 10%, 20%, 30%, 50%, 60% by weight of the composition.

In some embodiments, the sweetener or flavoring composition of the present application comprises one or more substances selected from the group consisting of SGs, GSGs, SG-MRPs and GSG-MRPs, wherein the composition comprises GRA and RA in a total amount that equals to, or is greater than 50%, 60%, 70%, 80%, 85%, 90%, 95%, 97%, 98% or 99% by weight of the composition.

In some embodiments, the sweetener or flavoring composition of the present application comprises one or more substances selected from the group consisting of SGs, GSGs, SG-MRPs and GSG-MRPs, wherein the composition comprises GRB and RB in a total amount that equals to, or is greater than 50%, 60%, 70%, 80%, 85%, 90%, 95%, 97%, 98% or 99% by weight of the composition.

In some embodiments, the sweetener or flavoring composition of the present application comprises one or more substances selected from the group consisting of SGs, GSGs, SG-MRPs and GSG-MRPs, wherein the composition comprises GRD and RD in a total amount that equals to, or is greater than 50%, 60%, 70%, 80%, 85%, 90%, 95%, 97%, 98% or 99% by weight of the composition.

In some embodiments, the sweetener or flavoring composition of the present application comprises one or more substances selected from the group consisting of SGs, GSGs, SG-MRPs and GSG-MRPs, wherein the composition comprises GRM and RM in a total amount that equals to, or is greater than 50%, 60%, 70%, 80%, 85%, 90%, 95%, 97%, 98% or 99% by weight of the composition.

In some embodiments, the sweetener or flavoring composition of the present application comprises one or more substances selected from the group consisting of SGs, GSGs, SG-MRPs and GSG-MRPs, wherein the composition comprises GRU and RU in a total amount that equals to, or is greater than 50%, 60%, 70%, 80%, 85%, 90%, 95%, 97%, 98% or 99% by weight of the composition.

In some embodiments, the sweetener or flavoring composition of present application comprises one or more substances selected from the group consisting of SGs, GSGs, SG-MRPs and GSG-MRPs, wherein the sweetener or flavoring composition comprises GRA, RA, GRU and RU in a total amount that equals to, or is greater than 50%, 60%, 70%, 80%, 85%, 90%, 95%, 97%, 98% or 99% by weight of the composition.

Additional Components in the Sweetener or Flavoring Composition of the Present Application In some embodiments, the sweetener or flavoring composition comprises a detectable level of residue sugar donor in a total amount that equals to, or is less than, 0.1%, 0.5%, 1%, 2%, 3%, 5%, 10%, 20%, 30%, 50% or 60% by weight of the composition. In some embodiments, the unreacted sugar donor comprises dextrin and/or maltodextrin. In some embodiments, the residue sugar donor comprises xylose, rhamnose, fructose, galactose and/or fruit juice, such as apple juice.

In some embodiments, the sweetener or flavoring composition comprises a residual amine donor of the Maillard reaction that produces the MRP of the sweetener or flavoring composition. In some embodiments, the composition comprises a detectable level of residue amine donors in a total amount that equals to, or is less than, 0.01%, 0.05%, 0.1%, 0.5%, 1%, 2%, 3%, 5% or 10%, by weight of the composition. In some embodiments, the residue amine donor comprises alanine, phenylalanine, proline, and/or glutamic acid.

In some embodiments, the sweetener or flavoring composition further comprises an additional sweetener. In some embodiments, the additional sweetener is a monosaccharide and/or a disaccharide and is present in total amount of 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % of the composition.

In some embodiments, the additional sweetener is a high intensity sweetener (HIS) and is present in total amount of 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % of the composition. In some embodiments, the HIS is a high intensity natural sweetener (HINS) selected from the group consisting of sweet tea extracts, glycosylated sweet tea extracts, suaviosides, glycosylated suaviosides, monk fruit extracts, glycosylated monk fruit extracts, mogrosides, glycosylated mogrosides, erythritol and licorice extracts. In some embodiments, the HIS is a high intensity synthetic sweetener (HISS) selected from the group consisting of sucralose, acesulfame K, saccharine and aspartame.

In some embodiments, the one or more additional components comprise a non-SG sweetener. In some embodiments, the non-SG sweetener is a sugar such as a monosaccharide (e.g., glucose) or a disaccharide (e.g., sucrose). In some embodiments, the non-SG sweetener is a sweetener selected from the group consisting of sorbitol, xylitol, mannitol, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, swingle extracts, glycosylated swingle extracts, sweet tea extracts, glycosylated sweet tea extracts, suaviosides, glycosylated suaviosides, mogrosides, glycosylated mogrosides, licoric extracts, sucraloses, acesulfame potassium (Ace-K), advantame, aspartame neotame and saccharine.

In some embodiments, a sweetener or flavoring composition further comprises one or more sweetener enhancers, such as thaumatin.

In some embodiments, the sweetener or flavoring composition further comprises a thickener.

In some embodiments, the sweetener or flavoring composition further comprises a flavorant or flavoring agent. In some embodiments, the flavorant or flavoring agent may be present in the sweetener or flavoring composition of the present application at a final concentration ranging from 10 ppm to 1000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 75 ppm to 600 ppm, from 75 ppm to 500 ppm, from 75 ppm to 400 ppm, from 75 ppm to 300 ppm, from 75 ppm to 200 ppm, from 75 ppm to 100 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, or from 500 ppm to 600 ppm.

In some embodiments, the sweetener or flavoring composition further comprises one or more surfactants.

In some embodiments, the one or more surfactants each has an HLB value between about 10 and 20. In some embodiments, the one or more surfactants comprise more than one surfactants, wherein the weighted average of their HLB values is between about 10 and about 20. In some embodiments, each of the one or more surfactants has an HLB value between about 11 and 16 or an HLB value of 15 or 16.

In some embodiments, the sweetener or flavoring composition comprises one or more surfactants having an HLB value between about 2 and 10, wherein the weighted average of their HLB values is between about 2 and about 10, or between about 4 and 7.

In some embodiments, the sweetener or flavoring composition comprises at least one surfactant having an HLB value between about 2 and 10 and at least one surfactant having an HLB value between about 10 and 20.

In some embodiments, the sweetener or flavoring composition comprises one or more fatty acid esters of a polyol having 3 or more hydroxy groups. Exemplary polyols having 3 or more hydroxy groups include sugars (e.g., monosaccharides, such as glucose, galactose, mannose, fructose, etc.), disaccharides (e.g., saccharose, maltose, lactose, trehalose, etc.); sugar alcohols (e.g., erythritol, lactitol, maltitol, mannitol, sorbitol, xylitol, inositol, sorbitan, etc.); alkane polyols (e.g., alkane triols (e.g., C3-10 alkane triols, such as glycerin, butanetriol, and hexanetriol, preferably C3-6 alkane triols): polyalkane polyols (e.g., polyalkane triols (e.g., polyglycerin (e.g., diglycerin, triglycerin) and other polyalkane triols, preferably di- to tri-C3-6 alkane triols.

In some embodiments, the non-ionic surfactant is a fatty acid ester of a polyol is a sugar fatty acid ester, such as a sucrose fatty acid ester, or a polyoxyethylene fatty acid ester, such as a sorbitan fatty acid ester.

In some embodiments, the non-ionic surfactant is an O/W (oil/water) emulsifier. In other embodiments, the non-ionic surfactant is a W/O-emulsifier. In some embodiments, the non-ionic surfactant comprises a mixture of an O/W emulsifier and a W/O emulsifier.

Another aspect of the present application relates to a method to improve taste profile of a HMW-SG composition by adding one or more LMW-SGs into the HMW-SG composition to form an improved composition. In some embodiments, the HMW-SG:LMW-SG weight ratio in the improved composition is in the range of 99:1 to 1:99, 90:1 to 1:99, 80:1 to 1:99, 70:1 to 1:99, 60:1 to 1:99, 50:1 to 1:99, 40:1 to 1:99, 30:1 to 1:99, 20:1 to 1:99, 10:1 to 1:99, 1:1 to 1:99, 99:1 to 1:90, 90:1 to 1:90, 80:1 to 1:90, 70:1 to 1:90, 60:1 to 1:90, 50:1 to 1:90, 40:1 to 1:90, 30:1 to 1:90, 20:1 to 1:90, 10:1 to 1:90, 1:1 to 1:90, 99:1 to 1:60, 90:1 to 1:60, 80:1 to 1:60, 70:1 to 1:60, 60:1 to 1:60, 50:1 to 1:60, 40:1 to 1:60, 30:1 to 1:60, 20:1 to 1:60, 10:1 to 1:60, 1:1 to 1:60, 99:1 to 1:30, 90:1 to 1:30, 80:1 to 1:30, 70:1 to 1:30, 60:1 to 1:30, 50:1 to 1:30, 40:1 to 1:30, 30:1 to 1:30, 20:1 to 1:30, 10:1 to 1:30, 1:1 to 1:30, 99:1 to 1:10, 90:1 to 1:10, 80:1 to 1:10, 70:1 to 1:10, 60:1 to 1:10, 50:1 to 1:10, 40:1 to 1:10, 30:1 to 1:10, 20:1 to 1:10, 10:1 to 1:10, 1:1 to 1:10.

Another aspect of the present application relates to a composition comprising one or more substances selected from GRA, GSTV and RB-related glycosides such as GRB, RB, RB salt, wherein the RB-related glycosides, individually or in combination, are present in an amount less than 40%, 30%, 20%, 10% or 5% by weight of the composition. In some related embodiments, the RB salt is arginine salt.

Another aspect of the present application relates to a composition comprising GRA, GSTV and one or more SGs.

Another aspect of the present application relates to a crude *Stevia* extract comprising SGs and non-SGs present in *Stevia* leaves, wherein RA is present in a range of 25-35 wt % of the crude *Stevia* extract, and wherein the non-SGs comprises polyphenols originated from *Stevia* leaves.

Another aspect of the present application relates to a composition comprising the crude *stevia* extract described above and one or more GSGs.

Another aspect of the present application relates to a composition comprising the crude *stevia* extract described above and one or more licorice-related products.

A. Highly Purified Steviol Glycosides (hpSGs)

The hpSGs of the present application can be prepared by any purification, conversion and synthesis method. In some embodiments, the hpSGs are prepared from crude *Stevia* extracts or a partially purified SGs by one or more rounds of re-precipitation in a mixture of water and organic solvent, such as methanol and ethanol, followed by filtration and spray drying. In some embodiments, the hpSGs are prepared by conversion from another hpSG, e.g., converting hpRA to hpRB by alkaline hydrolysis or converting hpSTV to hpRU (high purity rubusoside) by enzymatic method (as described in more detail in Section II(A)(2). In some embodiments, the hpSGs are prepared by chemical synthesis.

B. Glycosylated Steviol Glycoside (GSG)

The GSGs of the present application can be prepared by an enzyme-mediated or non-enzyme-mediated process in which one or more sugar residues are transferred from one or more sugar donors to a substrate to produce a GSG product. This process is referred to hereinafter as a glycosylation reaction.

The GSGs of the present application can also be prepared by a enzyme-mediated or nonenzyme-mediated process in which one or more sugar residues are removed from a GSG substrate to produce a new GSG product. This process is referred to hereinafter as a conversion reaction. The substrate of a conversion reaction can be, for example, a GRA, GRB, GRC, GRD, GRE, GRF, GRI, GRM, GRN, GRO, glycosylated steviolmonoside, glycosylated steviolbioside, glycosylated dulcoside, glycosylated rubusoside or glycosylated stevioside.

(1) Glycosylation Reactions

In some embodiments, the GSG products described in the present application are formed by an exogenous glycosylation reaction in the present of a glycosyltransferase.

As used herein, a "glycosyltransferase" refers to an enzyme that catalyzes the formation of a glycosidic linkage to form a glycoside. A glycoside is any molecule in which a sugar group is bonded through its anomeric carbon to another group via a glycosidic bond. Glycosides can be linked by an O— (an O-glycoside), N— (a glycosylamine), S— (a thioglycoside), or C— (a C-glycoside) glycosidic bond. The sugar group is known as the glycone and the non-sugar group is known as the aglycone. The glycone can be part of a single sugar group (monosaccharide) or several sugar groups (oligosaccharide). A glycosyltransferase according to the present application further embraces "glycosyltransferase variants" engineered for enhanced activities.

Glycosyltransferases utilize "activated" sugar phosphates as glycosyl donors, and catalyze glycosyl group transfer to an acceptor molecule comprising a nucleophilic group, usually an alcohol. A retaining glycosyltransferases is one which transfers a sugar residue with the retention of anomeric configuration. Retaining glycosyltransferase enzymes retain the stereochemistry of the donor glycosidic linkage after transfer to an acceptor molecule. An inverting glycosyltransferase, on the other hand, is one which transfers a sugar residue with the inversion of anomeric configuration. Glycosyltransferases are classified based on amino acid sequence similarities. Glycosyltransferases are classified by the Nomenclature Committee of the International Union of Biochemistry and Molecular Biology (NC-IUBMB) in the enzyme class of EC 2.4.1 on the basis of the reaction catalyzed and the specificity.

Glycosyltransferases can utilize a range of donor substrates. Based on the type of donor sugar transferred, these enzymes are grouped into families based on sequence similarities. Exemplary glycosyltransferases include glucanotransferases, N-acetylglucosaminyltransferases, N-acetylgalactosaminyltransferases, fucosyltransferases, mannosyltransferases, galactosyltransferases, sialyltransferases, galactosyltransferases, fucosyltransferase, Leloir glycosyltransferases, non-Leloir glycosyltransferases, and other glycosyltransferases in the enzyme class of EC 2.4.1. The Carbohydrate-Active Enzymes database (CAZy) provides a continuously updated list of the glycosyltransferase families.

In some embodiments, the GRAs are formed from a reaction mixture comprising an exogenous glycosyltransferase classified as an EC 2.4.1 enzyme, including but not limited to members selected from the group consisting of cyclomaltodextrin glucanotransferase (CGTase; EC 2.4.1.19), amylosucrase (EC 2.4.1.4), dextransucrase (EC 2.4.1.5), amylomaltase, sucrose:sucrose fructosyltransferase (EC 2.4.1.99), 4-α-glucanotransferase (EC 2.4.1.25), lactose synthase (EC 2.4.1.22), sucrose-1,6-α-glucan 3(6)-α-glucosyltransferase, maltose synthase (EC 2.4.1.139), alternasucrase (EC 2.4.1.140), including variants thereof.

Cyclomaltodextrin glucanotransferase, also known as CGTase, is an enzyme assigned with enzyme classification number EC 2.4.1.19, which is capable of catalyzing the hydrolysis and formation of (1→4)-α-D-glucosidic bonds, and in particular the formation of cyclic maltodextrins from polysaccharides as well as the disproportionation of linear oligosaccharides.

Dextransucrase is an enzyme assigned with enzyme classification number EC 2.4.1.5, and is also known as sucrose 6-glucosyltransferase, SGE, CEP, sucrose-1,6-α-glucan glucosyltransferase or sucrose: 1,6-α-D-glucan 6-α-D-glucosyltransferase. Dextransucrases are capable of catalyzing the reaction: sucrose+[(1→6)-α-D-glucosyl]n=D-fructose+[(1→6)-α-D-glucosyl]n+1. In addition, a glucosyltransferase (DsrE) from *Leuconostoc mesenteroides*, NRRL B-1299 has a second catalytic domain ("CD2") capable of adding alpha-1,2 branching to dextrans (U.S. Pat. Nos. 7,439,049 and 5,141,858; U.S. Patent Appl. Publ. No. 2009-0123448; Bozonnet et al., J. Bacteria 184:5753-5761, 2002).

Glycosyltransferases and other glycosylating enzymes for use in the present application may be derived from any source and may be used in a purified form, in an enriched concentrate or as a crude enzyme preparation.

In some embodiments, the glycosylation reaction is carried out by glycosylating an aglycone or glycoside substrate using e.g., a nucleotide sugar donor (e.g., sugar mono- or diphosphonucleotide) or "Leloir donor" in conjunction with a "Leloir glycosyltransferase" (after Nobel prize winner, Luis Leloir) that catalyzes the transfer of a monosaccharide unit from the nucleotide-sugar ("glycosyl donor') to a "glycosyl acceptor", typically a hydroxyl group in an aglycone or glycoside substrate.

Accordingly, in some embodiments the GRAs of the present application is formed from a reaction mixture comprising a nucleotide sugar.

In certain embodiments, the glycosylation reactions may involve the use of a specific Leloir glycosyltransferase in conjunction with a wide range of sugar nucleotides donors, including e.g., UDP-glucose, GDP-glucose, ADP-glucose, CDP-glucose, TDP-glucose or IDT-glucose in combination with a glucose-dependent glycosyltransferase (GDP-glycosyltransferases; GGTs), ADP-glucose-dependent glycosyltransferase (ADP-glycosyltransferases; AGTs), CDP-glucose-dependent glycosyltransferase (CDP-glycosyltransferases; CGTs), TDP-glucose-dependent glycosyltransferase (TDP-glycosyltransferases; TGTs) or IDP-glucose-dependent glycosyltransferase (IDP-glycosyltransferases; IGTs), respectively.

In particular embodiments, the exogenous glycosylation reaction is carried out using an exogenous Leloir-type UDP-glycosyltransferase enzyme of the classification EC 2.4.1.17, which catalyzes the transfer of glucose from UDP-α-D-glucuronate (also known as UDP-glucose) to an acceptor, releasing UDP and forming acceptor β-D-glucuronoside. In some embodiments, the glycosyltransferases include, but are not limited to, enzymes classified in the GT1 family. In certain preferred embodiment, the glycosylation reaction is catalyzed by an exogenous UDP-glucose-dependent glycosyltransferase. In some embodiments, the glycosylation reaction is catalyzed by a glycosyltransferase capable of transferring a non-glucose monosaccharide, such as fructose, galactose, ribose, arabinose, xylose, mannose, psicose, fucose and rhamnose, and derivative thereof, to the recipient.

U.S. Pat. No. 9,567,619 describes several UDP-dependent glycosyltransferases that can be used to transfer monosaccharides to rubusoside, including UGT76G1 UDP glycosyltransferase, HV1 UDP-glycosyltransferase, and EUGT11, a UDP glycosyltransferase-sucrose synthase fusion enzyme. The EUGT11 fusion enzyme contains a uridine diphospho glycosyltransferase domain coupled to a sucrose synthase domain and can exhibit 1,2-β glycosidic linkage and 1,6-β glycosidic linkage enzymatic activities, as well as sucrose synthase activity. Of the foregoing enzymes, UGT76G1 UDP glycosyltransferase contains a 1,3-O-glucose glycosylation activity which can transfer a second glucose moiety to the C-3' of 13-O-glucose of rubusoside to produce rebaudioside G ("Reb G"); HV1 UDP-glycosyltransferase contains a 1,2-O-glucose glycosylation activity which can transfer a second glucoside moiety to the C-2' of 19-O-glucose of rubusoside to produce rebaudioside KA ("Reb KA"); and the EUGT11 fusion enzyme contains a 1,2-O-glucose glycosylation activity which transfers a second glucose moiety to the C-2' of 19-O-glucose of rubusoside to produce rebaudioside KA or transfer a second glucose moiety to the C-2' of 13-O-glucose of rubusoside to produce stevioside. In addition, HV1 and EUGT11 can transfer a second sugar moiety to the C-2' of 19-O-glucose of rebaudioside G to produce rebaudioside V ("Reb V") and can additionally transfer a second glucose moiety to the C-2' of 13-O-glucose of rebaudioside KA to produce rebaudioside E ("Reb E"). Furthermore, when used singly or in combination, these enzymes can be used to generate a variety of steviol glycosides known to be present in *Stevia rebaudiana*, including rebaudioside D ("Reb D") and rebaudioside M ("Reb M").

In some embodiments, monosaccharides that can be transferred to a saccharide or monosaccharide acceptor include, but are not limited to glucose, fructose, galactose, ribose, arabinose, xylose, mannose, psicose, fucose and rhamnose, and derivative thereof, as well as acidic sugars, such as sialic acid, glucuronic acid and galacturonic acid.

In some embodiments, glycosylation of SGs is driven by an exogenous glycosyl hydrolase (GH). GHs normally cleave a glycosidic bond. However, they can be used to form glycosides by selecting conditions that favor synthesis via reverse hydrolysis. Reverse hydrolysis is frequently applied e.g., in the synthesis of aliphatic alkylmonoglucosides.

Glycosyl hydrolases have a wide range of donor substrates employing usually monosaccharides, oligosaccharides or/and engineered substrates (i.e., substrates carrying various functional groups). They often display activity towards a large variety of carbohydrate and non-carbohydrate acceptors. Glycosidases usually catalyze the hydrolysis of glycosidic linkages with either retention or inversion of stereochemical configuration in the product.

In some embodiments, the GRGs of the present application are formed from a reaction mixture comprising an exogenous glycosyl hydrolase, classified as an EC 3.2.1 enzyme, including but not limited to alpha-glucosidase, beta-glucosidase and beta-fructofuranosidase.

Exemplary glycosyl hydrolases for use in the present application include, but are not limited to α-amylases (EC 3.2.1.1), α-glucosidases (EC 3.2.1.20), β-glucosidases (EC 3.2.1.21), α-galactosidases (EC 3.2.1.22), β-galactosidases (EC 3.2.1.23), α-mannosidase (EC 3.2.1.24), β-mannosidase (EC 3.2.1.25), β-fructofuranosidase (EC 3.2.1.26), amylo-1,6-glucosidases (EC 3.2.1.33), β-D-fucosidases (EC 3.2.1.38), α-L-rhamnosidases (EC 3.21.40), glucan 1,6-α-glucosidases (EC 3.2.70), and variants thereof.

In some embodiments, the GRGs of the present application are formed using a class of glycoside hydrolases or glycosyltransferases known as "transglycosylases." As used herein, the term "transglycosylase" and "transglycosidase" (TG) are used interchangeably with reference to a glycoside hydrolase (GH) or glycosyltransferase (GT) enzyme capable of transferring a monosaccharide moiety from one molecule to another. Thus, a GH can catalyze the formation of a new glycosidic bond either by transglycosylation or by reverse hydrolysis (i.e., condensation).

The acceptor for transglycosylase reaction acceptor can be saccharide acceptor or a monosaccharide acceptor. Thus, a transglycosidase can transfer a monosaccharide moiety to a diverse set of aglycones, including e.g., monosaccharide acceptors, such as aromatic and aliphatic alcohols. Transglycosidases can transfer a wide variety of monosaccharides (D- or L-configurations) to saccharide acceptors, including glycosides, as well as monosaccharide acceptors, including a wide variety of flavonoid aglycones, such as naringenin, quercetin, hesperetin.

Monosaccharides that can be transferred to a saccharide or monosaccharide acceptor include, but are not limited to glucose, fructose, galactose, ribose, arabinose, xylose, mannose, psicose, fucose and rhamnose, and derivative thereof, as well as acidic sugars, such as sialic acid, glucuronic acid and galacturonic acid. The term "transglucosidase" is used when the monosaccharide moiety is a glucose moiety.

Transglycosidases include GHs or GTs from the enzyme classes of EC 3.2.1 or 2.4.1, respectively. In spite of the inclusion of certain glycosyltransferases as transglycosidases, TGs are classified into various GH families on the basis of sequence similarity. A large number of retaining glycosidases catalyze both hydrolysis and transglycosylation reactions. In particular, these enzymes catalyze the intra- or intermolecular substitution of the anomeric position of a glycoside. Under kinetically controlled reactions, retaining glycosidases can be used to form glycosidic linkages using a glycosyl donor activated by a good anomeric leaving group (e.g., nitrophenyl glycoside). In contrast, thermodynamically controlled reverse hydrolysis uses high concentrations of free sugars.

Transglycosidases corresponding to any of the GH families with notable transglycosylase activity may be used in the present application, and may include the use of e.g., members of the GH2 family, including LacZ β-galactosidase, which converts lactose to allolactose; GH13 family, which includes cyclodextran glucanotransferases that convert linear amylose to cyclodextrins, glycogen debranching enzyme, which transfers three glucose residues from the four-residue glycogen branch to a nearby branch, and trehalose synthase, which catalyzes the interconversion of maltose and trehalose; GH16 family, including xyloglucan endotransglycosylases, which cuts and rejoins xyloglucan chains in the plant cell wall; GH31, for example, α-transglucosidases, which catalyze the transfer of individual glucosyl residues between α-(1→4)-glucans; GH70 family, for example, glucansucrases, which catalyze the synthesis of high molecular weight glucans, from sucrose; GH77 family, for examples amylomaltase, which catalyzes the synthesis of maltodextrins from maltose; and the GH23, GH102, GH103, and GH104 families, which include lytic transglycosylases that convert peptidoglycan to 1,6-anhydrosugars.

In one embodiment, the glycosyltransferase is a transglucosylase from the glycoside hydrolase 70 (GH70) family. GH70 enzymes are transglucosylases produced by lactic acid bacteria from, e.g., *Streptococcus, Leuconostoc, Weisella* or *Lactobacillus* genera. Together with the families GH13 and GH77 enzymes, they form the clan GH-H. Most of the enzymes classified in this family use sucrose as the D-glucopyranosyl donor to synthesize α-D-glucans of high molecular mass (>106 Da) with the concomitant release of D-fructose. They are also referred to as glucosyltransferases or glucansucrases.

A wide range of α-D-glucans, varying in size, structure, degree of branching and spatial arrangements can thus be produced by GH70 family members. For example, GH70 glucansucrases can transfer D-glucosyl units from sucrose onto hydroxyl acceptor groups. Glucansucrases catalyze the formation of linear as well as branched α-D-glucan chains with various types of glycosidic linkages, namely α-1,2; α-1,3; α-1,4; and/or α-1,6.

In addition, sucrose analogues such as α-D-glucopyranosyl fluoride, p-nitrophenyl α-D-glucopyranoside, α-D-glucopyranosyl α-L-sorofuranoside and lactulosucrose can be utilized as D-glucopyranosyl donors. A large variety of acceptors may be recognized by glucansucrases, including carbohydrates, alcohols, polyols or flavonoids to yield oligosaccharides or gluco-conjugates.

Exemplary glucansucrases for use in the present application include e.g., dextransucrase (sucrose:1,6-α-D-glucosyltransferase; EC 2.4.1.5), alternansucrase (sucrose:1,6(1,3)-α-D-glucan-6(3)-α-D-glucosyltransferase, EC 2.4.1.140), mutansucrase (sucrose:1,3-α-D-glucan-3-α-D-glucosyltransferase; EC 2.4.1.125), and reuteransucrase (sucrose:1,4(6-α-D-glucan-4(6)-α-D-glucosyltransferase; EC 2.4.1.-). The structure of the resultant glucosylated product is dependent upon the enzyme specificity.

In some embodiments, a fructosyltransferase may be used to catalyze the transfer of one or more fructose units, optionally comprising terminal glucose, of the following sequence: (Fru)n-Glc consisting of one or more of: β 2,1, β 2,6, α 1,2 and β-1,2 glycosidic bonds, wherein n typically is 3-10. Variants include Inulin type β-1,2 and Levan type β-2,6 linkages between fructosyl units in the main chain. Exemplary fructosytransferase for use in the present application include e.g., β-fructofuranosidase (EC 3.2.1.26), inulosucrase (EC 2.4.1.9) levansucrase (EC 2.4.1.10), or endoinulinase.

In some embodiments, a galactosyltransferase or β-galactosidase may be used to catalyze the transfer of multiple saccharide units, in which one of the units is a terminal glucose and the remaining units are galactose and disaccharides comprising two units of galactose. In certain embodiments, the resulting structure includes a mixture of galactopyranosyl oligomers (DP=3-8) linked mostly by β-(1,4) or β-(1,6) bonds, although low proportions of β-(1,2) or 1-(1,3) linkages may also be present. Terminal glucosyl residues are linked by β-(1,4) bonds to galactosyl units. These structures may be synthesized by the reverse action of β-galactosidases (EC 3.2.1.23) on lactose at relatively high concentrations of lactose.

In some embodiments, the transglycosidase is an enzyme having trans-fucosidase, trans-sialidase, trans-lacto-N-biosidase and/or trans-N-acetyllactosaminidase activity.

In some embodiments, the glycosylation reactions may utilize a combination of any of glycosyltransferases described herein in combination with any one of the glycosyl hydrolases or transglycosidases described herein. In these reactions, the transglycosylase and the glycosyl hydrolase or transglycosidase may be present in a range of ratios (w/w), wherein the transglycosylase/glycosyl hydrolase ratio (w/w) ranges from 100:1, 80:1, 60:1, 40:1, 30:1, 25:1, 20:1, 15:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:15, 1:20, 1:25, 1:30, 1:40, 1:50, 1:60, 1:80, 1:100, or any ratio derived from any two of the aforementioned integers.

In some embodiments, the sugar donor in the glycosylation reaction is a glucose-based donor. Examples of glucose-based donors include, but are not limited to, glucose, dextrin, and maltodextrin.

In some embodiments, the sugar donor in the glycosylation reaction is a non-glucose-based sugar. Examples of non-glucose-based sugars include, but are not limited to, arabinose, fructose, galactose, lactose, mannose, rhamnose and xylose.

In some embodiments, a glycosylation reaction is performed with a combination of different sugars a sugar donor.

In some embodiments, multiple rounds of glycosylation reaction are performed with a different sugar donor in each round.

In some embodiments, the substrate of the glycosylation reaction is a SG, such as RA, RB, RC, RD, RE, RF, RI, RM, RN, RO, steviolmonoside, steviolbioside, dulcoside A, dulcoside B, rubusoside and stevioside. In some embodiments, the SG is a hpSG, such as hpRA, hpRB, hpRC, hpRD, hpRE, hpRF, hpRI, hpRM, hpRN, hpRO, high purity steviolmonoside, high purity steviolbioside, high purity dulcoside A, high purity dulcoside B, high purity rubusoside, and high purity stevioside.

In some embodiment, the substrate of the glycosylation reaction is a GSG, such as GRA, GRB, GRC, GRD, GRE, GRF, GRI, GRM, GRN, GRO, glycosylated steviolmonoside, glycosylated steviolbioside, glycosylated dulcoside, glycosylated rubusoside and glycosylated stevioside. In some embodiment, the substrate of the glycosylation reaction is a GhpSG, such as GhpRA, GhpRB, GhpRC, GhpRD, GhpRE, GhpRF, GhpRI, GhpRM, GhpRN, GhpRO, glycosylated high purity steviolmonoside, glycosylated high purity steviolbioside, glycosylated high purity dulcoside A, glycosylated high purity dulcoside B, glycosylated high purity rubusoside and glycosylated high purity stevioside. In some embodiment, the substrate of the glycosylation reaction is a hpGSG, such as hpGRA, hpGRB, hpGRC, hpGRD, hpGRE, hpGRF, hpGRI, hpGRM, hpGRN, hpGRO, high purity glycosylated steviolmonoside, high purity glycosylated steviolbioside, high purity glycosylated dulcoside A, high purity glycosylated dulcoside A, glycosylated rubusoside and glycosylated stevioside.

In some embodiments, the glycosylation reaction is performed with substrate-to-sugar donor weight ratio in the range of 99:1 to 1:99, 90:1 to 1:99, 80:1 to 1:99, 70:1 to 1:99, 60:1 to 1:99, 50:1 to 1:99, 40:1 to 1:99, 30:1 to 1:99, 20:1 to 1:99, 10:1 to 1:99, 1:1 to 1:99, 99:1 to 1:90, 90:1 to 1:90, 80:1 to 1:90, 70:1 to 1:90, 60:1 to 1:90, 50:1 to 1:90, 40:1 to 1:90, 30:1 to 1:90, 20:1 to 1:90, 10:1 to 1:90, 1:1 to 1:90, 99:1 to 1:60, 90:1 to 1:60, 80:1 to 1:60, 70:1 to 1:60, 60:1 to 1:60, 50:1 to 1:60, 40:1 to 1:60, 30:1 to 1:60, 20:1 to 1:60, 10:1 to 1:60, 1:1 to 1:60, 99:1 to 1:30, 90:1 to 1:30, 80:1 to 1:30, 70:1 to 1:30, 60:1 to 1:30, 50:1 to 1:30, 40:1 to 1:30, 30:1 to 1:30, 20:1 to 1:30, 10:1 to 1:30, 1:1 to 1:30, 99:1 to 1:10, 90:1 to 1:10, 80:1 to 1:10, 70:1 to 1:10, 60:1 to 1:10, 50:1 to 1:10, 40:1 to 1:10, 30:1 to 1:10, 20:1 to 1:10, 10:1 to 1:10, 1:1 to 1:10.

The glycosylating enzyme may be dissolved in the reaction mixture or immobilized on a solid support which is contacted with the reaction mixture. If the enzyme is immobilized, it may be attached to an inert carrier. Suitable carrier materials are known in the art. Examples for suitable carrier materials are clays, clay minerals such as kaolinite, diatomaceous earth, perlite, silica, alumina, sodium carbonate, calcium carbonate, cellulose powder, anion exchanger materials, synthetic polymers, such as polystyrene, acrylic resins, phenol formaldehyde resins, polyurethanes and polyolefins, such as polyethylene and polypropylene. For preparing carrier-bound enzymes the carrier materials usually are used in the form of fine powders, wherein porous forms are preferred. The particle size of the carrier material usually does not exceed 5 mm, in particular 2 mm. Further, suitable carrier materials are calcium alginate and carrageenan.

Enzymes may directly be linked by glutaraldehyde. A wide range of immobilization methods are known in the art. Ratio of reactants can be adjusted based on the desired performance of the final product. The temperature of the glycosylation reaction can be in the range of 1-100° C., preferably 40-80° C., more preferably 50-70° C.

In certain embodiments, the GRG used in the present application are prepared as follows: (i) mixing a starting SG composition (e.g., a hpRA) with a sugar-donor material to obtain a mixture; and (ii) adding an effective amount of an enzyme to the mixture to form a reaction mixture, where the enzyme catalyzes the transfer of sugar moieties from the sugar-donor material to the SG molecules in the starting SG composition; and (iii) incubating the reaction mixture at a desired temperature for a desired length of reaction time to glycosylate the SG molecules with sugar moieties present in the sugar-donor molecule to generate GSG. In some embodiments, after achieving a desired ratio of GSG to residual SG contents, the reaction mixture can be heated to a sufficient temperature for a sufficient amount of time to inactivate the enzyme. In some embodiments, the enzyme is removed by filtration in lieu of inactivation. In other embodiments, the enzyme is removed by filtration following inactivation, resulting a solution comprising GSG, residual SG from the starting SG composition and residual sugar donor. In some embodiments the resulting solution comprising GSG, residual SG and residue sugar donor is decolorized.

Examples of sugar donors include, but are not limited to, dextrin, maltodextin, glucose, fructose, galactose, lactose, mannose, fruit juice, vegetable juice and honey.

In some embodiments, the GSG used in the present application are prepared as follows: (i) dissolving a glucose-donor material in water to form a liquefied glucose-donor material; (ii) adding a starting SG composition to liquefied glucose-donor material to obtain a mixture; and (iii) adding an effective amount of an enzyme to the mixture to form a reaction mixture, wherein the enzyme catalyzes the transfer of glucose moieties from the glucose-donor material to the SG molecules in the starting SG composition; and (iv) incubating the reaction mixture at a desired temperature for a desired length of reaction time to glycosylate the SG molecules with glucose moieties present in the glucose-donor molecule. In some embodiments, after achieving a desired ratio of GSG and SG contents, the reaction mixture is heated to a sufficient temperature for a sufficient amount of time to inactivate the enzyme. In some embodiments, the enzyme is removed by filtration in lieu of inactivation. In other embodiments, the enzyme is removed by filtration following inactivation. In some embodiments the resulting solution comprising GSGs, residual SGs and dextrin is decolorized. In certain embodiments the resulting solution of GSGs, including residual SGs and dextrin is dried. In some embodiments, the drying is by spray drying. In some embodiments, step (i) comprises the substeps of (a) mixing a glucose-donor material with a desired amount of water to form a suspension, (b) adding a desired amount of enzyme to the suspension and (c) incubate the suspension at a desired temperature for a desired time to form liquefied glucose-donor material. Starch can be a suitable substitute for dextrin(s) and/or dextrin(s) can be obtained by the hydrolysis of starch.

The enzymatically catalyzed reaction can be carried out batch wise, semi-batch wise or continuously. Reactants can be supplied at the start of reaction or can be supplied subsequently, either semi-continuously or continuously. The catalytic amount of glycosidase or glycosyltransferase required for the method of the invention depends on the reaction conditions, such as temperature, solvents and amount of substrate.

The reaction can be performed in aqueous media such as buffer. A buffer adjusts the pH of the reaction mixture to a value suitable for effective enzymatic catalysis. Typically the pH is in the range of about pH 4 to about pH 9, for example, of about pH 5 to about pH 7. Suitable buffers comprise, but are not limited to, sodium acetate, tris(hydroxymethyl) aminomethane ("Tris") and phosphate buffers.

Optionally, the reaction may take place in the presence of a solvent mixture of water and a water miscible organic solvent at a weight ratio of water to organic solvent of from 0.1:1 to 9:1, for example, from 1:1 to 3:1. The organic solvent is not primary or secondary alcohol and, accordingly, is non-reactive towards the polysaccharide. Suitable organic solvents comprise alkanones, alkylnitriles, tertiary alcohols and cyclic ethers, and mixtures thereof, for example, acetone, acetonitrile, t-pentanol, t-butanol, 1,4-dioxane and tetrahydrofuran, and mixtures thereof. Generally, the use of organic solvents is not preferred.

The final product of the glycosylation reaction, such as glycosylated RA and glycosylated stevioside, may be further purified to remove residual sugar donor, such as maltodextrin.

In some embodiments, a GSG, such as GRA, is subjected to enzyme treatment (e.g., α-amylase treatment) to produce a GSG with reduced level of glycosylation (e.g., GSG with shortened side chains at the glycosylation sites) compared to the pre-treatment GSG.

In some embodiments, a GSG, such as GRA, is subjected to another glycosylation reaction to produce GSGs with increased level of glycosylation (e.g., elongated side chains at the glycosylation sites) compared to the pre-treatment GSG.

(2) Conversion Reactions (i) Enzyme-Mediated (or Enzymatic) Conversion

In some embodiments, the GSGs of the present application are formed by an exogenous conversion reaction in the present of a glycosyl hydrolase (GH), which cleaves a glycosidic bond and is thus capable of converting a GSG, such as glycosylated stevioside to another GSG, such as glycosylated rubusoside, by removing a glucose at the C-13 position of the stevioside.

(ii) Non-Enzyme-Mediated (Non-Enzymatic) Conversion

In some embodiments, the GSGs of the present application are formed by non-enzymatic hydrolysis. The non-enzymatic hydrolysis can be carried out under alkaline or acid conditions. Table C shows an exemplary list of hydrolysis products from natural diterpene glycoside.

In some embodiments, a GSG of the present application are produced by converting an original GSG into another GSG or GSGs by alkaline or acid hydrolysis. In some embodiments, the original GSG is a GhpSG or hpGSG.

In some embodiments, GRB of the present application is produced from GRA or GhpRA or hpGRA. For example, GRA or GhpRA or hpGRA of the present application can be hydrolyzed to remove a glucose unit from the glycoside chain on the C19 carbon of GRA, which converts GRA to GRB.

In some embodiments, glycosylated steviolbioside of the present application is produced from glycosylated stevioside, glycosylated high purity stevioside or high purity glycosylated steviolside. For examples, glycosylated stevioside can be hydrolyzed to remove a glucose unit from the glycoside chain on the C19 carbon of glycosylated stevioside, which converts glycosylated steviolside to glycosylated steviolbioside.

In some embodiments, glycosylated steviolmonoside of the present application is produced from glycosylated rubusoside, glycosylated high purity rubusoside or high purity glycosylated rubusoside. For example, glycosylated rubusoside, glycosylated high purity rubusoside or high purity glycosylated rubusoside can be hydrolyzed to remove a glucose unit from the glycoside chain on the C19 carbon of glycosylated rubusoside, which converts glycosylated rubusoside to glycosylated steviolmonoside.

In some embodiments, glycosylated dulcoside B of the present application is produced from GRC or GhpRC or hpGRC. For example, GRC or GhpRC or hpGRC can be hydrolyzed to remove a glucose unit from the glycoside chain on the C19 carbon of GRC, which converts GRC to glycosylated dulcoside B.

lysis of GRA, GRC, glycosylated stevioside or glycosylated rubusoside, but potassium hydroxide and other well-known alkali used in food processing can also be used.

In some embodiments, the starting or raw materials can include 50 wt % or greater, 55 wt % or greater, 60 wt % or greater, 65 wt % or greater, 70 wt % or greater, 75 wt % or greater, 80 wt % or greater, 85 wt % or greater, 90 wt % or greater, 95 wt % or greater, or 99 wt % or greater of GRA, GRC, glycosylated stevioside or glycosylated rubusoside.

In some embodiments, GSG starting material is dissolved in water (preferably potable water), alkali added, and the solution temperature raised preferably to 85° C. to 95° C., and more preferably to 90° C. If the alkaline hydrolysis is conducted at temperatures lower than 85° C., the reaction proceeds slowly until the alkali is exhausted. The solution is stirred and is maintained at the selected temperature for a duration that provides the desired concentrations of the hydrolysis products in the solution or until the alkali is

TABLE C

Compounds reported as degradation products from natural diterpene glycosides by alkaline or acid conditions.

| | Oligosaccharide Moieties | | | Chemical | Starting |
|---|---|---|---|---|---|
| Common Name | C-13 | C-19 | AS | Formula | Material |
| — | Xylβ(1-2)Glcβ$_1$- | — | I | $C_{31}H_{48}O_{12}$ | a |
| Dulcoside A$_1$ | Rhaα(1-2)Glcβ$_1$- | — | I | $C_{32}H_{50}O_{12}$ | Dulcoside A |
| Rebaudioside G$_1$ | Glcβ(1-3)Glcβ$_1$- | — | I | $C_{32}H_{50}O_{13}$ | Rebaudioside G |
| Rebaudioside F$_1$ | Xylβ(1-2)[Glcβ(1-3)]Glcβ$_1$- | — | I | $C_{37}H_{58}O_{17}$ | Rebaudioside F |
| Rebaudioside R$_1$ | Glc(1-2)[Glcβ(1-3)]Xylβ1- | — | I | $C_{37}H_{58}O_{17}$ | Rebaudioside R |
| Rebaudioside Z$_1$ | Glcβ(1-6)[Glcβ(1-2)]Glcβ$_1$- | — | I | $C_{38}H_{60}O_{18}$ | Rebaudioside Z |
| — | Glcβ(1-2)[Glcβ(1-3)]Glcβ$_1$- | | II | $C_{38}H_{60}O_{18}$ | — |
| — | 6-deoxyGlcβ(1-2)[Glcβ(1-3)]Glcβ$_1$- | — | I | $C_{38}H_{60}O_{17}$ | b |
| Rebaudioside H$_1$ | Glcβ(1-6)Glcβ(1-3)[Glcβ(1-3)]Glcβ$_1$- | — | I | $C_{44}H_{70}O_{23}$ | Rebaudioside H |
| Rebaudioside L$_1$ | Glcβ(1-3)Rhaα(1-2)[Glcβ(1-3)]Glcβ$_1$- | — | I | $C_{44}H_{70}O_{23}$ | Rebaudioside L |
| Isosteviol | — | — | III | $C_{20}H_{30}O_3$ | Rebaudioside A/Stevioside |
| Endo-steviol | — | — | IV | $C_{20}H_{30}O_3$ | Rebaudioside A/Stevioside |
| Endo-steviolmonoside | Glcβ$_1$- | — | IV | $C_{26}H_{40}O_8$ | Rebaudioside A/Rubusoside |
| Endo-rebaudioside G$_1$ | Glcβ(1-3)Glcβ$_1$- | — | IV | $C_{32}H_{50}O_{13}$ | Rebaudioside A |
| Endo-steviolbioside | Glcβ(1-2)Glcβ$_1$- | — | IV | $C_{32}H_{50}O_{13}$ | Rebaudioside A |
| Endo-rubusoside | Glcβ$_1$- | Glcβ$_1$- | IV | $C_{32}H_{50}O_{13}$ | Rebaudioside A/Rubusoside |
| Iso-stevioside/Endo-stevioside | Glcβ(1-2)Glcβ$_1$- | Glcβ$_1$- | IV | $C_{38}H_{60}O_{18}$ | Rebaudioside A |
| Iso-rebaudioside β/Endo-rebaudioside B | Glcβ(1-2)[Glcβ(1-3)]-Glcβ$_1$- | — | IV | $C_{38}H_{60}O_{18}$ | Rebaudioside A |
| — | — | Glcβ(1-2)[Glcβ(1-3)]Glcβ$_1$- | III | $C_{38}H_{60}O_{18}$ | Rebaudioside M |
| Iso-rebaudioside AEndo-rebaudioside A | Glcβ(1-2)[Glcβ(1-3)]Glcβ$_1$- | Glcβ$_1$- | IV | $C_{44}H_{70}O_{23}$ | Rebaudioside A |
| — | Glcβ(1-2)[Glcβ(1-3)]Glcβ$_1$- | Glcβ(1-2)[Glcβ(1-3)]Glcβ$_1$- | IV | $C_{56}H_{90}O_{33}$ | Rebaudioside M |
| — | Glcβ(1-2)[Glcβ(1-3)]Glcβ$_1$- | Glcβ(1-2)[Glcβ(1-3)]Glcβ$_1$- | V | $C_{56}H_{92}O_{34}$ | Rebaudioside M |

a 13-[(2-O-β-D-xylopyranosyl-β-D-glucopyranosyl-)oxy]ent-kaur-16-en-19-oic acid β-D-glucopyranosyl ester;

b 13-[(2-O-6-deoxy-β-D-glucopyranosyl-3-O-β-D-glucopyranosyl-β-D-glucopyranosyl)oxy]ent-kaur-16-en-19-oic acid β-D-glucopyranosyl ester.

In some embodiments, alkaline hydrolysis of the starting or raw material is preferred for simplicity and economics. Sodium hydroxide is the preferred alkali to use for hydroexhausted. The preferred duration of alkaline hydrolysis at commercial scale is a minimum 30 minutes; shorter durations typically do not exhaust the amounts of alkali used in commercial production. The final product solution (containing both the unhydrolyzed GSG starting material such as GRA, also referred to as "residual GSG", and the hydrolysis product such as GRB) is typically very close to pH 7.0, but pH can be adjusted (typically by adding HCl or NaOH).

The product solution produced as described above may be brown in color, has a faint "burnt sugar" smell, and has a weak "caramel" taste. Brown color, burnt sugar smell, and caramel taste can be removed by column chromatography such as an activated charcoal column, a polymer resin adsorption column or with an ion exchange column as the chromatography matrix, binding the caramel components to the be column while letting the steviol glycosides pass through. Depending upon the use of the sweetener or flavoring agent of the present application, the brown color, burnt sugar smell, and caramel taste may be desirable, or unnoticeable, in either case avoiding the need to remove the brown color, burnt sugar smell, and caramel taste.

The alkaline hydrolysis products can be kept in solution as a syrup ready for distribution as a liquid sweetener, or dried for distribution as a dry sweetener. Drying is by spray-drying, lyophilization, oven drying, and other drying processes well-known in the art of sweeteners.

The following paragraphs enumerated consecutively from 1 through 57 provide for various aspects of the present application. In one embodiment, in a first paragraph (1), the present invention provides a sweetening composition comprising one or more GSGs, one or more salts, and one or more natural or synthetic sweeteners.

2. The composition according to paragraph 1, wherein the one or more GSGs are selected from glycosylated steviolmonoside, glycosylated steviolbioside, glycosylated stevioside, GRA, GRB, GRC, GRD, GRE, GRF, GRM, GRN, GRO, glycosylated rubusoside, glycosylated dulcoside A, and glycosylated dulcoside B.
3. The composition according to any of paragraphs 1 to 2, wherein the one or more salts are selected from sodium chloride, potassium chloride, magnesium chloride, sodium sulfate, magnesium sulfate, potassium sulfate, sodium carbonate, potassium carbonate, magnesium carbonate, sodium bicarbonate, and potassium bicarbonate.
4. The composition according to any of paragraphs 1 to 3, wherein the one or more natural or synthetic sweeteners are selected from sucrose, fructose, maltose, xylitol, sorbitol, dextrose, glucose, mannitol, aspartame, sucralose, acesulfame-K, sodium cyclamate, inulin, erythritol, thaumatin, arabinose, galactose, mannose, rhamnose, xylose, trehalose, raffinose, cellobiose, tagatose, DOLCIA PRIMA™ allulose, and mogroside.
5. The composition according to any of paragraphs 1 to 4, wherein the composition is prepared by hydrolysis of a raw material comprising GRA.
6. The composition according to any of paragraphs 1 to 5, wherein the raw material comprises GRA and RA in a total amount that is equal to, or greater than, 80 w t % of the total amount of GSGs and SGs in the raw material.
7. The composition according to any of paragraphs 1 to 6, wherein the raw material comprises GRA and RA in a total amount that is equal to, or greater than, 90 wt % of the total amount of GSGs and SGs in the raw material.
8. The composition according to any of paragraphs 1 to 7, wherein the raw material comprises GRA and RA in a total amount that is equal to, or greater than, 95 wt % of the total amount of GSGs and SGs in the raw material.
9. The composition according to any of paragraphs 1 to 8, wherein the composition is prepared by hydrolysis of a raw material comprising glycosylated stevioside.
10. The composition according to any of paragraphs 1 to 9, wherein the raw material comprises >90 wt % glycosylated stevioside and stevioside in total *stevia* glycosides.
11. The composition according to any of paragraphs 1 to 10, wherein the raw material comprises >95 wt % glycosylated stevioside and stevioside in total *stevia* glycosides.
12. The composition according to any of paragraphs 1 to 11, wherein the raw material comprises >99 wt % glycosylated stevioside and stevioside in total *stevia* glycosides.
13. The composition according to any of paragraphs 1 to 12, wherein the composition comprises both GRA and GRB.
14. The composition according to any of paragraphs 1 to 13, wherein GRA comprises 20-100 wt % of total GSG in the composition.
15. The composition according to any of paragraphs 1 to 14, wherein GRB comprises 0-80 wt % of total GSG in the composition.
16. The composition according to any of paragraphs 1 to 15, wherein GRA comprises 20-100 wt % of the composition.
17. The composition according to any of paragraphs 1 to 16, wherein GRB comprises 0-80 wt % of the composition.
18. The composition according to any of paragraphs 1 to 17, wherein salt comprises 0-30 wt % of the composition.
19. The composition according to any of paragraphs 1 to 18, wherein natural or synthetic sweetener comprises 0-30 wt % of the composition.
20. The composition according to any of paragraphs 1 to 19, wherein the GRA and GRB comprises about 100 wt % of total steviol glycosides in the composition.
21. The composition according to any of paragraphs 1 to 20, where the composition has increased solubility compared to the same composition without one or more salt.
22. The composition according to any of paragraphs 1 to 21, where the composition has increased solubility compared to the same composition without one or more natural or synthetic sweeteners.
23. The composition according to any of paragraphs 1 to 22, where the composition has increased solubility compared to the same composition without one or more salt and one or more natural or synthetic sweeteners.
24. The composition according to any of paragraphs 1 to 23, where the composition has improved sensory profile compared to the same composition without one or more salt.
25. The composition according to any of paragraphs 1 to 24, where the composition has improved sensory profile compared to the same composition without one or more natural or synthetic sweeteners.
26. The composition according to any of paragraphs 1 to 25, where the composition has improved sensory profile compared to the same composition without one or more salt and one or more natural or synthetic sweeteners.

27. The composition according to any of paragraphs 1 to 26, comprising GRA, GRB, glucose, and sodium chloride.
28. The composition according to any of paragraphs 1 to 27, comprising from about 70 wt % to about 80 wt % of GRA.
29. The composition according to any of paragraphs 1 to 28, comprising from about 10 wt % to about 20 wt % of GRB.
30. The composition according to any of paragraphs 1 to 29, comprising from about 1 wt % to about 5 wt % of glucose, lactose, galactose, or maltose.
31. The composition according to any of paragraphs 1 to 30, comprising from about 1 wt % to about 5 wt % of sodium chloride or potassium chloride.
32. The composition according to any of paragraphs 1 to 31, comprising Rebaudioside A, Rebaudioside B, glucose, and sodium chloride in a weight ratio of 77.55:16.39:3.99:1.30 respectively.
33. The composition according to any of paragraphs 1 to 32, comprising GRA, GRB, glucose, and sodium chloride.
34. A sweetener, comprising one or more GSGs, one or more salts, and one or more natural or synthetic sweeteners.
35. The sweetener according to paragraph 34, wherein the one or more GSGs are selected from glycosylated steviolmonoside, glycosylated steviolbioside, glycosylated stevioside, GRA, GRB, GRC, GRD, GRE, GRF, GRM, GRN, GRO, glycosylated rubusoside, glycosylated dulcoside A, and glycosylated dulcoside B.
36. The sweetener according to any of paragraphs 34 to 35, wherein the one or more salts are selected from sodium chloride, potassium chloride, magnesium chloride, sodium sulfate, magnesium sulfate, potassium sulfate, sodium carbonate, potassium carbonate, magnesium carbonate, sodium bicarbonate, and potassium bicarbonate.
37. The sweetener according to any of paragraphs 34 to 36, wherein the one or more natural or synthetic sweeteners are selected from sucrose, fructose, maltose, xylitol, sorbitol, dextrose, glucose, mannitol, aspartame, inulin, sucralose, acesulfame-K, sodium cyclamate, erythritol, thaumatin, arabinose, galactose, mannose, rhamnose, xylose, trehalose, raffinose, cellobiose, tagatose, DOLCIA PRIMA™ allulose, and mogroside.
38. The sweetener according to any of paragraphs 34 to 37, where the composition has increased solubility compared to the same sweetener without one or more salt.
39. The sweetener according any of paragraphs 34 to 38, where the composition has increased solubility compared to the same sweetener without one or more natural or synthetic sweeteners.
40. The sweetener according to any of paragraphs 34 to 39, where the composition has increased solubility compared to the same sweetener without one or more salt and one or more natural or synthetic sweeteners.
41. The sweetener according to any of paragraphs 34 to 40, where the composition has an improved sensory profile compared to the same sweetener without one or more salt.
42. The sweetener according to any of paragraphs 34 to 41, where the composition has an improved sensory profile compared to the same sweetener without one or more natural or synthetic sweeteners.
43. The sweetener according to any of paragraphs 34 to 42, where the composition has an improved sensory profile compared to the same sweetener without one or more salt and one or more natural or synthetic sweeteners.
44. The sweetener according to any of paragraphs 34 to 43, comprising from about 70 wt % to about 80 wt % of GRA.
45. The sweetener according to any of paragraphs 34 to 44, comprising from about 10 wt % to about 20 wt % of GRB.
46. The sweetener according to any of paragraphs 34 to 45, comprising from about 1 wt % to about 5 wt % of glucose, lactose, galactose, or maltose.
47. The sweetener according to any of paragraphs 34 to 46, comprising from about 1 wt % to about 5 wt % of sodium chloride or potassium chloride.
48. The sweetener according to any of paragraphs 34 to 47, comprising GRA, GRB, glucose, and sodium chloride in a weight ratio of 77.55:16.39:3.99:1.30 respectively.
49. A method to prepare a sweetening composition, comprising one or more GSGs, one or more salts, and one or more natural or synthetic sweeteners.
50. The method according to paragraph 49, wherein the one or more steviol glycosides are selected from glycosylated steviolmonoside, glycosylated steviolbioside, glycosylated stevioside, GRA, GRB, GRC, GRD, GRE, GRF, GRM, GRN, GRO, glycosylated rubusoside, glycosylated dulcoside A, and glycosylated dulcoside B.
51. The method according to any of paragraphs 49 to 50, wherein the one or more salts are selected from sodium chloride, potassium chloride, magnesium chloride, sodium sulfate, magnesium sulfate, potassium sulfate, sodium carbonate, potassium carbonate, magnesium carbonate, sodium bicarbonate, and potassium bicarbonate.
52. The method according to any of paragraphs 49 to 51, wherein the one or more natural or synthetic sweeteners are selected from sucrose, fructose, maltose, xylitol, sorbitol, dextrose, glucose, mannitol, aspartame, inulin, sucralose, acesulfame-K, sodium cyclamate, erythritol, thaumatin, arabinose, galactose, mannose, rhamnose, xylose, trehalose, raffinose, cellobiose, tagatose, DOLCIA PRIMA™ allulose, and mogroside.
53. The method according to any of paragraphs 49 to 52, comprising from about 70 wt % to about 80 wt % of GRA.
54. The method according to any of paragraphs 49 to 53, comprising from about 10 wt % to about 20 wt % of GRB.
55. The method according to any of paragraphs 49 to 54, comprising from about 1 wt % to about 5 wt % of glucose, lactose, galactose, or maltose.
56. The method according to any of paragraphs 49 to 55, comprising from about 1 wt % to about 5 wt % of sodium chloride or potassium chloride.
57. The method according to any of paragraphs 49 to 56, comprising GRA, GRB, glucose, and sodium chloride in a weight ratio of 77.55:16.39:3.99:1.30 respectively.

(3) Glycosylation and Conversion Products

In some embodiments, the GSG of the present application is a GSG composition obtained from a glycosylation reaction or conversion reaction. In some embodiments, the GSG composition comprises GSGs in an individual or total amount that equals to, or is greater than, 20 wt %, 30 wt %, 40 wt %, 50 wt %, 60 wt %, 70 wt %, 80 wt %, 90 wt % or 95 wt % of the GSG composition. The GSGs may be the glycosylation product of a single SG (e.g., RA, RB, RC, RD, RE, RI, RI, RM, RN, RO, RU, STV, STB, STM, DA etc.) with different levels of glycosylation, or the glycosylation product of multiple SGs with different levels of glycosylation.

In some embodiments, the GSG composition further comprises one or more unreacted residual SGs in an individual or total amount that equals to, or is less than 0.01 wt %, 0.1 wt %, 1 wt %, 2 wt %, 5 wt %, 10 wt %, 20 wt %, 30 wt %, 40 wt % or 50 wt % of the GSG composition.

In some embodiments, the GSG composition further comprises unreacted residual dextrins and/or maltodextrin in an individual or total amount that equals to, or is less than 0.01 wt %, 0.1 wt %, 1 wt %, 2 wt %, 5 wt %, 10 wt %, 20 wt %, 30 wt %, 40 wt % or 50 wt % of the GSG composition.

In some embodiments, the GSG composition comprises one or more unreacted SGs in an individual or total amount that equals to, or is less than 0.01 wt %, 0.1 wt %, 1 wt %, 2 wt %, 5 wt %, 10 wt %, 20 wt %, 30 wt %, 40 wt % or 50 wt % of the GSG composition.

In some embodiments, the GSG composition comprises unreacted dextrins and/or maltodextrin in an amount that equals to, or is less than 0.01 wt %, 0.1 wt %, 1 wt %, 2 wt %, 5 wt %, 10 wt %, 20 wt %, 30 wt %, 40 wt % or 50 wt % of the GSG composition.

In some embodiments, the GSG composition is a GRA, GRB, GRC, GRD, GRE, GRF, GRM, GRN, GRU, GDA, GSTV, GSTB or GSTM composition. In some embodiments, the GRB, GRC, GRD, GRE, GRF, GRM, GRN, GRU, GDA, GSTV, GSTB or GSTM of the present application is the glycosylated form of hpRA, hpRB, hpRC, hpRD, hpRE, hpRF, hpRM, hpRN, hpRU, hpDA, hpSTV, hpSTB or hpSTM.

The glycosylation product of the present application may comprise both reacted and unreacted components from the starting materials (i.e., the mixture of materials before the initiation of the glycosylation reaction). In some embodiments, the glycosylation reaction product of the present application comprises GRA, GRB, GRC, GRD, GRE, GRF, GRM, GRN, GRU, GDA, GSTV, GSTB or GSTM in a range between 1-99.5 wt %, 1-5 wt %, 1-10 wt %, 1-20 wt %, 1-30 wt %, 1-40 wt %, 1-50 wt %, 1-60 wt %, 1-70 wt %, 1-80 wt %, 1-90 wt %, 1-99 wt %, 5-10 wt %, 5-20 wt %, 5-30 wt %, 5-40 wt %, 5-50 wt %, 5-60 wt %, 5-70 wt %, 5-80 wt %, 5-90 wt %, 5-99 wt %, 10-20 wt %, 10-30 wt %, 10-40 wt %, 10-50 wt %, 10-60 wt %, 10-70 wt %, 10-80 wt %, 10-90 wt %, 10-99 wt %, 20-30 wt %, 20-40 wt %, 20-50 wt %, 20-60 wt %, 20-70 wt %, 20-80 wt %, 20-90 wt %, 20-99 wt %, 30-40 wt %, 30-50 wt %, 30-60 wt %, 30-70 wt %, 30-80 wt %, 30-90 wt %, 30-99 wt %, 40-50 wt %, 40-60 wt %, 40-70 wt %, 40-80 wt %, 40-90 wt %, 40-99 wt %, 50-60 wt %, 50-70 wt %, 50-80 wt %, 50-90 wt %, 50-99 wt %, 60-70 wt %, 60-80 wt %, 60-90 wt %, 60-99 wt %, 70-80 wt %, 70-90 wt %, 70-99 wt %, 80-90 wt %, 80-99 wt %, 90-99 wt % of the of the glycosylation reaction product.

In some embodiments, GRA, GRB, GRC, GRD, GRE, GRF, GRM, GRN, GRU, GDA, GSTV, GSTB or GSTM is present in the glycosylation reaction product in an amount that equals to, or is greater than, 0.01 wt %, 0.1 wt %, 1 wt %, 2 wt %, 5 wt %, 10 wt %, 20 wt %, 30 wt %, 40 wt %, 50 wt %, 60 wt %, 70 wt %, 80 wt %, 90 wt %, 95 wt %, or 99 wt % of the glycosylation reaction product.

In some embodiments, unreacted RA, RB, RC, RD, RE, RF, RM, RN, RU, DA, STV, STB or STM is present in the glycosylation reaction product in an amount that equals to, or less than 0.01 wt %, 0.1 wt %, 1 wt %, 2 wt %, 5 wt %, 10 wt %, 20 wt %, 30 wt %, 40 wt %, 50 wt % or 60 wt % of the glycosylation reaction product.

In some embodiments, the glycosylation reaction product includes GSG and residual SGs at a GSG:residual SG weight ratio of 99:1 to 1:99, 90:1 to 1:99, 80:1 to 1:99, 70:1 to 1:99, 60:1 to 1:99, 50:1 to 1:99, 40:1 to 1:99, 30:1 to 1:99, 20:1 to 1:99, 10:1 to 1:99, 1:1 to 1:99, 99:1 to 1:90, 90:1 to 1:90, 80:1 to 1:90, 70:1 to 1:90, 60:1 to 1:90, 50:1 to 1:90, 40:1 to 1:90, 30:1 to 1:90, 20:1 to 1:90, 10:1 to 1:90, 1:1 to 1:90, 99:1 to 1:60, 90:1 to 1:60, 80:1 to 1:60, 70:1 to 1:60, 60:1 to 1:60, 50:1 to 1:60, 40:1 to 1:60, 30:1 to 1:60, 20:1 to 1:60, 10:1 to 1:60, 1:1 to 1:60, 99:1 to 1:30, 90:1 to 1:30, 80:1 to 1:30, 70:1 to 1:30, 60:1 to 1:30, 50:1 to 1:30, 40:1 to 1:30, 30:1 to 1:30, 20:1 to 1:30, 10:1 to 1:30, 1:1 to 1:30, 99:1 to 1:10, 90:1 to 1:10, 80:1 to 1:10, 70:1 to 1:10, 60:1 to 1:10, 50:1 to 1:10, 40:1 to 1:10, 30:1 to 1:10, 20:1 to 1:10, 10:1 to 1:10, 1:1 to 1:10.

In some embodiments, the GSG composition is a GRA composition. In some embodiments, the GRA of the present application is the glycosylated form of hpRA. In some embodiments, the hpRA comprises at least 96% wt, 97 wt %, 98 wt %, 99 wt % or 99.5 wt % of RA. In some embodiments, the hpRA comprises less than 4 wt %, 3 wt %, 2 wt %, 1 wt %, 0.5 wt %, 0.2 wt % or 0.1 wt % of RU.

The glycosylation product of the present application may comprise both reacted and unreacted components from the starting materials (i.e., the mixture of materials before the initiation of the glycosylation reaction). In some embodiments, the glycosylation reaction product of the present application comprises GRA in a range between 1-99.5 wt %, 1-5 wt %, 1-10 wt %, 1-20 wt %, 1-30 wt %, 1-40 wt %, 1-50 wt %, 1-60 wt %, 1-70 wt %, 1-80 wt %, 1-90 wt %, 1-99 wt %, 5-10 wt %, 5-20 wt %, 5-30 wt %, 5-40 wt %, 5-50 wt %, 5-60 wt %, 5-70 wt %, 5-80 wt %, 5-90 wt %, 5-99 wt %, 10-20 wt %, 10-30 wt %, 10-40 wt %, 10-50 wt %, 10-60 wt %, 10-70 wt %, 10-80 wt %, 10-90 wt %, 10-99 wt %, 20-30 wt %, 20-40 wt %, 20-50 wt %, 20-60 wt %, 20-70 wt %, 20-80 wt %, 20-90 wt %, 20-99 wt %, 30-40 wt %, 30-50 wt %, 30-60 wt %, 30-70 wt %, 30-80 wt %, 30-90 wt %, 30-99 wt %, 40-50 wt %, 40-60 wt %, 40-70 wt %, 40-80 wt %, 40-90 wt %, 40-99 wt %, 50-60 wt %, 50-70 wt %, 50-80 wt %, 50-90 wt %, 50-99 wt %, 60-70 wt %, 60-80 wt %, 60-90 wt %, 60-99 wt %, 70-80 wt %, 70-90 wt %, 70-99 wt %, 80-90 wt %, 80-99 wt %, 90-99 wt % of the of the total GRA.

In some embodiments, GRA is present in the glycosylation reaction product in an amount that equals to, or is greater than, 0.01 wt %, 0.1 wt %, 1 wt %, 2 wt %, 5 wt %, 10 wt %, 20 wt %, 30 wt %, 40 wt %, 50 wt %, 60 wt %, 70 wt %, 80 wt %, 90 wt %, 95 wt %, or 99 wt % of the glycosylation reaction product.

In some embodiments, unreacted RA is present in the glycosylation reaction product in an amount that equals to, or less than 0.01 wt %, 0.1 wt %, 1 wt %, 2 wt %, 5 wt %, 10 wt %, 20 wt %, 30 wt %, 40 wt %, 50 wt % or 60 wt % of the glycosylation reaction product.

In some embodiments, the glycosylation reaction product comprises GRA and unreacted RA, the weight ratio of GRA (individually or collectively) to RA in the glycosylation reaction product is 99:1 to 1:2, 99:1 to 1:1, 99:1 to 2:1, 99:1 to 5:1, 99:1 to 10:1, 99:1 to 20:1, 99:1 to 40:1, 99:1 to 60:1, 99:1 to 80:1, 80:1 to 1:2, 80:1 to 1:1, 80:1 to 2:1, 80:1 to 5:1, 80:1 to 10:1, 80:1 to 20:1, 80:1 to 40:1, 80:1 to 60:1, 60:1 to 1:2, 60:1 to 1:1, 60:1 to 2:1, 60:1 to 5:1, 60:1 to 10:1, 60:1 to 20:1, 60:1 to 40:1, 40:1 to 1:2, 40:1 to 1:1, 40:1 to 2:1, 40:1 to 5:1, 40:1 to 10:1, 40:1 to 20:1, 20:1 to 1:2, 20:1 to 1:1, 20:1 to 2:1, 20:1 to 5:1, 20:1 to 10:1, 10:1 to 1:2, 20:1 to 1:1, 20:1 to 2:1, 20:1 to 5:1, 20:1 to 10:1, 10:1 to 1:1, 10:1 to 2:1, 10:1 to 5:1, 5:1 to 1:2, 5:1 to 1:1, 5:1 to 2:1, 2:1 to 1:2, 2:1 to 1:1, or 1:1 to 1:2. In some embodiments, the glycosylation reaction product further comprises one or more SGs such as RB, RC, RD, RE, RF, RI, RM, RN, RO, steviolmonoside, steviolbioside, dulcoside A, dulcoside B, rubusoside and/or stevioside.

In some embodiments, the glycosylation reaction product comprises glycosylated stevioside and unreacted stevioside, the weight ratio of glycosylated stevioside (individually or collectively) to unreacted stevioside in the glycosylation reaction product is 99:1 to 1:2, 99:1 to 1:1, 99:1 to 2:1, 99:1 to 5:1, 99:1 to 10:1, 99:1 to 20:1, 99:1 to 40:1, 99:1 to 60:1, 99:1 to 80:1, 80:1 to 1:2, 80:1 to 1:1, 80:1 to 2:1, 80:1 to 5:1, 80:1 to 10:1, 80:1 to 20:1, 80:1 to 40:1, 80:1 to 60:1, 60:1 to 1:2, 60:1 to 1:1, 60:1 to 2:1, 60:1 to 5:1, 60:1 to 10:1, 60:1 to 20:1, 60:1 to 40:1, 40:1 to 1:2, 40:1 to 1:1, 40:1 to 2:1, 40:1 to 5:1, 40:1 to 10:1, 40:1 to 20:1, 20:1 to 1:2, 20:1 to 1:1, 20:1 to 2:1, 20:1 to 5:1, 20:1 to 10:1, 10:1 to 1:2, 20:1 to 1:1, 20:1 to 2:1, 20:1 to 5:1, 20:1 to 10:1, 10:1 to 1:1, 10:1 to 2:1, 10:1 to 5:1, 5:1 to 1:2, 5:1 to 1:1, 5:1 to 2:1, 2:1 to 1:2, 2:1 to 1:1, or 1:1 to 1:2. In some embodiments, the glycosylation reaction product further comprises one or more SGs such as RA, RB, RC, RD, RE, RF, RI, RM, RN, RO, steviolmonoside, steviolbioside, dulcoside A, dulcoside B, and/or rubusoside.

In some embodiments, unreacted dextrin and/or maltodextrin is present in the glycosylation reaction product in an amount that equals to, or less than 0.01 wt %, 0.1 wt %, 1 wt %, 2 wt %, 5 wt %, 10 wt %, 20 wt % or 30 wt % of the glycosylation reaction product.

The GSG molecules of the present application include GSG molecules with different levels of glycosylation. In some embodiments, the GSG molecules of the present application comprise 1-20 additional monosaccharide units that are added to the SG backbone during a man-made glycosylation reaction. In some embodiments, the additional monosaccharide units are glucose units. In some embodiments, the additional monosaccharide units are non-glucose units, such as fructose, xylose and galactose units. In some embodiments, the additional monosaccharide units are a mixture of glucose units and non-glucose units. In some embodiments, the GSG of the present application comprises mono-glycosylated SG, di-glycosylated SG, tri-glycosylated SG, tetra-glycosylated SG and/or penta-glycosylated SG.

In some embodiments, the GSG composition of the present application contains mono-glycosylated SG, di-glycosylated SG, tri-glycosylated SG, tetra-glycosylated SG and/or penta-glycosylated SG, individually or in combination, in an amount of less than 99 wt %, 90 wt %, 80 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, 2 wt %, or 1 wt % of mono-glycosylated SG.

In some embodiments, the GSG composition of the present application contains mono-glycosylated SG, di-glycosylated SG, tri-glycosylated SG, tetra-glycosylated SG and/or penta-glycosylated SG, individually or in combination, in an amount that equals to, or is greater than, 1 wt %, 2 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt % or 80 wt % of the total GSG.

In some embodiments, the GSG composition of the present application contains mono-glycosylated SG, di-glycosylated SG, tri-glycosylated SG, tetra-glycosylated SG and/or penta-glycosylated SG, individually or in combination, in an amount that is in the range of 1-99 wt %, 1-95 wt %, 1-90 wt %, 1-85 wt %, 1-80 wt %, 1-75 wt %, 1-70 wt %, 1-65 wt %, 1-60 wt %, 1-55 wt %, 1-50 wt %, 1-45 wt %, 1-40 wt %, 1-35 wt %, 1-30 wt %, 1-25 wt %, 1-20 wt %, 1-15 wt %, 1-10 wt %, 1-5 wt %, 1-2 wt %, 2-99 wt %, 2-95 wt %, 2-90 wt %, 2-85 wt %, 2-80 wt %, 2-75 wt %, 2-70 wt %, 2-65 wt %, 2-60 wt %, 2-55 wt %, 2-50 wt %, 2-45 wt %, 2-40 wt %, 2-35 wt %, 2-30 wt %, 2-25 wt %, 2-20 wt %, 2-15 wt %, 2-10 wt %, 2-5 wt %, 5-99 wt %, 5-95 wt %, 5-90 wt %, 5-85 wt %, 5-80 wt %, 5-75 wt %, 5-70 wt %, 5-65 wt %, 5-60 wt %, 5-55 wt %, 5-50 wt %, 5-45 wt %, 5-40 wt %, 5-35 wt %, 5-30 wt %, 5-25 wt %, 5-20 wt %, 5-15 wt %, 5-10 wt %, 10-99 wt %, 10-95 wt %, 10-90 wt %, 10-85 wt %, 10-80 wt %, 10-75 wt %, 10-70 wt %, 10-65 wt %, 10-60 wt %, 10-55 wt %, 10-50 wt %, 10-45 wt %, 10-40 wt %, 10-35 wt %, 10-30 wt %, 10-25 wt %, 10-20 wt %, 10-15 wt %, 15-99 wt %, 15-95 wt %, 15-90 wt %, 15-85 wt %, 15-80 wt %, 15-75 wt %, 15-70 wt %, 15-65 wt %, 15-60 wt %, 15-55 wt %, 15-50 wt %, 15-45 wt %, 15-40 wt %, 15-35 wt %, 15-30 wt %, 15-25 wt %, 15-20 wt %, 20-99 wt %, 20-95 wt %, 20-90 wt %, 20-85 wt %, 20-80 wt %, 20-75 wt %, 20-70 wt %, 20-65 wt %, 20-60 wt %, 20-55 wt %, 20-50 wt %, 20-45 wt %, 20-40 wt %, 20-35 wt %, 20-30 wt %, 20-25 wt %, 25-99 wt %, 25-95 wt %, 25-90 wt %, 25-85 wt %, 25-80 wt %, 25-75 wt %, 25-70 wt %, 25-65 wt %, 25-60 wt %, 25-55 wt %, 25-50 wt %, 25-45 wt %, 25-40 wt %, 25-35 wt %, 25-30 wt %, 30-99 wt %, 30-95 wt %, 30-90 wt %, 30-85 wt %, 30-80 wt %, 30-75 wt %, 30-70 wt %, 30-65 wt %, 30-60 wt %, 30-55 wt %, 30-50 wt %, 30-45 wt %, 30-40 wt %, 30-35 wt %, 35-99 wt %, 35-95 wt %, 35-90 wt %, 35-85 wt %, 35-80 wt %, 35-75 wt %, 35-70 wt %, 35-65 wt %, 35-60 wt %, 35-55 wt %, 35-50 wt %, 35-45 wt %, 35-40 wt %, 40-99 wt %, 40-95 wt %, 40-90 wt %, 40-85 wt %, 40-80 wt %, 40-75 wt %, 40-70 wt %, 40-65 wt %, 40-60 wt %, 40-55 wt %, 40-50 wt %, 40-45 wt %, 45-99 wt %, 45-95 wt %, 45-90 wt %, 45-85 wt %, 45-80 wt %, 45-75 wt %, 45-70 wt %, 45-65 wt %, 45-60 wt %, 45-55 wt %, 45-50 wt %, 50-99 wt %, 50-95 wt %, 50-90 wt %, 50-85 wt %, 50-80 wt %, 50-75 wt %, 50-70 wt %, 50-65 wt %, 50-60 wt %, 50-55 wt %, 55-99 wt %, 55-95 wt %, 55-90 wt %, 55-85 wt %, 55-80 wt %, 55-75 wt %; 55-70 wt %, 55-65 wt %, 55-60 wt %, 60-99 wt %, 60-95 wt %, 60-90 wt %, 60-85 wt %, 60-80 wt %, 60-75 wt %, 60-70 wt %, 60-65 wt %, 65-99 wt %, 65-95 wt %, 65-90 wt %, 65-85 wt %, 65-80 wt %, 65-75 wt %, 65-70 wt %, 70-99 wt %, 70-95 wt %, 70-90 wt %, 70-85 wt %, 70-80 wt %, 70-75 wt %, 75-99 wt %, 75-95 wt %, 75-90 wt %, 75-85 wt %, 75-80 wt %, 80-99 wt %, 80-95 wt %, 80-90 wt %, 80-85 wt %, 85-99 wt %, 85-95 wt %, 85-90 wt %, 90-99 wt %, 90-95 wt % or 95-99 wt % of the total GSG.

In some embodiments, the GSG composition contains less than 60 wt %, 50 wt %, 40 wt %, 30 wt %, 20 wt %, 15 wt %, 10 wt %, 5 wt % or 2 wt % of mono-glycosylated SG. In some embodiments, the GSG contains greater than 5 wt %, 10 wt %, 15 wt %, 20 wt %, 30 wt %, 40 wt %, 50 wt % or 60 wt % of mono-glycosylated SG. In some embodiments, the GSG contain about 5 wt %, 10 wt %, 15 wt %, 20 wt %, 30 wt %, 40 wt %, 50 wt % or 60 wt % of mono-glycosylated SG.

In some embodiments, the GSG composition contains less than 60 wt %, 50-wt %, 40 wt %, 30 wt %, 20 wt %, 15 wt %, 10 wt %, 5 wt % or 2 wt % of di-glycosylated SG. In some embodiments, the GSG contains greater than 5 wt %, 10 wt %, 15 wt %, 20 wt %, 30 wt %, 40 wt %, 50 wt % or 60 wt % of di-glycosylated SG. In some embodiments, the GSG contain about 5 wt %, 10 wt %, 15 wt %, 20 wt %, 30 wt %, 40 wt %, 50 wt % or 60 wt % of di-glycosylated SG.

In some embodiments, the GSG composition contains less than 60 wt %, 50 wt %, 40 wt %, 30 wt %, 20 wt %, 15 wt %, 10 wt %, 5 wt % or 2 wt % of tri-glycosylated SG. In some embodiments, the GSG contains greater than 5 wt %, 10 wt %, 15 wt %, 20 wt %, 30 wt %, 40 wt %, 50 wt % or 60 wt % of tri-glycosylated SG. In some embodiments, the GSG contain about 5 wt %, 10 wt %, 15 wt %, 20 wt %, 30 wt %, 40 wt %, 50 wt % or 60 wt % of tri-glycosylated SG.

In some embodiments, the GSG composition contains less than 60 wt %, 50 wt %, 40 wt %, 30 wt %, 20 wt %, 15 wt %, 10 wt %, 5 wt % or 2 wt % of tetra-glycosylated SG. In some embodiments, the GSG contains greater than 5 wt %, 10 wt %, 15 wt %, 20 wt %, 30 wt %, 40 wt %, 50 wt % or 60 wt % of tetra-glycosylated SG. In some embodiments, the GSG contains about 5 wt %, 10 wt %, 15 wt %, 20 wt %, 30 wt %, 40 wt %, 50 wt % or 60 wt % of tetra-glycosylated SG.

In some embodiments, the GSG composition contains less than 60 wt %, 50 wt %, 40 wt %, 30 wt %, 20 wt %, 15 wt %, 10 wt %, 5 wt % or 2 wt % of penta-glycosylated SG. In some embodiments, the GSG contains greater than 5 wt %, 10 wt %, 15 wt %, 20 wt %, 30 wt %, 40 wt %, 50 wt % or 60 wt % of penta-glycosylated SG. In some embodiments, the GSG contain about 5 wt %, 10 wt %, 15 wt %, 20 wt %, 30 wt %, 40 wt %, 50 wt % or 60 wt % of penta-glycosylated SG.

In some embodiments, the GSG composition is a SGSG composition. In some embodiments, the GSG composition is a SGRA composition. In some embodiments, the GSG composition is a SGRA100 composition. In some embodiments, the GSG composition is a SGRA composition wherein greater than 30 wt %, greater than 40 wt %, greater than 50 wt %, greater than 60 wt %, greater than 70 wt %, greater than 80 wt %, greater than 85 wt %, greater than 90 wt %, or greater than 95 wt % of the GRA molecules in the SGRA composition have a retention time that is between the retention time of RD (including the retention time of RD) and the retention time of RA (not including the retention time of RA) in an HPLC spectrogram generated under conditions described in Example 8 of this application.

In some embodiments, the GSG composition is a LGSG composition. In some embodiments, the GSG composition is a LGRA100 composition. In some embodiments, the GSG composition is a LGRA composition wherein 80 wt % or less, 75 wt % or less, 70 wt % or less, 65 wt % or less, 60 wt % or less, 55 wt % or less, or 50 wt % or less of the GRA molecules in the LGRA composition have a retention time that is between the retention time of RD (including the retention time of RD) and the retention time of RA (not including the retention time of RA) in an HPLC spectrogram generated under conditions described in Example 8 of this application.

In some embodiments, the GSG composition is a glycosylation product with glucose as sugar donor (glucosylation product). In some embodiments, the GSG composition is a glycosylation product with arabinose as sugar donor (arabinosylation product). In some embodiments, the GSG composition is a glycosylation product with fructose as sugar donor (fructosylation product). In some embodiments, the GSG composition is a glycosylation product with galactose as sugar donor (galactosylation product). In some embodiments, the GSG composition is a glycosylation product with lactose as sugar donor (lactosylation product). In some embodiments, the GSG composition is a glycosylation product with mannose as sugar donor (mannosylation product). In some embodiments, the GSG composition is a glycosylation product with rhamnose as sugar donor (rhamnosylation product). In some embodiments, the GSG composition is a glycosylation product with xylase as sugar donor (xylosylation product).

In some embodiments, the GSG of the present application comprise a mixture of two, three or more glycosylation products selected from the group consisting of glucosylation products, arabinosylation products, fructosylation products, galactosylation products, lactosylation products, mannosylation products, rhamnosylation products, and xylosylation products. In some embodiments, the GSG of the present application comprise two glycosylation products mixed at a weight ratio of in the range of 99:1 to 1:99, 90:1 to 1:99, 80:1 to 1:99, 70:1 to 1:99, 60:1 to 1:99, 50:1 to 1:99, 40:1 to 1:99, 30:1 to 1:99, 20:1 to 1:99, 10:1 to 1:99, 1:1 to 1:99, 99:1 to 1:90, 90:1 to 1:90, 80:1 to 1:90, 70:1 to 1:90, 60:1 to 1:90, 50:1 to 1:90, 40:1 to 1:90, 30:1 to 1:90, 20:1 to 1:90, 10:1 to 1:90, 1:1 to 1:90, 99:1 to 1:60, 90:1 to 1:60, 80:1 to 1:60, 70:1 to 1:60, 60:1 to 1:60, 50:1 to 1:60, 40:1 to 1:60, 30:1 to 1:60, 20:1 to 1:60, 10:1 to 1:60, 1:1 to 1:60, 99:1 to 1:30, 90:1 to 1:30, 80:1 to 1:30, 70:1 to 1:30, 60:1 to 1:30, 50:1 to 1:30, 40:1 to 1:30, 30:1 to 1:30, 20:1 to 1:30, 10:1 to 1:30, 1:1 to 1:30, 99:1 to 1:10, 90:1 to 1:10, 80:1 to 1:10, 70:1 to 1:10, 60:1 to 1:10, 50:1 to 1:10, 40:1 to 1:10, 30:1 to 1:10, 20:1 to 1:10, 10:1 to 1:10, 1:1 to 1:10. In some embodiments, the two glycosylation products are fructosylation product and glucosylation product.

C. Maillard Reaction Product Prepared from the SGs and GSGs of the Present Application (1) The Maillard Reaction The Maillard reaction generally refers to a non-enzymatic browning reaction of a sugar donor with an amine donor in the presence of heat which produces flavor. Common flavors produced as a result of the Maillard reaction include, for example, those associated with red meat, poultry, coffee, vegetables, bread crust etc. subjected to heat. A Maillard reaction relies mainly on sugars and amino acids but it can also contain other ingredients including: autolyzed yeast extracts, hydrolyzed vegetable proteins, gelatin (protein source), vegetable extracts (i.e., onion powder), enzyme treated proteins, meat fats or extracts and acids or bases to adjust the pH of the reaction. The reaction can be in an aqueous environment with an adjusted pH at specific temperatures for a specified amount of time to produce a variety of flavors. Typical flavors include those associated with chicken, pork, beef, caramel, chocolate etc. However, a wide variety of different taste and aroma profiles can be achieved by adjusting the ingredients, the temperature and/or the pH of the reaction. The main advantage of the reaction flavors is that they can produce characteristic meat, burnt, roasted, caramellic, or chocolate profiles desired by the food industry, which are not typically achievable by using compounding of flavor ingredients.

Reducing groups can be found on reducing sugars (sugar donors) and amino groups can be found on amino donors such as free amino acids, peptides, and proteins. Initially, a reactive carbonyl group of a reducing sugar condenses with a free amino group, with a concomitant loss of a water molecule. A reducing sugar substrate for Maillard reaction typically has a reactive carbonyl group in the form of a free aldehyde or a free ketone. The resultant N-substituted glycoaldosylamine is not stable. The aldosylamine compound rearranges, through an Amadori rearrangement, to form a ketosamine. Ketosamines that are so-formed may further react through any of the following three pathways: (a) further dehydration to form reductones and dehydroreductones; (b) hydrolytic fission to form short chain products, such as diacetyl, acetol, pyruvaldehyde, and the like, which can, in turn, undergo Strecker degradation with additional amino groups to form aldehydes, and condensation, to form aldols; and (c) loss of water molecules, followed by reaction with additional amino groups and water, followed by condensation and/or polymerization into melanoids. Factors that affect the rate and/or extent of Maillard reactions include among others the temperature, water activity, and pH. The Maillard reaction is enhanced by high temperature, low moisture levels, and alkaline pH.

In the Maillard reaction, suitable carbonyl containing reactants include those that comprise a reactive aldehyde (—CHO) or keto (—CO—) group, such that the carbonyl free aldehyde or free keto group is available to react with an amino group associated with the reactant. Typically, the reducing reactant is a reducing sugar, e.g., a sugar that can reduce a test reagent, e.g., can reduce $Cu2+$ to $Cu+$, or can be oxidized by such reagents.

Monosaccharides, disaccharides, oligosaccharides, polysaccharides (e.g., dextrins, starches, and edible gums) and their hydrolysis products are suitable reducing reactants if they have at least one reducing group that can participate in a Maillard reaction. Reducing sugars include aldoses or ketoses such as glucose, fructose, maltose, lactose, glyceraldehyde, dihydroxyacetone, arabinose, xylose, ribose, mannose, erythrose, threose, and galactose. Other reducing reactants include uronic acids (e.g., glucuronic acid, glucuronolactone, and galacturonic acid, mannuronic acid, iduronic acid) or Maillard reaction intermediates bearing at least one carbonyl group such as aldehydes, ketones, alpha-hydroxycarbonyl or dicarbonyl compounds.

In some embodiments, the present application provides a Maillard reaction product (MRP) composition that is formed from heating a reaction mixture comprising (1) a SG and/or GSG and (2) one or more amine donors. In some embodiments, the reaction mixture further comprises (3) one or more sugar donors. In some embodiments, the SG is a hpSG. In some embodiments, the GSG is a GhpSG.

Amine Donor of a Maillard Reaction

The amine donor can be any compound or substance that contains a free amino group and that can participate in a Maillard reaction. Amine containing reactants include amino acids, peptides (including dipeptides, tripeptides, and oligopeptides), proteins, proteolytic or nonenzymatic digests thereof, and other compounds that react with reducing sugars and similar compounds in a Maillard reaction, such as phospholipids, chitosan, lipids, etc. In some embodiments, the amine donor also provides one or more sulfur-containing groups. Exemplary amine donors include amino acids, peptides, proteins, protein extracts.

Exemplary amino acids include, for example, nonpolar amino acids, such as alanine, glycine, isoleucine, leucine, methionine, tryptophan, phenylalanine, proline, valine; polar amino acids, such as cysteine, serine, threonine, tyrosine, asparagine, and glutamine; polar basic (positively charged) amino acids, such as histidine and lysine; and polar acidic (negatively charged) amino acids, such as aspartate and glutamate.

Exemplary peptides include, for example, hydrolyzed vegetable proteins (HVPs) and mixtures thereof.

Exemplary proteins include, for example, sweet taste-modifying proteins, soy protein, sodium caseinate, whey protein, wheat gluten or mixtures thereof. Exemplary sweet taste-modifying proteins include, for example, thaumatin, monellin, brazzein, miraculin, curculin, pentadin, mabinlin, and mixtures thereof. In certain embodiments, the sweet-taste modifying proteins may be used interchangeably with the term "sweetener enhancer."

Exemplary protein extracts include yeast extracts, plant extracts, bacterial extracts and the like.

The nature of the amino donor can play an important role in accounting for the many flavors produced from a Maillard reaction. In some embodiments, the amine donor may account for one or more flavors produced from a Maillard reaction. In some embodiments, a flavor may be produced from a Maillard reaction by using one or more amine donors, or a particular combination of an amine donor and sugar donor.

In certain embodiments, the amine donor is present in the compositions described herein in a range of from about 1 to about 99 weight percent, from about 1 to about 50 weight percent, from about 1 to about 10 weight percent, from about 2 to about 9 weight percent, from about 3 to about 8 weight percent, from about 4 to about 7 weight percent, from about 5 to about 6 weight percent and all values and ranges encompassed over the range of from about 1 to about 50 weight percent. In some embodiments, the amine donor is from a plant source, such as vegetable juice, fruit juice, berry juice, etc.

Sugar Donor of a Maillard Reaction

In some embodiments, the sugar donor is a reducing sugar. Reducing sugars for use in the present application include, for example, all monosaccharides and some disaccharides, which can be aldose reducing sugars or ketose reducing sugars. Typically, the reducing sugar may be selected from the group consisting of aldotetrose, aldopentose, aldohexose, ketotetrose, ketopentose, and ketohexose reducing sugars. Suitable examples of aldose reducing sugars include erythrose, threose, ribose, arabinose, xylose, lyxose, allose, altrose, glucose, mannose, gulose, idose, galactose and talose. Suitable examples of ketose reducing sugars include erythrulose, ribulose, xylulose, psicose, fructose, sorbose and tagatose. The aldose or the ketose may also be a deoxy-reducing sugar, for example, a 6-deoxy reducing sugar, such as fucose or rhamnose.

Specific monosaccharide aldoses include, for example, reducing agents include, for example, where at least one reducing sugar is a monosaccharide, or the one or more reducing sugars are selected from a group comprising monosaccharide reducing sugars, typically at least one monosaccharide reducing sugar is an aldose or a ketose.

Where the reducing sugar is a monosaccharide, the monosaccharide may be in the D- or L-configuration, or a mixture thereof. Typically, the monosaccharide is present in the configuration in which it most commonly occurs in nature. For example, the one or more reducing sugars may be selected from the group consisting of D-ribose, L-arabinose, D-xylose, D-lyxose, D-glucose, D-mannose, D-galactose, D-psicose, D-fructose, L-fucose and L-rhamnose. In a more particular embodiment, the one or more reducing sugars are selected from the group consisting of D-xylose, D-glucose, D-mannose, D-galactose, L-rhamnose and lactose.

Specific reducing sugars include ribose, glucose, fructose, maltose, lyxose, galactose, mannose, arabinose, xylose, rhamnose, rutinose, lactose, maltose, cellobiose, glucuronolactone, glucuronic acid, D-allose, D-psicose, xylitol, allulose, melezitose, D-tagatose, D-altrose, D-alditol, L-gulose, L-sorbose, D-talitol, inulin, stachyose, including mixtures and derivatives therefrom.

Exemplary disaccharide reducing sugars for use in the present application include maltose, lactose, lactulose, cellubiose, kojibiose, nigerose, sophorose, laminarbiose, gentiobiose, turanose, maltulose, palantinose, gentiobiulose, mannobiose, melibiose, melibiulose, rutinose, rutinulose or xylobiose.

Mannose and glucuronolactone or glucuronic acid can be used as sugar donors under Maillard reaction conditions, although they have seldom been used. Maillard reaction products of mannose, glucuronolactone or glucuronic acid provide yet another unique approach to provide new taste profiles with the sweetener agents described throughout the specification alone or in combination with additional natural sweeteners, synthetic sweeteners, and/or flavoring agents described herein.

In some embodiments, one or more carbohydrate sweeteners may be added to a reaction mixture subjected to the Maillard reaction. In other embodiments, one or more carbohydrate sweeteners may be added to an MRP composition after Maillard reaction. Non-limiting examples of carbohydrate sweeteners for use in the present application include caloric sweeteners, such as, sucrose, fructose, glucose, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, sugar alcohols, such as erythritol, xylitol, mannitol, sorbitol, maltitol, lactitol, mannitol, and inositol; xylo-oligosaccharides (xylotriose, xylobiose and the like), gentio-oligoscaccharides (gentiobiose, gentiotriose, gentiotetraose and the like), galacto-oligosaccharides, sorbose, nigero-oligosaccharides, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (containing fructose and glucose, e.g., HFCS55, HFCS42, or HFCS90), coupling sugars, soybean oligosaccharides, and glucose syrup. Additionally, the above carbohydrates may be in either the D- or L-configuration.

It should be noted, however, that not all carbohydrate sweeteners are reducing sugars. Sugars having acetal or ketal linkages are not reducing sugars, as they do not have free aldehyde chains. They therefore do not react with reducing-sugar test solutions (e.g., in a Tollens' test or Benedict's test). However, a non-reducing sugar can be hydrolyzed using diluted hydrochloric acid.

In some embodiments, the sugar donor is a non-reducing sugar that does not contain free aldehyde or free keto groups. Exemplary non-reducing sugars include, but are not limited to, sucrose, trehalose, xylitol, and raffinose. In some embodiments, the sugar donor comprises both reducing sugar and non-reducing sugar. In some embodiments, the sugar donor is derived from a food ingredient, such as sugar, flour, starch, vegetable and fruits.

In some embodiments; the sugar donor is derived from a plant source. For example, in some embodiments, the sugar donor comprises a fruit juice, berry juice, vegetable juice, syrup, plant extract, vegetable extract etc.

In some embodiments, the sugar donor is orange juice, cranberry juice, apple juice, peach juice, watermelon juice, pineapple juice, grape juice and concentrated products thereof.

In some embodiments, the fruit juice, berry juice or vegetable juice serves as both amine donor and sugar donor.

Reducing sugars can be derived from various sources for use as sugar donors in the Maillard reaction. For example, a sugar syrup may be extracted from a natural source, such as Monk fruit, fruit juice or juice concentrate (e.g., grape juice, apple juice, etc.), vegetable juice (e.g., onion etc.), or fruit (e.g., apples, pears, cherries, etc.) for use as a sugar donor.

The syrup may include any type of juice regardless of whether there is any ingredient being isolated from juice, such as purified apple juice with trace amounts of malic acid etc. The juice can be in the form of liquid, paste or solid. Sugar donors may also be extracted from *Stevia*, sweet tea, luohanguo, etc. after isolation of high intensity sweetener agents described herein (containing non-reducing sugars) from crude extracts and mixtures thereof. Extracts from any part of plant containing reducing sugars can be used as sugar donors in Maillard reactions with or without other additional reducing sugars. In some embodiments, the MRPs are prepared using a plant extract as a sugar donor.

In some embodiments, the sugar donor and amino donor are present in the reaction mixture in a molar ratio of 10:1 to 1:10, 8:1 to 1:8, 6:1 to 1:6, 4:1 to 1:4, 3:1 to 1:3 or 2:1 to 1:2. In some embodiments, the sugar donor and amino donor are present in the reaction mixture in a molar ratio of 10:1, 9:1, 8:1, 7:1, 6:1, 5:1, 4:1, 3:1, 2:1, 1:1, 1:2, 1:3, 1:4, 1:5, 1:6, 1:7, 1; 8, 1:9 or 1:10.

In some embodiments, the sugar donor and amino donor are present in the reaction mixture in a sugar donor:amino donor weight ratio of 10:1 to 1:10, 8:1 to 1:8, 6:1 to 1:6, 4:1 to 1:4, 3:1 to 1:3 or 2:1 to 1:2. In some embodiments, the sugar donor and amino donor are present in the reaction mixture in a molar ratio of 10:1, 9:1, 8:1, 7:1, 6:1, 5:1, 4:1, 3:1, 2:1, 1:1, 1:2, 1:3, 1:4, 1:5, 1:6, 1:7, 1; 8, 1:9 or 1:10.

In some embodiments, the SG/GSG and amine donor are present in the reaction mixture in a RA/GRA:amino donor weight ratio of 10:1 to 1:10, 8:1 to 1:8, 6:1 to 1:6, 4:1 to 1:4, 3:1 to 1:3 or 2:1 to 1:2. In some embodiments, the sugar donor and amino donor are present in the reaction mixture in a molar ratio of 10:1, 9:1, 8:1, 7:1, 6:1, 5:1, 4:1, 3:1, 2:1, 1:1, 1:2, 1:3, 1:4, 1:5, 1:6, 1:7, 1; 8, 1:9 or 1:10.

In some embodiments, the SG/GSG and sugar donor are present in the reaction mixture in a RA/GRA:amino donor weight ratio of 10:1 to 1:10, 8:1 to 1:8, 6:1 to 1:6, 4:1 to 1:4, 3:1 to 1:3 or 2:1 to 1:2. In some embodiments, the sugar donor and amino donor are present in the reaction mixture in a molar ratio of 10:1, 9:1, 8:1, 7:1, 6:1, 5:1, 4:1, 3:1, 2:1, 1:1, 1:2, 1:3, 1:4, 1:5, 1:6, 1:7, 1; 8, 1:9 or 1:10.

In some embodiments, the sugar donor in the MRP reaction comprises one or more members selected from the group consisting of fructose, arabinose, maltose, high maltose syrup, dextrin, maltodextrin, fructose, high fructose syrup, glucose, and high glucose syrup.

In some embodiments, the sugar donor in the MRP reaction comprises a monosaccharide or a disaccharide. In some embodiments, the sugar donor in the MRP reaction comprises a fruit juice, a vegetable juice or honey.

Additional Components in the Reaction Mixture of Maillard Reaction

In some embodiments, the reactants for the Maillard reaction include a number of different raw materials for producing the MRP compositions of the present application. The raw materials may be categorized into the following groups comprising the following exemplary materials:

(1) Protein Nitrogen Sources:

Protein nitrogen containing foods (meat, poultry, eggs, dairy products, cereals, vegetable products, fruits, yeasts), extracts thereof and hydrolysis products thereof, autolyzed yeasts, peptides, amino acids and/or their salts.

(2) Carbohydrate Sources:

Foods containing carbohydrates (cereals, vegetable products and fruits) and their extracts; mono-, di- and polysaccharides (sugars, dextrins, starches and edible gums), and hydrolysis products thereof.

(3) Fat or Fatty Acid Sources:

Foods containing fats and oils, edible fats and oil from animal, marine or vegetable origin, hydrogenated, trans-esterified and/or fractionated fats and oils, and hydrolysis products thereof.

4) Miscellaneous List of Additional Ingredients:

Foodstuffs, herbs, spices, their extracts and flavoring agents identified therein Water Thiamine and its hydrochloric salt Ascorbic, Citric, Lactic, Fumaric, Malic, Succinic, Tartaric and the Na, K, Ca, Mg and NH4 salts of these acids Guanylic acid and inosinic acid and its Na, K and Ca salts Inositol Sodium, potassium and ammonium sulphides, hydrosulphides and polysulphides Lecithin Acids, bases and salts as pH regulators:

Acetic, hydrochloric, phosphoric and sulphuric acids

Sodium, potassium, calcium and ammonium hydroxide.

Salts of the above acids and bases

Polymethylsiloxane as antifoaming agent.

In another aspect, the present application contemplates the use of any one of a number of raw materials exemplified below to produce NATURAL PRODUCTS:

Sugar Syrups: Xylose syrup, arabinose syrup and rhamnose syrup manufactured from beech wood. Ardilla Technologies supply these along with natural crystalline L-xylose, L-arabinose and L-rhamnose. Xylose syrup may also be obtained from natural sources, such as the xylan-rich portion of hemicellulose, mannose syrup from ivory nut, etc. These and other types of syrup described herein can be used as sugar donors in the compositions described herein.

Hydrolyzed gum arabic: Thickeners, such as gum arabic can be hydrolyzed with an organic acid or by enzyme hydrolysis to produce a mixture containing arabinose. Arabinose could also be obtained from other wood-based or biomass hydrolysate. Cellulose enzymes can also be used.

Meat Extracts: Connercially available from a number of companies, such as Henningsens (Chicken skin and meat), which gives excellent chicken notes.

Jardox: Meat and poultry extracts and stocks.

Kanegrade: Fish powders, anchovy, squid, tuna and others.

Vegetable Powders: onion and garlic powders, celery, tomato and leek powders are effective flavor contributors to reaction flavors.

Egg Yolk: Contains 50% fat and 50% protein. The fat contains phospholipids and lecithin. The proteins are coagulating proteins and their activity must be destroyed by hydrolysis with acid or by the use of proteases prior to use. This will also liberate amino acids and peptides useful in reaction flavors (Allergen activity).

Vegetable oils: Peanut (groundnut) oil—Oleic acid 50%, Linoleic acid 32%—beef and lamb profile. Sunflower—linoleic acid 50-75%, oleic 25%—chicken profile. Canola (rapeseed)—oleic 60%, linoleic 20%, alpha-linoleic 10%, gadoleic 12%.

Sauces: Fish sauce, soy sauce, oyster sauce, miso.

Enzyme Digests: Beef heart digest—rich in phospholipids. Liver digest—at low levels <5% gives a rich meaty character. Meat digests can also add authenticity but they are usually not as powerful as yeast extracts and HVPs.

Enzyme enhanced umami products—shitake or porcini mushrooms, kombu, etc. Enzyme digested fats—beef, lamb, etc.

All of the components of the compositions disclosed herein can be purchased or made by processes known to those of ordinary skill in the art and combined (e.g., precipitation/co-precipitation, mixing, blending, grounding, mortar and pestle, microemulsion, solvothermal, sonochemical, etc.) or treated as defined by the current invention.

Solvent

The Maillard reaction is conducted with a suitable solvent or carrier. Examples of suitable solvents or carriers include but are not limited to water, alcohols such as low molecular weight alcohols (e.g., methanol, ethanol, propanol, butanol, pentanol, hexanol, ethylene glycol, propylene glycol, butyl glycol, etc.), acetone, benzyl alcohol, 1,3-butylene glycol, carbon dioxide, castor oil, citric acid esters of mono- and di-glycerides, ethyl acetate, ethyl alcohol, ethyl alcohol denatured with methanol, glycerol (glycerin), glyceryl diacetate, glyceryl triacetate (triacetin), glyceryl tributyrate (tributyrin), hexane, isopropyl alcohol, methyl alcohol, methyl ethyl ketone (2-butanone), methylene chloride, monoglycerides and diglycerides, monoglyceride citrate, 1,2-propylene glycol, propylene glycol mono-esters and diesters, triethyl citrate, and mixtures thereof.

Although recognizing that other suitable solvents may be used for flavoring agents, The International Organization of the Flavor Industry (IOFI) Code of Practice (Version 1.3, dated Feb. 29, 2012) lists the following solvents as being appropriate for use in flavoring agents: acetic acid, benzyl alcohol, edible oils, ethyl alcohol, glycerol, hydrogenated vegetable oils, isopropyl alcohol, mannitol, propylene glycol, sorbitol, sorbitol syrup, water, and xylitol. Accordingly, in certain embodiments, these are preferred solvents.

In some embodiments, the solvent is water. In some embodiments, the solvent is glycerol. In some embodiments, the solvent is a glycerol-water mixture with a glycerol:water ratio (v:v) of 10:1 to 1:10, 9:1 to 1:9, 8:1 to 1:8, 7:1 to 1:7, 6:1 to 1:6, 1:5 to 5:1, 1:4 to 4:1, 1:3 to 3:1, 1:2 to 2:1. In some embodiments, the solvent is a glycerol-water mixture with a glycerol:water ratio (v:v) of 1:9, 1:8, 1:7, 1:6, 1:5, 1:4, 1:3, 1:2, 1:1, 2:1, 3:1, 4:1, 5:1, 6:1, 7:1, 8:1 or 9:1.

In some embodiments, the reaction mixture comprises a solvent in an amount of 10-90 wt %, 10-80 wt %, 10-70 wt %, 10-60 wt %, 10-50 wt %, 10-40 wt %, 10-30 wt %, 10-20 wt %, 20-90 wt %, 20-80 wt %, 20-70 wt %, 20-60 wt %, 20-50 wt %, 20-40 wt %, 20-30 wt %, 30-90 wt %, 30-80 wt %, 30-70 wt %, 30-60 wt %, 30-50 wt %, 30-40 wt %, 40-90 wt %, 40-80 wt %, 40-70 wt %, 40-60 wt %, 40-50 wt %, 50-90 wt %, 50-80 wt %, 50-70 wt %, 50-60 wt %, 60-90 wt %, 60-80 wt %, 60-70 wt %, 70-90 wt %, 70-80 wt %, or 80-90 wt % of the reaction mixture. In some embodiments, the reaction mixture comprises a solvent in an amount of about 10 wt %, about 15 wt %, about 20 wt %, about 25 wt %, about 30 wt %, about 33 wt. %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, or about 90 wt % of the reaction mixture.

Maillard Reaction Conditions

Maillard reaction conditions are affected by temperature, pressure, pH, reaction times, ratio of different reactants, types of solvents, and solvents-to-reactants ratio. Accordingly, in certain embodiments, the reaction mixture may include a pH regulator, which can be an acid or a base.

Suitable base regulators include, for example, sodium hydroxide, potassium hydroxide, baking powder, baking soda, any useable food grade base salts including alkaline amino acids. Additionally, the Maillard reaction can be conducted in the presence of alkalinic amino acids without the need of an additional base where the alkaline amino acid serves as the base itself. The pH of the reaction mixture can be maintained at any pH suitable for the Maillard reaction. In certain embodiments, the pH is maintained at a pH of from about 2 to about 14, from about 2 to about 7, from about 3 to about 9, from about 4 to about 8, from about 5 to about 7, from about 7 to about 14, from about 8 to about 10, from about 9 to about 11, from about 10 to about 12, or any pH range derived from these integer values.

In some embodiments, the reaction mixture has a pH of 4, 5, 6, 7, 8 or 9 at the initiation of the Maillard reaction.

In any of the embodiments described in the present application, the reaction temperature in any of the MRP reaction mixtures described in the present application may be 0° C., 5° C., 10° C., 20° C., 25° C., 30° C., 35° C., 40° C., 50° C., 55° C., 60° C., 65° C., 70° C., 80° C., 90° C., 100° C., 110° C., 120° C., 125° C., 130° C., 135° C., 140° C., 150° C., 155° C., 160° C., 165° C., 170° C., 180° C., 190° C., 200° C., 210° C., 220° C., 225° C., 230° C., 235° C., 240° C., 250° C., 255° C., 260° C., 265° C., 270° C., 280° C., 290° C., 300° C., 400° C., 500° C., 600° C., 700° C., 800° C., 900° C., 1000° C., or any temperature range defined by any two temperature values in this paragraph.

In more particular embodiments, the reaction temperature in any of the MRP reaction mixtures described in the present application may range from 0° C. to 1000° C., 10° C. to 300° C., from 15° C. to 250° C., from 20° C. to 250° C., from 40° C. to 250° C., from 60° C. to 250° C., from 80° C. to 250° C., from 100° C. to 250° C., from 120° C. to 250° C., from 140° C. to 250° C., from 160° C. to 250° C., from 180° C. to 250° C., from 200° C. to 250° C., from 220° C. to 250° C., from 240° C. to 250° C., from 30° C. to 225° C., from 50° C. to 225° C., from 70° C. to 225° C., from 90° C. to 225° C., from 110° C. to 225° C., from 130° C. to 225° C., from 150° C. to 225° C., from 170° C. to 225° C., from 190° C. to 225° C., from 210° C. to 225° C., from 80° C. to 200° C., from 100° C. to 200° C., from 120° C. to 200° C., from 140° C. to 200° C., from 140° C. to 200° C., from 160° C. to 200° C., from 180° C. to 200° C., from 90° C. to 180° C., from 100° C. to 180° C., from 110° C. to 180° C., from 120° C. to 180° C., from 130° C. to 180° C., from 140° C. to 180° C., from 150° C. to 180° C., from 160° C. to 180° C., from 80° C. to 160° C., from 90° C. to 160° C., from 100° C. to 160° C., from 110° C. to 160° C., from 120° C. to 160° C., from 130° C. to 160° C., from 140° C. to 160° C., from 150° C. to 160° C., from 80° C. to 140° C., from 90° C. to 140° C., from 100° C. to 140° C., from 110° C. to 140° C., from 120° C. to 140° C., from 130° C. to 140° C., from 80° C. to 120° C., from 85° C. to 120° C., from 90° C. to 120° C., from 95° C. to 120° C., from 100° C. to 120° C., from 110° C. to 120° C., from 115° C. to 120° C., from 80° C. to 100° C., from 85° C. to 100° C., from 90° C. to 100° C., from 95° C. to 100° C.; or any aforementioned temperature value in this paragraph, or a temperature range defined by any pair of the aforementioned temperature values in this paragraph.

Maillard reaction(s) can be conducted either under open or sealed conditions. The reaction time is generally from 1 second to 100 hours, more particularly from 1 minute to 24 hours, from 1 minute to 12 hours, from 1 minute to 8 hours, from 1 minute to 4 hours, from 1 minute to 2 hours, from 1 minute to 1 hour, from 1 minute to 40 minutes, from 1 minute to 20 minutes, from 1 minute to 10 minutes, from 10 minutes to 24 hours, from 10 minutes to 12 hours, from 10 minutes to 8 hours, from 10 minutes to 4 hours, from 10 minutes to 2 hours, from 10 minutes to 1 hour, from 10 minutes to 40 minutes, from 10 minutes to 20 minutes, from 20 minutes to 24 hours, from 20 minutes to 12 hours, from 20 minutes to 8 hours, from 20 minutes to 4 hours, from 20 minutes to 2 hours, from 20 minutes to 1 hour, from 20 minutes to 40 minutes, from 40 minutes to 24 hours, from 40 minutes to 12 hours, from 40 minutes to 8 hours, from 40 minutes to 4 hours, from 40 minutes to 2 hours, from 40 minutes to 1 hour, from 1 hour to 24 hours, from 1 hour to 12 hours, from 1 hour to 8 hours, from 1 hour to 4 hours, from 1 hour to 2 hours, from 2 hour to 24 hours, from 2 hour to 12 hours, from 2 hour to 8 hours, from 2 hour to 4 hours, from 4 hour to 24 hours, from 4 hour to 12 hours, from 4 hour to 8 hours, from 8 hour to 24 hours, from 8 hour to 12 hours, or from 12 hour to 24 hours. Depending on the desired taste, the reaction can be terminated at any time. The Maillard reaction mixture can contain unreacted reactants, degraded substances from the reactants, pH regulator(s), and/or salt(s).

The Maillard reactions can be conducted at atmospheric pressure or under pressure. When conducted under pressure, the reaction mixture may be subjected to constant pressure or it may be subjected to varying pressures over time. In certain embodiments, the pressure in the reaction vessel is at least 10 MPa, at least 20 MPa, at least 30 MPa, at least 40 MPa, at least 50 MPa, at least 75 MPa, at least 100 MPa, at least 150 MPa, at least 200 MPa, at least 250 MPa, at least 300 MPa, at least 400 MPa, at least 500 MPa, at least 600 MPa, at least 700 MPa, at least 800 MPa, and any pressure range derived from the aforementioned pressure values.

In some embodiments, the Maillard reaction is conducted with the assistance of microwave heating. Microwave heating results in the superheating of substances, particularly those that response to dipole rotation or ionic conductivity.

In some embodiments, it is desirable to suppress the Maillard reaction, in part. This can be achieved by exercising one or more of the following approaches, including the use of raw materials that are not susceptible to browning, adjusting the factors affecting the browning velocity of Maillard reaction, lowering the temperature, lowering pH, adjusting water activity, increasing the level of oxygen, using oxidant, introducing enzymes, etc.

In certain embodiments, the use of low solubility or insoluble amino acids in the Maillard reaction may result in insoluble reactants present in the final MRP composition. In such cases, filtration may be used to remove any insoluble components present in the MRP compositions.

A general method to prepare derived Maillard reaction product(s) is described as follows. Briefly, a steviol glycoside composition of the present application, such as RA or hpRA, or a glycosylated steviol glycoside composition of the present application, such as GRA or G-hpRA, is dissolved with or without a sugar donor, and together with amino acid donor in a solvent, such as water, to form a reaction mixture, followed by heating of the reaction mixture at an elevated temperature, for example, from 30, 40, or 50° C. up to 250° C. The reaction time can be varied from more than one minute to a few days, more generally a few hours, until Maillard reaction products (MRPs) are formed or one of the reaction components has been exhausted or the reaction has been completed, with or without formation of caramelization reaction products (CRPs), which are further described below. When required, a pH adjuster or pH buffer can be added to regulate the pH of the reaction mixture before, during or after reaction as further described herein.

The resultant solution is dried by spray dryer or hot air oven to remove the water and to obtain the MRP composition of the present application.

When the reaction is completed, the product mixture does not need to be neutralized or it can be neutralized. Water and/or solvent(s) do not necessarily need to be removed but can be removed by distillation, spray drying or other known methods if the product is desired as a powder or liquid, whatever the case may be.

Interestingly, when a reaction mixture is dried to a powder, such as by spray drying, the resultant powder typically only has a slight smell associated with them. This is in contrast to regular powdered flavoring agents that generally have a strong smell. The dried powdered reaction mixtures of the embodiments, when dissolved in a solvent, such as water or alcohol or mixtures thereof, release the smell. This demonstrates that the volatile substances in the MRP can be preserved by the SG or GSG present in the MRP composition of the present application. Powders with strong aromas can be obtained too, particularly where the carrier, such as RA or GRA, is much less compared with MRP flavors or strong flavor substances used during Maillard reactions.

In some embodiments, the MRP composition may further include one or more carriers (or flavor carriers) acceptable for use with sweetener agents or flavoring agents. In addition, such carriers may be suitable e.g., as solvents for the Maillard reaction.

Exemplary carriers include acetylated distarch adipate, acetylated distarch phosphate, agar, alginic acid, beeswax, beta-cyclodextrine, calcium carbonate, calcium silicate, calcium sulphate, candelilla wax, carboxymethyl cellulose, sodium salt, carnauba wax, carrageenan, microcrystalline cellulose, dextran, dextrin, diammonium phosphate, distarch phosphate, edible fats, elemi resin, ethyl lactate, ethyl cellulose, ethyl hydroxyethyl cellulose, ethyl tartrate, gelatin, gellan gum, ghatti gum, glucose, glyceryl diacetate, glyceryl diesters of aliphatic fatty acids C6-C18, glyceryl monoesters of aliphatic fatty acids C6-C18, gyceryl triacetate (triacetin), glyceryl triesters of aliphatic fatty acids C6-C18, glyceryl tripropanoate, guar gum, gum arabic, hydrolyzed vegetable protein, hydroxyproplymethyl cellulose, hydroxypropyl cellulose, hydroxypropyl distarch phosphate, hydroxypropyl starch, karaya gum, konjac gum, lactic acid, lactose, locust bean gum (carob bean gum), magnesium carbonate, magnesium salts of fatty acids, maltodextrin, methyl cellulose, medium chain triglyceride, modified starches, such as acetylated distarch adipate, acetylated oxidized starch, acid-treated starch, alkaline treated starch, bleached starch, roasted starch dextrins, distarch phosphate, hydroxypropyl distarch phosphate, acetylated distarch phosphate, hydroxypropyl starch, monostarch phosphate, oxidized starch, phosphated distarch phosphate, starch acetate, starch sodium octenyl succinate, and enzyme treated starches; mono-,di- and tri-calcium orthophosphate, Na, K, NH4 and Ca alginate, pectins, processed euchema seaweed, propylene glycol alginate, sodium chloride (salt), silicon dioxide, sodium aluminium diphosphate, sodium aluminium silicate, Sodium, potassium and calcium salts of fatty acids, starch, starch (sodium) octenyl succinate, starch acetate, sucro glycerides, sucrose, sucrose esters of fatty acids, type I and type II sucrose oligoesters, taragum, tragacanth, triethylcitrate, whey powder, xanthan gum, fibers such as non-starch polysaccharides, lignin, cellulose, methylcellulose, the hemicelluloses, β-glucans, mucilage, inulins, oligosaccharides, polydextrose, fructooligosaccharides, cyclodextrins, chitins, and combinations thereof, and thickeners such as carbomers, cellulose base materials, gums, waxes, algin, agar, pectins, carrageenan, gelatin, mineral or modified mineral thickeners, polyethylene glycol and polyalcohols, polyacrylamide and other polymeric thickeners, and combinations thereof.

When utilizing the MRP compositions for use in a sweetener or flavoring composition, one or more additional components may be added to the MRP composition after the Maillard reaction has occurred. In some embodiments, these additional components include flavoring substances. Moreover, the reaction products after the Maillard reaction has been completed can further include, for example, one or more sweetener agents, reducing sugars (i.e., residue sugar donors), amine donors, sweetener enhancers, and CRPs, as well as one or more degraded sweetener agents, degraded sugar donors, degraded amine donors, and salts.

It should also be understood, for example, that the Maillard reaction can be performed under conditions containing an excess of amine donors in comparison to reducing sugars or much less than the amount of reducing sugars present. In the first instance, the resultant MRPs would include unreacted amine donors, degraded amine donors and/or residues from reacted amine donors. Conversely, when there is an excess of reducing sugars present in the Maillard reaction, the amine donors would be more fully reacted during the course of the reaction and a greater amount of unreacted reducing sugars as well as degraded reducing sugars and/or degrading reducing sugars and residues therefrom. Surprisingly, where the reducing sugar is replaced with a sweetener agent (e.g., a material such as an RA that does not include a reactive aldehydic or ketone moiety) and reacted with one or more amine donors, the amine donors may be present in the reaction products in reduced amounts reflecting their consumption in the Maillard type reaction or there excess of amine donors, as well as amine donor residues and/or amine degradation products after the Maillard reaction has been completed.

There are many ways to control the resulting MRP composition. For instance, adjusting the pH, pressure, reaction time, and ingredient additions to optimize the ratio of raw materials etc. Further, the separation of Maillard reaction products can provide a means for preparing different types of flavors or flavor enhancers. For example, a Maillard reaction product composition includes both volatile substances and non-volatile substances. Therefore, by evaporating the volatile substances, non-volatile substances can be purified for use. These non-volatile substances (or products) can be used as flavor modifiers or with the top note flavor in final products, such as volatile peach, lemon flavor provided by traditional flavor houses.

Volatile substances can be used as flavor or flavor enhancers as well. Partial separation/purification of a MRP can be carried out to obtain volatile substances, which can be further separated by distillation etc. or obtain non-volatile substances for instance by recrystallization, chromatograph etc. could be done to meet different targets of taste and flavor. Therefore, the MRP compositions of the present application include compositions containing one or more volatile substances, one or more non-volatile substances or mixtures thereof. Non-volatile substances in MRPs or isolated from MRPs can provide a good mouth feel, umami and Kokumi taste.

In some embodiments, the sweetener or flavoring composition of the present application further comprises a MRP formed from a reaction mixture comprising one or more flavonoid glycosides, isoflavone glycosides, saponin glycosides, phenol glycosides, cynophore glycosides, anthraquinone glycosides, cardiac glycosides, bitter glycosides, coumarin glycosides, and/or sulfur glycosides.

In some embodiments, the sweetener or flavoring composition further comprises a MRP formed from a reaction mixture comprising one or more glycosylated flavonoid glycosides, glycosylated isoflavone glycosides, glycosylated saponin glycosides, glycosylated phenol glycosides, glycosylated cynophore glycosides, glycosylated anthraquinone glycosides, glycosylated cardiac glycosides, glycosylated bitter glycosides, glycosylated coumarin glycosides, and/or glycosylated sulfur glycosides.

In some embodiments, the sugar donor may account for one or more flavors produced from a Maillard reaction. More particularly, a flavor may be produced from a Maillard reaction by using one or more sugar donors, wherein at least one sugar donor is selected from a product comprising a glycoside and a free carbonyl group. In some embodiments, glycosidic materials for use in Maillard reactions include natural juice/concentrates/extracts selected from strawberry, blueberry, blackberry, bilberry, raspberry, lingonberry, cranberry, red currants, white currants, blackcurrants, apple, peach, pear, apricot, mango, grape, water melon, cantolope, grapefruit, passion fruit, dragon fruit, carrot, celery, eggplant, tomato, etc.

The natural extracts used in Maillard reactions described herein can include any solvent extract-containing substances, such as polyphenols, free amino acids, flavonoids etc. The extracts can be further purified by methods such as resin-enriched, membrane filtration, crystallization etc., as further described herein.

In one embodiment, a Maillard reaction mixture or an MRP composition produced thereof may include a sweetener, a sweetener enhancer, such as thaumatin, and optionally one or more MRP products, wherein the sweetener is selected from date paste, apple juice concentrate, monk fruit concentrate, sugar beet syrup, pear juice or puree concentrate, apricot juice concentrate. Alternatively, a root or berry juice may be used as sugar donor or sweetener added to an MRP composition.

In some embodiments, particular flavors may be produced from a Maillard reaction through the use of one or more sugar donors, where at least one sugar donor is selected from plant juice/powder, vegetable juice/powder, berries juice/powder, fruit juice/powder. In certain preferred embodiments, a concentrate or extract may be used, such as a bilberry juice concentrate or extract having an abundance of anthocyanins. Optionally, at least one sugar donor and/or one amine donor is selected from animal source based products, such as meat, oil etc. Meat from any part of an animal, or protein(s) from any part of a plant could be used as source of amino donor(s) in this application.

In some embodiments, the Maillard reactants may further include one or more high intensity synthetic sweeteners, natural non-SG sweeteners, and/or the glycosylation products thereof. Alternatively, or in addition, the high intensity synthetic sweeteners may be added to an MRP composition comprising reaction products formed in the Maillard reaction.

Caramelization can occur in the course of Maillard reaction. Exemplary reactions include:

1. equilibration of anomeric and ring forms
2. sucrose inversion to fructose and glucose.
3. condensation
4. intramolecular bonding
5. isomerization of aldoses to ketoses
6. dehydration reactions
7. fragmentation reactions
8. unsaturated polymer formation One embodiment comprises one or more of these non-volatile substances originating from the MRP of the present application, including remaining sugar donors, remaining amine donors, and caramelized substances thereof. The caramelized substances can include e.g., caramelized disaccharides, trisaccharides, tetrasaccharides etc., which are formed by sugar donors; dimer-peptides, tri-peptides, tetra-peptides etc., which are formed by amine donors; glycosylamine and their derivatives, such as Amadori compounds, Heyns compounds, enolisated compounds, sugar fragments, amino acid fragments, and non-volatile flavor compounds formed by Maillard reactions of sugars and amino acid donors.

(2) Precision Fermentation

In some embodiments, a desirable MRP or a glycosylated amine donor is prepared by precision fermentation. Precision fermentation technology is a form of synthetic biology that typically requires the use of genetically engineered microorganisms. The genetically engineered microorganisms, such as yeast, algae or bacteria, are capable of producing or excreting a particular desirable material, such as edible fats, proteins and glycosylated amines donors. In some embodiments, glycosylated conventional amine donors, glycosylated natural high intensity sweeteners, glycosylated *stevia* extracts, glycosylated SGs, glycosylated sweet tea extracts, or glycosylated monk fruit extracts, are produced by precision fermentation. In some embodiments, the C-MRPs, SG-MRPs or GSG-MRPs of the present application are produced by precision fermentation.

III. Consumable Products Containing the Sweetener or Flavoring Composition of the Present Application Another aspect of the present application relates to a consumable product that contains the sweetener or flavoring composition of the present application. The term "consumable product", as used herein, refers to substances which are contacted with the mouths of people or animals, including substances, which are taken into and subsequently ejected from the mouth, substances which are drunk, eaten, swallowed or otherwise ingested, and are safe for human or animal consumption when used in a generally acceptable range.

The sweetener or flavoring compositions of the present application can be added to an consumable product to provide a sweetened product or a flavored product. The sweetener or flavoring compositions of the present application can be incorporated into any oral consumable product, including but not limited to, for example, beverages and beverage products, food products or foodstuffs (e.g., confections, condiments, baked goods, cereal compositions, dairy products, chewing compositions, and tabletop sweetener compositions), pharmaceutical compositions, smoking compositions, oral hygiene compositions, dental compositions, and the like. Consumables can be sweetened or unsweetened. Consumables employing the sweetener or flavoring compositions of the present application are also suitable for use in processed agricultural products, livestock products or seafood; processed meat products such as sausage and the like; retort food products, pickles, preserves boiled in soy sauce, delicacies, side dishes; soups; snacks, such as potato chips, cookies, or the like; as shredded filler, leaf, stem, stalk, homogenized leaf cured and animal feed.

In some embodiments, the consumable product comprises the sweetener or flavoring composition in an amount of 0.001-99 wt %, 0.001-75 wt %, 0.001-50 wt %, 0.001-25 wt %, 0.001-10 wt %, 0.001-5 wt %, 0.001-2 wt %, 0.001-1 wt %, 0.001-0.1 wt %, 0.001-0.01 wt %, 0.01-99 wt %, 0.01-75 wt %, 0.01-50 wt %, 0.01-25 wt %, 0.01-10 wt %, 0.01-5 wt %, 0.01-2 wt %, 0.01-1 wt %, 0.1-99 wt %, 0.1-75 wt %, 0.1 wt-50 wt %, 0.1-25 wt %, 0.1-10 wt %, 0.1-5 wt %, 0.1-2 wt %, 0.1-1 wt %, 0.1-0.5 wt %, 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % of the consumable product.

In some embodiments, the consumable product comprises one or more SGs, one or more non-SG components originated from *Stevia* leaves, such as polyphenols, and/or one or more GSGs, individually or collectively, in an amount of 0.001-99 wt %, 0.001-75 wt, %, 0.001-50 wt %, 0.001-25 wt %, 0.001-10 wt %, 0.001-5 wt %, 0.001-2 wt %, 0.001-1 wt %, 0.001-0.1 wt %, 0.001-0.01 wt %, 0.01-99 wt %, 0.01-75 wt %, 0.01-50 wt %, 0.01-25 wt %, 0.01-10 wt %, 0.01-5 wt %, 0.01-2 wt %, 0.01-1 wt %, 0.1-99 wt %, 0.1-75 wt %, 0.1 wt-50 wt %, 0.1-25 wt %, 0.1-10 wt %, 0.1-5 wt %, 0.1-2 wt %, 0.1-1 wt %, 0.1-0.5 wt %, 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % of the consumable product.

In some embodiments, the consumable product comprises one or more SG-MRPs and/or one or more GSG-MRPs, individually or collectively, in an amount of 0.001-99 wt %, 0.001-75 wt %, 0.001-50 wt %, 0.001-25 wt %, 0.001-10 wt %, 0.001-5 wt %, 0.001-2 wt %, 0.001-1 wt %, 0.001-0.1 wt %, 0.001-0.01 wt %, 0.01-99 wt %, 0.01-75 wt %, 0.01-50 wt %, 0.01-25 wt %, 0.01-10 wt %, 0.01-5 wt %, 0.01-2 wt %, 0.01-1 wt %, 0.1-99 wt %, 0.1-75 wt %, 0.1 wt-50 wt %, 0.1-25 wt %, 0.1-10 wt %, 0.1-5 wt %, 0.1-2 wt %, 0.1-1 wt %, 0.1-0.5 wt %, 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % of the consumable product.

In some embodiments, the one or more SG-MRPs are produced from a reaction mixture comprising RA, RB, RC, RD, RE, RF, RI, RM, RN, RO, steviolmonoside, steviolbioside, dulcoside A, dulcoside B, rubusoside and/or stevioside. In some embodiments, the reaction mixture further comprises one or more non-SG components originated from *Stevia* leaves, such as polyphenols.

In some embodiments, the one or more GSG-MRPs are produced from a reaction mixture comprising GRA, GRB, GRC, GRD, GRE, GRF, GRI, GRM, GRN, GRO, glycosylated steviolnonoside, glycosylated steviolbioside, glycosylated dulcoside A, glycosylated dulcoside B, glycosylated rubusoside and/or glycosylated stevioside.

In some embodiments, the consumable product further comprises one or more non-SG components originated from *Stevia* leaves, such as polyphenols.

In some embodiments, the consumable product of the present application further comprises a thickener. Thickeners such as hydrocolloids or polyols are used in liquid to improve the mouth feel by increasing the viscosity, they are also used in solid base product as filler for low cost sugar products. However, they could create a chalky or a floury taste, and higher viscosities would make a beverage less palatable. Therefore, there is a need to find a solution to reduce the amount of thickeners to be used for food and beverage especially for sugar, fat and salt reduction products. The inventors surprisingly found that adding the G-hpRA composition can enhance the mouth feel of thickeners and have a synergistic effect without necessarily increasing the viscosity, thus improving the palatability of the food or beverage.

In some embodiments, the consumable product of the present application further comprises a surfactant or emulsifier. In some embodiments, the consumable comprises a single surfactant. In other embodiments, the consumable contains a combination of two or more surfactants.

The consumable products of the present application includes dairy products, fats and oils and fat emulsions (type water-in-oil), edible ices, such as sherbet and sorbet, fruits and vegetables (including mushrooms and fungi, roots and tubers, pulses and legumes), nuts and seeds, confectionery, cereals and cereal products, bakery wares, meat and meat products, fish and fish products, eggs and egg products, sweeteners, such as sugar and honey, salt, spices, soups, sauces, salads, protein products, foodstuffs intended for particular nutritional uses, such as infant formula, beverages (excluding dairy products), ready-to-eat savories, and composite foods (e.g., casseroles, meat pies, mincemeat).

In some embodiment, the sweetener or flavoring composition of the present application is present in a consumable product, individually or collectively, at a final concentration of 0.0001 ppm, 0.001 ppm, 0.01 ppm, 0.1 ppm, 1 ppm, 2 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 100 ppm, 110 ppm, 120, ppm, 130 ppm, 140 ppm, 150 ppm, 160 ppm, 170 ppm, 180 ppm, 190 ppm, 200 ppm, 220 ppm, 240 ppm, 260 ppm, 280 ppm, 300 ppm, 320 ppm, 340 ppm, 360 ppm 380 ppm, 400 ppm, 420 ppm, 440 ppm, 460 ppm, 480 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,200 ppm, 1,400 ppm, 1,600 ppm, 1,800 ppm, 2,000 ppm, 2,200 ppm, 2,400 ppm, 2,600 ppm, 2,800 ppm, 3,000 ppm, 3,200 ppm, 3,400 ppm, 3,600 ppm, 3,800 ppm, 4,000 ppm, 4,200 ppm, 4,400 ppm, 4,600 ppm, 4,800 ppm, 5,000 ppm, 5,500 ppm, 6,000 ppm, 6,500 ppm, 7,000 ppm, 7,500 ppm, 8,000 ppm, 8,500 ppm, 9,000 ppm, 9,500 ppm, 10,000 ppm, 11,000 ppm, 12,000 ppm, 13000 ppm, 14,000 ppm, or 15,000 ppm in the consumable product.

In some embodiment, the sweetener or flavoring composition of the present application is present in a consumable product, individually or collectively, at a final concentration ranging from 1 ppm to 15,000 ppm, from 1 ppm to 10,000 ppm, from 1 ppm to 5,000 ppm, from 10 ppm to 1,000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, from 500 ppm to 600 ppm, from 20 ppm to 200 ppm, from 20 ppm to 180 ppm, from 20 ppm to 160 ppm, from 20 ppm to 140 ppm, from 20 ppm to 120 ppm, from 20 ppm to 100 ppm, from 20 ppm to 80 ppm, from 20 ppm to 60 ppm, from 20 ppm to 40 ppm, from 40 ppm to 150 ppm, from 40 ppm to 130 ppm, from 40 ppm to 100 ppm, from 40 ppm to 90 ppm, from 40 ppm to 70 ppm, from 40 ppm to 50 ppm, from 20 ppm to 100 ppm, from 40 ppm to 100 ppm, from 50 ppm to 100 ppm, from 60 ppm to 100 ppm, from 80 ppm to 100 ppm, from 5 ppm to 100 ppm, from 5 ppm to 95 ppm, from 5 ppm to 90 ppm, from 5 ppm to 85 ppm, from 5 ppm to 80 ppm, from 5 ppm to 75 ppm, from 5 ppm to 70 ppm, from 5 ppm to 65 ppm, from 5 ppm to 60 ppm, from 5 ppm to 55 ppm, from 5 ppm to 50 ppm, from 5 ppm to 45 ppm, from 5 ppm to 40 ppm, from 5 ppm to 35 ppm, from 5 ppm to 30 ppm, from 5 ppm to 25 ppm, from 5 ppm to 20 ppm, from 5 ppm to 15 ppm, or from 5 ppm to 10 ppm.

In some embodiments, the sweetener or flavoring composition of the present application is present in the consumable product, individually or collectively, at a final weight percentage range of 0.001-99 wt %, 0.001-75 wt %, 0.001-50 wt %, 0.001-25 wt %, 0.001-10 wt %, 0.001-5 wt %, 0.001-2 wt %, 0.001-1 wt %, 0.001-0.1 wt %, 0.001-0.01 wt %, 0.01-99 wt %, 0.01-75 wt %, 0.01-50 wt %, 0.01-25 wt %, 0.01-10 wt %, 0.01-5 wt %, 0.01-2 wt %, 0.01-1 wt %, 0.1-99 wt %, 0.1-75 wt %, 0.1-50 wt %, 0.1-25 wt %, 0.1-10 wt %, 0.1-5 wt %, 0.1-2 wt %, 0.1-1 wt %, 0.1-0.5 wt %, 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt %.

In general, tabletop sugar replacements lack certain taste attributes associated with sugar, especially for solid tabletop sweeteners. In addressing this need, the inventor of the present application has developed more palatable tabletop sugar replacements than commonly known. Specifically, in some embodiments, the present application provides a consumable product comprising the sweetener or flavoring composition of the present application in the form of a tabletop sweetener composition. In one embodiment, the tabletop sweetener composition has a taste similar to molasses.

In some embodiments, the tabletop sweetener composition may further include at least one bulking agent, additive, anti-caking agent, functional ingredient or combination thereof.

Suitable "bulking agents" include, but are not limited to, maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, and the like, or mixtures thereof. Additionally, in accordance with still other embodiments of the application, granulated sugar (sucrose) or other caloric sweeteners such as crystalline fructose, other carbohydrates, or sugar alcohol can be used as a bulking agent due to their provision of good content uniformity without the addition of significant calories.

As used herein, the phrase "anti-caking agent" and "flow agent" refers to any composition which assists in content uniformity and uniform dissolution. In some embodiments, non-limiting examples of anti-caking agents include cream of tartar, aluminium silicate (Kaolin), calcium aluminium silicate, calcium carbonate, calcium silicate, magnesium carbonate, magnesium silicate, mono-, di- and tri-calcium orthophosphate, potassium aluminium silicate, silicon dioxide, sodium aluminium silicate, salts of stearic acid, microcrystalline cellulose (Avicel, FMC BioPolymer, Philadelphia, Pennsylvania), and tricalcium phosphate. In one embodiment, the anti-caking agents are present in the tabletop sweetener composition in an amount from about 0.001 to about 3% by weight of the tabletop sweetener composition.

The tabletop sweetener compositions can be packaged in any form known in the art. Non-limiting forms include, but are not limited to, powder form, granular form, packets, tablets, sachets, pellets, cubes, solids, and liquids.

In some embodiments, the tabletop sweetener compositions of the present application comprise GhpRA and/or GhpRA-MRP, individually or collectively, at a weight percentage range from 0.001-99 wt %, 0.001-75 wt %, 0.001-50 wt %, 0.001-25 wt %, 0.001-10 wt %, 0.001-5 wt %, 0.001-2 wt %, 0.001-1 wt %, 0.001-0.1 wt %, 0.001-0.01 wt %, 0.01-99 wt %, 0.01-75 wt %, 0.01-50 wt %, 0.01-25 wt %, 0.01-10 wt %, 0.01-5 wt %, 0.01-2 wt %, 0.01-1 wt %, 0.1-99 wt %, 0.1-75 wt %, 0.1-50 wt %, 0.1-25 wt %, 0.1-10 wt %, 0.1-5 wt %, 0.1-2 wt %, 0.1-1 wt %, 0.1-0.5 wt %, 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt %.

In some embodiments, the tabletop sweetener compositions of the present application comprise RA, hpRA, RA-MRP, and/or hpRA-MRP, individually or collectively, at a weight percentage range from 0.001-99 wt %, 0.001-75 wt %, 0.001-50 wt %, 0.001-25 wt %, 0.001-10 wt %, 0.001-5 wt %, 0.001-2 wt %, 0.001-1 wt %, 0.001-0.1 wt %, 0.001-0.01 wt %, 0.01-99 wt %, 0.01-75 wt %, 0.01-50 wt %, 0.01-25 wt %, 0.01-10 wt %, 0.01-5 wt %, 0.01-2 wt %, 0.01-1 wt %, 0.1-99 wt %, 0.1-75 wt %, 0.1-50 wt %, 0.1-25 wt %, 0.1-10 wt %, 0.1-5 wt %, 0.1-2 wt %, 0.1-1 wt %, 0.1-0.5 wt % 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % of the tabletop sweetener compositions.

In some embodiments, the tabletop sweetener compositions of the present application comprise RA30, GRA30, RA30-MRP and/or GRA30-MRP, individually or collectively, at a weight percentage range from 0.001-99 wt %, 0.001-75 wt %, 0.001-50 wt %, 0.001-25 wt %, 0.001-10 wt %, 0.001-5 wt %, 0.001-2 wt %, 0.001-1 wt %, 0.001-0.1 wt %, 0.001-0.01 wt %, 0.01-99 wt %, 0.01-75 wt %, 0.01-50 wt %, 0.01-25 wt %, 0.01-10 wt %, 0.01-5 wt %, 0.01-2 wt %, 0.01-1 wt %, 0.1-99 wt %, 0.1-75 wt %, 0.1-50 wt %, 0.1-25 wt %, 0.1-10 wt %, 0.1-5 wt %, 0.1-2 wt %, 0.1-1 wt %, 0.1-0.5 wt %, 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % tabletop sweetener compositions.

In some embodiments, the tabletop sweetener compositions of the present application comprise stevioside (STV), glycosylated stevioside (GSTV), STV-MRP, and/or GSTV-MRP, individually or collectively, at a weight percentage range from 0.001-99 wt %, 0.001-75 wt %, 0.001-50 wt %, 0.001-25 wt %, 0.001-10 wt %, 0.001-5 wt %, 0.001-2 wt %, 0.001-1 wt %, 0.001-0.1 wt %, 0.001-0.01 wt %, 0.01-99 wt %, 0.01-75 wt %, 0.01-50 wt %, 0.01-25 wt %, 0.01-10 wt %, 0.01-5 wt %, 0.01-2 wt %, 0.01-1 wt %, 0.1-99 wt %, 0.1-75 wt %, 0.1-50 wt %, 0.1-25 wt %, 0.1-10 wt %, 0.1-5 wt %, 0.1-2 wt %, 0.1-1 wt %, 0.1-0.5 wt %, 1-99 wt %, 1-75 wt %, 1-50 wt %, 1-25 wt %, 1-10 wt %, 1-5 wt %, 5-99 wt %, 5-75 wt %, 5-50 wt %, 5-25 wt %, 5-10 wt %, 10-99 wt %, 10-75 wt %, 10-50 wt %, 10-25 wt %, 10-15 wt %, 20-99 wt %, 20-75 wt %, 20-50 wt %, 30-99 wt %, 30-75 wt %, 30-50 wt %, 40-99 wt %, 40-75 wt %, 40-50 wt %, 50-99 wt %, 50-75 wt %, 60-99 wt %, 60-75 wt %, 70-99 wt %, 70-75 wt %, 80-99 wt %, 80-90 wt %, or 90-99 wt % tabletop sweetener compositions.

IV. Taste Profiles and Taste Testing of Compositions Containing the Sweetener or Flavoring Composition of the Present Application Another aspect of the present application relates to a method of improving the taste profile and/or flavor of a sweetener or flavoring composition by adding to the sweetener or flavor product one or more SGs, one or more GSGs, and/or one or more MRPs of the present application, wherein the addition of the one or more SGs, one or more GSGs, and/or one or more MRPs of the present application improves the taste and/or aroma profiles of the original sweetener or flavoring composition. In some embodiments, the one or more SGs, one or more GSGs, and/or one or more MRPs of the present application is present in an individual or combined amount of 0.0001-99.5% by weight of the sweetener or flavoring composition.

In some embodiments, the original sweetener or flavoring composition is a synthetic sweetener, such as sucralose, ACE-K, aspartame, sodium saccharin, and mixtures thereof. In some embodiments, the original sweetener or flavoring composition is a high intensity natural sweeteners such as steviol glycosides, *Stevia* extracts, sweet tea extracts, sweet tea components, monk fruit extract, monk fruit components, licorice extract, and licorice components.

Another aspect of the present application relates to a method of improving the taste profile of a consumable product. The method comprises the step of adding to the consumable product, a sufficient amount of the sweetener or flavoring composition of the present application. In more particular embodiments, the consumable product is a beverage, a bakery product or a dairy product. In some embodiments, the sweetener or flavoring composition is present in an amount of 0.0001-99.5% by weight of the consumable product.

The sweetener or flavoring compositions of the present application are useful for improved taste and aroma profiles of many consumable products relative to control samples. The phrase "taste profile", which is interchangeable with "sensory profile" and "sweetness profile", may be defined as the temporal profile of all basic tastes of a sweetener. The "temporal profile" may be considered to represent the intensity of sweetness perceived over time in tasting of the composition by a human, especially a trained "taster". Carbohydrate and polyol sweeteners typically exhibit a quick onset followed by a rapid decrease in sweetness, which disappears relatively quickly on swallowing a food or beverage containing the same. In contrast, high intensity natural sweeteners typically have a slower sweet taste onset reaching a maximal response more slowly, followed by a decline in intensity more slowly than with carbohydrate and polyol sweeteners. This decline in sweetness is often referred to as "sweetness linger" and is a major limitation associated with the use of high intensity natural sweeteners.

In the context of taste tasting, the terms "improve", "improved" and "improvement" are used interchangeably with reference to a perceived advantageous change in a composition or consumable product upon introduction of the sweetener or flavoring composition of the present application relative to the original taste profile of the composition or consumable product without the added GSG and/or MRP composition in any aspect, such as less bitterness, better sweetness, better sour taste, better aroma, better mouth feel, better flavor, less aftertaste, etc. The terms "improve" or "improvement" can refer to a slight change, a change, or a significant change of the original taste profile, etc., which makes the composition more palatable to an individual.

In some embodiments, the sweetener or flavoring compositions of the present application are useful for improving the taste and aroma profiles for other synthetic sweeteners, such as sucralose, ACE-K, aspartame, sodium saccharin, and mixtures thereof, and for natural high intensity sweeteners such as steviol glycosides, *Stevia* extracts, monk fruit extract, monk fruit components, licorice extract, licorice components.

In some embodiments, the sweetener or flavoring composition of the present application may be evaluated with reference to the degree of their sucrose equivalence. Accordingly, the SGs, GSGs, MRPs and the sweetener or flavoring composition of the present application may be diluted or modified with respect to its ingredients to conform with this sucrose equivalence.

The onset and decay of sweetness when the GSGs, MRPs and the sweetener or flavoring composition of the present application are consumed can be perceived by trained human tasters and measured in seconds from first contact with a taster's tongue ("onset") to a cutoff point (typically 180 seconds after onset) to provide a "temporal profile of sweetness". A plurality of such human tasters is called a "sensory panel." In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness." Aromas from aroma producing substances are volatile compounds which are perceived by the aroma receptor sites of the smell organ, i.e., the olfactory tissue of the nasal cavity. They reach the receptors when drawn in through the nose (orthonasal detection) and via the throat after being released by chewing (retronasal detection). The concept of aroma substances, like the concept of taste substances, is to be used loosely, since a compound might contribute to the typical aroma or taste of one food, while in another food it may cause a faulty aroma or taste, or both, resulting in an off-flavor. Thus, sensory profile may include evaluation of aroma as well.

The term "mouth feel" involves the physical and chemical interaction of a consumable in the mouth. More specifically, as used herein, the term "mouth feel" refers to the fullness sensation experienced in the mouth, which relates to the body and texture of the consumable such as its viscosity. Mouth feel is one of the most important organoleptic properties and the major criteria that consumers use to judge the quality and freshness of foods. Subtle changes in a food and beverage product's formulation can change mouth feel significantly. Simply taking out sugar and adding a high intensity sweetener can cause noticeable alterations in mouth feel, making a formerly good product unacceptable to consumers. Sugar not only sweetens, it also builds body and viscosity in food and beverage products, and leaves a slight coating on the tongue. For example, reducing salt levels in soup changes not only taste, but can alter mouth feel as well. Primarily it is the mouth feel that is always the compliant with non-sugar sweeteners.

The phrase "sweetness detection threshold" refers to the minimum concentration at which panelists consisting of 1-10 persons are able to detect sweetness in a composition, liquid or solid. This is further defined as provided in the Examples herein and are conducted by the methods described in Sensory Testing for Flavorings with Modifying Properties by Christie L. Harman, John B. Hallagan, and the FEMA Science, Committee Sensory Data Task Force, November 2013, Volume 67, No. 11 and Appendix A attached thereto, the teachings of which are incorporated herein by reference.

"Threshold of sweetness" refers to a concentration of a material below which sweetness cannot be detected, but can still impart a flavor to a consumable (including water). When half of a trained panel of testers determines something is "sweet" at a given concentration, then the sample meets the threshold. When less than half of a panel of testers cannot discern sweetness at a given concentration, then concentrations of the substance below the sweetness level are considered a flavoring agent.

It should be understood that the flavoring agents described herein can be used in combination with other sweetener agents, including high-intensity natural and synthetic sweeteners, to encapsulate and reduce or eliminate the unwanted off taste present in the composition. There is a sequence of steps in Maillard reaction(s) that can be used to produce flavor(s). That is, there can be a first step where a first reaction takes place between a first sugar donor and a first amine donor under appropriate conditions followed by a second reaction with a second sugar donor and a second amine donor, and possible subsequent reactions to provide a complex flavorant composition that is a combination of various Maillard reaction products between, for example, the first sugar donor and first amine donor, along with the reaction between the first sugar donor and a second amine donor or a second sugar donor reacting with the first sugar donor, etc. under the Maillard reaction conditions described herein. The processes described herein can be used to preserve flavors.

For example, to dissolve any flavor or flavor combination in a dissolved steviol glycosides solution, afterwards, the solution could be ready to use, or it could be further concentrated to syrup or powder form. For evaluating the taste profile of a given composition, a sample may be tested by e.g., a panel of 1-10 people. In some cases, a trained taster may independently taste the sample(s) first. The taster may be asked to describe the taste profile and score 0-5 according to the increasing sugar like, bitterness, aftertaste and lingering taste profiles. The taster may be allowed to re-taste, and then make notes for the sensory attributes perceived. Afterwards, another group of 1-10 tasters may similarly taste the sample(s), record its taste attributes and discuss the samples openly to find a suitable description. Where more than 1 taster disagrees with the results, the tasting may be repeated. For example, a "5" for sugar like is the best score for having a taste that is sugar like and conversely a value of 0 or near zero is not sugar like. Similarly, a "5" for bitterness, aftertaste and lingering is not desired. A value of zero or near zero means that the bitterness, aftertaste and/or lingering is reduced or is removed. Other taste attributes may include astringency and overall likability.

In some embodiments, vanilla, maltol or other flavor modifier product(s) "FMPs" can be added to the compositions described herein to further improve the taste. FMPs, such as maltol, ethyl-maltol, vanillin, ethyl vanillin, m-methylphenol, and m-n-propylphenol can further enhance the mouth feel, sweetness and aroma of the SGs, GSGs, MRPs and the sweetener or flavoring composition of the present application. Thus, in some embodiments, one or more FMPs may be added before or after the Maillard reaction, such as maltol, ethyl-maltol, vanillin, ethyl vanillin, m-methylphenol, m-n-propylphenol, or combinations thereof. In certain embodiments, MRPs and/or sweeteners may be combined with one or more FMPs. Particular MRP/FMP combinations include MRPs and maltol; MRPs and vanillin; sweetener(s) and maltol; sweetener(s) and vanillin etc. Such compositions may be used in any of the food or beverage products described herein.

Production of the SGs, GSGs, MRPs and the sweetener or flavoring of the present application may involve the use of any of the following methodologies, including reflux at atmospheric pressure, reaction under pressure, oven drying, vacuum oven drying, roller/drum drying, surface scraped heat exchange, and/or extrusion.

The inventors of the present application have also developed a unique process which can preserve useful flavor substances originating from natural high intensity sweetener plants, including *stevia*, sweet tea, monk fruit, licorice etc. and recovered in in the form of *stevia* extracts, sweet tea extracts, monk fruit extracts, licorice etc. Such flavor substances can be further amplified in glycosylation and/or Maillard reactions involving the foregoing extracts in combination with various amine donors as described herein.

Additionally, flavor substances in natural high intensity sweetener plants can also include new flavor substances from new natural high intensity sweetener plant varieties produced by hybridizing, grafting and other cultivating methods.

A flavoring agent, other than a flavor derived from a Maillard reaction product as described herein, can be added to the compositions described herein before or after a Maillard reaction has been effected. Suitable flavoring agents include, for example, natural flavors, vitamins, such as vitamin C, artificial flavors, spices, seasonings, and the like. Exemplary flavor agents include synthetic flavor oils and flavoring aromatics and/or oils, uronic acids (e.g., glucuronic acid and galacturonic acid) or oleoresins, essences, and distillates, and a combination comprising at least one of the foregoing.

During the Maillard reaction or following completion of the Maillard reaction, "top note" agents may be added, which are often quite volatile, vaporizing at or below room temperature. "Top notes" are often what give foods their fresh flavors. Suitable top note agents include but are not limited to, for example, furfuryl mercaptan, methional, nonanal, trans,trans-2,4-decadienal, 2,2'-(dithiodimethylene) difuran, 2-methyl-3-furanthiol, 4-methyl-5-thiazoleethanol, pyrazineethanethiol, bis(2-methyl-3-furyl) disulfide, methyl furfuryl disulfide, 2,5-dimethyl-2,5-dihydroxy-1,4-dithiane, 95%, trithioacetone, 2,3-butanedithiol, methyl 2-methyl-3-furyl disulfide, 4-methylnonanoic acid, 4-methyloctanoic acid, or 2-methyl-3-tetrahydrofuranthiol.

Generally any flavoring agent or food additive, such as those described in "Chemicals Used in Food Processing", Publication No 1274, pages 63-258, by the National Academy of Sciences, can be used. This publication is incorporated herein by reference.

As used herein, a "flavoring agent" or "flavorant" herein refers to a compound or an ingestibly acceptable salt or solvate thereof that induces a flavor or taste in an animal or a human. The flavoring agent can be natural, semi-synthetic, or synthetic. Suitable flavorants and flavoring agent additives for use in the compositions of the present application include, but are not limited to, vanillin, vanilla extract, mango extract, cinnamon, citrus, coconut, ginger, viridiflorol, almond, bay, thyme, cedar leaf, nutmeg, allspice, sage, mace, menthol (including menthol without mint), an essential oil, such as an oil produced from a plant or a fruit, such as peppermint oil, spearmint oil, other mint oils, clove oil, cinnamon oil, oil of wintergreen, or an oil of almonds; a plant extract, fruit extract or fruit essence from grape skin extract, grape seed extract, apple, banana, watermelon, pear, peach, grape, strawberry, raspberry, cherry, plum, pineapple, apricot, a flavoring agent comprising a citrus flavor, such as an extract, essence, or oil of lemon, lime, orange, tangerine, grapefruit, citron, kumquat, or combinations thereof. Flavorants for use in the present application include both natural and synthetic substances which are safe for humans or animals when used in a generally accepted range.

Quick sweet and or freshness perception are important contributors to a consumer's "hedonic preference". A complicated and long lasting sensory decision making process to recognize a taste or a flavor triggers failure search and defect analysis (lower overall quality rating).

The quick sweet and or freshness decision depends on the combination of sensory signals and their fit with our acquired perception of freshness. The clearer and the easier recognizable a set of signals appears, the quicker and easier our brain can decide in favor of good sweet and or freshness perception, the less attention to be paid to other attributes of sensory perception. Ambiguity in a set of signals prevents a quick decision making process. A set of unclear and/or unrecognized sensory signals triggers uncertainty in our brain. This uncertainty is either interpreted as "not recognizable" or yields a decision telling us "similar to . . . with following defects" with psychological attention.

Quick and early recognition of a taste and or a flavor is not only of major importance for the sweet and or freshness decision. Our brain tends to stop further considerations once a decision is made (evolutionary useful feature as thinking costs a lot of energy). With other words, once a familiar sweet or freshness decision is made, sensory attributes will no more followed up making failure responses or defect analysis much less probable than in cases where it took long time to recognize a taste or a flavor.

Freshness is an ignored sensory attribution by the food and beverage industry. Slow sweet perception is an underestimated factor for palatability of consumables. An embodiment of composition in this invention could improve the freshness and or quick onset sweetness which could significantly improve the palatability of consumables.

In some embodiments, a food and beverage comprises the GSG (e.g., GhpSG such as GhpRA, GhpRB and GhpRD) or MRP (GhpSG-MRP such as GhpRA-MRP, GhpRB-MRP and GhpRD-MRP) or the sweetener composition of the present application, which contribute to sucrose equivalences (SugarEs) in an amount the equals to, or is greater than 1%, 1.5%, 2%, 2.5%, 3%, 4% or 5% SugarE. In some embodiments, a food and beverage comprises the GSG (e.g., GhpSG such as GhpRA, GhpRB and GhpRD) or MRP (GhpSG-MRP such as GhpRA-MRP, GhpRB-MRP and GhpRD-MRP) or the sweetener composition of the present application, which contribute to sucrose equivalences (SugarEs) in an amount that is less than 0.5%, 1%, or 1.5% SugarE.

In other embodiments, the present application provides methods for using the GSG (e.g., GhpSG such as GhpRA, GhpRB and GhpRD) or MRP (GhpSG-MRP such as GhpRA-MRP, GhpRB-MRP and GhpRD-MRP) or the sweetener composition of the present application as food ingredients or food additives. A further embodiment of a food ingredient or additive comprises the SG (e.g., hpSG), GSG (e.g., GhpSG such as GhpRA, GhpRB and GhpRD) or MRP (GhpSG-MRP such as GhpRA-MRP, GhpRB-MRP and GhpRD-MRP) or the sweetener composition of the present application. It should be noted that the hpSG and/or G-hpSG used in the compositions and methods of the present application can originate from any source, including but not limited to *stevia* leaves, sweet tea, enzymatic conversion from *stevia* extracts and *stevia* glycosides, fermentation, hydrolysis, and other biosynthetic or synthetic methods.

The inventor surprisingly found that the GSG (e.g., GhpSG such as GhpRA, GhpRB and GhpRD) or MRP (GhpSG-MRP such as GhpRA-MRP, GhpRB-MRP and GhpRD-MRP) and the sweetener or flavoring composition of the present application can significantly mask the bitterness, metallic taste of natural high intensity sweeteners such as *stevia* extract, *stevia* glycosides, monk fruit juice, monk fruit extract, licorice extract, and also high synthetic sweeteners, such as Acesulfame K, sucralose. Thus, in certain embodiments, a food flavor or sweetener can comprise: (a) the GhpSG (e.g., GhpRA) composition and/or the GhpSG-MRP (e.g., GhpRA-MRP) composition of the present application, and (b) one or more components selected from natural or synthetic high intensity sweeteners.

EXAMPLES

Example 1. Preparation of Glycosylated Rebaudioside A 97% or 100% (GRA97 or GRA100) from Rebaudioside A 97% or 100%

Glycosylated reaction products from Rebaudioside A 100% were prepared according to the following method.

Materials: Rebaudioside A 100% (available from Sweet Green Fields). The content is show in Table 1-1 (JECFA 2010). Lot #CT001-140604. Based on the testing results, the purity of RA is higher than reference standard.

Rebaudioside A 97% (available from Sweet Green Fields). The RA content is show in Table 1-2. Lot #20150508)

TABLE 1-1

| Contents of Rebaudioside A 100% | | | | | | | | | | |
|---|---|---|---|---|---|---|---|---|---|---|
| Product Lot# | RD | RA | STV | RF | RC | Dulc A | RU | RB | STB | TSG(9) |
| CT001-140604 | / | 100.03 | / | / | / | / | / | 0.34 | / | 100.37 |

TABLE 1-2

| Contents of Rebaudioside A 97% | | | | | | | | | | |
|---|---|---|---|---|---|---|---|---|---|---|
| Product Lot# | RD | RA | STV | RF | RC | Dulc A | RU | RB | STB | TSG(9) |
| 20150508 | / | 97.32 | / | 0.09 | / | / | / | 1.60 | / | 99.01 |

Experiment (i) Different weights of dextrin (show in table 1-1) and Rebaudioside A 100% (RA100, content shown is Table 1-1) or Rebaudioside A 97% (RA97, content shown in Table 1-2) were dissolved in 100 ml deionized water and the pHs were adjusted to 5.9. The weight and ratio of dextrin and RA100 or RA97 are shown in Table 1-3.

(ii) 0.5 ml CGTase enzyme was added to the mixtures in (i) and incubated at 69° C. for 10 hours to glycosylate the Rebaudioside A 97% or 100% compositions via glucose molecules derived from dextrin.

(iii) The reaction mixtures were heated to 85° C. for 10 min to inactivate the CGTase, which was then removed by filtration.

(iv) The resulting solutions of GRA100 or GRA97, residual RA and dextrin were decolored and spray dried, yielding about 25 g as a white powder (the contents of GRA are show in Table 1-4).

TABLE 1-3

| weight and ratio of dextrin and RA 100 or RA97 | | | | |
|---|---|---|---|---|
| | Weights, ratios of dextrin and RA 97% or RA 100% | | | |
| No. | RA to dextrin ratio (w/w) | Weight of dextrin (g) | RA97 (g) | RA100 (g) |
| 1-1 | 1:1 | 10 | 10 | |
| 1-2 | 1:1.2 | 12 | 10 | |
| 1-3 | 1:1.3 | 13 | 10 | |
| 1-4 | 1:1.4 | 14 | 10 | |
| 1-5 | 1:1 | 10 | | 10 |
| 1-6 | 1:1.2 | 12 | | 10 |

TABLE 1-4

| contents of GRA97 and GRA100. | | | | | | | | | | | |
|---|---|---|---|---|---|---|---|---|---|---|---|
| | Contents (%) | | | | | | | | | | |
| No. | RD | RA | STV | RF | RC | DA | RU | RB | STB | TSG(9) | Dextrin |
| 1-1 | 0.2 | 10.1 | / | / | / | / | / | 0.58 | / | 10.88 | 19.07 |
| 1-2 | 0.19 | 9.55 | 0.07 | 0.08 | / | / | / | 0.17 | / | 10.06 | 19.36 |
| 1-3 | / | 8.55 | 0.05 | / | / | / | / | 0.17 | / | 8.77 | 20.46 |
| 1-4 | 0.17 | 7.87 | 0.05 | 0.07 | / | / | / | 0.16 | / | 8.32 | 22.18 |
| 1-5 | / | 11.26 | / | / | / | / | / | 0.37 | / | / | 36.19 |
| 1-6 | / | 9.19 | / | / | / | / | / | 0.17 | / | 9.25 | 19.20 |

Note:

TSG refers to the content of total Steviol glycosides (TSG(9)), which includes Rebaudioside A, Rebaudioside B, Rebaudioside C, Rebaudioside D, Rebaudioside F, stevioside, steviolbioside, rubusoside, and dulcoside Note: TSG refers to the content of total Steviol glycosides (TSG(9)), which includes Rebaudioside A, Rebaudioside B, Rebaudioside C, Rebaudioside D, Rebaudioside F, stevioside, steviolbioside, rubusoside, and dulcoside Conclusion: Rebaudioside A 97% or 100% can be glycosylated well by dextrins and CGTase enzyme. Different ratio of Rebaudioside A to dextrins results in different residual Rebaudioside A and dextrins of final product shows that different number glucosyl residues GRA97 or GRA100 derivatives are obtained.

Example 2. Sensory Evaluation Methods and their Use in Evaluating the Sweetness and Overall Likability of GRA100

Sensory Evaluation Method.

(1) Sucrose equivalence or SugarE. As used herein, the phrase "sucrose equivalence" or "SugarE" refers to the amount of non-sucrose sweetener required to provide the sweetness of a given percentage of sucrose in the same solution.

TABLE 2-1

SugarE evaluation standards.

| | Sucrose weight | | | | | | | | | |
|---|---|---|---|---|---|---|---|---|---|---|
| | 1 g | 2 g | 3 g | 4 g | 5 g | 6 g | 7 g | 8 g | 9 g | 10 g |
| Water volume | 100 mL | | | | | | | | | |
| SugarE | 1% | 2% | 3% | 4% | 5% | 6% | 7% | 8% | 9% | 10% |

Evaluation method: The sample to be evaluated was dissolved in neutral deionized water. The tester placed 20-30 mL of the evaluation solution into his/her mouth. After 5 seconds, the solution was spit out. After a mouthwash step with water, the standard solution was taken. If the degree of SugarE was similar, the SugarE degree of the sample solution is deemed to be the SugarE degree value of the standard solution. Otherwise it was necessary to take additional standard solutions and try again until the SugarE degree value was determined.

(2) Time-Intensity Curves

Figure 1:
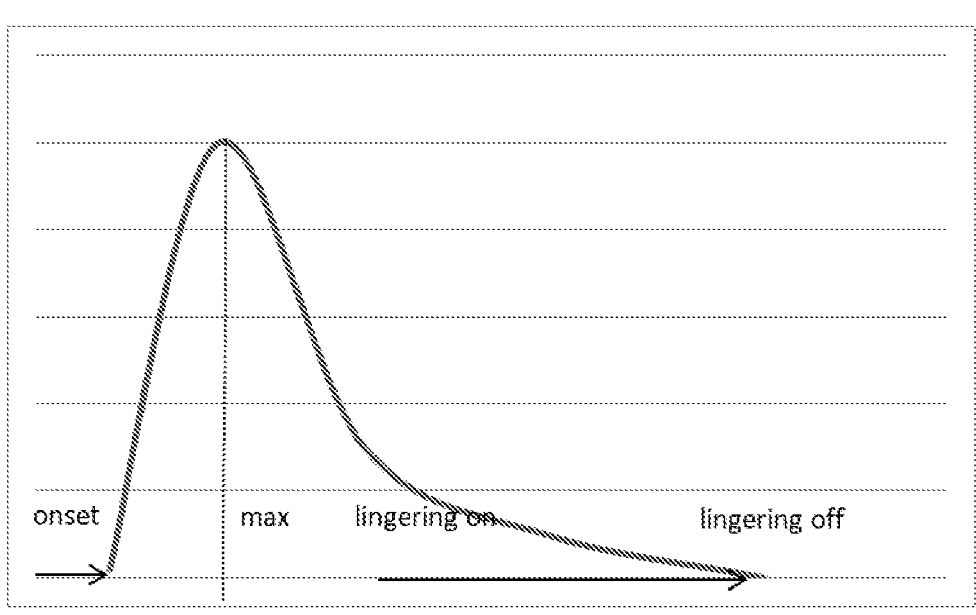
FIG. 1 shows a schematic diagram of an exemplary time-intensity curve.

Evaluation method: Each person of the test panel had to drink sample solutions with defined concentrations. During the test, all persons had a time clock. Each person noted the appearance-time for four specific points in a time-intensity curve (onset, maximum sweetness, lingering on and lingering off). The results were recorded and a graph was generated, which depicts mean values calculated from at least 6 individual test persons for each specific point in the time-intensity curve. FIG. 1 shows a schematic diagram of an exemplary time-intensity curve.

(2-1) Sweet Onset

Each sample for evaluation was dissolved in neutral deionized water. The tester placed 20-30 mL of the evaluation solution in his/her mouth, and the time was started to record the start and sweet onset times. The test solution was then spit out. The time at which the sweetness started was compared to the time in the table below to determine the sweet onset score.

TABLE 2-2

Sweet onset evaluation test standards.

| | Time at which sweetness starting | | | | |
|---|---|---|---|---|---|
| | <1 s | 1-3 s | 3-5 s | 5-7 s | >7 s |
| Score of sweet lingering | 5 | 4 | 3 | 2 | 1 |

(2-2) Sweet Peak

The sample to be evaluated is dissolved in neutral deionized water. The tester placed 20-30 mL of the evaluation solution in their mouth, and timing was started to record the sweetness onset time and max time. The test solution was then spit out. The time at which the sweetness onset to max was compared to the time in the table below to determine the value of sweet peak.

TABLE 2-3

Sweet peak evaluation test standards.

| | Time from sweetness onset to max | | | | |
|---|---|---|---|---|---|
| | >8 s | 6 s-8 s | 4-6 s | 2 s-4 s | <2 s |
| Score of sweet peak | 1 | 2 | 3 | 4 | 5 |

(2-3) Sweet Lingering

Each sample to be evaluated was dissolved in neutral deionized water. The tester placed 20-30 mL of the evaluation solution in his/her mouth, and the time was started to record the times to onset and maximum sweetness. The test solution was then spit out. Recording of the time continued until the sweetness disappeared completely. The time at which the sweetness completely disappeared was compared to the time in the table below to determine the sweet lingering score as shown in Table 2-4.

TABLE 2-4

Sweet lingering evaluation test standards.

| | Time at which sweetness completely disappears | | | | |
|---|---|---|---|---|---|
| | <20 s | 20-30 s | 30-40 s | 40-50 s | >50 s |
| Score of sweet lingering | 1 | 2 | 3 | 4 | 5 |

Evaluation of sweetness and overall likability of GRA100.

Preparation of Sample Solutions:

GRA100 (product of 1-6 from Ex. 1) was weighed and uniformly dissolved in 100 ml pure water as shown in Table 2-5. The test samples prepared were then subjected to sucrose equivalence (SugarE) and overall likability evaluation tests as shown in Table 2-6.

TABLE 2-5

GRA100 test sample preparation.

| No. | Concentration of GRA100 (ppm) | Weight of GRA100 (g) | Volume of Pure Water (mL) |
|---|---|---|---|
| 2-1 | 200 | 0.02 | 100 |
| 2-2 | 400 | 0.04 | 100 |
| 2-3 | 600 | 0.06 | 100 |

TABLE 2-5-continued

GRA100 test sample preparation.

| No. | Concentration of GRA100 (ppm) | Weight of GRA100 (g) | Volume of Pure Water (mL) |
|---|---|---|---|
| 2-4 | 800 | 0.08 | 100 |
| 2-5 | 1000 | 0.10 | 100 |

The sucrose equivalence (SugarE) and overall likability were evaluated, where an overall likability score of 3 or above is indicative of a palatable taste and an overall likability score below 3 is indicative of an unpalatable taste.

The sensory evaluation results are shown in Table 2-6.

TABLE 2-6

SugarE and overall likability evaluations of GRA100.

| No. | Concentration of GRA100 (ppm) | Sugar equivalence (SugarE) | Overall likability |
|---|---|---|---|
| 2-1 | 200 | 1.8 | 5 |
| 2-2 | 400 | 3 | 4 |
| 2-3 | 600 | 5.5 | 3 |
| 2-4 | 800 | 8 | 2.5 |
| 2-5 | 1000 | 8 | 2 |

Figure 2:
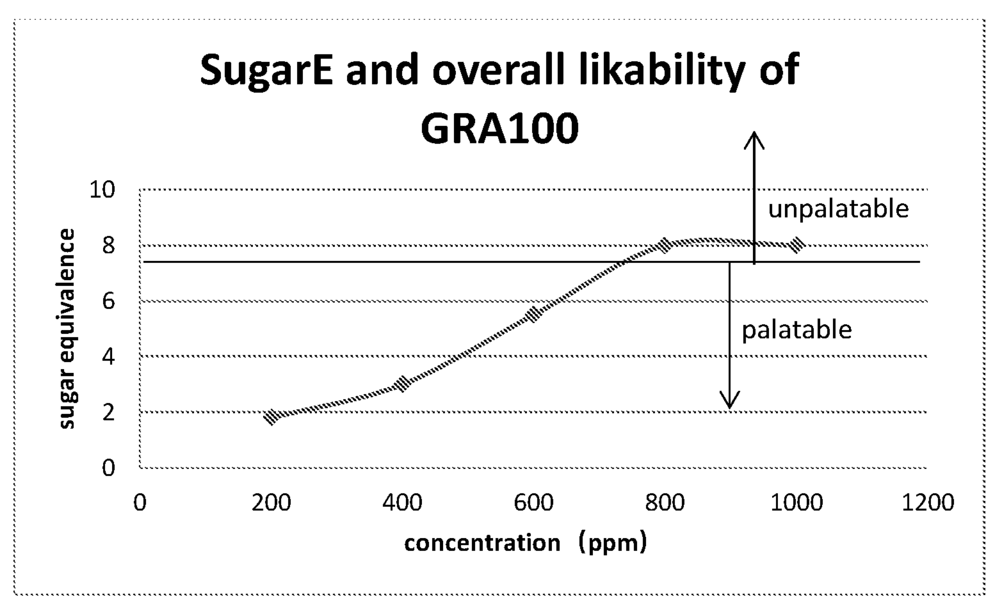
FIG. 2 shows the SugarE and overall likability of GRA100 at different concentrations.

Data analysis: The SugarE and overall likability of GRA100 at different concentrations is shown in FIG. 2.

Conclusion: the taste of GRA100 was palatable at the sweetness level of less than 5.5 SugarE without an unacceptable taste or sweet lingering. Thus, GRA100 can serve as an excellent sweetener and/or flavoring substance.

Example 3. Sensory Evaluation Comparison of GRA100 with RD, RM and Glycosylated *Stevia* Extract (G-SE)

Materials:

RD, available from Sichuan Ingia Biosynthetic Co., Ltd, China, the content of RD was 94.39%, Lot #: 20190215.

RM, available from Sichuan Ingia Biosynthetic Co., Ltd, China. The content of RM was 93.03% and Lot # was 20180915.

Glycosylated *stevia* extract (G-SE), available from Sweet Green Fields. Lot #: 3080191.

The preparation process was similar to Ex. 1, except RA100 was replaced with *Stevia* extract. All the samples were weighed, uniformly mixed and dissolved in 100 ml pure water as shown in Table 3-1 prior to being subjected to the sensory evaluation tests described below.

TABLE 3-1

Test sample composition preparation.

| No. | Weight of GRA100 (mg) | Weight of RM (mg) | Weight of RD (mg) | Weight of G-SE (mg) | Volume of pure water (mL) |
|---|---|---|---|---|---|
| 3-1 | 60 | | | | 100 |
| 3-2 | | 40 | | | 100 |
| 3-3 | | | 40 | | 100 |
| 3-4 | | | | 60 | 100 |

Experiment: Each sample was evaluated according to the sensory evaluation method. Average scores from the test panel for each sensory criterium were recorded as the evaluation test results. The resulting taste profiles of the mixtures are shown in Table 3-2.

TABLE 3-2

Sensory evaluation of sweetener compositions.

| No. | Overall likability | Sweet onset | Sweet peak | Sweet lingering | Metallic aftertaste |
|---|---|---|---|---|---|
| 600 ppm GRA100 | 4 | 4 | 3.5 | 1.5 | 1 |
| 400 ppm RM | 3.8 | 4 | 4 | 4 | 1.5 |
| 600 ppm RD | 3.5 | 4 | 4 | 4.5 | 2 |
| 600 ppm G-SE | 2.5 | 2 | 2 | 4.5 | 3 |

Conclusion: Compared with RD, RM and G-SE, the sweet onset of GRA100 is equivalent to RD and RM, but its sweet lingering is the best, with no metallic aftertaste. The results further showed that the GRA100 product exhibited the most overall likability. Thus, GRA100 can serve as an excellent sweetener and/or flavor.

Example 4. Preparation of Short Side Chain Glycosylated Rebaudioside a 100% (SGRA100) from GRA100

Raw material: GRA100: product 1-6 in Ex. 1. As used herein, the phrase "short side chain glycosylated rebaudioside A 100%" or "SGRA100" refers to a GRA100 composition further treated (e.g., with α-amylase) to reduce the level of glycosylation. Compared to the original GRA composition, the SGRA composition in this example contains a greater portion of GRA molecules with two or less α-1,4-glucosyl residues at the glycosylation sites.

Process:

(i) 10 g GRA100 (Product 1-6 in Ex. 1) was dissolved in 100 ml deionized water and adjust the pH to 5.9.

(ii) 0.5 ml α-amylase were added to the mixture of i) and incubated at 69° C. for 10 hours.

(iii) The reaction mixture was heated to 85° C. for 10 min to inactivate the α-amylase, which was then removed by filtration.

(iv) The resulting solution was then diluted to 1 L, passed through an 800 mL T-28 macroporous resin (Sunrise) column, and washed with 2 column volumes of water (1600 mL water). The column was then washed with 1600 mL ethanol, and the solution was collected and concentrated in a vacuum. The ethanol was later removed and the solution was spray-dried, resulting in a short chain glycosylated Rebaudioside A 100% (SGRA100; product 4-1) as a powder with steviol glycoside contents as shown in Table 4-1

TABLE 4-1 steviol glycoside contents (%) of SGRA100

| No. | RD | RA | STV | RF | RC | Dulc A | RU | RB | STB | TSG(9) |
|---|---|---|---|---|---|---|---|---|---|---|
| 4-1 | / | 16.83 | / | / | / | / | / | 0.17 | / | 17 |

Example 5. Evaluation of the Sweetness and Overall Likability of SGRA100

Preparation of Test Sample Solutions:

SGRA100 from Ex. 4 was weighed and uniformly mixed according to the weights shown in Table 5-1; dissolved in 100 ml pure water; and subjected to a sweetness and overall likability evaluation test.

TABLE 5-1

SGRA100 test sample preparation.

| No. | Concentration of SGRA100 (ppm) | Weight of SGRA100 (g) | Volume of Pure Water (mL) |
|---|---|---|---|
| 5-1 | 200 | 0.02 | 100 |
| 5-2 | 400 | 0.04 | 100 |
| 5-3 | 600 | 0.06 | 100 |
| 5-4 | 800 | 0.08 | 100 |
| 5-5 | 1000 | 0.10 | 100 |

The sucrose equivalence (SugarE) and overall likability of the above samples were evaluated, where an overall likability score of 3 or above is indicative of a palatable taste and an overall likability score below 3 is indicative of an unpalatable taste.

The sensory evaluation results are shown in Table 5-2.

TABLE 5-2

SE and overall likability evaluation of SGRA100.

| No. | Concentration of SGRA100 (ppm) | Sugar Equivalence | Overall likability |
|---|---|---|---|
| 5-1 | 200 | 3.8 | 5 |
| 5-2 | 400 | 5.5 | 5 |
| 5-3 | 600 | 6 | 4 |
| 5-4 | 800 | 7 | 3 |
| 5-5 | 1000 | 7.8 | 2.5 |

Figure 3:
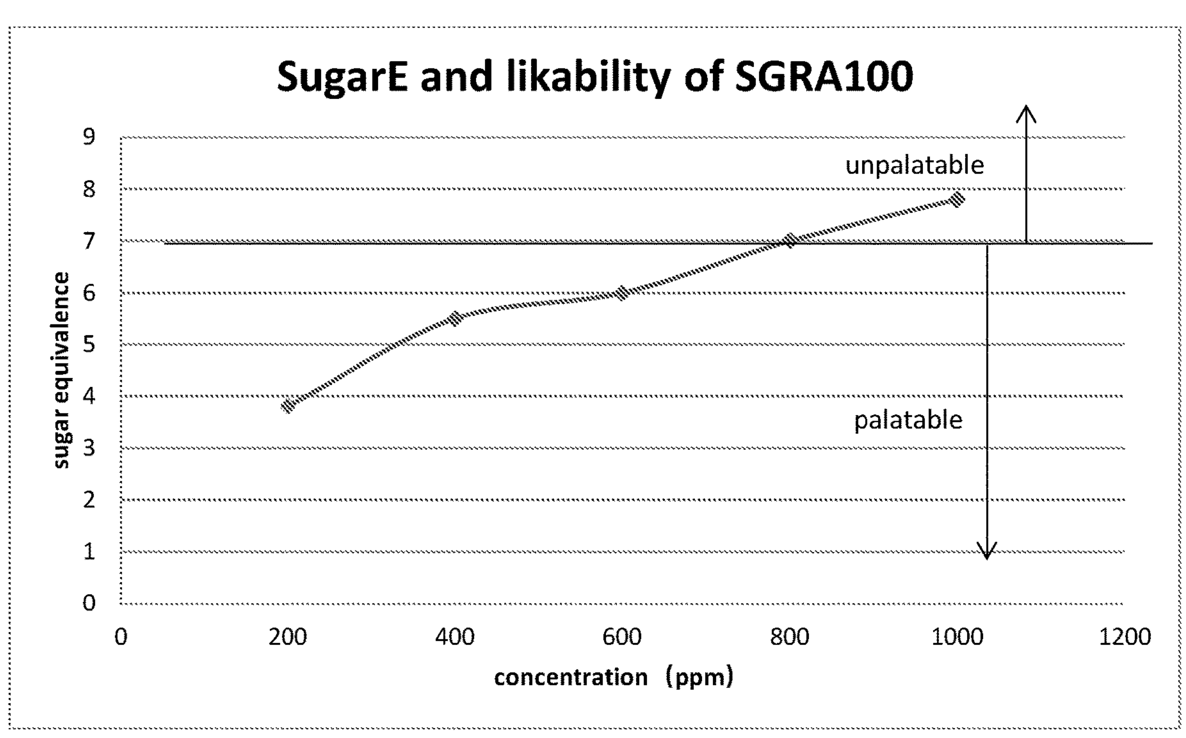
FIG. 3 shows the SugarE and overall likability of different concentrations of SGRA100.

Data analysis: The SugarE and overall likability of different concentrations of SGRA100 in this Example are shown in FIG. 3

Conclusion: the taste of SGRA100 was palatable at the sweetness level of less than 7 SugarE, with no unacceptable taste and sweet lingering. Compared to GRA100, SGRA100 shows the most overall likability and higher SugarE substitution level. SGRA100 could be used as sweetener and flavor in all applications mentioned this specification.

Example 6. Preparation of Long Side Chain Glycosylated Rebaudioside A 100% (LGRA100) from GRA100

Raw material: GRA100: product 1-6 in Ex. 1. As used herein, the phrase "LGRA100" refers to a GRA100 composition that is subjected to further treatment (e.g., with CGTase) to increase the level of glycosylation. Compared to the original GRA composition, the LGRA composition contains a greater portion of GRA molecules with more than two $\alpha$-1,4-glucosyl residues at the glycosylation sites.

Process:

(i) 10 g GRA100 (Product 1-6 in Ex. 1) and 10 g dextrin were dissolved in 100 ml deionized water and adjust the pH to 5.9.

(ii) 0.5 ml CGTase enzyme was added to the mixture of i) and incubated at 69° C. for 10 hours.

(iii) The reaction mixture was heated to 85° C. for 10 min to inactivate the CGTase enzyme, which was then removed by filtration.

(iv) The resulting solution was then dilute to 1 L, and passed through an 800 mL T-28 macroporous resin (Sunrise) column and washed with 2 column volumes of water (1600 mL water). The column was then washed with 1600 mL ethanol, and the solution was collected, concentrated in vacuum. The ethanol was later removed and the solution was spray-dried, resulting in a long chain glycosylated Rebaudioside A 100% (LGRA100) as a powder with steviol glycoside contents as shown in Table 6-1.

TABLE 6-1

Steviol glycoside contents (%) of LGRA100

| No. | RD isomer | RA | STV | RF | RC | Dulc A | RU | RB | STB | TSG (9) |
|---|---|---|---|---|---|---|---|---|---|---|
| 6-1 | 0.19 | 3.10 | / | / | 0.06 | / | / | 0.30 | / | 3.66 |

Example 7. Comparison of the GRA100 with SGRA100 and LGRA100

Materials: GRA100, product 1-6 in Ex. 1; SGRA100, product 4-1 in Ex. 4; and LGRA100, product 6-1 in Ex. 6.

All the samples were weighed and uniformly mixed according to the weight shown in Table 7-1, dissolved in 100 ml pure water, and subjected to a sensory evaluation.

TABLE 7-1

Sample composition preparation.

| No. | Weight of GRA100 (mg) | Weight of SGRA100 (mg) | Weight of LGRA100 (mg) | Volume of pure water (mL) |
|---|---|---|---|---|
| 7-1 | 60 | | | 100 |
| 7-2 | | 60 | | 100 |
| 7-3 | | | 60 | 100 |

Experiment: Each sample was evaluated according to the sensory evaluation method. Average scores from the test panel for each sensory criterion were recorded as the evaluation test results. The resulting taste profiles of the mixtures are shown in Table 7-2.

TABLE 7-2

Sensory evaluations

| No. | Overall likability | Sweet onset | Sweet peak | Sweet lingering | Metallic aftertaste |
|---|---|---|---|---|---|
| 600 ppm GRA100 | 3.5 | 4 | 3.5 | 2.5 | 1 |
| 600 ppm SGRA100 | 4.5 | 4.5 | 4.5 | 1.5 | 1 |
| 600 ppm LGRA100 | 2.5 | 2 | 2 | 4 | 2 |

Conclusion: Among GRA100, SGRA100 and LGRA100, the sweet onset and sweet peak of SGRA100 is the best, and sweet lingering is the shortest. The result showed that SGRA100 product shows the most overall likability. All of these products could be used as sweetener and flavor substances in application mentioned in this specification.

Example 8. Analysis of GRA100, SGRA100 and LGRA100

Analytical method: Determine the percentages of the individual steviol glycosides by HPLC (JECFA 2010) under the following conditions.

Reagents:

Acetonitrile: more than 95% transmittance at 210 nm.

Standards: Stevioside: more than 99.0% purity on the dried basis; Rebaudioside A: more than 99.0% purity on the dried basis.

Mixture of nine steviol glycosides standard solution: Containing stevioside, rebaudioside A. This solution is diluted with water-acetonitrile (7:3) accordingly and is used for the confirmation of retention times. Standards are available from Wako Pure Chemical Industries, Ltd. Japan and ChromaDex, USA.

Standard Solution

Accurately weigh 50 mg of stevioside and rebaudioside A standard into each of two 50-ml volumetric flasks. Dissolve and make up to volume with water-acetonitrile (7:3).

Sample Solution

Accurately weigh 50-100 mg of sample into a 50-ml volumetric flask. Dissolve and make up to volume with water-acetonitrile (7:3).

Procedure:

Inject 5 μl of sample solution under the following conditions.

Column: Capcell pak C18 MG II (Shiseido Co. Ltd)

Mobile phase: 32:68 mixture of acetonitrile and 10 mmol/L sodium phosphate buffer (pH 2.6)

Flow rate: 1.0 ml/min

Detector: UV at 210 nm

Column temperature: 400

Record the chromatogram for about 30 min

Identification of the Peaks and Calculations.

Identify the peaks from the sample solution by comparing the retention time with the peaks from the mixture of nine steviol glycosides standard solution (see under figure). Measure the peak areas for the nine steviol glycosides from the sample solution. Measure the peak area for stevioside and rebaudioside A from their standard solutions.

(1) Calculate the percentage of each of the eight steviol glycosides (except rebaudioside A) in the sample from the formula: % X=[WS/W]×[fXAX/AS]×100 and (2) Calculate the percentage of rebaudioside A in the sample from the formula:

$$\% \text{ rebaudioside } A=[WR/W]\times[AX/AR]\times 100, \text{ where}$$

X is each steviol glycoside;

WS is the amount (mg) calculated on the dried basis of stevioside in the standard solution;

WR is the amount (mg) calculated on the dried basis of rebaudioside A in the standard solution;

W is the amount (mg) calculated on the dried basis of sample in the sample solution;

AS is the peak area for stevioside from the standard solution;

AR is the peak area for rebaudioside from the standard solution;

AX is the peak area of X for the sample solution; and fX is the ratio of the formula weight of X to the formula weight of stevioside: 1.00 (stevioside), 1.20 (rebaudioside A), 1.00 (rebaudioside B), 1.18 (rebaudioside C), 1.40 (rebaudioside D), 1.16 (rebaudioside F), 0.98 (dulcoside A), 0.80 (rubusoside) and 0.80 (steviolbioside).

Figure 4:
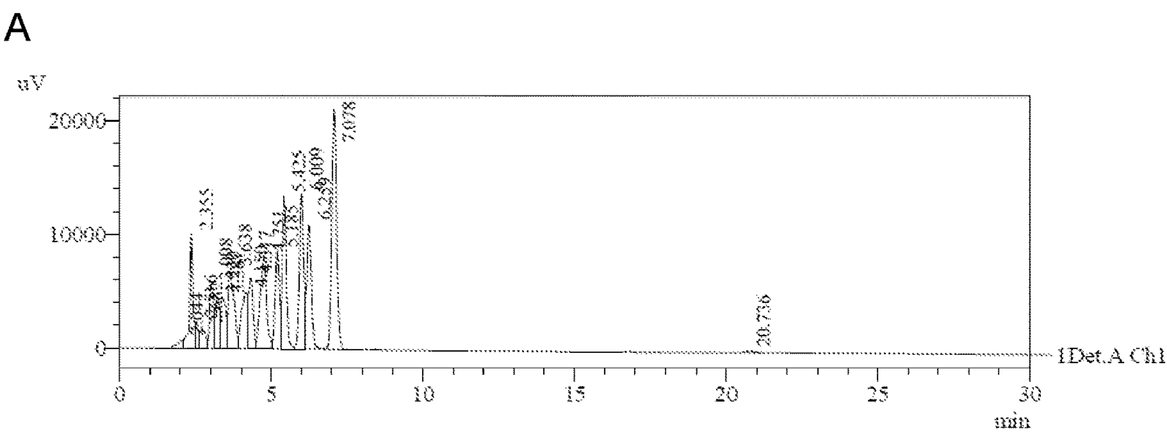
FIG. 4, Panel A shows HPLC spectrogram of GRA100. Panel B shows HPLC spectrogram of SGRA100. Panel C shows HPLC spectrogram of LGRA100.
Figure 4:
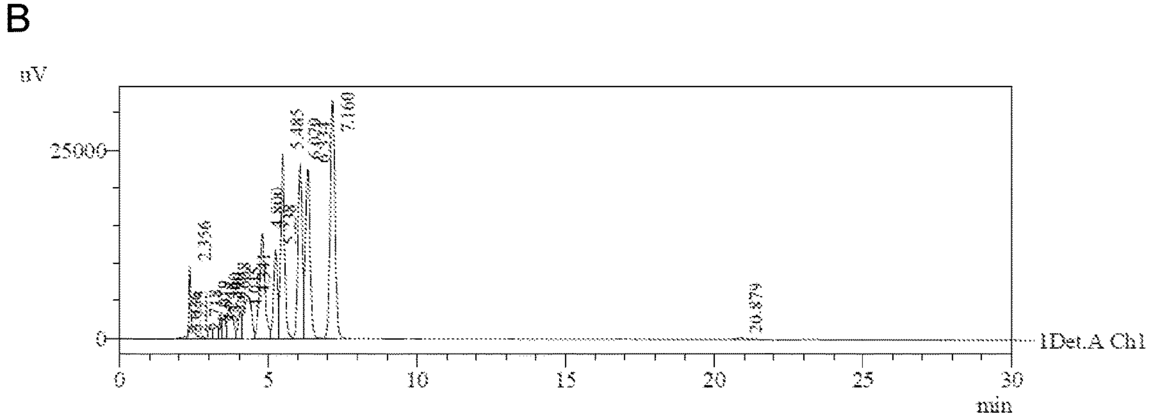
Figure 4:
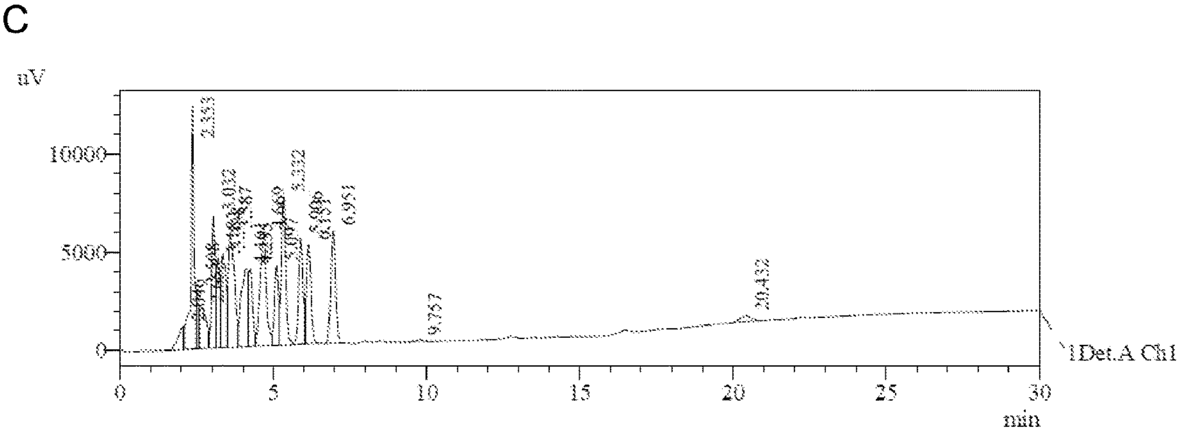

Calculate the percentage of total steviol glycosides (sum the nine percentages) (see FIG. 4, Panel A-C).

Analysis:

In C18 column, retention time of RD is around 3.27 min, retention time of RM is around 3.41 min, and retention time of RA is around 6.9 min. The peaks between retention time of RA to RD (includes RD) is defined as shorter chain (or lower molecular weight) glycosylated Reb A. and the peaks and retention time earlier than RD are glycosylated RA with longer chain higher molecular weight. Thus, the area percent between retention time of RA to RD (including RD) shown in Table 8-1 represents the ratio of lower molecular weight glycosylated RA in the whole GRA100, SGRA100 or LGRA100, respectively.

TABLE 8-1

Percent of low molecular GRA (area %)

| | Percent of lmw-GRA (%) |
|---|---|
| GRA100 | 83.87 |
| SGRA100 | 94.52 |
| LGRA100 | 68.39 |

Conclusion: Among GRA100, SGRA100 and LGRA100, SGRA100 has the highest amount of lmw-GRA (about 94.52% in this example), and LGRA has the lowest amount of lmw-GRA (about 68.39% in this example).

Example 9. Preparation of Flavored Glycosylated Rebaudioside a 97% (GRA97-MRP-GF) from GRA97, Glutamic Acid and Fructose Maillard reaction products from GRA97 were prepared according to the following method.

Material: GRA97 (product 1-1 in Ex. 1).

Process: GRA97, sugar donor, amino acids, water were weighed as table 9-1. All the ingredients were mixed and fully dissolved in the water. The solution was then heated at about 95 or 100° C. for 1.5 hours. When the reaction was completed, the solution was filtered through filter paper and the filtrate was dried with a spray dryer, resulting in products 9-1 to 9-3 as white powders.

TABLE 9-1

Preparation of GRA97-MRP-GF.

| No. | Weight of GRA97 (g) | Weight of Glutamic acid (g) | Weight of Fructose (g) | Volume of pure water (mL) | Temp. (° C.) |
|---|---|---|---|---|---|
| 9-1 | 18 | 1 | 1 | 10 | 100 |
| 9-2 | 18 | 1 | 11 | 15 | 95 |
| 9-3 | 18 | 1 | 1 | 10 | 95 |

Example 10. Preparation of Flavored Glycosylated Rebaudioside a 97% (GRA97-MRP-AA) from GRA97, Alanine and Arabinose Maillard reaction products from GRA97 were prepared according to the following method.

Material: GRA97 (product 1-1 in Ex. 1).

Process: GRA97, sugar donor, amino acids, water were weighed as Table 10-1. All the ingredients were mixed and fully dissolved in the water. The solution was then heated at about 100° C. for 2 hours. When the reaction was completed, the solution was filtered through filter paper and the filtrate was dried with a spray dryer, resulting in products 1 to 2 as white powders.

TABLE 10-1

| GRA97-MRP-AA preparation. | | | | |
|---|---|---|---|---|
| No. | Weight of GRA97 (g) | Weight of Alanine (g) | Weight of Arabinose (g) | Volume of pure water (mL) |
| 10-1 | 8 | 0.89 | 1.5 | 60 |
| 10-2 | 8 | 0.50 | 1.5 | 5 |

Each sample was evaluated the average score of the panel was taken as the evaluation result data. The taste profiles of the prepared samples are shown in Ex. 11.

Example 11a GRA97-MRP-AA Improves the Taste Profile of GRA97 and Natural Sweetener Mixtures Materials:

1. Raw material of homemade natural sweetener drinks: Erythritol (available from Zhucheng Dongxiao Biotechnology Co., Ltd); RA75/RB15 (available from Sweet Green Fields Co. Ltd.; Lot #3080380); and RA80/RB10/RD6 (available from Sweet Green Fields Co. Ltd.; Lot #3080452); GSG-MRP-CA (available from EPC Natural Products Co. Ltd; Lot #20200101).
2. GRA97-MRP-AA (products 10-1 and 10-2 in Ex. 10).

TABLE 11a-1

| Recipes of homemade natural sweetener drinks | | | | | | |
|---|---|---|---|---|---|---|
| | Weight of GSG-MRP-CA (g) | Weight of Erythritol (g) | Weight of RA75/RB15 (g) | Weight of RA80/RB10/RD6 (g) | Citric Acid (g) | Volume of deionized water (mL) |
| homemade natural sweetener drinks | 0.15 | 38 | 0.1 | 0.1 | 0.5 | 1000 |

Process: Dissolve powders of GRA97-MRP-AA (products 10-1 and 10-2 in Ex. 10). into homemade natural sweetener drinks. Weights are shown in Tables 11a-2.

TABLE 11a-2

| Test sample compositions. | | | |
|---|---|---|---|
| Component | Weight of GRA97-MRP-AA (mg) | Volume of homemade natural sweetener drinks (mL) | Concentration of GRA97-MRP-A (ppm) |
| base | — | 100 | — |
| 10-1 | 3 | 100 | 30 |
| 10-2 | 3 | 100 | 30 |

Each sample was evaluated according to the sensory evaluation method. Average scores from the test panel for each sensory criterium were recorded as the evaluation test results. The resulting taste profiles of the mixtures are shown in Table 11a-3.

TABLE 11a-3

| Sensory evaluation results of sweeteners | | | | |
|---|---|---|---|---|
| No. | Overall likability | Bitterness | Mouth feel | Sweet lingering |
| Base | 3 | 3 | 2 | 3 |
| 10-1 | 4.5 | 1.5 | 3.5 | 1 |
| 10-2 | 4.8 | 1 | 4.5 | 0.5 |

Conclusion: GRA97-MRP-AA (10-1, 10-2 in Ex. 10) can reduce sweet lingering, improve mouth feel and enhance overall likability of homemade natural sweetener drinks. Such effects can be extended to all natural sweeteners, including *stevia* glycosides, glycosylated *stevia* glycosides, sweet tea extract and monk fruit extract.

Example 11b. GRA97-MRP-AA Improves the Taste Profile of GRA97

Materials:

GRA97: product 1-1 in Ex. 1

GRA97-MRP-AA: products 10-1 and 10-2 in Ex. 10

Process: Dissolve powders of GRA97-MRP-AA (products 10-1 and 10-2 in Ex. 10) into 600 ppm GRA97. Weights are shown in Tables 11b-1.

TABLE 11b-1

| Test sample compositions. | | | | | |
|---|---|---|---|---|---|
| Component | Weight of GRA97-MRP-AA (mg) | Weight of GRA97 (mg) | Volume of water (mL) | Concentration of GRA97 (ppm) | Concentration of GRA97-MRP-A (ppm) |
| base | — | 60 | 100 | 600 | |
| 10-1 | 3 | 60 | 100 | 600 | 30 |
| 10-2 | 3 | 60 | 100 | 600 | 30 |

Each sample was evaluated according to the sensory evaluation method. Average scores from the test panel for each sensory criterium were recorded as the evaluation test results. The resulting taste profiles of the mixtures are shown in Table 11b-2.

TABLE 11b-2

| Sensory evaluation results of sweeteners | | | | |
|---|---|---|---|---|
| No. | Overall likability | Flavor | Mouth feel | Sweet lingering |
| Base | 2.5 | 2 | 2 | 3 |
| 10-1 | 3.5 | 3.5 | 3.5 | 1.5 |
| 10-2 | 4.5 | 4.5 | 4.5 | 1 |

Conclusion: GRA97-MRP-AA (10-1, 10-2 in Ex. 10) can reduce sweet lingering, improve mouth feel, flavor and enhance overall likability of GRA97. Such effects can be extended to all natural sweeteners, including *stevia* glycosides, glycosylated *stevia* glycosides, sweet tea extract and monk fruit extract.

Example 12. Preparation of Flavored Glycosylated Rebaudioside a 97% (GRA97-MRP-APX) from GRA97, Alanine, Phenylalanine and Xylose Materials: GRA97: Product No. 1-1 in Ex. 1.

Process: 8 g GRA97, 0.4 g alanine, 0.1 g phenylalanine and 1.5 g xylose were mixed. The ratio of Alanine to Phenylalanine was 4:1 and the ratio of GRA97 to the mixture of alanine, phenylalanine and xylose was 8:2. The obtained mixture was then dissolved in 60 g pure water without pH adjustment. The resulting solution was then heated at about 100° C. for 2 hour. When the reaction was completed, the solution was filtered through filter paper and the filtrate was dried with a spray dryer. The resulting composition contained 6.8 g GRA97-MRP-APX as brown powder.

TABLE 12-1

Preparation of GRA97-MRP-APX.

| No. | Weight of GRA97 (g) | Weight of Alanine (g) | Weight of Phenyl-alanine (g) | Weight of Xylose (g) | Volume of pure water (mL) | Time (h) |
|---|---|---|---|---|---|---|
| 12-1 | 8 | 0.4 | 0.1 | 1.5 | 60 | 2 |

Example 13. Preparation of Flavored Glycosylated Rebaudioside a 97% (GRA97-MRP-APAH) from GRA97, Alanine, Phenylalanine, Arabinose, and High Malt Syrup Materials: GRA97: product 1-1 in Ex. 1.

Process: 7.7 g GRA97, 0.16 g alanine, 0.08 g phenylalanine, 0.86 g high malt syrup (available from Shanghai Haocheng Co. Ltd. Lot #20210604) and 0.24 g arabinose were mixed. The ratio of alanine to phenylalanine was 2:1 and the ratio of GRA97 to the mixture of alanine, phenylalanine and arabinose was 7:1. The obtained mixture was then dissolved in 60 g pure water without pH adjustment. The resulting solution was then heated at about 100° C. for 1.5 hours. When the reaction was completed, the solution was filtered through filter paper and the filtrate was dried with a spray dryer. The resulting composition contained 7.2 g GRA97-MRP-APAH as brown powder.

TABLE 13-1

Preparation of GRA97-MRP-APAH.

| No. | Weight of GRA97 (g) | Weight of Alanine (g) | Weight of Phenyl-alanine (g) | Weight of Arabi-nose (g) | High Malt syrup (g) | Volume of pure water (mL) | Time (h) |
|---|---|---|---|---|---|---|---|
| 13-1 | 7.7 | 0.16 | 0.08 | 1.5 | 0.86 | 60 | 1.5 |

Example 14. Preparation of Flavored Glycosylated Rebaudioside a 97% (GRA97-MRP-GA) from GRA97, Glutamic Acid and Arabinose Materials: GRA97: product 1-1 in Ex. 1.

Process: 9 g GRA97, 0.25 g glutamic acid and 0.75 g arabinose were mixed. The ratio of arabinose to glutamic acid was 3:1 and the ratio of GRA97 to the mixture of glutamic acid and arabinose was 9:1. The obtained mixture was then dissolved in 5 g pure water without pH adjustment. The resulting solution was then heated at about 100° C. for 2 hours. When the reaction was completed, the solution was filtered through filter paper and the filtrate was dried with a spray dryer. The resulting composition contained 8.1 g GRA97-MRP-GA as white powder.

TABLE 14-1

Preparation of GRA97-MRP-GA.

| No. | Weight of GRA97 (g) | Weight of Glutamic acid (g) | Weight of Arabinose (g) | Volume of pure water (mL) | Time (h) |
|---|---|---|---|---|---|
| 14-1 | 9 | 0.25 | 0.75 | 5 | 2 |

Example 15. Preparation of Flavored Glycosylated Rebaudioside a 97% (GRA97-MRP-APX) from GRA97, Alanine, Phenylalanine and Xylose Materials: GRA97: product 1-2 in Ex. 1.

Process: 8 g GRA97, 0.4 g alanine, 0.1 g phenylalanine and 1.5 g xylose were mixed. The ratio of alanine to phenylalanine was 4:1 and the ratio of GRA97 to the mixture of alanine, phenylalanine and xylose was 8:2. The obtained mixture was then dissolved in 5 g pure water without pH adjustment. The resulting solution was then heated at about 100° C. for 1.5 hour. When the reaction was completed, the solution was filtered through filter paper and the filtrate was dried with a spray dryer. The resulting composition contained 6.7 g GRA97-MRP-APX as brown powder.

TABLE 15-1

Preparation of GRA97-MRP-APX.

| No. | Weight of GRA97 (g) | Weight of Alanine (g) | Weight of Phenyl-alanine (g) | Weight of Xylose (g) | Volume of pure water (mL) | Time (h) |
|---|---|---|---|---|---|---|
| 15-1 | 8 | 0.4 | 0.1 | 1.5 | 5 | 1.5 |

Example 16. Preparation of Flavored Glycosylated Rebaudioside A 97% (GRA97-MRP-APA) from GRA97, Alanine, Phenylalanine and Arabinose Materials: GRA97: product 1-2 in Ex. 1.

Process: 8 g GRA97, 0.178 g alanine, 0.0825 g phenylalanine and 1.125 g arabinose were mixed. The ratio of GRA97 to Arabinose was 7:1, the ratio of alanine to phenylalanine was 2:1. The obtained mixture was then dissolved in 5 g pure water without pH adjustment. The resulting solution was then heated at about 100° C. for 1.5 hours. When the reaction was completed, the solution was filtered through filter paper and the filtrate was dried with a spray dryer. The resulting composition contained 7.1 g GRA97-MRP-APA as brown powder.

TABLE 16-1

Sample composition preparation.

| No. | Weight of GRA97 (g) | Weight of Alanine (g) | Weight of Phenyl-alanine (g) | Weight of Arabinose (g) | Volume of pure water (mL) | Time (h) |
|---|---|---|---|---|---|---|
| 16-1 | 8 | 0.178 | 0.0825 | 1.125 | 5 | 1.5 |

Example 17a. GRA97-MRP-APA (Product 16-1 in Ex. 16) Improves the Taste Profiles of GRA97 (1-2 in Ex. 1)

Materials:

GRA97-MRP-APA (Product 16-1 in Ex. 16);

GRA97 (Product 1-2 in Ex. 1);

Process: Dissolve powders of GRA97-MRP-APA (Product 16-1 in Ex. 16) into 600 ppm GRA97. Weights are shown in Tables 17a-1.

TABLE 17a-1

Test sample compositions.

| Component | Weight of GRA97-MRP-APA (mg) | Weight of GRA97 (mg) | Volume of water (mL) | Concentration of GRA97 (ppm) | Concentration of GRA97-MRP-A (ppm) |
|---|---|---|---|---|---|
| base | — | 60 | 100 | 600 | — |
| 16-1 | 3 | 60 | 100 | 600 | 30 |

Experiment: Each sample was evaluated according to the sensory evaluation method. Average scores from the test panel for each sensory criterium were recorded as the evaluation test results. The resulting taste profiles of the mixtures are shown in Table 17a-2.

TABLE 17a-2

Sensory evaluation results of sweeteners

| No. | Overall likability | Sweet onset | Sweet peak | Sweet lingering |
|---|---|---|---|---|
| Base | 2 | 2 | 2 | 3 |
| 16-1 | 3.5 | 3.5 | 3.5 | 1.5 |

Conclusion: GRA97-MRP-APA (Product 16-1 in Ex. 16) can improve sweet onset, sweet peak and mouth coating, reduce sweet lingering and enhance overall likability relative to GRA97. Such effects can be extended to all natural sweeteners.

Example 17b. GRA97-MRP-APA (Product 16-1 in Ex. 16) Improves the Taste Profiles of RA75/RB15

Materials:

GRA97-MRP-APA, product 16-1 in Ex. 16;

RA75/RB15, available from Sweet Green Fields Co. Ltd.; Lot #3080380.

Process: Dissolve powders of GRA97-MRP-APA (Product 16-1 in Ex. 16) into 200 ppm RA75/RB15. Weights are shown in Tables 17b-1.

TABLE 17b-1

Test sample compositions.

| Component | Weight of GRA97-MRP-APA (mg) | Weight of RA75/RB15 (mg) | Volume of water (mL) | Concentration of RA75/RB15 (ppm) | Concentration of GRA97-MRP-A (ppm) |
|---|---|---|---|---|---|
| base | — | 20 | 100 | 200 | — |
| 16-1 | 3 | 20 | 100 | 200 | 30 |

Experiment: Each sample was evaluated according to the sensory evaluation method. Average scores from the test panel for each sensory criterium were recorded as the evaluation test results. The resulting taste profiles of the mixtures are shown in Table 1b7-2.

TABLE 17b-2

Sensory evaluation results of sweeteners

| No. | Overall likability | Sweet onset | Mouth feel | Sweet lingering |
|---|---|---|---|---|
| Base | 2 | 2 | 2 | 3 |
| 16-1 | 3.5 | 3.0 | 3.5 | 1.0 |

Conclusion: GRA97-MRP-APA (16-1 in Ex. 16) can improve sweet onset, sweet peak and mouth feel, reduce sweet lingering and enhance overall likability of RA75/RB15. Such effects can be extended to all natural sweeteners.

Example 18. Preparation of Flavored Glycosylated Rebaudioside A 100% (GRA100-MRP-AXA) from GRA100, Alanine, Xylose, and Arabinose Materials: GRA100: Product 1-6 in Ex. 1.

Process: GRA100, sugar donor, amino acids, and water were weighed as shown in Table 18-1. All the ingredients were mixed and fully dissolved in the water. The solution was then heated at about 90-95° C. for 2 hours. When the reaction was completed, the solution was filtered through filter paper and the filtrate was dried with a spray dryer, resulting in Products 18-1, 18-2 and 18-3 as white powders.

TABLE 18-1

Preparation of GRA100-MRP-AXA.

| No. | Weight of GRA100 (g) | Weight of Alanine (g) | Weight of Xylose (g) | Weight of Arabinose (g) | Volume of pure water (mL) | Dextrin (g) |
|---|---|---|---|---|---|---|
| 18-1 | 14 | 1.5 | 4.5 | — | 120 | 40 |
| 18-2 | 14 | 1.5 | 4.0 | 0.5 | 120 | 40 |
| 18-3 | 8 | 0.5 | 1.5 | — | 60 | 20 |

Example 19. GRA100-MRP-AXA Improves the Taste Profile of GRA100 Compared to GSG-MRP-CA Materials: GRA100: Product 1-6 in Ex. 1; GRA100-MRP-AXA: Product 18-1 in Ex. 18; GSG-MRP-CA (available from EPC Natural Products Co., Ltd, Lot #20200101; preparation procedure:14 g GSG (glycosylated steviol glycosides, available from EPC Natural Products Co., Ltd, Lot #20201202) was dissolved together with 1.5 g alanine and 4.5 g xylose in 120 ml deionized water. The mixture was stirred and heated to about 95-100 degrees centigrade for about 2 hours. When the reaction was complete, the solution was spray dried to provide about 95 g of an off white powder).

GRA100, GRA100-MRP-AXA, and GSG-MRP-CA were weighed, uniformly mixed and dissolved in 100 ml pure water as indicated in Table 19-1. The test samples were then subjected to sensory evaluations.

TABLE 19-1

Preparation of test samples for sensory evaluations.

| Component | Weight of GRA100 (mg) | Weight of GSG-MRP-CA (mg) | Weight of GRA100-MRP-AXA (mg) | Citric Acid (mg) | Volume of pure water (mL) |
|---|---|---|---|---|---|
| Base | 60 | | | 75 | 100 |
| GSG-MRP-CA | 60 | 10 | | 75 | 100 |
| 18-1 | 60 | | 10 | 75 | 100 |

Experiment: Each sample was evaluated according to the sensory evaluation methods in Ex. 2. Average scores from the test panel for each sensory criterium were recorded as the evaluation test results. The resulting taste profiles of the mixtures are shown in Table 19-2.

TABLE 19-2

Sensory evaluation results in 600 ppm GRA100.

| Sweetener | Sensory | GSG-MRP-CA | GRA100-MRP-AXA (18-1) | Evaluation |
|---|---|---|---|---|
| 600 ppm GRA100 | Sweet onset | 2 | 3.5 | GRA100-MRP-AXA (18-1 in Ex. 18) can improve sweet onset and mouth coating, reduce sweet lingering and enhance overall likability of 600 ppm GRA100 |
| | Mouth coating | 2 | 3.5 | |
| | Sweet lingering | 3 | 1.5 | |
| | Overall likability | 2 | 3.5 | |

Conclusion: GRA100-MRP-AXA (18-1 in Ex. 18) can improve sweet onset, mouth coating, reduce sweet lingering and enhance overall likability of GRA100. These effects can be extended to all natural sweeteners.

Example 20. Preparation of Flavored Glycosylated Rebaudioside A 100% (GRA100-MRP-HA from GRA100, Alanine, Maltose/High Malt Syrup and Arabinose Materials: GRA100: Product 1-6 in Ex. 1.

Process: GRA100, sugar donors, amino acids, and water were weighed as Table 20-1. All the ingredients were mixed and fully dissolved in the water. The solution was then heated at about 90-95° C. for 2 hours. When the reaction was completed, the solution was filtered through filter paper and the filtrate was dried with a spray dryer, resulting in products 20-1, 20-2 and 20-3 as white powders.

TABLE 20-1

Preparation of GRA100-MRP-HA.

| No. | Weight of GRA100 (g) | Weight of Alanine (g) | Weight of Maltose (g) | High Malt Syrup (g) | Weight of Arabinose (g) | Dextrin (g) | Volume of pure water (mL) |
|---|---|---|---|---|---|---|---|
| 20-1 | 7.7 | 0.1588 | 0.9412 | — | 0.2378 | 18 | 5 |
| 20-2 | 8 | 0.16 | — | 1 | 0.5 | 20 | 20 |
| 20-3 | 8 | 0.20 | | 1.3 | 0.6 | 20 | 20 |

Example 21. Sensory Evaluation Comparison of GRA100-MRP-HA (Products 20-1, 20-2 and 20-3 from Ex. 20) with GRA100 (Products 1-6 from Ex. 1)

Materials:

GRA100-MRP-HA: products 20-1, 20-2 and 20-3 from Ex. 20

GRA100: products 1-6 from Ex. 1

Progress: GRA100-MRP-HA Products 20-1, 20-2 and 20-3 from Ex. 20 and GRA100 (products 1-6 from Ex. 1) were weighed and dissolved in 100 ml pure water as indicated in Table 21-1, and then subjected to a sensory evaluation tests according to Ex. 2.

TABLE 21-1

Test sample compositions.

| Sample No. | Product No. 1-6 (mg) | Product No. 20-1 (mg) | Product No. 20-2 (mg) | Product No. 20-3 (mg) | Volume of pure water (mL) |
|---|---|---|---|---|---|
| 21-1 | 60 | | | | 100 |
| 21-2 | | 60 | | | 100 |
| 21-3 | | | 60 | | 100 |
| 21-4 | | | | 60 | 100 |

Experiment: Each sample was evaluated and average scores from the test panel for each sensory criterium were recorded as the evaluation test results. The products were evaluated in terms of mouth feel, bitterness, bitterness lingering, sweet lingering, metallic aftertaste and overall likability according to the methods in Ex. 2.

The resulting taste profiles of the mixtures are shown in Table 21-2.

TABLE 21-2

Sensory evaluation comparison of GRA100-MRP-HA (products 20-1, 20-2 and 20-3 from Ex. 20) with GRA100 (products 1-6 from Ex. 1).

| Product | Overall likability | Sweet onset | Sweet peak | Sweet lingering | Metallic aftertaste |
|---|---|---|---|---|---|
| 21-1 | 2 | 1 | 1 | 3.5 | 2.5 |
| 21-2 | 2.5 | 2 | 2 | 3 | 2 |
| 21-3 | 3 | 4 | 3.5 | 1.5 | 1 |
| 21-4 | 4.5 | 4.5 | 4.5 | 1 | 1 |

Conclusion: From the results, it can be concluded that high malt syrup is a key factor in the Maillard reaction for taste enhancement. The sweet onset and sweet peak is sharply reduced with maltose instead of high malt syrup in the Maillard reaction. Thus, high malt syrup can significantly improve sweet onset and peak of GRA100 when included in the Maillard reaction. Moreover, GRA100-MRP-HA (20-1 to 20-3 in Ex. 20) can improve sweet onset and peak, reduce sweet lingering, and enhance overall likability relative to GRA100, regardless of whether maltose or high malt syrup is used in the MRP reaction. Such effects can be extended to all natural sweeteners.

Example 22. Sucrose Fatty Acid Ester Improves the Taste Profile of GRA100

Materials: Sucrose fatty acid ester (Trilogy Flavors Shanghai Ltd., Lot #20210615); GRA100: product 1-6 in Ex. 1.

Process: Sucrose fatty acid ester and GRA100 (product 1-6 in Ex. 1) were weighed, uniformly mixed, and dissolved in 100 ml pure water as indicated in Table 22-1, and then subjected to sensory evaluation tests described in Ex. 2 (as indicated).

TABLE 22-1

Test sample preparation.

| Test sample | Weight of GRA100 (mg) | Weight of sucrose fatty acid ester (mg) | Volume of water (mL) | Concentration of GRA100 (ppm) | Concentration of sucrose fatty acid ester (ppm) |
|---|---|---|---|---|---|
| GRA100 | 60 | / | 100 | 600 | / |
| 22-1 | 60 | 1 | 100 | 600 | 10 |
| 22-2 | 60 | 60 | 100 | 600 | 600 |

Experiment: Each sample was evaluated according to the sensory evaluation method described in Ex. 2. Average scores from the test panel for each sensory criterium were recorded as the evaluation test results. The resulting taste profiles from the aforementioned test samples is shown in Table 22-2.

TABLE 22-2

Sensory evaluation results of sucrose fatty acid ester in GRA100.

| Sample | Overall likability | Sweet onset | Sweet peak | Sweet lingering |
|---|---|---|---|---|
| GRA100 | 3.5 | 3 | 3 | 2.5 |
| 22-1 | 4 | 3.5 | 3.5 | 2 |
| 22-2 | 4.5 | 4.5 | 4 | 1 |

Conclusion: The taste profiles show that sucrose fatty acid ester can significantly reduce sweet lingering, and enhance sweet onset and sweet peak of GRA100, resulting in a better overall likability. These improvements may result from surfactin-mediated changes to GRA100 by the sucrose fatty acid ester. Such improvements can be extended to improve the taste of other natural glycosides, including *stevia* glycosides and glycosylated *stevia* glycosides.

Example 23. GRA100-MRP-HA Improves the Taste Profile of Sparkling Water Consisting of Natural Sweeteners Materials: GRA100-MRP-HA (product 20-3 in Ex. 20); RA100 (RA content, 100.03%; available from Sweet Green Fields Co. Ltd., Lot #CT001-140604); Erythritol (available from Zhucheng Dongxiao Biotechnology Co., Ltd.); RA75/RB15 (available from Sweet Green Fields Co. Ltd., Lot #3080380); RA80/RB10/RD6 (available from Sweet Green Fields Co. Ltd., Lot #3080452).

Process: a natural sweetener sparkling water were prepared by using above materials, which is selected as a base. And then a certain amount of GRA100-MRP-HA (20-3 in Ex. 20) powder was added to the base to evaluate its effects. The details are in Table 23-1.

TABLE 23-1

Test sample preparation for sensory evaluations.

| Product | Weight of GRA100-MRP-HA (g) | Weight of Citric Acid (g) | Weight of Erythritol (g) | Weight of RA100 (g) | Weight of RA75/RB15 (g) | Weight of RA80/RB10/RD6 (g) | Volume of deionized water (mL) |
|---|---|---|---|---|---|---|---|
| Base | — | 0.15 | 6 | 0.06 | 0.03 | 0.03 | 300 |
| 20-3 | 0.030 | 0.15 | 6 | 0.06 | 0.03 | 0.03 | 300 |

Each sample was evaluated and average scores from the test panel for each sensory criterium were recorded as the evaluation test results in Table 23-2.

TABLE 23-2

Sensory evaluation results.

| No. | Overall likability | Sweet onset | Sweet peak | Bitterness lingering |
|---|---|---|---|---|
| Sparkling water | 2 | 2 | 1.5 | 4 |
| 20-3 | 3.5 | 3.5 | 3 | 2 |

Conclusion: GRA100-MRP-HA (20-3 in Ex. 20) can improve sweet onset and sweet peak, reduce bitterness lingering, and enhance overall likability of sparkling water. Such effect can be extended to all natural sweeteners.

Example 24. Preparation of Flavored Glycosylated Rebaudioside A 97% (LGRA100-MRP-GA) from GRA100, Glutamic Acid and Arabinose Maillard reaction products from GRA100 were prepared according to the following method.

Material: LGRA100 (The product of Ex. 6).

Process: LGRA100, sugar donor, amino acids, and water were weighed as Table 24-1. All the ingredients were mixed and fully dissolved in the water. The solution was then heated at about 100° C. for 2 hours. When the reaction was completed, the solution was filtered through filter paper and the filtrate was dried with a spray dryer, resulting in product 24-1 as a white powder.

TABLE 24-1

Preparation of LGRA100-MRP-GA.

| Product No. | Weight of LGRA100 (g) | Weight of Glutamic acid (g) | Weight of Arabinose (g) | Volume of pure water (mL) | Time (h) |
|---|---|---|---|---|---|
| 24-1 | 8 | 0.5 | 1.5 | 5 | 2 |

Example 25. LGRA100-MRP-GA Improves the Taste Profile of a Sparkling Water Containing Natural Sweeteners Materials: LGRA100-MRP-GA (product 24-1 in Ex. 24); Erythritol (available from Zhucheng Dongxiao Biotechnology Co., Ltd.); RA75/RB15 (available from Sweet Green Fields Co. Ltd., Lot #3080380); and RA80/RB10/RD6 (available from Sweet Green Fields Co. Ltd. Lot #3080452).

Process: carbonated water (base) with added natural sweetener was prepared from the above materials. LGRA100-MRP-GA powder (24-1 in Ex. 24) was added to the carbonated water base as indicated in Table 25-1 and then subjected to sensory evaluation tests in Ex. 2 as indicated below.

TABLE 25-1

Test sample preparation.

| | Weight of LGRA-100-MRP-GA (g) | Weight of Citric Acid (g) | Weight of Erythritol (g) | Weight of RA75/RB15 (g) | Weight of RA80/RB10/RD6 (g) | Volume of carbonated water (mL) |
|---|---|---|---|---|---|---|
| Base | — | 0.15 | 6 | 0.030 | 0.030 | 300 |
| 24-1 | 0.030 | 0.15 | 6 | 0.030 | 0.030 | 300 |

Each sample was evaluated and average scores from the test panel for each sensory criterium were recorded as the evaluation test results in Table 25-2.

TABLE 25-2

Sensory evaluation of test samples.

| Test sample | Overall likability | Sweet onset | Sweet peak | Sweet lingering |
|---|---|---|---|---|
| Base | 2 | 2 | 1.5 | 4 |
| 24-1 | 3.5 | 2.5 | 2 | 1 |

Conclusion: LGRA100-MRP-GA (24-1 in Ex. 24) can improve sweet onset and sweet peak, significantly reduce bitterness lingering, and enhance the overall likability of sparkling water. These effects can be extended to all natural sweeteners.

Example 26. GRA100, SGRA100 and LGRA100 Improved the Taste Profile of Natural Sweeteners RM Materials:

GRA100, the product of 1-6 from example 1.

SGRA100, the product of 4-1 from example 4.

LGRA100, the product of 6-1 from example 6.

RM, available from Sichuan Ingia Biosynthetic Co., ltd, China. The content of RM was 93.03%. Lot #20180915.

All the samples were weighed and uniformly mixed according to the weight shown in Table 26-1, dissolved in 100 ml pure water, and subjected to a sensory evaluation.

TABLE 26-1

Test sample composition

| No. | Weight of GRA100 (mg) | Weight of SGRA100 (mg) | Weight of LGRA100 (mg) | Weight of RM (mg) | Volume of pure water (mL) |
|---|---|---|---|---|---|
| Base | | | | 40 | 100 |
| 26-1 | 5 | | | 40 | 100 |
| 26-2 | | 5 | | 40 | 100 |
| 26-3 | | | 5 | 40 | 100 |

Experiment: Each sample was evaluated according to the sensory evaluation method. Average scores from the test panel for each sensory criterium were recorded as the evaluation test results. The resulting taste profiles of the mixtures are shown in Table 26-2.

TABLE 26-2 sensory evaluation

| No. | Overall likability | Sweet onset | Sweet peak | Sweet lingering | Metallic aftertaste |
|---|---|---|---|---|---|
| Base | 3 | 3 | 3 | 4 | 2 |
| 26-1 | 3.8 | 3.5 | 3.5 | 2.5 | 1 |
| 26-2 | 4.2 | 4 | 4.5 | 1.5 | 1 |
| 26-3 | 3.5 | 3.5 | 3.5 | 3 | 1.5 |

Conclusion: GRA100, SGRA100 and LGRA100 all can improve sweet onset and sweet peak, cut sweet lingering and enhance overall likeability of natural sweeteners RM. Such effect can be extended to all natural sweeteners. Among them, SGRA100 improve sweet onset and cut sweet lingering significantly than the others. It is worth mentioning that GRA100, SGRA100 and LGRA100 all make the sweet lingering on tongue while RM itself in all the mouth and throat.

Example 27. GRA100, SGRA100 and LGRA100 Improved the Taste Profile of Natural Sweeteners RD Materials:

GRA100, the product of 1-6 from example 1

SGRA100, the product of 4-1 from example 4

LGRA100, the product of 6-1 from example 6

RD, available from Sichuan Ingia Biosynthetic Co., Ltd, China, the content of RD was 94.39%, Lot #: 20190215

All the samples were weighed and uniformly mixed according to the weight shown in Table 27-1, dissolved in 100 ml pure water, and subjected to a sensory evaluation.

TABLE 27-1

Test sample compositions.

| No. | Weight of GRA100 (mg) | Weight of SGRA100 (mg) | Weight of LGRA100 (mg) | Weight of RD (mg) | Volume of pure water (mL) |
|---|---|---|---|---|---|
| Base | | | | 40 | 100 |
| 27-1 | 5 | | | 40 | 100 |
| 27-2 | | 5 | | 40 | 100 |
| 27-3 | | | 5 | 40 | 100 |

Experiment: Each sample was evaluated according to the sensory evaluation method. Average scores from the test panel for each sensory criterium were recorded as the evaluation test results. The resulting taste profiles of the mixtures are shown in Table 27-2.

TABLE 27-2 sensory evaluation

| No. | Overall likability | Sweet onset | Sweet peak | Sweet lingering | Metallic aftertaste |
|---|---|---|---|---|---|
| Base | 3 | 2.5 | 3.5 | 3.5 | 2 |
| 27-1 | 3.8 | 3.5 | 4 | 2 | 1 |
| 27-2 | 4.5 | 4 | 4.5 | 1.5 | 1 |
| 27-3 | 3.5 | 3 | 3.5 | 2.5 | 1.5 |

Conclusion: GRA100, SGRA100 and LGRA100 all can improve sweet onset and sweet peak, cut sweet lingering and enhance overall likeability of natural sweeteners RD. Such effect can be extended to all natural sweeteners. Among them, SGRA100 improve sweet onset and cut sweet lingering significantly than the others. It is worth mentioning that GRA100, SGRA100 and LGRA100 all make the sweet lingering on tongue while RD itself in all the mouth and throat. Such effect can be extended to all natural sweeteners.

Example 28. GRA100, SGRA100 and LGRA100 Improved the Taste Profile of Natural Sweeteners RA75/RB15

Materials:

GRA100, the product of 1-6 from example 1

SGRA100, the product of 4-1 from example 4

LGRA100, the product of 6-1 from example 6

RA75/RB15 (available from Sweet Green Fields Co. Ltd. Lot #3080380),

All the samples were weighed and uniformly mixed according to the weight shown in Table 28-1, dissolved in 100 ml pure water, and subjected to a sensory evaluation.

TABLE 28-1

Test sample composition

| No. | Weight of GRA100 (mg) | Weight of SGRA100 (mg) | Weight of LGRA10 (mg) | Weight of RA75/RB15 (mg) | Volume of pure water (mL) |
|---|---|---|---|---|---|
| Base | | | | 20 | 100 |
| 28-1 | 5 | | | 20 | 100 |
| 28-2 | | 5 | | 20 | 100 |
| 28-3 | | | 5 | 20 | 100 |

Experiment: Each sample was evaluated according to the sensory evaluation method. Average scores from the test panel for each sensory criterium were recorded as the evaluation test results. The resulting taste profiles of the mixtures are shown in Table 28-2.

TABLE 28-2

Sensory evaluations.

| No. | Overall likability | Sweet onset | Sweet peak | Sweet lingering | Metallic aftertaste |
|---|---|---|---|---|---|
| Base | 2 | 2 | 3.5 | 3.5 | 4 |
| 28-1 | 4 | 3.5 | 4 | 1.5 | 1 |
| 28-2 | 3.5 | 4 | 4.5 | 2 | 2 |
| 28-3 | 3 | 3 | 3.5 | 2.2 | 2 |

Conclusion: GRA100, SGRA100 and LGRA100 all can improve sweet onset and sweet peak, cut sweet lingering and enhance overall likeability of natural sweeteners RA75/RB15. Such effect can be extended to all natural sweeteners. Among them, GRA100 remove metallic aftertaste and cut sweet lingering more significantly than the others, while SGRA100 improve sweet onset and sweet peak more significantly than the others.

Example 29. Sensory Evaluation Comparison of the GRA100/RA100 with RM

Materials:

GRA100, the product of 1-6 from example 1.

RA100, available from Sweet Green Fields. The content is show in table 29-1 (JECFA 2010). Lot #CT001-140604.

TABLE 29-1

Contents of RA100.

| Product Lot# | RD | RA | STV | RF | RC | Dulc A | RU | RB | STB | TSG(9) |
|---|---|---|---|---|---|---|---|---|---|---|
| CT001-140604 | / | 100.03 | / | / | / | / | / | 0.34 | / | 100.37 |

RM, available from Sichuan Ingia Biosynthetic Co., ltd, China. The content of RM was 93.03%.Lot #20180915.

All the samples were weighed and uniformly mixed according to the weight shown in Table 29-2, dissolved in 100 ml pure water, and subjected to a sensory evaluation.

TABLE 29-2

| Test sample compositions. | | | | |
|---|---|---|---|---|
| No. | Weight of GRA100 (mg) | Weight of RA100 (mg) | Weight of RM (mg) | Volume of pure water(mL) |
| 29-1 | 30 | 15 | | 100 |
| 29-2 | | | 30 | 100 |

Experiment: Each sample was evaluated according to the sensory evaluation method. Average scores from the test panel for each sensory criterium were recorded as the evaluation test results. The resulting taste profiles of the mixtures are shown in Table 29-3.

TABLE 29-3

| sensory evaluation | | | | | |
|---|---|---|---|---|---|
| No. | Overall likability | Sweet onset | Sweet peak | Sweet lingering | Metallic aftertaste |
| 29-1 | 4 | 3.5 | 4 | 2 | 1 |
| 29-2 | 3.5 | 3 | 2 | 3 | 2 |

Conclusion: The sensory of GRA100/RA100 is parallel and even better than RM. The GRA100/RA100 mixture presents a faster sweet onset, higher sweet peak, and shorter sweet lingering than RM. Such effect can be extended to all natural sweeteners mixed with GRA100.

Example 30. Structure Comparison of RD/RM Isomers in GRA100 (Product 1-6 in Ex. 1), SGRA100 (Product 4-1 in Ex. 4), LGRA100 (Product 6-1 in Ex. 6) and *Stevia* Extract by Using UPLC-Q-TOF-MS/MS Method Materials RD: available from Sichuan Ingia Biosynthetic Co., Ltd, China (Lot #20190215). The steviol glycoside concentrations in 20190215 are shown in Table 30-1.

TABLE 30-1

| | Concentration (%) | | | | | | | | | | |
|---|---|---|---|---|---|---|---|---|---|---|---|
| Lot# | RD | RM | RA | STV | RF | RC | DA | RU | RB | STB | TSG(9) |
| 20190215 | 94.49 | / | 0.35 | / | / | / | / | / | / | / | 94.84 |

RM: available from EPC Natural Products Co. Ltd. (Lot #EPC-324-43-1). The steviol glycoside concentrations in EPC-324-43-1 are shown in Table 30-2.

TABLE 30-2

| | Concentration (%) | | | | | | | | | | |
|---|---|---|---|---|---|---|---|---|---|---|---|
| Lot# | RD | RM | RA | STV | RF | RC | DA | RU | RB | STB | TSG(9) |
| EPC-324-43-1 | / | 91.52 | / | / | / | / | / | / | 0.16 | / | 91.68 |

GRA100: the product 1-6 in Ex. 1.

SGRA100, the product 4-1 in Ex. 4

LGRA100, the product 6-1 in Ex. 6

*Stevia* extract: available from EPC Natural Products Co. Ltd., Lot #EPC-327-8-1, the steviol glycoside concentrations of which are shown in Table 30-3

TABLE 30-3

| | Concentration (%) | | | | | | | | | | |
|---|---|---|---|---|---|---|---|---|---|---|---|
| Lot# | RD | RM | RA | STV | RF | RC | DA | RU | RB | SB | TSG(9) |
| EPC-327-8-1 | 8.06 | / | 23.67 | 21.62 | 1.74 | 10.73 | 0.95 | 0.75 | / | / | / |

HPLC grade acetonitrile,

Formic acid

Method:

The HPLC system consisted of an Agilent 1290 system (autosampler, ternary gradient pump, column thermostat, VWD-UV/VIS detector, DAD-UV/VIS detector) connected in-line to an Agilent time of flight mass spectrometer (Agilent LCQTOF 6546)

UPLC-TOF-MS/MS Conditions

UPLC Conditions

Mobile Phase

Phase A: water-formic acid (100:0.1); phase B: acetonitrile-formic acid (100:0.1)

Following gradient: 0·5 min, 5% B, 5~30 min, 5%~95% B; Flow 0.4 ml/min

Oven: 40° C., injection volume 5 uL

QTOF conditions: TOF-MS survey scan (m/z 100~1700); TOF-MS/MS scans (m/z 20~1000); Acquisition frequency 4 spectra/s; Sheath gas (nitrogen) flow 10 L/min, 400° C.; drying gas (nitrogen) flow 8 L/min, 350° C.; atomization pressure 60 psig; spray voltage 1 kV; capillary voltage 3.5 kV.

Results:

Ex. 30, Part 1: RA-1Glu

Figure 5:
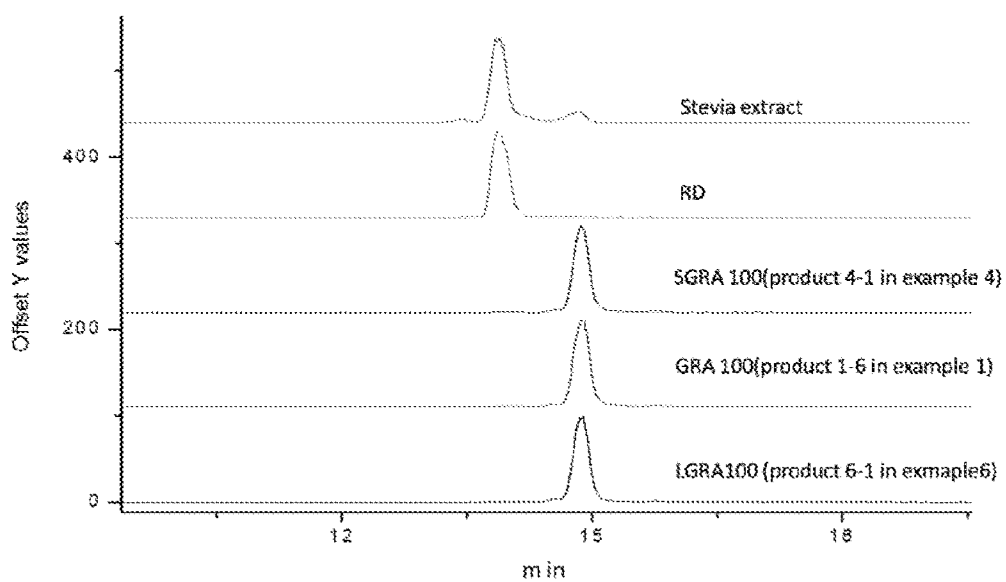
FIG. 5, Panel A shows the ESI EIC (1127.47) MS spectra from the RD, GRA100 (product 1-6 in Ex. 1), LGRA100 (product 6-1 in Ex. 6), SGRA100 (product 4-1 in Ex. 4)
Figure 5:
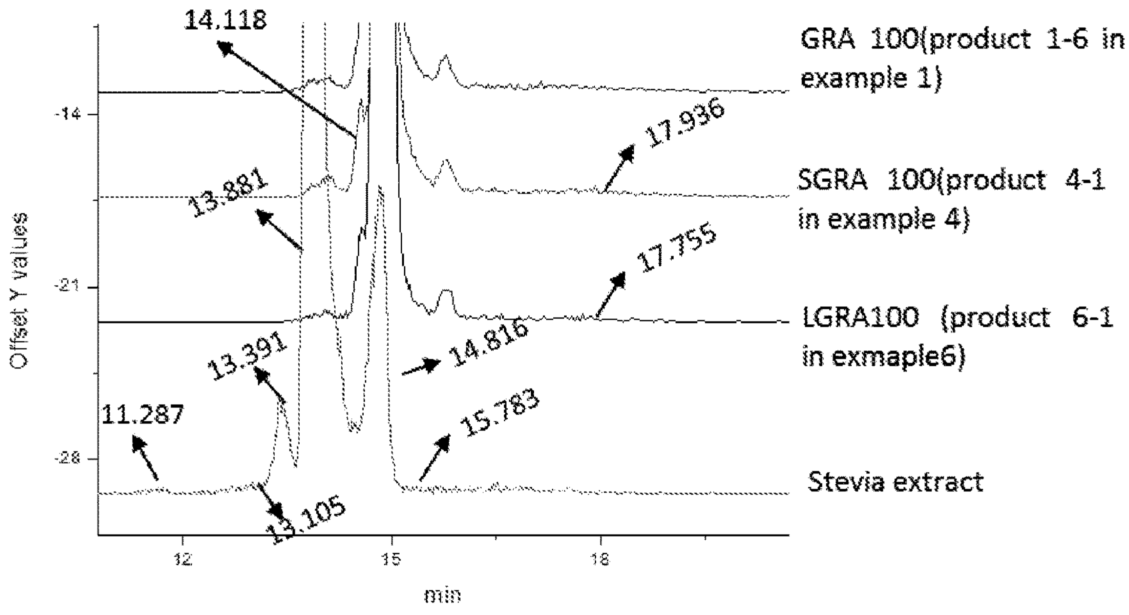
Figure 5:
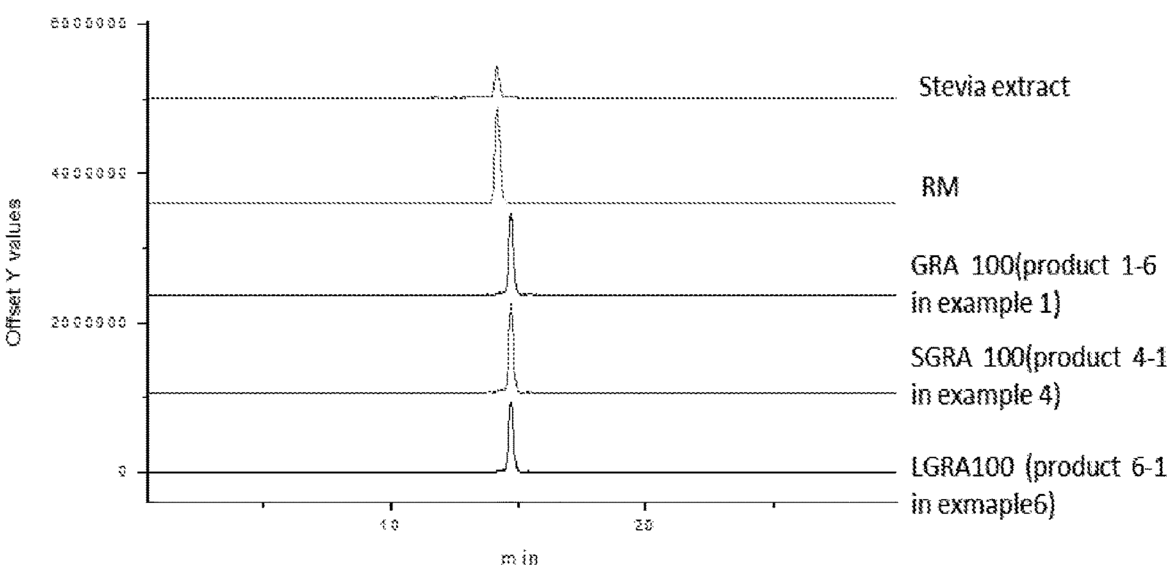
Figure 5:
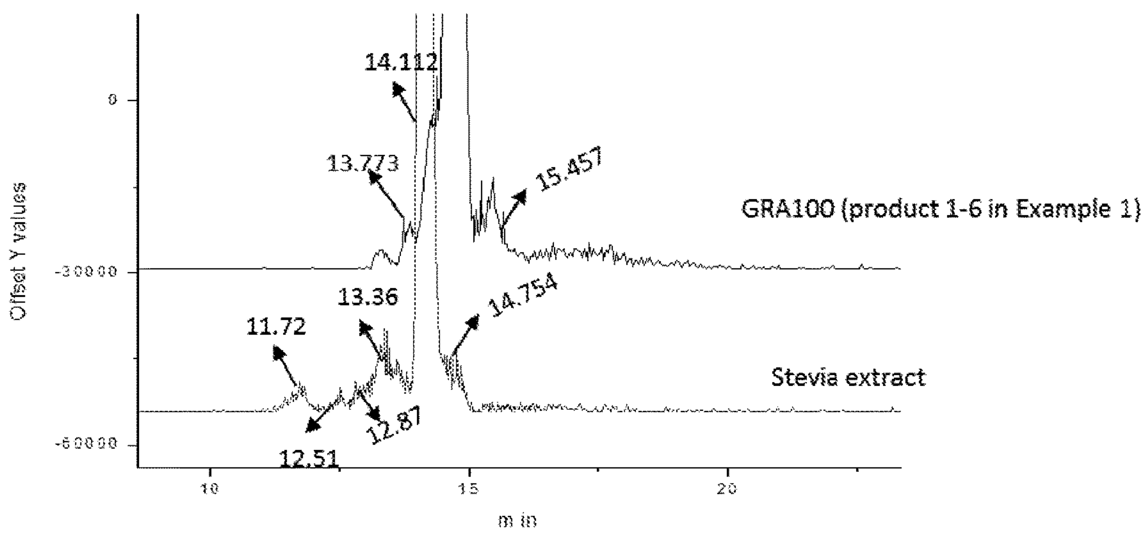

FIG. 5, Panel A shows the ESI EIC (1127.47) MS spectra from the RD, GRA100 (product 1-6 in Ex. 1), LGRA100 (product 6-1 in Ex. 6), SGRA100 (product 4-1 in Ex. 4) and *Stevia* extract samples.

FIG. 5, Panel B shows the ESI EIC (1127.47) MS amplification spectra from the RD, GRA100 (product 1-6 in Ex. 1), LGRA100 (product 6-1 in Ex. 6), SGRA100 (product 4-1 in Ex. 4) and *Stevia* extract samples.

The ESI EIC (1127.47) MS spectra in FIG. 5, Panel A and Panel B show RD isomers. Peaks with the same retention times that appear in the RD, GRA100 (product 1-6 in Ex. 1), LGRA100 (product 6-1 in Ex. 6), and SGRA100 (product 4-1 in Ex. 4) samples indicate that their structures are similar or even the same. RD0n (n=1-8) define different RD isomers. The RD isomers in each sample are shown in Table 30-4.

TABLE 30-4

RD isomers in samples.

| Sample | Time (min) | Stevia extract | GRA100 (product 1-4 in Ex. 4) | L-GRA100 (product 6-1 in Ex. 6) | S-GRA100 (product 4-1 in Ex. 4) |
|---|---|---|---|---|---|
| RD01 | 11.287 | ✓ | | | |
| RD02 | 13.105 | ✓ | | | |
| RD03 | 13.391 | ✓ | | | |
| RD04 | 13.881 | ✓ | ✓ | ✓ | ✓ |
| RD05 | 14.118 | | ✓ | ✓ | ✓ |
| RD06 | 14.816 | ✓ | ✓ | ✓ | ✓ |
| RD07 | 15.783 | ✓ | ✓ | ✓ | ✓ |
| RD08 | 17.755 | | | ✓ | ✓ |

Ex. 30, Part 2: RA-2Glu

FIG. 5, Panel C shows the ESI EIC (1289.53) MS spectra at 1289.53 from the *Stevia* extract, RM, GRA100 (product 1-6 in Ex. 1), LGRA100 (product 6-1 in Ex. 6), and SGRA100 (product 4-1 in Ex. 4) samples.

FIG. 5, Panel D shows the ESI EIC (1289.53) MS amplification spectra from the *Stevia* extract and GRA100 (product 1-6 in Ex. 1) samples.

The ESI EIC (1289.53) MS spectra in FIG. 5. Panel A and Panel B show RM isomers. Peaks with the same retention time that appear in the RM, GRA100 (product 1-6 in Ex. 1), LGRA100 (product 6-1 in Ex. 6), and SGRA100 (product 4-1 in Example 4) samples indicate that their structures are similar or even the same. RM0n (n=1-8) defines different RM isomers. The RM isomers in each sample are shown in Table 30-5.

TABLE 30-5

RM isomers in samples.

| Sample | Time (min) | Stevia extract | GRA100 (product 1-6 in Ex. 1) | LGRA100 (product 6-1 in Ex. 6) | S-GRA100 (product 4-1 in Ex. 4 ), |
|---|---|---|---|---|---|
| RM01 | 11.72 | ✓ | | | |
| RM02 | 12.51 | ✓ | | | |
| RM03 | 12.87 | ✓ | | | |
| RM04 | 13.36 | ✓ | ✓ | ✓ | ✓ |
| RM05 | 13.773 | | ✓ | ✓ | ✓ |
| RM06 | 14.112 | ✓ | ✓ | ✓ | ✓ |
| RM07 | 14.754 | ✓ | ✓ | ✓ | ✓ |
| RM08 | 15.457 | | ✓ | ✓ | ✓ |

Conclusion: The ESI EIC (1127.47) MS spectra in FIG. 5. Panel A and Panel B and the retention times in Table 30-4, specifically the peaks corresponding to retention times of 13.881 min, 14.816 min, and 15.783 min in the GRA100, LGRA100, and SGRA100 samples are also present in the *Stevia* extract. Moreover, The ESI EIC (1289.53) MS spectra in FIG. 5. Panel C and Panel D and the retention times in Table 30-5, specifically the peaks corresponding to retention times of 13.36 min, 14.112 min, 14.754 in the GRA100, LGRA100, and SGRA100 samples are also present in the *Stevia* extract. These results show that the RD and RM isomers in GRA100, LGRA100 and SGRA100 are present in the *Stevia* extract, suggesting that the generated steviol glycosides in glycosylated RA100 are also present in natural *Stevia* extracts.

Example 31. Content Analysis of RA-1Glu/RA-2Glu/RA-3Glu/RA-4Glu Isomers in GRA100 (Product 1-6 in Ex. 1), SGRA100 (Product 4-1 in Ex. 4) and LGRA100 (Product 6-1 in Ex. 6) by UPLC-Q-TOF-MS/MS All the quantification below was performed by peak area of the RD as external standard and by peak area of the RA as internal standard with molar mass correction where applicable.

Ex. 31, Part 1. RA-1Glu

Contents of RA-1Glu in the GRA100 (product 1-6 in Ex. 1), LGRA100 (product 6-1 in Ex. 6), and SGRA100 (product 4-1 in Example 4) were calculated as shown in Tables 31-1a and 31-1b. RA-1Glu is an RD isomer. RD0n (n=1-8) defines different RA-1Glu isomers. Table 31-1a shows their RD isomer (from RD04-08) content and Table 31-1b shows each RD isomer area percentage to the whole RA-1Glu weight.

TABLE 31-1a

Contents of RD0n* (n* = 4, 5, 6, 7, 8) detected in GRA100 (product 1-6 in Ex. 1), LGRA100 (product 6-1in Ex. 6), and SGRA100 (product 4-1 in Ex. 4) samples.

| | | Content (g/100 g) (Dry basis) | | |
|---|---|---|---|---|
| Sample | Time (min) | GRA100 (product 1-6 in Ex. 1) | LGRA100 (product 6-1in Ex. 6) | SGRA100 (product 4-1in Ex. 4), |
| RD04 | 13.881 | 1.31 | 0.72 | 1.87 |
| RD05 | 14.118 | 2.27 | 2.61 | 4.10 |
| RD06 | 14.816 | 22.38 | 16.19 | 25.47 |
| RD07 | 15.783 | 1.89 | 2.08 | 2.99 |
| RD08 | 17.755 | — | 0.15 | 1.22 |
| SUM | | 27.85 | 21.75 | 35.65 |

TABLE 31-1b

Area percentages of RD0n* in the RA-1Glu (n* = 4, 5, 6, 7, 8)

| | | Area percentage (%) | | |
|---|---|---|---|---|
| Sample | Time (min) | GRA100 (product 1-6 in Ex. 1) | LGRA100 (product 6-1 in Ex. 6) | S-GRA100 (product 4-1 in Ex. 4) |
| RD04 | 13.881 | 0.84 | 0.62 | 1.03 |
| RD05 | 14.118 | 1.45 | 2.27 | 2.25 |
| RD06 | 14.816 | 96.51 | 95.16 | 94.42 |
| RD07 | 15.783 | 1.21 | 1.81 | 1.64 |
| RD08 | 17.755 | — | 0.13 | 0.67 |

Conclusion: The contents of RD0n* (n*=4, 5, 6, 7, 8) detected in the GRA100, LGRA100, and SGRA100 samples show that RD isomers in GRA100, SGRA100 and LGRA100 encompass weight percentages of 20-40% relative to the whole RA-1Glu weight. The weight percentage of RD isomer is different among each sample (SGRA100>GRA100>LGRA100), considering the different treatments to which GRA100 was subjected in Examples 4 and 6. Moreover, the area percentages of RD0n* in the RA-1Glu (n*=4, 5, 6, 7, 8) show that RD06 encompasses the majority of the whole RD isomer (~95%), although there are 5 different RD isomers in GRA100, SGRA100 and LGRA100.

Ex. 31, Part 2: RA-2Glu

Contents of RA-2Glu in the GRA100 (product 1-6 in Ex. 1), LGRA100 (product 6-1 in Ex. 6), and SGRA100 (product 4-1 in Example 4) were calculated as shown in Tables 31-2a and 31-2b. RA-2Glu is an RM isomer. RM0n (n=1-8) define different RA-2Glu isomers. Table 31-2a shows RM isomer (from RM04-08) contents in the samples and Table 31-2b shows each RM isomer area percentage to the whole RA-2Glu weight.

TABLE 31-2a

Contents of RM0n* (n* = 4, 5, 6, 7, 8) detected in GRA100 (product 1-6 in Ex. 1), LGRA100 (product 6-1in Ex. 6), and SGRA100 (product 4-1 in Ex. 4) samples.

| | | Content (g/100 g) (dry basis) | | |
|---|---|---|---|---|
| Sample | Time (min) | GRA100 (product 1-6 in Ex. 1) | LGRA100 (product 6-1 in Ex. 6) | SGRA100 (product 4-1 in Ex. 4) |
| RM04 | 13.360 | 0.40 | 0.15 | 0.41 |
| RM05 | 13.773 | 0.72 | 0.55 | 0.94 |
| RM06 | 14.112 | 2.32 | 2.25 | 3.09 |
| RM07 | 14.754 | 19.93 | 16.43 | 22.42 |
| RM08 | 15.457 | 1.97 | 1.33 | 1.54 |
| SUM | | 25.33 | 20.72 | 28.40 |

TABLE 31-2b

Area percentages of RM0n* (n* = 4, 5, 6, 7, 8) in the RA-2Glu.

| | | Area percentage (%) | | |
|---|---|---|---|---|
| Sample | Time (min) | GRA100 (product 1-6 in Ex. 1) | LGRA100 (product 6-1 in Ex. 6) | SGRA100 (product 4-1 in Ex. 4) |
| RM04 | 13.36 | 0.42 | 0.20 | 0.39 |
| RM05 | 13.773 | 0.76 | 0.71 | 0.88 |
| RM06 | 14.112 | 2.45 | 2.89 | 2.91 |
| RM07 | 14.754 | 94.29 | 94.49 | 94.39 |
| RM08 | 15.457 | 2.08 | 1.71 | 1.44 |

Conclusion: The contents of RM0n* (n*=4, 5, 6, 7, 8) detected in samples GRA100, LGRA100, and SGRA100 show that RM isomers in GRA100, SGRA100 and LGRA100 are present in weight percentages of 20-30% relative to the whole RA-2Glu weight. The weight percentages of RM isomer in each sample (SGRA100>GRA100>LGRA100) are different, considering the different treatments to which GRA100 was subjected in Examples 4 and 6. Moreover, the area percentages of RD0n* in the RA-2Glu (n*=4, 5, 6, 7, 8) show that RM06 encompasses the majority of the whole RM isomer (~95%), although there are 5 different RM isomers in GRA100, SGRA100 and LGRA100.

Ex. 31, Part 3: RA-3Glu

FIG. 6, Panel A shows ESI EIC (1451.58) MS spectra at 1451.58 from the GRA100 (product 1-6 in Ex. 1), LGRA100 (product 6-1 in Ex. 6), and SGRA100 (product 4-1 in Ex. 4) samples.

FIG. 6, Panel B shows ESI EIC (1451.58) MS amplification spectra from the GRA100 (product 1-6 in Ex. 1), LGRA100 (product 6-1 in Ex. 6), and SGRA100 (product 4-1 in Ex. 4) samples.

From FIG. 6, Panel A and Panel B contents of RA-3Glu in GRA100 (product 1-6 in Ex. 1), LGRA100 (product 6-1 in Ex. 6), and SGRA100 (product 4-1 in Ex. 4) were calculated. RO0n (n=1~5) define different RA-3Glu isomers. Table 31-3a shows RA-3Glu isomer (from RO01-05) contents in the samples and Table 31-3b shows each RA-3Glu isomer area percentage to the whole RA-3Glu weight.

TABLE 31-3a

Contents of RO0n* (n* = 1, 2, 3, 4, 5) detected in GRA100 (product 1-6 in Ex. 1), LGRA100 (product 6-1in Ex. 6), and SGRA100 (product 4-1 in Ex. 4) samples.

| | | Content (g/100 g) (Dry basis) | | |
|---|---|---|---|---|
| Sample | Time (min) | GRA100 (product 1-6 in Ex. 1) | LGRA100 (product 6-1 in Ex. 6) | S-GRA100 (product 4-1 in Ex. 4 ), |
| RO01 | 13.144 | 0.08 | 0.03 | 0.08 |
| RO02 | 13.863 | 0.20 | 0.22 | 0.37 |
| RO03 | 14.118 | 0.10 | 0.12 | 0.20 |
| RO04 | 14.5 | 13.28 | 10.92 | 12.67 |
| RO05 | 15.173 | 0.27 | 0.17 | 0.09 |
| SUM | | 13.93 | 11.45 | 13.41 |

TABLE 31-3b

Area percentages of RO0n* (n* = 1, 2, 3, 4, 5) in the RA-3Glu

| | | Area percentage (%) | | |
|---|---|---|---|---|
| Sample | Time (min) | GRA100 (product 1-6 in Ex. 1) | LGRA100 (product 6-1 in Ex. 6) | S-GRA100 (product 4-1 in Ex. 4 ), |
| RO01 | 13.144 | 0.57 | 0.28 | 0.63 |
| RO02 | 13.863 | 1.41 | 1.89 | 2.76 |
| RO03 | 14.118 | 0.73 | 1.03 | 1.46 |
| RO04 | 14.5 | 95.33 | 95.33 | 94.47 |
| RO05 | | 1.96 | 1.47 | 0.69 |

Conclusion: The contents of RO0n* (n*=1, 2, 3, 4, 5) detected in the GRA100, LGRA100, and SGRA100 samples show that RA-3Glu isomers are present in the GRA100, SGRA100 and LGRA100 samples in weight percentages of 10-15% relative to the whole RA-3Glu weight. The weight percentages of RA-3Glu isomer in each SGRA100, GRA100 and LGRA100 samples are similar. Moreover, the area percentages of RO0n* in the RA-3Glu (n*=1, 2, 3, 4, 5) show that RO04 encompasses the majority of the RA-3Glu isomers (~95%), although there are 5 different RO isomers in GRA100, SGRA100 and LGRA100.

Ex. 31, Part 4: RA-4Glu

FIG. 6, Panel C shows the ESI EIC (1613.64) MS spectra at 1613.64 from the RA100 (product 1-6 in Ex. 1), LGRA100 (product 6-1 in Ex. 6), SGRA100 (product 4-1 in Ex. 4) samples.

FIG. 6, Panel D shows the ESI EIC (1613.64) MS amplification spectra from the GRA100 (product 1-6 in Ex. 1), LGRA100 (product 6-1 in Ex. 6), and SGRA100 (product 4-1 in Ex. 4) samples.

From FIG. 6, Panel C and Panel D, contents of RA-4Glu in GRA100 (product 1-6 in Ex. 1), LGRA100 (product 6-1 in Ex. 6), and SGRA100 (product 4-1 in Ex. 4) were calculated. RSY0n (n=1-5) defines different RA-4Glu isomers. Table 31-4a shows RSY isomer (from RSY 01-05) content in the samples and Table 31-4b shows each RA-4Glu isomer area percentage to the whole RA-4Glu weight.

TABLE 31-4a

Contents of RSY 0n* (n* = 1, 2, 3, 4, 5) detected in the GRA100 (product 1-6 in Ex. 1), LGRA100 (product 6-1in Ex. 6), and SGRA100 (product 4-1 in Ex. 4) samples.

| | | Content (g/100 g) (Dry basis) | | |
|---|---|---|---|---|
| Sample | Time (min) | GRA100 (product 1-6 in Ex. 1) | LGRA100 (product 6-1 in Ex. 6) | S-GRA100 (product 4-1 in Ex. 4) |
| RSY 01 | 13.104 | 0.03 | — | 0.06 |
| RSY 02 | 13.595 | 0.19 | 0.17 | — |
| RSY 03 | 13.904 | — | 0.20 | 0.18 |
| RSY 04 | 14.289 | 6.57 | 5.42 | 5.12 |
| RSY 05 | 15.201 | 0.07 | 0.14 | 0.09 |
| SUM | | 6.85 | 5.93 | 5.45 |

TABLE 31-4b

Area percentages of RSY0n* (n* = 1, 2, 3, 4, 5) in the RA-4Glu.

| | | Area percentage (%) | | |
|---|---|---|---|---|
| Sample | Time (min) | GRA100 (product 1-6 in Ex. 1) | LGRA100 (product 6-1 in Ex. 6) | S-GRA100 (product 4-1 in Ex. 4) |
| RSY 01 | 13.104 | 0.41 | — | 1.16 |
| RSY 02 | 13.595 | 2.71 | 2.92 | — |
| RSY 03 | 13.904 | — | 3.37 | 3.23 |
| RSY 04 | 14.289 | 95.81 | 91.39 | 93.92 |
| RSY 05 | 15.201 | 1.07 | 2.33 | 1.69 |

Conclusion: The contents of RSY0n* (n*=1, 2, 3, 4, 5) detected in the GRA100, LGRA100, and SGRA100 samples show that RA-4Glu isomers are present in the GRA100, SGRA100 and LGRA100 samples in weight percentages of 5-6% relative to the whole RA-4Glu weight. The weight percentages of RA-4Glu isomer in each SGRA100, GRA100 and LGRA100 sample is similar. Moreover, the area percentages of RSY0n* in the RA-4Glu (n*=1, 2, 3, 4, 5) show that RSY04 encompasses the majority of the RA-4Glu isomers (>90%), although there are 5 different RA-4Glu isomers in GRA100, SGRA100 and LGRA100.

Ex. 31, Part 5: Steviol-Glycoside, Glucosylated Steviol-Glycoside and Maltodextrin Contents in GRA100, LGRA100, and SGRA100 Samples From Tables 31-1a, 31-1b, 31-2a, 31-2b, 31-3a, 31-3b, 31-4a, 31-4b and HPLC analyses, the contents of steviol glycosides, glucosylated steviol glycosides and maltodextrins in GRA100 (product 1-6 in Example 1), LGRA100 (product 6-1 in Example 6), and SGRA100 (product 4-1 in Example 4) were calculated. The results are shown in Table 31-5 below.

TABLE 31-5

Steviol glycosides detected in GRA100, LGRA100, and SGRA100 samples.

| Sample | Content (g/100 g) (Dry basis) | | |
|---|---|---|---|
| | GRA100 (product 1-6 in Ex. 1) | LGRA100 (product 6-1 in Ex. 6) | S-GRA100 (product 4-1 in Ex. 4), |
| RA | 9.19 | 3.10 | 16.83 |
| RA-1Glu | 27.85 | 21.76 | 35.65 |
| RA-2Glu | 25.33 | 20.72 | 28.40 |
| RA-3Glu | 13.93 | 11.45 | 13.41 |
| RA-4Glu | 6.85 | 5.92 | 5.44 |
| SUM (RA/GRA) | 83.15 | 62.95 | 99.73 |
| maltodextrins | 19.2 | —[2)] | —[2)] |
| SUM | 102.35[1)] | — | — |

Note:
[1)]Relative standard deviation (RSD) = 5%
[2)]The maltodextrins of this sample is about <2%, for its dextrin removing treatment in example 4 or example 6.

Conclusion: Table 31-5 shows that the different extents of glycosylation associated resulted in different weight percentages of RA-1Glu, RA-2Glu, RA-3Glu and RA-4Glu in the GRA100 (product 1-6 in Ex. 1), SGRA100 (product 4-1 in Ex. 4) and LGRA100 (product 6-1 in Ex. 6) samples. The weight percentages of RA-1 Glu and RA-2Glu were found to be different among these samples (SGRA100>GRA100>LGRA100), considering the different treatments to which GRA100 was subjected in Examples 4 and 6. These results indicate that RA-1Glu and RA-2Glu encompass the majority of glycosyled RA in SGRA100 while RA-mGlu (m>2) encompass the majority of glycosyled RA in LGRA100.

Example 32. Structure of RD/RM Isomers in GRA100 (Product 1-6 in Ex. 1), SGRA100 (Product 4-1 in Ex. 4) and LGRA100 (Product 6-1 in Ex. 6)

In view of the CGTase enzyme properties, and the MS spectra and contents corresponding to the GRA100 (product 1-6 in Ex. 1), SGRA100 (product 4-1 in Ex. 4), LGRA100 (product 6-1 in Ex. 6), RD, RM, and *Stevia* extract samples in Examples 30 and 31, the structures of RD/RM isomers were determined.

Ex. 32, Part 1: RA-1Glu

FIG. 7, Panel A shows that RA has four glucosyl groups. FIG. 7, Panel B shows the aglycone of RA and RD. CGTase enzyme can only catalyze the incorporation of glucosyl groups connected by a 1-4 linkages. Therefore, the 1Glu group in RD can result in 4 types of RD isomers in the GRA100 (product 1-6 in Ex. 1), SGRA100 (product 4-1 in Ex. 4) and LGRA100 (product 6-1 in Ex. 6) samples as shown in Tables 32-1a and 32-1b. Steviol (FIG. 7, Panel B) is the aglycone for these isomers.

TABLE 32-1a

RD isomers in the GRA100, SGRA100, and LGRA100 samples.

| Sample | Number | Aglycone | Conjugation | |
|---|---|---|---|---|
| | | | R1(Position 19) | R2 (Position 13) |
| RA | — | Steviol | Gluβ(1-2)[Gluβ(1-3)]Gluβ | Gluβ |
| RD | — | | Gluβ(1-2)[Gluβ(1-3)]Gluβ | GluβGlu β(1-2) |
| RA-1Glu | I | | Gluβ(1-2) Glu α(1-4) [Gluβ(1-3)]Gluβ | Gluβ |
| | II | | Gluβ(1-2) [Gluβ(1-3) Glu α(1-4)]Gluβ | Gluβ |
| | III | | Gluβ(1-2) [Gluβ(1-3)]GluβGlu α(1-4) | Gluβ |
| | IV | | Gluβ(1-2)[Gluβ(1-3)]Gluβ | GluβGlu α(1-4) |

TABLE 32-1b
| RD isomer structures in the GRA100, SGRA100, and LGRA100 samples. | |
|---|---|
| Number | Structure |
| I | 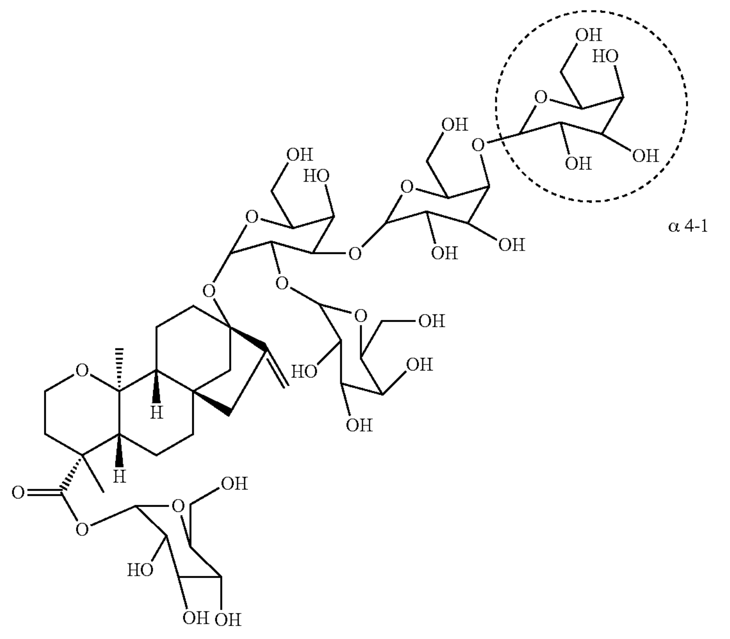 α 4-1 |
| II | 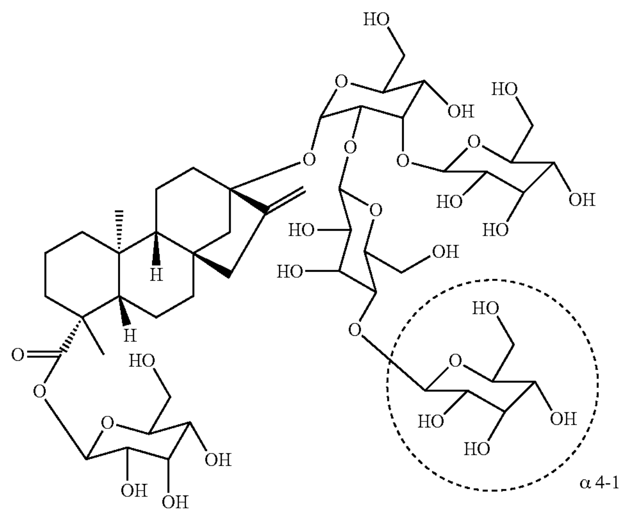 α 4-1 |

TABLE 32-1b-continued

RD isomer structures in the GRA100, SGRA100, and LGRA100 samples.

| Number | Structure |
|---|---|
| III | 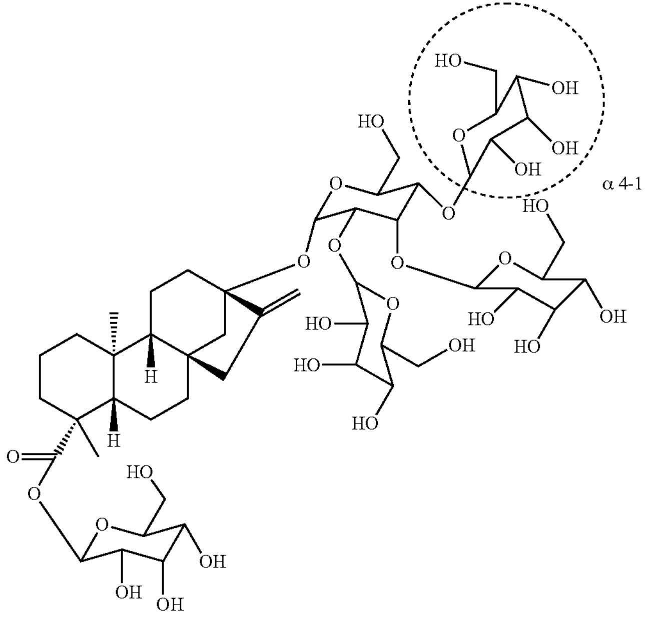 |
| IV | 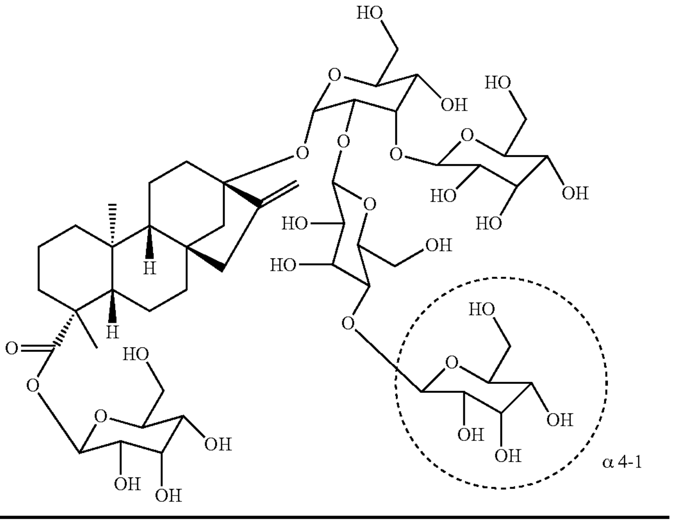 |

Ex. 32, Part 2: RA-2Glu

FIG. 7, Panel A shows that RA has four glucosyl groups. CGTase enzyme can only catalyze the incorporation of glucosyl groups connected by a 1-4 linkages. Therefore, the 2Glu groups in RM isomers in can result in 10 different isomers in the GRA100 (product 1-6 in Ex. 1), SGRA100 (product 4-1 in Ex. 4) and LGRA100 (product 6-1 in Ex. 6) samples as shown in Tables 32-2a and 32-2b. Steviol (FIG. 7, Panel B) is the aglycone for these isomers.

TABLE 32-2a

RM isomers in the GRA100, SGRA100 and LGRA100 samples.

| Sample | Number | Aglycone | Conjugation R1(Position 19) | Conjugation R2 (Position 13) |
|---|---|---|---|---|
| RA | — | Steviol | Gluβ(1-2)[Gluβ(1-3)]Gluβ | Gluβ |
| RM | — | | Gluβ(1-2)[Gluβ(1-3)]Gluβ | Gluβ[Gluβ(1-3)]Glu β(1-2) |
| RA-2Glu | I | | Gluβ(1-2) Glu α(1-4) [Gluβ(1-3)]Gluβ | GluβGlu α(1-4) |
| | II | | Gluβ(1-2) [Gluβ(1-3)]GluβGlu α(1-4) | GluβGlu α(1-4) |
| | III | | Gluβ(1-2) [Gluβ(1-3) Glu α(1-4)]Gluβ | GluβGlu α(1-4) |
| | IV | | Gluβ(1-2)[Gluβ(1-3)]Gluβ | GluβGlu α(1-4) Glu α(1-4) |
| | V | | Gluβ(1-2) [Gluβ(1-3) Glu α(1-4) Glu α(1-4)]Gluβ | Gluβ |
| | VI | | Gluβ(1-2) [Gluβ(1-3)]GluβGlu α(1-4) Glu α(1-4) | Gluβ |
| | VII | | Gluβ(1-2) Glu α(1-4) Glu α(1-4) [Gluβ(1-3)]Gluβ | Gluβ |
| | VIII | | Gluβ(1-2) Glu α(1-4) [Gluβ(1-3) Glu α(1-4)]Gluβ | Gluβ |
| | IX | | Gluβ(1-2) Glu α(1-4) [Gluβ(1-3)]GluβGlu α(1-4) | Gluβ |
| | X | | Gluβ(1-2) [Gluβ(1-3) Glu α(1-4)]GluβGlu α(1-4) | Gluβ |

TABLE 32-2b

RM isomer structures in the GRA100, SGRA100, and LGRA100 samples.

| Number | Structure |
|---|---|
| I | 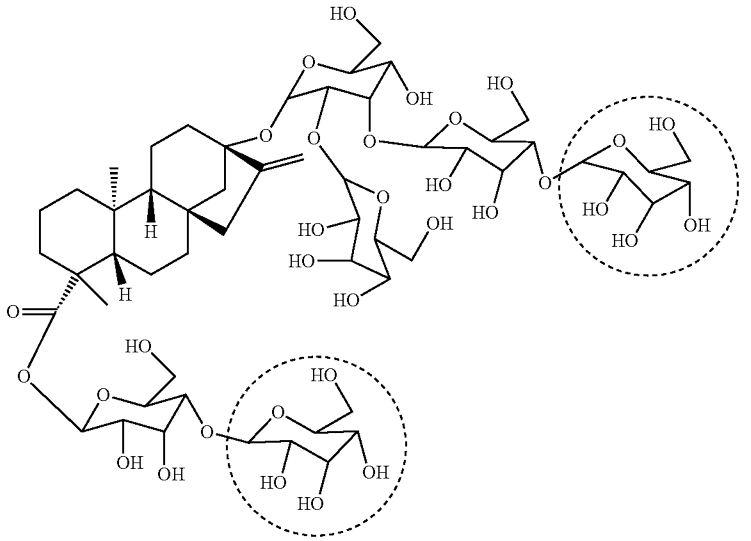 |

TABLE 32-2b-continued
| RM isomer structures in the GRA100, SGRA100, and LGRA100 samples. | |
|---|---|
| Number | Structure |
| II | 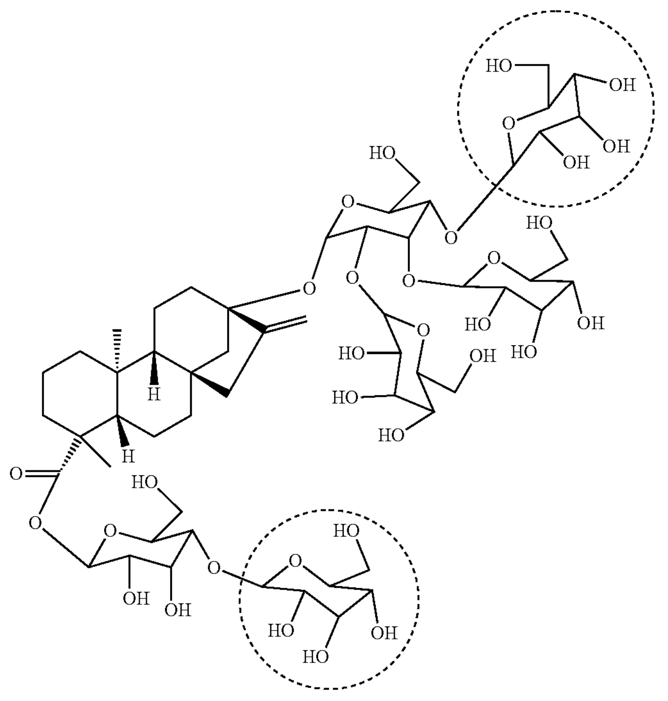 |
| III | 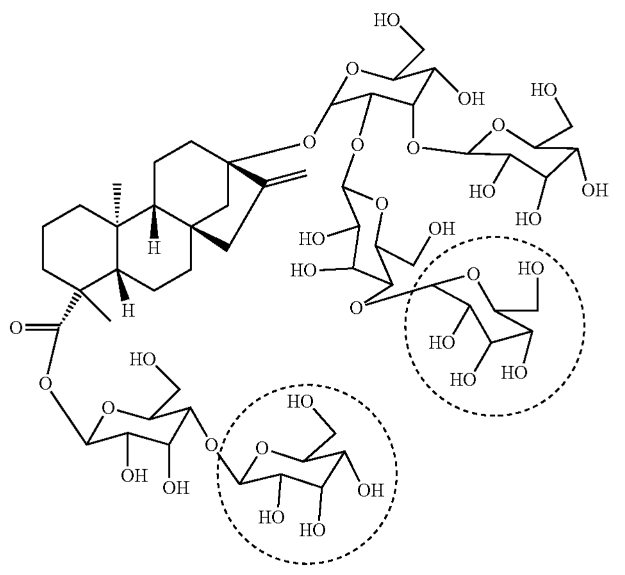 |

TABLE 32-2b-continued
| RM isomer structures in the GRA100, SGRA100, and LGRA100 samples. | |
|---|---|
| Number | Structure |
| IV | 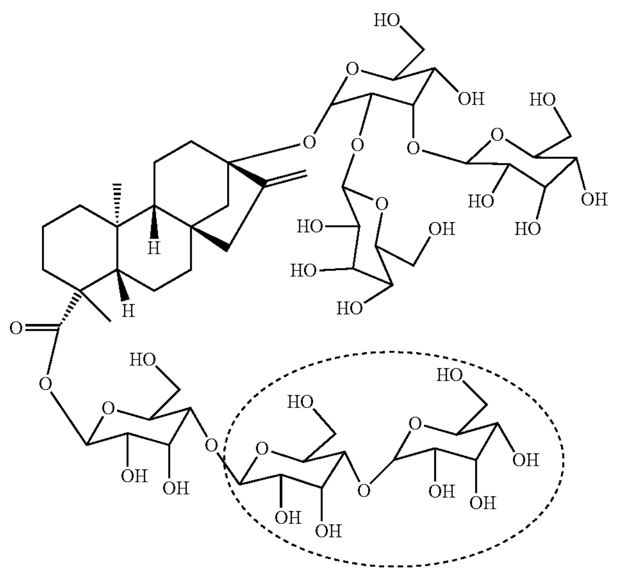 |
| V | 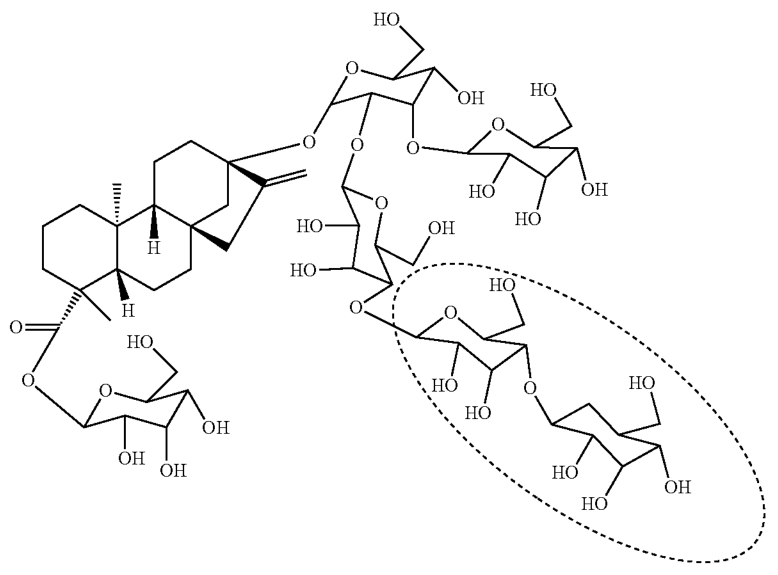 |

TABLE 32-2b-continued
| RM isomer structures in the GRA100, SGRA100, and LGRA100 samples. | |
|---|---|
| Number | Structure |
| VI | 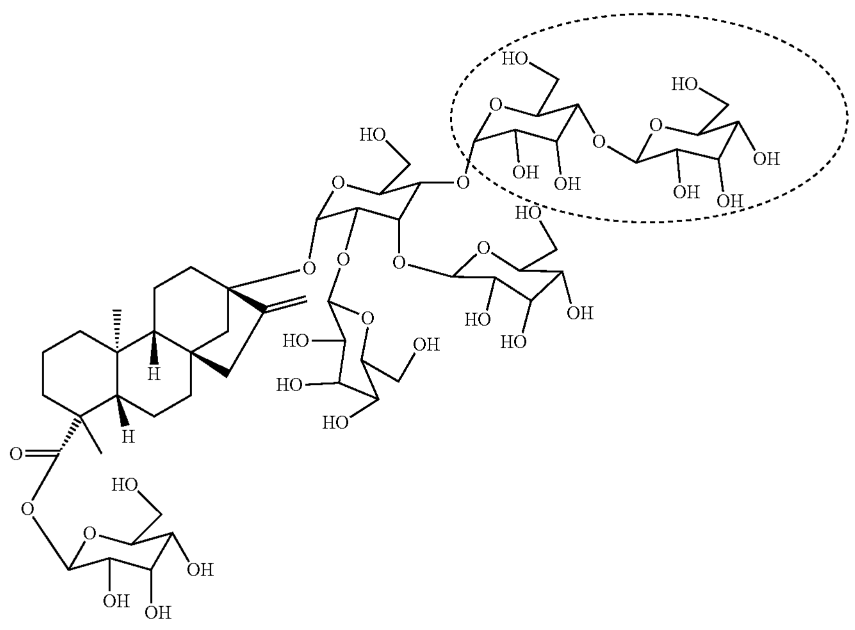 |
| VII | 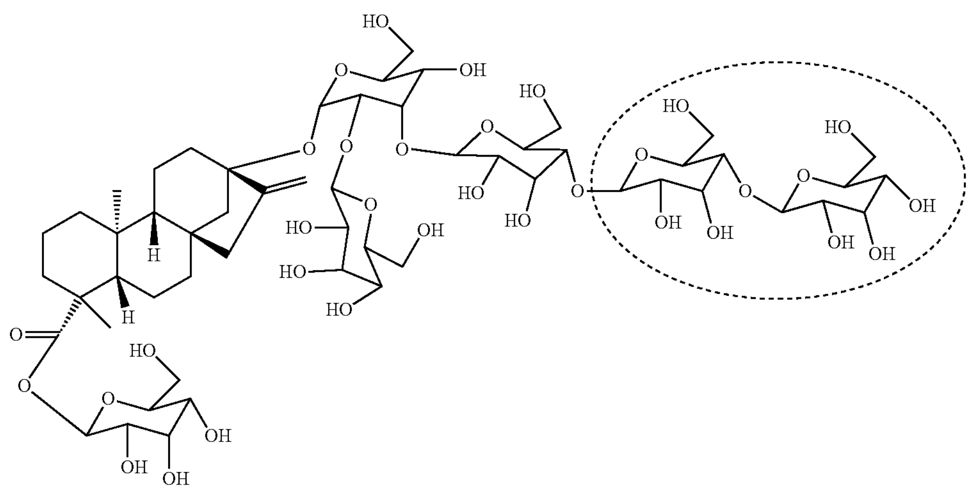 |

TABLE 32-2b-continued
| RM isomer structures in the GRA100, SGRA100, and LGRA100 samples. | |
|---|---|
| Number | Structure |
| VIII | 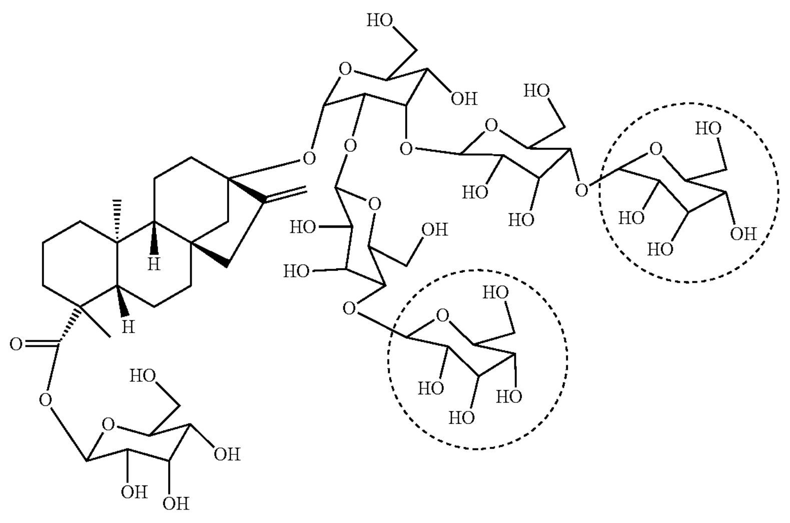 |
| IX | 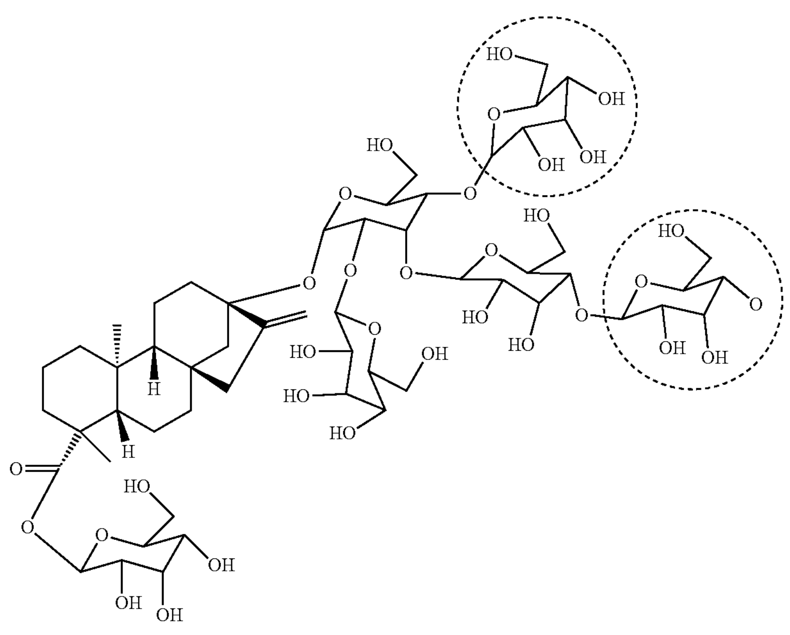 |

TABLE 32-2b-continued

| RM isomer structures in the GRA100, SGRA100, and LGRA100 samples. | |
|---|---|
| Number | Structure |
| X | 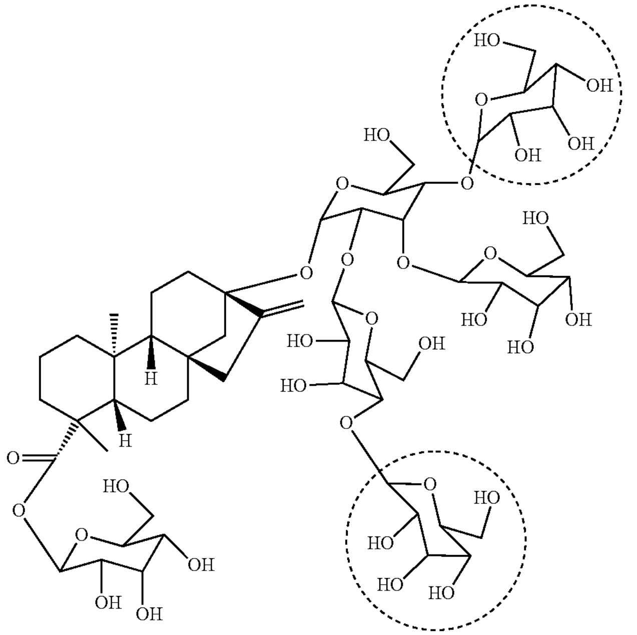 |

Example 33. Analysis of GRA100, SGRA100 and LGRA100

Materials: GRA100, product 1-6 in Ex. 1; SGRA100, product 4-1 in Ex. 4; and LGRA100, product 6-1 in Ex. 6.

Methods and Materials

Reference standards (to qualify the analytical method) for steviol glycosides (Reb A, Reb B, Reb C, Reb D, Reb E, Reb F, Reb G, Reb I, Reb M, Reb N, Reb O, Stevioside, Isoreb A, Isostevioside) were obtained from Chromadex (LGC Germany). Solvents and reagents (HPLC grade) were obtained from VWR (Vienna) or Sigma-Aldrich (Vienna). Davisil Grade 633 (high-purity grade silica gel, pore size 60 Å, 200-425 mesh particle size was obtained from Sigma-Aldrich (Vienna).

Sample Preparation (HPLC/DAD/MS):All samples were fractionated over a glass column (100×5 mnm) filled with Davisil Grade 633. The column was equilibrated with ethlyacetate/Acetic acid/H2O=8/3/2 (v/v/v). 100 mg sample, dissolved in 2 ml H2O, were loaded on the column and eluted with ethlyacetate/Acetic acid/H2O=8/3/2 at a flow rate of 2 ml/min. The first 6 ml of the eluate were discarded and the next 30 ml containing unreacted steviol-glycosides were collected. Enzymatically reacted steviol-glycosides eluted in the range of 36-70 ml and were again collected.

After fractionation of 3 samples, the pooled eluates were evaporated to dryness and reconstituted in 20 ml Acetonitrile/H2O=9/1 (v/v) corresponding to an equivalent sample concentration of 150 mg sample/10 ml.

The method was qualified by fractionation of steviolglycoside standards and enzymatically reacted steviol-glycosides. An elution yield of >97% of steviol-glycosides and of >95% enzymatically reacted steviol-glycosides was observed, the carry over between the fraction was calculated to less than 3%.

The pooled, evaporated samples were used for analysis of steviol-related compounds as well as for non-volatile non-steviol-related compounds.

HPLC-Method:

The HPLC system consisted of an Agilent 1100 system (autosampler, ternary gradient pump, column thermostat, VWD-UV/VIS detector, DAD-UV/VIS detector) connected in-line to an Agilent mass spectrometer (ESI-MS quadrupole G1956A VL). For HPLC analysis 150 mg of the corresponding sample was dissolved in Acetonitrile (1 ml) and filled up to 10 ml with H2O.

The samples were separated at 0.8 ml/min on a Phenomenex Synergi Hydro-RP (150×3 mm) followed by a Macherey-Nagel Nucleosil 100-7 C18 (250×4.6 mm) at 45° C. by gradient elution. Mobile Phase A consisted of a 0.01 molar NH4-Acetate buffer (native pH) with 0.1% acetic acid, 0.05% trimethylamine and 0.001% dichloromethane. Mobile Phase B consisted of 0.01 molar NH4-Acetate buffer (native pH) and Acetonitrile (1/9 v/v) with 0.1% acetic acid, 0.05% trimethylamine and 0.001% dichloromethane. The gradient started with 22% B, was increased linearly in 20 minutes to 45% B and kept at this condition for another 15 minutes. Injection volume was set to 10 µl.

The detectors were set to 210 nm (VWD), to 205 and 254 nm (DAD with spectra collection between 200-600 nm) and to ESI negative mode TIC m/z 300-1500, Fragmentor 200, Gain 2 (MS, 300° C., nitrogen 12 l/min, nebulizer setting 50 psig. Capillary voltage 4500 V).

Detection at 205 and 210 nm were used to quantify the chromatograms, the MS-spectra were used to determine the molar mass and structural information of individual peaks. Detection at 254 nm was used to identify non-steviol glycoside peaks.

Samples were quantified by external standardization against reference compounds of Reb A or stevioside, in case where no authentic reference standard was available, the peak area was quantified against the reference standard with the most similar mass and corrected for the molar mass differences. The calibration range of reference standards was in a range 1-75 mg/10 ml (dissolved in Acetonitrile/H2O=9/1 (v/v)).

Identification and Quantification

Steviol-glycosides and enzymatically reacted steviol-glycosides were identified by comparison of retention times to authentic reference standards and/or by evaluation of the mass spectra obtained (including interpretation of the fragmentation pattern and double charged ions triggered by the presence of dichloromethane).

Steviol-glycosides were quantified against external standards. In case that no reference standard was available quantification was performed against the reference standard with the most similar molar mass.

Results: Contents of GRA100, SGRA100 and LGRA100 are shown in Table 33-1

TABLE 33-1

Contents of GRA100, SGRA100 and LGRA100.

| | | GRA 100 | | | GRA 100 | | | LGRA 100 | | | SGRA 100 | | |
|---|---|---|---|---|---|---|---|---|---|---|---|---|---|
| added gluc | molar mass | Rt (min) | Area | % m/m | Rt (min) | Area | % m/m | Rt (min) | Area | % m/m | Rt (min) | Area | % m/m |
| +7 | 2099 | | | | 34.4 | 54 | 0.284 | 34.4 | 30 | 0.359 | | | |
| | 2099 | 35.2 | 86 | 0.344 | 35.3 | 106 | 0.381 | 34.7 | 244 | 0.958 | | | |
| | 2099 | | | | | | | 35.1 | 226 | 0.908 | | | |
| | 2099 | 35.7 | 77 | 0.327 | 35.8 | 94 | 0.359 | 35.6 | 218 | 0.886 | | | |
| +6 | 1937 | | | | | | | 35.9 | 311 | 1.06 | | | |
| | 1937 | | | | | | | | | | | | |
| | 1937 | 36.2 | 96 | 0.335 | 36.3 | 108 | 0.355 | 36.4 | 722 | 2.12 | | | |
| | 1937 | 36.6 | 169 | 0.460 | 36.7 | 175 | 0.471 | | | | 36.7 | 28 | 0.325 |
| | 1937 | 37.2 | 354 | 0.779 | 37.3 | 361 | 0.792 | 37.4 | 627 | 1.87 | 37.5 | 17 | 0.298 |
| +5 | 1775 | 37.6 | 95 | 0.305 | 37.7 | 105 | 0.320 | | | | 75.1 | 6 | 0.246 |
| | 1775 | 38.2 | 470 | 0.897 | 38.3 | 467 | 0.892 | 38.3 | 396 | 1.170 | 38.1 | 12 | 0.260 |
| | 1775 | 38.6 | 657 | 1.19 | | | | 38.6 | 855 | 2.26 | 38.6 | 70 | 0.398 |
| | 1775 | 39.3 | 391 | 0.77 | 39.4 | 347 | 0.703 | 39.3 | 1338 | 3.40 | 39.4 | 18 | 0.275 |
| | 1775 | 39.6 | 605 | 1.11 | 39.6 | 595 | 1.09 | 39.6 | 330 | 1.015 | | | |
| | 1775 | | | | | | | 39.8 | 789 | 1.91 | 40.0 | 143 | 0.519 |
| +4 | 1613 | 40.4 | 1165 | 1.81 | 40.4 | 1111 | 1.74 | 40.3 | 1614 | 3.68 | | | |
| | 1613 | 40.7 | 240 | 0.484 | 40.8 | 243 | 0.490 | | | | | | |
| | 1613 | 41.1 | 617 | 1.03 | 41.1 | 625 | 1.04 | 41.0 | 1449 | 3.33 | 40.8 | 317 | 0.894 |
| | 1613 | 41.7 | 1254 | 1.94 | 42.5 | 1398 | 2.15 | 41.5 | 2481 | 5.55 | 81.3 | 356 | 0.977 |
| | 1613 | 42.5 | 1463 | 2.24 | | | | 42.7 | 2034 | 4.59 | 84.5 | 731 | 1.78 |
| | 1613 | 43.0 | 2033 | 3.06 | | | | 43.1 | 1068 | 2.51 | | | |
| +3 | 1451 | 44.2 | 1767 | 2.41 | 44.2 | 1738 | 2.37 | 43.8 | 2898 | 5.80 | 43.7 | 1684 | 3.45 |
| | 1451 | 44.6 | 912 | 1.30 | 44.6 | 898 | 1.29 | 44.6 | 1737 | 3.55 | 88.7 | 1697 | 3.48 |
| | 1451 | 45.2 | 2959 | 3.95 | 45.2 | 2816 | 3.76 | 45.5 | 3808 | 7.56 | | | |
| | 1451 | 45.8 | 1585 | 2.17 | 45.8 | 1595 | 2.19 | 46.2 | 7 | 0.203 | | | |
| +2 | 1289 | 46.6 | 3421 | 4.04 | 46.6 | 3401 | 4.01 | 46.8 | 2894 | 5.15 | 45.3 | 6966 | 13.68 |
| | 1289 | 47.5 | 3465 | 4.09 | 47.5 | 3297 | 3.89 | 47.2 | 2327 | 4.17 | 46.3 | 5389 | 10.62 |
| | 1289 | 47.8 | 2536 | 3.02 | 47.8 | 2442 | 2.91 | 47.5 | 3273 | 5.80 | | | |
| +1 | 1127 | 48.0 | 3293 | 3.40 | 48.0 | 3156 | 3.26 | 48.8 | 4567 | 7.02 | 47.0 | 11877 | 20.60 |
| | 1127 | 48.9 | 5921 | 6.04 | 48.9 | 5551 | 5.66 | 49.2 | 4525 | 6.95 | 48.2 | 10995 | 19.08 |
| | 1127 | 49.3 | 5003 | 5.12 | 49.3 | 4854 | 4.97 | 49.8 | 13 | 0.167 | | | |
| 0 | 965 | 50.3 | 9813 | 8.51 | 50.3 | 9320 | 8.09 | 50.3 | 6801 | 8.88 | 50.3 | 15975 | 20.70 |
| Sum % (m/m) | | | | 61.12 | | | 53.18 | | | 92.84 | | | 97.59 |

Example 34. Number of Positions Available for Glucosylation (n=1-10) of GRA100

Rebaudioside A offers 3 practical positions (see arrows in FIG. 8) for (a 144) extensions with glucose using a glucose donor and glucosyltransferases. A fourth position (see broken arrow in FIG. 8) is theoretically available only as it would create branching and not extension and is sterically hindered. Considering that glucosyltransferases do not act site-specific, all three available binding positions will be glucosylated in a random order. Subsequent glucosylations are also expected to appear in random order whereby the total number of extension positions remains 3, irrespectively of the number of glucose units attached Mathematically, glucosylation follows then the exponential function V=nm where V denotes all possible structural variants, in denotes the number of glucose units attached and n denotes the number of possible positions for glucosylation.

The number of all possible structural variants includes molecules which are chemically identical, but the sequence of glucosylation to yield the identical structure is different. The number of variants with different chemical structures (structural isomers) follow the formula I=(n+m−1)!/((n−1)!*m!) where I denotes structural isomers, m denotes the number of glucose units attached and n denotes the number of possible positions for glucosylation.

Exemplifying, the possible sequence of adding 2 or 3 glucose units is shown below on Table 34-1. The 3 sites for the first glucose unit are denoted as a1, b1, c1 (step 1) the variations for the second glucose unit are denoted as a2, b2 and c2 (step 2) or a3, b3, c3 (step 3). Variants in step 2 or 3 with identical chemical structure but different sequence are shown in one row.

Table 34-2 summarizes the number of all possible structural variants and structural isomers for various numbers of initially available (α 1→4) positions for glucosylation. Mathematically the difference between possible structure and structural isomers is explained by considering versus neglecting the sequence of glucosylation.

The formula below shows positions available for (α 1→4) glucosidic bonds in Rebaudioside A (marked by arrows, also shown in FIG. 8)

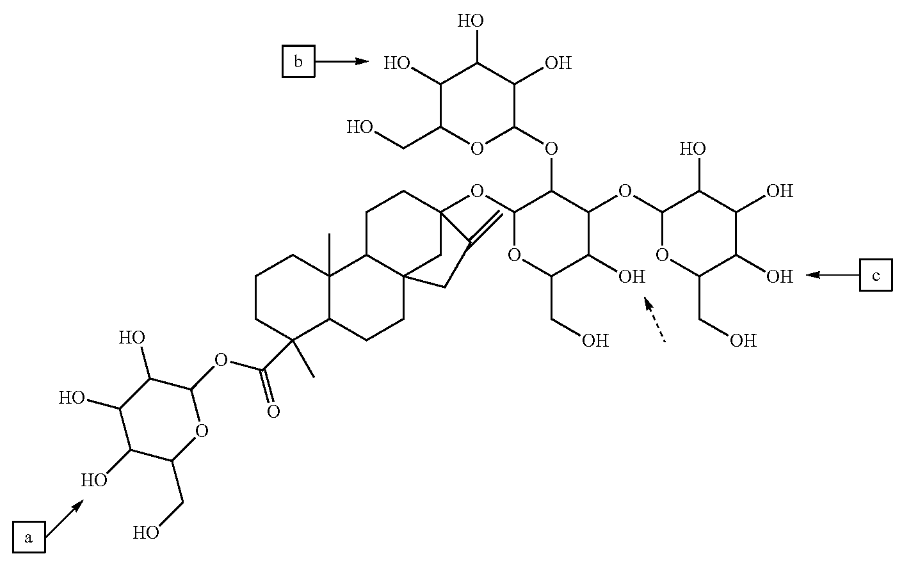 [SMILES: C=C1CC23CCC4C(C)(C(=O)OC5OC(CO)C(O)C(O)C5O)CCCC4(C)C2CCC1(OC1OC(CO)C(O)C(OC2OC(CO)C(O)C(O)C2O)C1OC1OC(CO)C(O)C(O)C1O)C3]

Table 34-1, Structural variants for glucosylation with 2 or 3 glucose in (a 1→4) positions. Each panel shows all possible variants and each row represents one structural isomer.

Structural variants for glucosylation with 2 glucose in (a 144) positions.

| | |
|---|---|
| a1a2 | |
| a1b2 | b1a2 |
| a1c2 | c1a2 |
| b1b2 | |
| b1c2 | c1b2 |
| c1c2 | |

Structural variants for glucosylation with 3 glucose in (a 144) positions.

| | | | | | |
|---|---|---|---|---|---|
| a1a2a3 | | | | | |
| b1a2a3 | a1b2a3 | a1a2b3 | | | |
| c1a2a3 | a1c2a3 | a1a2c3 | | | |
| a1b2c3 | a1c2b3 | b1a2c3 | b1c2a3 | c1a2b3 | c1b2a3 |
| b1b2b3 | | | | | |
| a1b2b3 | b1a2b3 | b1b2a3 | | | |
| c1b2b3 | b1c2b3 | b1b2c3 | | | |
| c1c2c3 | | | | | |
| a1c2c3 | c1a3c3 | c1c2a3 | | | |
| b1c2c3 | c1b2c3 | c1c2b3 | | | |

Legend:

a, b, c denotes the positions available for (α 1→4) glucosylation;

1, 2, 3 denotes the sequence of glucosylation

TABLE 34-2

Generalized Overview on possible variants (pv) and structural isomers (is) dependent on the number of available positions for glucosylation and number of glucose units attached.

| number of glc units | number of positions available for glucosylation (n) | | | | | | | | | |
|---|---|---|---|---|---|---|---|---|---|---|
| attached | 1 | | 2 | | 3 | | 4 | | 5 | |
| (m) | pv | si | pv | si | pv | si | pv | si | pv | si |
| 1 | 1 | 1 | 2 | 2 | 3 | 3 | 4 | 4 | 5 | 5 |
| 2 | 1 | 1 | 4 | 3 | 9 | 6 | 16 | 10 | 25 | 15 |
| 3 | 1 | 1 | 8 | 4 | 27 | 10 | 64 | 20 | 125 | 35 |
| 4 | 1 | 1 | 16 | 5 | 81 | 15 | 256 | 35 | 625 | 70 |
| 5 | 1 | 1 | 32 | 6 | 243 | 21 | 1024 | 56 | 3125 | 126 |
| 6 | 1 | 1 | 64 | 7 | 729 | 28 | 4096 | 84 | 15625 | 210 |
| 7 | 1 | 1 | 128 | 8 | 2187 | 36 | 16384 | 120 | 78125 | 330 |
| 8 | 1 | 1 | 256 | 9 | 6561 | 45 | 65536 | 165 | 390625 | 495 |
| 9 | 1 | 1 | 512 | 10 | 19683 | 55 | 262144 | 220 | 1953125 | 715 |
| 10 | 1 | 1 | 1024 | 11 | 59049 | 66 | 1048576 | 286 | 9765625 | 1001 |

An embodiment of sweetener or flavor composition of the present application comprises one or more glycosylated *stevia* glycosides as per FIG. 8 and/or Table 34-2. Additionally, the structural variants for glucosylation described in FIG. 8 and Table 34-2 also applies to other *stevia* glycosides, wherein the structure of Rebaudioside A is replaced by stevioside, rubusoside, rebaudioside B, Rebaudioside C, Rebaudioside D, Rebaudioside M etc.

Example 35. Preparation of Glycosylated Stevioside 90% (GSTV90) from Stevioside 90%

Glycosylated reaction products from stevioside 90% were prepared according to the following method.

Stevioside 90%, available from EPC Natural Products Co., Ltd. Lot #20201201. The contents are shown in Table 35-1.

TABLE 35-1

| contents of STV90 | | | | | | | | | | |
|---|---|---|---|---|---|---|---|---|---|---|
| Lot# | RD | RA | STV | RF | RC | DA | RU | RB | STB | TSG(9) |
| 20201201 | / | 2.40 | 91.01 | / | / | / | 0.36 | / | 1.10 | 94.86 |

Progress:

i) 15 g β-cyclodextrin was dissolved in 45 ml deionized water.

ii) 15 g stevioside 90% was added to liquefied dextrin.

iii) 0.75 ml CGTase enzyme and 15 ml deionized water were added to the mixture of ii) and incubated at 69° C. for 20 hours to glycosylate the STV90 composition via glucose molecules derived from β-cyclodextrin.

iv) The reaction mixture was heated to 85° C. for 10 min to inactivate the CGTase, which was then removed by filtration.

v) The resulting solution of GSTV, residual STV, dextrin ands-cyclodextrin were decolored and spray dried yielding 25 g of GSTV90 (product 35-01 of Example 35) as a white powder (the content of are shown in Table 35-2).

TABLE 35-2

| The content of GSTV90 | | | | | | | | | | |
|---|---|---|---|---|---|---|---|---|---|---|
| | RD | RA | STV | RF | RC | DA | RU | RB | STB | TSG(9) |
| GSTV90 | / | 0.3 | 6.54 | / | / | / | / | / | / | 6.84 |

Example 36. Preparation of GSTV90-MRP-CA from GSTV90, Xylose and Alanine

Materia:

GSTV90: product 35-01 of Example 35

Progress:

GSTV90, xylose and alanine and water were weighed and dissolved in water according to Table 36-1. The solutions were then heated at about 100° C. for 2 hour. When the reactions were completed, the solutions were filtered through filter paper and the filtrates were dried with a spray dryer, thereby resulting in 36-01 product as an off white powder.

TABLE 36-1

| Sample compositions. | | | | |
|---|---|---|---|---|
| Product No. | Weight of GSTV90 (g) | Weight of xylose (g) | Weight of alanine (g) | Weight of water (g) |
| 36-01 | 8 | 1.5 | 0.5 | 60 |

Example 37. Sensory Evaluation Comparison of a Natural Sweeteners Sparkling Water Consist of GSTV90 (Product 35-01 of Example 35) with an Artificial Sweetener Sparkling Water Consist of Sucralose Materials:

GSTV90 (product 35-01 of Example 35); RA100 (RA content, 100.03%); available from Sweet Green Fields Co. Ltd., Lot #CT001-140604; Erythritol available from Zhucheng Dongxiao Biotechnology Co., Ltd., Lot #201218B.

Process:

An artificial sweetener sparkling water containing sucralose was selected as a reference. And then a natural sweetener sparkling water containing GSTV90 (product 35-01 of Example 35) was prepared. The details are in Table 37-1.

TABLE 37-1

| Test sample preparation for sensory evaluations. | | | | | | | |
|---|---|---|---|---|---|---|---|
| Product | Weight of GSTV90 (product 19-01 of example 19) (g) | Weight of sucralose (g) | Weight of Citric Acid (g) | Weight of Sodium citrate (g) | Weight of Erythritol (g) | Weight of RA100 (g) | Volume of deionized water (mL) |
| reference | — | 0.008 | 0.05 | 0.02 | 3.8 | — | 100 |
| 37-01 | 0.04 | — | 0.05 | 0.02 | 3.8 | 0.015 | 100 |

Each sample was evaluated and average scores from the test panel for each sensory criteriun were recorded as the evaluation test results in Table 37-2.

TABLE 37-2

| Sensory evaluation results. | | | | | |
|---|---|---|---|---|---|
| No. | Overall likability | Sweet onset | Sweet peak | Sweet linger | Metallic aftertaste |
| reference | 3 | 3 | 4 | 4 | 4 |
| 37-01 | 4 | 3 | 3.5 | 3 | 2 |

Conclusion: compared with an artificial sweetener sparkling water containing of sucralose, the sweet linger and metallic aftertaste of the natural sweeteners sparkling water containing of GSTV90 (product 35-01 of Example 35) are better. Such effect can be extended to all natural sweeteners. GSTV90 and enzymatic converted products originated from purified stevioside such as 91%, 92%, 93%, 95%, 96%, 97%, 98%, 99%, 99.5% could be used as sweetener or flavor. These products could be combined with other high intensity sweeteners for food and beverage applications.

Example 38. Sensory Evaluation Comparison of a Natural Sweetener Sparkling Water Containing GSTV90-MRP-CA (Product 36-01 of Example 36) with an Artificial Sweetener Sparkling Water Containing Sucralose Materials:

GSTV90-MRP-CA (product 36-01 of Example 36); RA100 (RA content, 100.03%); available from Sweet Green Fields Co. Ltd., Lot #CT001-140604; Erythritol available from Zhucheng Dongxiao Biotechnology Co., Ltd. Lot #201218B.

Process:

An artificial sweetener sparkling water containing sucralose was selected as a reference. And then a natural sweetener sparkling water containing GSTV90-MRP-CA (product 36-01 of Example 36) was prepared. The details are in Table 38-1.

TABLE 38-1

Test sample preparation for sensory evaluations.

| Product | Weight of GSTV90-MRP-CA (product 20-01 of example 20) (g) | Weight of sucralose (g) | Weight of Citric Acid (g) | Weight of Sodium citrate (g) | Weight of Erythritol (g) | Weight of RA100 (g) | Volume of deionized water (mL) |
|---|---|---|---|---|---|---|---|
| reference | — | 0.008 | 0.05 | 0.02 | 3.8 | — | 100 |
| 38-01 | 0.04 | — | 0.05 | 0.02 | 3.8 | 0.015 | 100 |

Each sample was evaluated and average scores from the test panel for each sensory criterium were recorded as the evaluation test results in Table 38-2.

TABLE 38-2

Sensory evaluation results.

| No. | Overall likability | Sweet onset | Sweet peak | Sweet linger | Metallic aftertaste |
|---|---|---|---|---|---|
| reference | 3 | 3 | 4 | 4 | 4 |
| 38-01 | 4.5 | 3.5 | 4.5 | 1 | 2 |

Conclusion: When compared to artificial sweeteners sparkling water containing sucralose, the natural sweeteners sparkling water containing GSTV90-MRP-CA (product 36-01 of Example 36) had a better sweet onset, sweet peak, sweet linger, and metallic aftertaste. This effect is applicable to all natural sweeteners.

Example 39. GSTV90 (Product 35-01 of Example 35) and GSTV90-MRP-CA (Product 36-01 of Example 36) Improved the Taste Profile of Mouth Wash Materials: Crest White lock mouth wash (peach flavor): available from Guangzhou P & G Co., Ltd. Lot #:1207D29811

Ingredients: water, glycerinum, propylene glycol sodium hexametaphosphate, ethanol, sorbitol, thymol, eucalyptol, methyl salicylate, menthol, benzoic acid, poloxamer 407, sodium benzoate, Sodium lauryl sulfate, edible essence, phosphoric acid, saccharin sodium salt, Trichlorogalactose, Cl 17200, Cl19140.

Process: Dissolve a certain amount of concentrated GSTV90 (product 35-01 of Example 35) and GSTV90-MRP-CA (product 36-01 of Example 36) into the mouth wash. The details are as follows.

TABLE 39-1

Sample composition

| Type of added products | Weight of added products (mg) | Volume of mouth wash (mL) | Concentration (ppm) |
|---|---|---|---|
| base | — | 100 | — |
| GSTV90 (product 35-01 of Example 35) | 5 | 100 | 50 |
| GSTV90-MRP-CA (product 36-01 of Example 36) | 5 | 100 | 50 |

Experiment: Each sample was evaluated according to the aforementioned sensory evaluation method and the above added method. The average score of the panel was taken as the evaluation result data. The taste profile of the mixture is shown in Table 39-2.

TABLE 39-2

Sensory evaluation results.

| | Overall likability | coolness | Refreshing | bitterness | flavor |
|---|---|---|---|---|---|
| base | 2.5 | 2.5 | 3 | 3 | 3 |
| GSTV90 | 3 | 3 | 3.5 | 1 | 4 |
| GSTV90-MRP-CA | 3.5 | 3.5 | 4 | 1.5 | 3.5 |

Conclusion: GSTV90 (product 35-01 of Example 35) and GSTV90-MRP-CA (product 36-01 of Example 36) both can improve the taste profile of Crest White lock mouth wash. Specifically, GSTV90 can reduce the unpleasant bitterness, improve peach flavor and coolness in mouth wash. Such effect can be extended to all the natural sweeteners Example 40. GSTV90 (Product 35-01 of Example 35) and GSTV90-MRP-CA (Product 36-01 of Example 36) Improved the Coolness of Essential Balm Materials: essential balm, (liquid state), available from Shanghai Zhonghua Pharmaceutical Nantong Co., Ltd. Lot #:C200813

Ingredients: menthol, methyl salicylate, camphor, eucalyptus oil, eugenol, essence, chlorophyll, liquid paraffin Process: Dissolve a certain amount of GSTV90 (product 35-01 of Example 35) and GSTV90-MRP-CA (product 36-01 of Example 36) into the essential balm. The details are as follows.

TABLE 40-1

| Sample composition | | | | |
|---|---|---|---|---|
| Sample | Weight of GSTV90 (product 35-01 of Example 35) | Weight of GSTV90-MRP-CA (product 36-01 of Example 36) | Volume/ weight of essential balm | Evaluation type |
| essential balm | — | | 100 mL | skin smear |
| essential balm + GSTV90 (product 35-01 of Example 35) | 10 mg | | 100 mL | |
| essential balm + GSTV90-MRP-CA (product 36-01 of Example 36) | | 10 mg | 100 mL | |

Experiment: Each sample was evaluated by coolness feeling of skin smear. The sensory evaluation results of the mixture are shown in Table 40-2.

TABLE 40-2

| Sensory evaluation results. | | |
|---|---|---|
| Sample | Evaluation type | Sensory evaluation |
| essential balm | skin smear | |
| essential balm + GSTV90 (product 35-01 of Example 35) | | GSTV90 (product 35-01 of Example 35) can improve coolness onset, coolness intensity and coolness lasting of essential balm |
| essential balm + GSTV90-MRP-CA (product 20-01 of example 20) | | GSTV90-MRP-CA (product 36-01 of Example 36) can improve coolness intensity and coolness lasting of essential balm. |

Conclusion: GSTV90 (product 35-01 of Example 35) and GSTV90-MRP-CA (product 36-01 of Example 36) can improve coolness onset, coolness intensity and coolness lasting of essential balm. This result can extend to all *stevia* extract, glycosylated *stevia* extract and their MRPs.

Example 41. Preparation of Rebaudioside B 90% (RB90) from Rebaudioside A 99% (RA99)

A Rebaudioside B 90% product composition was prepared using Rebaudioside A 99% according to the following method:

Materials: Rebaudioside A 99% (available from Refinebiology. Co., Ltd.). The RA content is shown in Table 41-1. Lot #20150508)

TABLE 41-1

| Contents of Rebaudioside A 99% (m/m %) | | | | | | | | | |
|---|---|---|---|---|---|---|---|---|---|
| RD | RA | STV | RF | RC | Dulc A | RU | RB | STB | TSG(9)* |
| / | 99.36 | / | / | / | / | / | 0.12 | / | 99.48 |

Total steviol glycosides (TSG(9)) include Rebaudioside A, Rebaudioside B, Rebaudioside C, Rebaudioside D, Rebaudioside F, stevioside, steviolbioside, rubusoside, and dulcoside A.

Progress:

i) 200 g Rebaudioside A 99% was dissolved in 800 ml deionized water and 200 mL methanol and incubated at 70° C. for 30 min
ii) 40 g NaOH (dissolved in 200 mL deionized water) was added to i) and incubated at 70° C. for 1.5 h
iii) Adjust the pH to 2.5-3.0 by using 10% HCl and then lots of white powder is precipitated.
iv) filter the white powder with deionized water and then collect them. (The resulting RB is as shown in Table 41-2).

TABLE 41-2

| Contents of Rebaudioside B 90% | | | | | | | | | |
|---|---|---|---|---|---|---|---|---|---|
| RD | RA | STV | RF | RC | Dulc A | RU | RB | STB | TSG(9) |
| / | 0.17 | / | / | / | / | / | 91.4 | 0.15 | 91.72 |

Example 42. Preparation of Rebaudioside B 90% Potassium (RB-K) from Rebaudioside B 90%

Materials: the product of Example 41 RB90

Progress:

i) 50 g RB90 was dissolved in 400 mL deionized water and stir it to turbid liquid
ii) Adjust liquid to clear by using 10% KOH
iii) Spray drying this ii) liquid and thereby yielding 46 g of RB-K as a white powder. (The contents of resulting RB-K are shown in Table 42-1).

TABLE 42-1

| Contents of RB-K (m/m %) | | | | | | | | | |
|---|---|---|---|---|---|---|---|---|---|
| RD | RA | STV | RF | RC | Dulc A | RU | RB | STB | TSG(9) |
| / | 0.12 | / | / | / | / | / | 89.89 | 0.41 | 90.43 |

The equivalent RB-K90 content is 94.13%. (i.e., containing 94.13% of potassium salt of RB)

Example 43. Preparation of Glycosylated Rebaudioside B 90% (GRB90dRB) from RB90

A glycosylated reaction product composition was prepared using Rebaudioside B 90% (product of Ex. 41, RB90) according to the following method:

i) 15 g maltodextrin (BAOLIBAO BIOLOGY Co., Ltd) was dissolved in 45 ml deionized water ii) 15 g RB90 (the product of Example 41) was added to liquefied dextrin to form a mixture and then adjust the pH to 7.4 to make the liquid clear.

iii) 0.75 ml CGTase enzyme (Amano Enzyme, Inc) and 15 ml deionized water were added to the mixture and incubated at 69° C. for 10 hours to glycosylate the RB90 with glucose molecules derived from maltodextrin.

iv) The reaction mixture of iii) was heated to 85° C. for 10 min to inactivate the CGTase, which was then removed by filtration.

v) The resulting solution of glycosylated Rebaudioside B (GRB), residual RB and dextrin were decolored and spray dried, thereby yielding 25 g of GRB90dRB as a white powder (The contents of residual RB is 25.39% and its conversion Rate is 44.4%).

Example 44. Preparation of Glycosylated Rebaudioside A 99% GRA99 or PGRA99 from Rebaudioside A 99%

Materials: Rebaudioside A 99% (available from Refinebiology. Co., Ltd.). The RA content is shown in Table 41-1.)

Experiment (i) 48 g maltodextrin or 60 g β-cyclodextrin and 40 g Rebaudioside A 99% were dissolved in 400 ml deionized water and the pHs were adjusted to 5.9.

(ii) 2 ml CGTase enzyme was added to the mixtures in (i) and incubated at 69° C. for 10 hours to glycosylate the Rebaudioside A 99% compositions via glucose molecules derived from dextrin.

(iii) The reaction mixtures were heated to 85° C. for 10 min to inactivate the CGTase, which was then removed by filtration.

(iv) The resulting solutions of GRA99, residual RA and dextrin were decolored and spray dried, yielding about 70 g as a white powder (for GRA99, the contents of residual RA is 9.308% and its conversion rate is 80.04%; for PGRA99, the contents of residual RA is 3.49% and its conversion rate is 91.28%).

Example 45. Preparation Glycosylated of Rebaudioside B 90 (GRB90dGRA or βGRB90dβGRA) from Glycosylated Rebaudioside A 99% (GRA99 or PGRA99)

Materials: product of Example 44, GRA99 or βGRA99.

Progress:

i) 30 g GRA99 or βGRA99. was dissolved in 240 ml deionized water and incubated at 70° C. for 30 min ii) 4 g NaOH (dissolved in 60 mL deionized water) was added to i) and incubated at 70° C. for 1.5 h iv) Adjust the pH to 7.4 by using 10% HCl v) put the iv) liquid to T28 macroporous resin and then washed the resin with 75% ethanol and spray dried, thereby yielding 25 g of GRB90dGRA or βGRB90dβGRA as a white powder (the contents of residual RB in GRB90dGRA is 29.70% and the contents of residual RB in βGRB90dβGRA is 17.35%).

Example 46. Sensory Evaluation of the Sweetness and Overall Likability of RB90, RB-K90 and GRB90dRB Examples 41-43

Preparation of Sample Solutions:

RB90, RB-K90 and GRB90dRB from Examples 41 to 43 were weighed and uniformly mixed according to the weights shown in Tables 46-1 to 46-3; dissolved in 100 ml pure water; and subjected to a sweetness and overall likability evaluation test.

TABLE 46-1

RB90 sample composition

| No. | Concentration of RB90 (ppm) | Weight of RB90 (g) | Volume of Pure Water (mL) |
|---|---|---|---|
| 46-1-01 | 100 | 0.01 | 100 |
| 46-1-02 | 200 | 0.02 | 100 |
| 46-1-03 | 400 | 0.04 | 100 |
| 46-1-04 | 600 | 0.06 | 100 |
| 46-1-05 | 700 | 0.07 | 100 |

TABLE 46-2

RB-K90 sample composition

| No. | Concentration of RB-K90 (ppm) | Weight of RB-K90 (g) | Volume of Pure Water (mL) |
|---|---|---|---|
| 46-2-01 | 100 | 0.01 | 100 |
| 46-2-02 | 200 | 0.02 | 100 |
| 46-2-03 | 400 | 0.04 | 100 |
| 46-2-04 | 600 | 0.06 | 100 |
| 46-2-05 | 700 | 0.07 | 100 |
| 46-2-06 | 1000 | 0.1 | 100 |
| 46-2-07 | 1200 | 0.12 | 100 |

TABLE 46-3

GRB90dRB sample composition

| No. | Concentration of $GRB90_{dRB}$ (ppm) | Weight of $GRB90_{dRB}$(g) | Volume of Pure Water (mL) |
|---|---|---|---|
| 46-3-01 | 150 | 0.015 | 100 |
| 46-3-02 | 250 | 0.025 | 100 |
| 46-3-03 | 500 | 0.05 | 100 |
| 46-3-04 | 700 | 0.07 | 100 |
| 46-3-05 | 900 | 0.09 | 100 |

The sugar equivalence and overall likability (an overall likability score of 4 or above means very good taste, an overall likability score of 3 or above means palabable taste) of above solutions were evaluated by the Sensory evaluation.

The results are shown in Tables 46-4 to 46-6.

TABLE 46-4

SugarE and overall likability evaluation of RB90

| No. | Concentration of RB90 (ppm) | Sugar Equivalence | Overall likability | comment |
|---|---|---|---|---|
| 46-1-01 | 100 | 1 | 4 | Sugar like |
| 46-1-02 | 200 | 2 | 3.5 | Sugar like |
| 46-1-03 | 400 | 3 | 3 | sweet lingering |
| 46-1-04 | 600 | 4 | 2 | Metallic aftertaste, sweet lingering |
| 46-1-05 | 700 | / | / | insoluble |

TABLE 46-5

SE and overall likability evaluation of RB-K90

| No. | Concentration of RB-K90 (ppm) | Sugar Equivalence | Overall likability | comment |
|---|---|---|---|---|
| 46-2-01 | 200 | 2 | 5 | Sugar like |
| 46-2-02 | 300 | 4.2 | 4 | A little metallic aftertaste, Sugar like |
| 46-2-03 | 400 | 6 | 3 | metallic aftertaste |
| 46-2-04 | 600 | 8 | 2.5 | Metallic aftertaste, sweet lingering |
| 46-2-05 | 800 | 10 | 2 | Strong metallic aftertaste, sweet lingering |
| 46-2-06 | 1000 | 12 | 2 | Strong metallic aftertaste, sweet lingering |

TABLE 46-6

SE and overall likability evaluation of GRB90dRB

| No. | Concentration of $GRB90_{dRB}$ (ppm) | Sugar Equivalence | Overall likability | comment |
|---|---|---|---|---|
| 46-3-01 | 150 | 1 | 4 | |
| 46-3-02 | 250 | 2 | 3.8 | |
| 46-3-03 | 500 | 4 | 3.2 | a little sweet lingering |
| 46-3-04 | 700 | 6 | 2.5 | Metallic aftertaste, sweet lingering |
| 46-3-05 | 900 | 6 | 2 | Metallic aftertaste, sweet lingering, bitterness |

Data analysis: The SugarE of different concentrations of RB90, RB-K90 and GRB90dRB in this Example are shown in FIG. 9, Panel A-C.

The overall likability of different SugarE of RB90, RB-K90 and GRB90dRB in this Example are shown in FIG. 9, Panel D.

Conclusion: As shown in FIG. 9, Panel D, the taste of RB90 was unpalatable even at low SugarE level. However, when modified by glycosylation, the taste was improved. The SugarE at which the taste can be palatable increased from 3% to 4% SugarE. When Alkaline hydrolyse RB90 to RB-K90, the SugarE at which the taste can be palatable increased from 3% SugerE to 6% RB-K90. The sweetness curve of RB-K90 is linear and its highest sugar equivalence can exceed 10 SugarE. This example demonstrates that the overall likability of RB90 can be modified by glycosylation or alkaline hydrolysis.

Example 47. Sensory Evaluation Comparison of GRB90dRB (the Product 43-1 of Example 43), GRB90dGRA (the Product 45-1 in Example 45) and βGRB90dβGRA (the Product 45-2 in Example 45)

Materials:

GRB90dRB, the product 43-1 in Example 43.

GRB90dGRA, the product 45-1 in Example 45.

βGRB90dβGRA, the product 45-2 in Example 45

Progress: All the samples were weighed, uniformly mixed and dissolved in 100 ml pure water as shown in Table 47-1 prior to being subjected to the sensory evaluation tests described below.

TABLE 47-1

Test sample composition preparation.

| No. | Weight of $GRB90_{dRB}$ (the product 43-1 in Example 43) (mg) | Weight of $GRB90_{dGRA}$ (the product 45-1 in Example 45) (mg) | Weight of $\beta GRB90_{d\beta GRA}$ (the product 45-2 in Example 45) (mg) | Volume of pure water (mL) |
|---|---|---|---|---|
| 47-1 | 60 | | | 100 |
| 47-2 | | 60 | | 100 |
| 47-3 | | | 60 | 100 |

Experiment: Each sample was evaluated according to the sensory evaluation method. Average scores from the test panel for each sensory criterium were recorded as the evaluation test results. The resulting taste profiles of the mixtures are shown in Table 47-2.

TABLE 47-2

Sensory evaluation of sweetener compositions.

| No. | Overall likability | Sweet onset | Sweet peak | Sweet lingering | Metallic aftertaste |
|---|---|---|---|---|---|
| 47-1 | 4 | 3 | 3.5 | 3 | 2 |
| 47-2 | 4.5 | 4 | 4 | 2 | 3 |
| 47-3 | 2.5 | 2.5 | 3 | 3 | 3 |

Conclusion: Compared with GRB90dRB (the product 43-1 of Example 43), the sweet onset, sweet lingering and sweet peak of GRB90dGRA (the product 45-1 of Example 45) is better, but its metallic aftertaste is a little stronger. However, sweet profile of βGRB90dβGRA (the product 45-2 of Example 45) is the worst of all the three.

Example 48. Preparing of Rebaudioside A 30% (RA30) from *Stevia* Leaves

Materials: *Stevia* leaves, Ca(OH)2 (Sinophann Chemical Reagent Co., Ltd), FeSO4 (Sinopharm Chemical Reagent Co., Ltd)

Process:

(i) 100 g crushed *stevia* leaves was dissolved in 1 L deionized water and stirred at 65-70° C. for 2 hours and then filter out the *stevia* leaves and collected.

(ii) 100 g the above (i) collected *stevia* leaves was dissolved in 500 mL deionized water and stirred at 65-70° C. for 1 hour and then filtered.

(iii) the solutions in the above (i) and (ii) were mixed and passed through a 100-mesh filter bag
(iv) 0.3-0.35% FeSO4 was added to above (i) solution and adjust the pH to 9-10 by using Ca(OH)2.
(v) the above (iv) solution was filtered and collected its solution.
(vi) the solution from (v) was treated with cation exchange resin (Xi'an Lanxiao Technology New Material Co., Ltd) and then anion exchange resin (Xi'an Lanxiao Technology New Material Co., Ltd).
(vii) the solution from (vi) was filtered by 300 Dalton membrane and collect its concentrated solution.
(viii) the solution from (vii) was spray dried and yield RA30 (the contents of are shown in Table 48-1)

TABLE 48-1

| Contents of RA30 (m/m %) | | | | | | | | | | |
|---|---|---|---|---|---|---|---|---|---|---|
| Name | RD | RA | STV | RF | RC | DA | RU | RB | STB | TSG |
| RA30 | / | 33.28 | 2.2 | 0.52 | 2.86 | / | 0.09 | 0.92 | / | 39.88 |

Example 49. Preparation of Maltodextrin Glycosylated RA 30% (GRA30)

A glycosylated reaction product composition was prepared using Rebaudioside A 30% (product of Ex. 48, RA30) according to the following method:
(i) 15 g maltodextrin (BAOLIBAO BIOLOGY Co., Ltd) was dissolved in 45 ml deionized water
(ii) 15 g RA30 (the product of Ex. 48) was added to liquefied dextrin to form a mixture.
(iii) 0.75 ml CGTase enzyme (Amano Enzyme, Inc.) and 15 ml deionized water were added to the mixture and incubated at 69° C. for 20 hours to glycosylate the RA30 with glucose molecules derived from maltodextrin.
(iv) The reaction mixture of (iii) was heated to 85° C. for 10 min to inactivate the CGTase, which was then removed by filtration.
(v) The resulting solution of glycosylated RA (GRA), residual RA and dextrin were decolored and spray dried, thereby yielding 25 g of GRA30 as a white powder (the contents are shown in Table 49-1)

TABLE 49-1

| Contents of GRA30 (m/m %) | | | | | | | | | | |
|---|---|---|---|---|---|---|---|---|---|---|
| Name | RD | RA | STV | RF | RC | DA | RU | RB | STB | TSG |
| GRA30 | / | 3.27 | 0.2 | / | 0.27 | / | 0.08 | 0.38 | / | 4.19 |

Example 50. Analysis Comparison of RA30 and GRA30

Analysis Method:
Materials:

GRA30, product of Example 49. RA30, product of Example 48.

Reference standards (to qualify the analytical method) for steviolglycosides (Reb A, Reb B, Reb C, Reb D, Reb E, Reb F, Reb G, Reb I, Reb M, Reb N, Reb O, Stevioside, Isoreb A, Isostevioside) were obtained from Chromadex (LGC Germany). Solvents and reagents (HPLC grade) were obtained from VWR (Vienna) or Sigma-Aldrich (Vienna).

Davisil Grade 633 (high-purity grade silica gel, pore size 60 Å, 200-425 mesh particle size was obtained from Sigma-Aldrich (Vienna).

Sample Preparation (HPLC/DAD/MS):

All samples were fractionated over a glass column (100×5 mm) filled with Davisil Grade 633. The column was equilibrated with ethlyacetate/Acetic acid/H2O=8/3/2 (v/v/v). 100 mg sample, dissolved in 2 ml H2O, were loaded on the column and eluted with ethlyacetate/Acetic acid/H2O=8/3/2 at a flow rate of 2 ml/min. The first 6 ml of the eluate were discarded and the next 30 ml containing unreacted steviolglycosides were collected. Enzymatically reacted steviolglycosides eluted in the range of 36-70 ml and were again collected.

After fractionation of 3 samples, the pooled eluates were evaporated to dryness and reconstituted in 20 ml Acetonitrile/H2O=9/1 (v/v) corresponding to an equivalent sample concentration of 150 mg sample/10 ml.

The method was qualified by fractionation of steviolglycoside standards and enzymatically reacted steviol-glycosides. An elution yield of >97% of steviol-glycosides and of >95% enzymatically reacted steviol-glycosides was observed, the carry over between the fraction was calculated to less than 3%.

The pooled, evaporated samples were used for analysis of steviol-related compounds as well as for non-volatile non-steviol-related compounds.

HPLC-Method:

The HPLC system consisted of an Agilent 1100 system (autosampler, ternary gradient pump, column thermostat, VWD-UV/VIS detector, DAD-UV/VIS detector) connected in-line to an Agilent mass spectrometer (ESI-MS quadrupole G1956A VL). For HPLC analysis 150 mg of the corresponding sample was dissolved in Acetonitrile (1 ml) and filled up to 10 ml with H2O.

The samples were separated at 0.8 ml/min on a Phenomenex Synergi Hydro-RP (150×3 mm) followed by a Macherey-Nagel Nucleosil 100-7 C18 (250×4.6 mm) at 45° C. by gradient elution. Mobile Phase A consisted of a 0.01 molar NH4-Acetate buffer (native pH) with 0.1% acetic acid, 0.05% trimethylamine and 0.001% dichloromethane. Mobile Phase B consisted of 0.01 molar NH4-Acetate buffer (native pH) and Acetonitrile (1/9 v/v) with 0.1% acetic acid, 0.05% trimethylamine and 0.001% dichloromethane. The gradient started with 22% B, was increased linearly in 20 minutes to 45% B and kept at this condition for another 15 minutes. Injection volume was set to 10 µl.

The detectors were set to 210 nm (VWD), to 205 and 254 nm (DAD with spectra collection between 200-600 nm) and to ESI negative mode TIC m/z 300-1500, Fragmentor 200, Gain 2 (MS, 300° C., nitrogen 12 l/min, nebulizer setting 50 psig. Capillary voltage 4500 V).

Detection at 205 and 210 nm were used to quantify the chromatograms, the MS-spectra were used to determine the molar mass and structural information of individual peaks. Detection at 254 nm was used to identify non-steviol glycoside peaks.

Samples were quantified by external standardization against reference compounds of Reb A or stevioside, in case where no authentic reference standard was available, the peak area was quantified against the reference standard with the most similar mass and corrected for the molar mass differences. The calibration range of reference standards was in a range 1-75 mg/10 ml (dissolved in Acetonitrile/H2O=9/1 (v/v)).

Identification and Quantification:

Steviol-glycosides and enzymatically reacted steviol-glycosides were identified by comparison of retention times to authentic reference standards and/or by evaluation of the mass spectra obtained (including interpretation of the fragmentation pattern and double charged ions triggered by the presence of dichloromethane).

Steviol-glycosides were quantified against external standards. In case that no reference standard was available quantification was performed against the reference standard with the most similar molar mass.

Sample Preparation (GC/MS):

1 g of the sample was dissolved in 100 ml water and transferred in a round flask used for water steam distillation.

The sample was submitted to a combined water steam distillation and solvent extraction/concentration process as shown in the following FIG. 11. One ml of the organic solvent used was ethyl acetate placed between the bubbles HJ and L.

The steam distillation was performed for 120 minutes. The ethyl acetate was collected and injected onto the GC/MS system.

| | |
|---|---|
| Mobile Phase: | He |
| Column: | Agilent DB-5 60.0 m × 0.25 mm I.D., 0.25 μm |
| Oven Program | 90° C. (3 min), 10° C./min to 300° C. (hold 5 min) |
| Constant Flow | 1.5 ml/min |
| Injection Temperature | 240° C. |
| Transfer Line Temperature | 250° C. |
| MS Mode | EI, TIC Full Scan (90-270 m/z) |
| Injection Liquid | 1.0 μl (splitless) |
| Ion Source Temperature | 240° C. |

Results:

The contents of RA30 and GRA30 are shown in Table 50-1

TABLE 50-1 contents of RA30 and GRA30

| SG-group | Individual SG (unreacted part) | SG-{ }-Added Glucose (reacted part) | [Mr] | RA30 % (m/m) | GRA30 % (m/m) |
|---|---|---|---|---|---|
| SG-2G | Rubusoside | — | 642 | 0.103 | 0.260 |
| | Stev-Bios | — | 642 | 0.329 | 0.116 |
| SG-3G | Reb-B | — | 804 | 0.512 | 0.066 |
| | Reb-G | — | 804 | 0.284 | 0.097 |
| | Stevioside | — | 804 | 2.63 | 0.091 |
| | Re-KA | — | 804 | 0.0582 | 0.020 |
| | Stevioside B | — | 804 | 0.1266 | 0.071 |
| | | SG-3G-2 | 1128 | — | 4.453 |
| | | SG-3G-3 | 1290 | — | 1.814 |
| | | SG-3G-4 | 1452 | — | 0.865 |
| | | SG-3G-7 | 1938 | — | 0.786 |
| | | SG-3G-8 | 2100 | — | 1.164 |
| SG-4G | Reb-A | — | 966 | 39.80 | 2.829 |
| | Reb A2 | — | 966 | 0.889 | 0.476 |
| | Reb-E | — | 966 | 0.4233 | 0.184 |
| | Reb H1 | — | 966 | 0.11 | 0.052 |
| | | SG-4G-1 | 1128 | — | 3.929 |
| | | SG-4G-2 | 1290 | — | 0.485 |
| | | SG-4G-3 | 1452 | — | 0.722 |
| | | SG-4G-7 | 2100 | — | 1.964 |
| SG-5G | Reb D | — | 1128 | 1.902 | 0.249 |
| | Reb I | — | 1128 | 0.1015 | 0.041 |
| | Reb L | — | 1128 | 0.1087 | 0.055 |
| | Reb Q | — | 1128 | 0.23 | 0.072 |
| | Reb I2 | — | 1128 | 0.1095 | 0.066 |

TABLE 50-1-continued contents of RA30 and GRA30

| SG-group | Individual SG (unreacted part) | SG-{ }-Added Glucose (reacted part) | [Mr] | RA30 % (m/m) | GRA30 % (m/m) |
|---|---|---|---|---|---|
| | | SG-5G-1 | 1290 | — | 0.144 |
| | | SG-5G-2 | 1452 | — | 0.122 |
| | | SG-5G-3 | 1614 | — | 0.620 |
| | | SG-5G-4 | 1776 | — | 0.121 |
| | | SG-5G-5 | 1938 | — | 0.995 |
| SG-6G | Reb M | — | 1290 | 0.901 | 0.317 |
| | | SG-6G-3 | 1776 | — | 0.440 |
| SG-2G1R | Dulcoside A | — | 788 | 0.371 | 0.141 |
| | Dulcoside B | — | 788 | 0.765 | 0.317 |
| SG-3G1R | Reb C | — | 950 | 0.691 | 0.302 |
| | Reb S | — | 950 | 0.486 | 0.186 |
| | Reb H | — | 950 | 0.37 | 0.145 |
| | | SG-3G1R-3 | 1436 | — | 2.295 |
| SG-4G1R | Reb J | — | 1112 | 0.09 | 0.056 |
| | Reb K | — | 1112 | 0.07 | 0.037 |
| | Reb K2 | — | 1112 | 0.17 | 0.073 |
| | | SG-4G1R-6 | 2084 | — | 1.424 |
| | | SG-4G1R-4 | 1760 | — | 1.181 |
| | | SG-4G1R-3 | 1598 | — | 0.095 |
| | | SG-4G1R-2 | 1436 | — | 0.340 |
| SG-5G1R | Reb N | — | 1274 | 0.61 | 0.203 |
| | | SG-5G1R-4 | 1922 | — | 1.666 |
| SG-6G1R | Reb O | — | 1436 | 0.2097 | 0.103 |
| | | SG-6G1R-2 | 1760 | — | 0.921 |
| | | SG-6G1R-1 | 1598 | — | 0.623 |
| SG-3G1X | Reb F | — | 936 | 1.046 | 0.496 |
| | Reb R | — | 936 | 0.453 | 0.164 |
| | | SG-3G1X-5 | 1746 | — | 0.521 |
| | | SG-3G1X-4 | 1584 | — | 1.308 |
| SG-4G1X | Reb U | — | 1098 | 0.1253 | 0.426 |
| | Reb T | — | 1098 | 0.04 | <0.03 |
| | Reb W | — | 1098 | 0.06 | <0.03 |
| | Reb W2 | — | 1098 | 0.06 | <0.03 |
| | | SG-4G1X-4 | 1746 | — | 0.554 |
| | | SG-4G1X-3 | 1584 | — | 1.284 |
| | | SG-4G1X-2 | 1422 | — | 0.530 |
| | | SG-4G1X-1 | 1260 | — | 0.681 |
| SG-5G1X | Reb V | — | 1260 | 0.963 | 0.574 |
| | | SG-5G1X-1 | 1422 | — | 0.787 |
| Sum I (% m/m) | | | | 55.2 | 41.1 |

Nutritional Analysis

The Nutrition contents of RA30 and GRA30 are shown in Table 50-2

TABLE 50-2

Nutrition contents of RA30 and GRA30

| Type | RA30 % (m/m) | GRA30 % (m/m) |
|---|---|---|
| Carbohydrates | 40.6 | 54.8 |
| thereof Disaccharides | 1.290 | 4.03 |
| thereof Monosaccharides | 2.49 | 1.59 |
| thereof TOA (Malic Acid) | 0.2590 | 0.221 |
| thereof Polyols | 1.287 | 1.30 |
| Sorbitol | 0.166 | 0.126 |
| Mannitol | 0.0427 | 0.0366 |
| Isomalt | <0.01 | <0.01 |
| Maltitols | 0.0381 | 0.0304 |
| Lactitol | <0.01 | <0.01 |
| Xylitol | 0.0397 | 0.0413 |
| Erythritol | 0.0624 | 0.0531 |

TABLE 50-2-continued

| Nutrition contents of RA30 and GRA30 | | |
|---|---|---|
| Type | RA30 % (m/m) | GRA30 % (m/m) |
| Fat | 0.109 | 0.0983 |
| Protein | 0.786 | 0.799 |
| Ash (Residue on ignition) | 0.228 | 0.193 |
| Sum II (% m/m) | 96.9 | 97.0 |
| Water Content | 3.09 | 3.01 |
| Sum III (% m/m on dry basis) | 100 | 100 |

Example 51. Sensory Evaluation Comparison of GRA30 with RA30

Materials:

GRA30, product of Example 49.

RA30, product of Example 48.

All the samples were weighed, uniformly mixed and dissolved in 100 ml pure water as shown in Table 51-1 prior to being subjected to the sensory evaluation tests described below.

TABLE 51-1

| Test sample composition preparation. | | | |
|---|---|---|---|
| No. | concentration of RA30 (ppm) | concentration of GRA30 (ppm) | Volume of pure water (mL) |
| 51-1 | 200 | | 100 |
| 51-2 | | 380 | 100 |

Experiment: Each sample was evaluated according to the sensory evaluation method. Average scores from the test panel for each sensory criterium were recorded as the evaluation test results. The resulting taste profiles of the mixtures are shown in Table 51-2.

TABLE 51-2

| Sensory evaluation of sweetener compositions. | | | | | | |
|---|---|---|---|---|---|---|
| No. | sugar equivalence | Flavor | Overall likability | Mouth feel | Sweet lingering | Metallic after-taste |
| RA30 200 ppm | 1.5 | herb | 3 | 2 | 3 | 3 |
| GRA30 380 ppm | 1.5 | no herb | 4 | 4 | 2 | 1 |

Conclusion: in the same sugar equivalence, the mouth feel of GRA30 is better than RA30, with no metallic aftertaste and herb flavor. In addition, the sweet lingering is decreased by glycosylation.

Example 52. Preparing of Rubusoside 30% (RU30) from Chinese Sweet Tea Leaves

Materials: Chinese sweet tea leaves, Ca(OH)2 (Sinopharm Chemical Reagent Co., Ltd), FeSO4 (Sinopharm Chemical Reagent Co., Ltd)

Process:

(i) 100 g crushed Chinese sweet tea leaves was dissolved in 1.5 L deionized water and stirred at 70-80° C. for 1 hours and then filter out the waste.

(ii) 0.3-0.35% FeSO4 was added to above (i) solution and adjust the pH to 9-10 by using Ca(OH)2.

(iii) the above (ii) solution was filtered and collected its solution.

(iv) the solution from (iii) was treated with cation exchange resin (Xi'an Lanxiao Technology New Material Co., Ltd) and then anion exchange resin (Xi'an Lanxiao Technology New Material Co., Ltd).

(v) the solution from (iv) was filtered by 300 Dalton membrane and collect its concentrated solution.

(vi) the solution from (v) was spray dried and yield RU30. The contents of are shown in Table 52-1.

TABLE 52-1

| Contents of RU30 (m/m %) | |
|---|---|
| Steviol-Related Compounds % (m/m) | |
| Stev | 0.38 |
| Rub | 31.01 |
| Stev-Mon | 0.38 |
| Reb-A | 0.05 |
| Suavioside A | <0.01 |
| Suavioside B | 0.15 |
| Suavioside D1/D2 | 0.03 |
| Suavioside E | 0.03 |
| Suavioside F | <0.01 |
| Suavioside H | 0.07 |
| Suavioside K | 0.06 |
| Suavioside L | <0.01 |
| Suavioside O | <0.01 |
| Suavioside Q1/Q2 | 0.07 |
| Suavioside S1/S2 | 0.05 |
| 9-OH Suav J | 0.04 |
| Sum (% m/m) | 32.32 |
| Non-Steviol compounds % (m/m) | |
| 3-Caffeoylquinic acid | 0.68 |
| 4-Caffeoylquinic acid | 0.91 |
| 5-Caffeoylquinic acid | 0.06 |
| 3,5-Dicaffeoylquinic acid | 0.29 |
| 3,4-Dicaffeoylquinic acid | 0.18 |
| 4,5-Dicaffeoylquinic acid | 0.37 |
| Kaempferol-hexoside | 0.64 |
| Quercetin-pentoside | 0.32 |
| Kaempferol-xyloside-hexoside | 0.60 |
| Quercetin-dihexoside-rhamnoside | 0.35 |
| Quercetin-dirhamnoside | 0.43 |
| Sum (% m/m) | 4.84 |

Example 53. Preparation of Maltodextrin Glycosylated RU 30% (GRU30) and β-Cyclodextrin Glycosylated RU 30% (βGRU30)

A glycosylated reaction product composition was prepared using Rubusoside 30% (product of Example 52) according to the following method:

(i) 15 g maltodextrin (BAOLIBAO BIOLOGY Co., Ltd) or β-cyclodextrin (Wacker Chemical Corp.) was dissolved in 45 ml deionized water (ii) 15 g RU30 (product of Example 52) was added to liquefied dextrin to form a mixture.

(iii) 0.75 ml CGTase enzyme (Amano Enzyme, Inc.) and 15 ml deionized water were added to the mixture and incubated at 69° C. for 20 hours to glycosylate the RU30 with glucose molecules derived from maltodextrin or β-cyclodextrin.

(iv) The reaction mixture of (iii) was heated to 85° C. for 10 min to inactivate the CGTase, which was then removed by filtration.

(v) The resulting solution of glycosylated rubusoside (GRU), residual RU and dextrin were decolored and spray dried, thereby yielding 25 g of GRU30 (product of 53-01 in Example 53) or βGRU30 (product of 53-02 in Example 53) as a white powder (the contents are shown in Table 53-1).

-continued

| | Number of | % (m/m) | | |
|---|---|---|---|---|
| Compound | glc added | RU 30 | GRU 30 | β-GRU 30 |
| Suavioside K | n.a. | 0.0555 | 0.0194 | 0.0177 |
| Suavioside L | n.a. | <0.01 | <0.01 | <0.01 |
| Suavioside O | n.a. | <0.01 | <0.01 | <0.01 |
| Suavioside Q1/Q2 | n.a. | 0.0734 | 0.0254 | 0.0231 |
| Suavioside S1/S2 | n.a. | 0.0476 | 0.0163 | 0.0142 |
| 9-OH Suav J | n.a. | 0.0410 | 0.0137 | 0.0121 |
| Rub (α- ) 1 Glc | 1 | BLD | 0.22 | 0.17 |
| Rub (α- ) 1 Glc | 1 | BLD | 5.02 | 4.04 |
| Rub (α- ) 2 Glc | 2 | BLD | 6.10 | 5.95 |

TABLE 2-1

| Contents of GRU 30 and β-GRU 30. | | | | | | | | | | | |
|---|---|---|---|---|---|---|---|---|---|---|---|
| GRU 30 (15 mg/ml) - Product 53-01 | | | | | | β-GRU 30 (15 mg/ml) - Product 53-02 | | | | | |
| Ret.Time (min) | Area | +glc | m/z | mg/ml | % (m/m) | Ret.Time (min) | Area | +glc | m/z | mg/ml | % (m/m) |
| 40.9 | — | — | — | — | | 40.9 | 290.6 | 7 | 1937 | 0.08 | 0.51 |
| 42.7 | — | — | — | — | | 42.7 | 427.7 | 7 | 1937 | 0.12 | 0.79 |
| 43.4 | — | — | — | — | | 43.4 | 483.0 | 6 | 1775 | 0.12 | 0.83 |
| 43.8 | — | — | — | — | | 43.8 | 135.9 | 6 | 1775 | 0.03 | 0.17 |
| 44.0 | — | — | — | — | | 44.0 | 216.3 | 6 | 1775 | 0.05 | 0.32 |
| 44.5 | — | — | — | — | | 44.5 | 499.0 | 6 | 1775 | 0.13 | 0.86 |
| 45.1 | 428.6 | 5 | 1613 | 0.10 | 0.66 | 45.1 | 897.6 | 5 | 1613 | 0.22 | 1.48 |
| 45.7 | 299.3 | 5 | 1613 | 0.07 | 0.44 | 45.7 | 731.1 | 5 | 1613 | 0.18 | 1.19 |
| 46.2 | 246.3 | 5 | 1613 | 0.05 | 0.34 | 46.2 | 490.9 | 5 | 1613 | 0.12 | 0.77 |
| 46.8 | 503.6 | 5 | 1451 | 0.11 | 0.71 | 46.8 | 900.7 | 5 | 1451 | 0.20 | 1.34 |
| 47.4 | — | — | — | — | | 47.4 | 214.5 | 4 | 1451 | 0.04 | 0.26 |
| 48.1 | 1000.1 | 4 | 1451 | 0.22 | 1.49 | 48.1 | 1582.6 | 4 | 1451 | 0.36 | 2.41 |
| 48.6 | 190.0 | 4 | 1451 | 0.03 | 0.22 | 48.6 | 371.1 | 4 | 1451 | 0.08 | 0.51 |
| 49.0 | 538.4 | 4 | 1451 | 0.12 | 0.77 | 49.0 | 753.6 | 4 | 1451 | 0.17 | 1.11 |
| 49.5 | 460.7 | 4 | 1289 | 0.09 | 0.57 | 49.5 | 748.8 | 4 | 1289 | 0.15 | 0.98 |
| 50.2 | 393.1 | 4 | 1289 | 0.07 | 0.48 | 50.2 | 430.4 | 4 | 1289 | 0.08 | 0.53 |
| 50.7 | 1939.3 | 4 | 1289 | 0.40 | 2.64 | 50.7 | 2513.8 | 4 | 1289 | 0.52 | 3.44 |
| 51.4 | 826.4 | 3 | 1127 | 0.14 | 0.95 | 51.4 | 988.5 | 3 | 1127 | 0.17 | 1.15 |
| 52.0 | 1180.0 | 3 | 1127 | 0.21 | 1.38 | 52.0 | 1408.6 | 3 | 1127 | 0.25 | 1.66 |
| 52.6 | 874.2 | 3 | 1127 | 0.15 | 1.01 | 52.6 | 1067.5 | 3 | 1127 | 0.19 | 1.24 |
| 53.1 | 1859.1 | 2 | 965 | 0.92 | 6.10 | 53.1 | 1810.9 | 2 | 965 | 0.89 | 5.95 |
| 53.5 | 1555.8 | 2 | 965 | 0.77 | 5.11 | 53.5 | 1464.5 | 2 | 965 | 0.72 | 4.81 |
| 53.9 | 2209.0 | 2 | 965 | 1.09 | 7.26 | 53.9 | 2165.5 | 2 | 965 | 1.07 | 7.11 |
| 54.4 | 340.2 | 1 | 803 | 0.03 | 0.22 | 54.4 | 275.5 | 1 | 803 | 0.03 | 0.17 |
| 55.0 | 6548.3 | 1 | 803 | 0.75 | 5.02 | 55.0 | 5287.9 | 1 | 803 | 0.61 | 4.04 |
| 56.8 | 6488.3 | RU (0) | 641 | 0.67 | 4.46 | 56.8 | 4166.2 | RU (0) | 641 | 0.43 | 2.85 |
| Sum of RU/GRU (mg/ml) and % (m/m): | | | | 10.15 | 39.8 | Sum of RU/GRU (mg/ml) and % (m/m): | | | | 14.62 | 46.5 |

Example 54. Analysis of RU30, GRU30 (Product of 53-01 in Example 2) and BGRU30 (Product of 53-02 in Example 2)

Materials: RU30, product of 52-01 in Example 52
GRU30, product of 53-01 in Example 53
βGRU30, product of 53-02 in Example 53

| | Number of | % (m/m) | | |
|---|---|---|---|---|
| Compound | glc added | RU 30 | GRU 30 | β-GRU 30 |
| Stev | n.a. | 0.381 | n.d. | n.d. |
| Rub | n.a. | 31.0 | 4.46 | 2.85 |
| Stev-Mon | n.a. | 0.379 | 0.107 | 0.0931 |
| Reb-A | n.a. | 0.045 | n.d. | n.d. |
| Suavioside A | n.a. | <0.01 | <0.01 | <0.01 |
| Suavioside B | n.a. | 0.148 | 0.0504 | 0.0466 |
| Suavioside D1/D2 | n.a. | 0.0336 | 0.0119 | <0.01 |
| Suavioside E | n.a. | 0.0306 | 0.0110 | <0.01 |
| Suavioside F | n.a. | <0.01 | <0.01 | <0.01 |
| Suavioside H | n.a. | 0.0720 | 0.0258 | 0.0221 |

-continued

| | Number of | % (m/m) | | |
|---|---|---|---|---|
| Compound | glc added | RU 30 | GRU 30 | β-GRU 30 |
| Rub (α- ) 2 Glc | 2 | BLD | 5.11 | 4.81 |
| Rub (α- ) 2 Glc | 2 | BLD | 7.26 | 7.11 |
| Rub (α- ) 3 Glc | 3 | BLD | 0.95 | 1.15 |
| Rub (α- ) 3 Glc | 3 | BLD | 1.38 | 1.66 |
| Rub (α- ) 3 Glc | 3 | BLD | 1.01 | 1.24 |
| Rub (α- ) 4 Glc | 4 | BLD | <0.01 | 0.26 |
| Rub (α- ) 4 Glc | 4 | BLD | 1.49 | 2.41 |
| Rub (α- ) 4 Glc | 4 | BLD | 0.22 | 0.51 |
| Rub (α- ) 4 Glc | 4 | BLD | 0.77 | 1.11 |
| Rub (α- ) 4 Glc | 4 | BLD | 0.57 | 0.98 |
| Rub (α- ) 4 Glc | 4 | BLD | 0.48 | 0.53 |
| Rub (α- ) 4 Glc | 4 | BLD | 2.64 | 3.44 |
| Rub (α- ) 5 Glc | 5 | BLD | | 1.48 |
| Rub (α- ) 5 Glc | 5 | BLD | 0.44 | 1.19 |
| Rub (α- ) 5 Glc | 5 | BLD | 0.34 | 0.77 |
| Rub (α- ) 5 Glc | 5 | BLD | 0.71 | 1.34 |
| Rub (α- ) 6 Glc | 6 | BLD | <0.01 | 0.83 |
| Rub (α- ) 6 Glc | 6 | BLD | <0.01 | 0.17 |

-continued

| Compound | Number of glc added | % (m/m) RU 30 | GRU 30 | β-GRU 30 |
|---|---|---|---|---|
| Rub (α- ) 6 Glc | 6 | BLD | <0.01 | 0.32 |
| Rub (α- ) 6 Glc | 6 | BLD | <0.01 | 0.86 |
| Rub (α- ) 7 Glc | 7 | BLD | <0.01 | 0.51 |
| Rub (α- ) 7 Glc | 7 | BLD | <0.01 | 0.79 |
| 3-Caffeoylquinic acid | n.a. | 0.676 | 0.229 | 0.244 |
| 4-Caffeoylquinic acid | n.a. | 0.915 | 0.307 | 0.294 |
| 5-Caffeoylquinic acid | n.a. | 0.0637 | 0.022 | 0.024 |
| 3,5-Dicaffeoylquinic acid | n.a. | 0.285 | 0.096 | 0.114 |
| 3,4-Dicaffeoylquinic acid | n.a. | 0.183 | 0.058 | 0.063 |
| 4,5-Dicaffeoylquinic acid | n.a. | 0.366 | 0.121 | 0.138 |
| Kaempferol-hexoside | n.a. | 0.644 | 0.213 | 0.239 |
| Quercetin-pentoside | n.a. | 0.320 | 0.106 | 0.106 |
| Kaempferol-xyloside-hexoside | n.a. | 0.603 | 0.193 | 0.225 |
| Quercetin-dihexoside-rhamnoside | n.a. | 0.353 | 0.125 | 0.120 |
| Quercetin-dirhamnoside | n.a. | 0.431 | 0.152 | 0.167 |
| Sum: (Sweet leave specific) | | 37.157 | 41.071 | 48.423 |
| Residual cyclodextrin | | n.a. | 9.73 | 8.46 |
| Water content | | 2.870 | 2.590 | 2.990 |
| Ash | | 0.116 | 0.184 | 0.207 |
| Fat | | 0.0236 | 0.0301 | 0.0211 |
| Protein | | 0.308 | 0.249 | 0.362 |
| Carbohydrates | | 59.5 | 46.1 | 39.5 |
| Sum: (Total) | | 100.000 | 100.000 | 100.000 |

The above description is for the purpose of teaching a person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the claimed components and steps in any sequence which is effective to meet the objectives there intended, unless the context specifically indicates the contrary.

What is claimed is:

1. A glycosylated steviol glycoside (GSG) composition, comprising GSG in a total amount of 40-99.9 wt % of the GSG composition, wherein the GSG composition contains mono-glycosylated SG, di-glycosylated SG, tri-glycosylated SG, tetra-glycosylated SG, and penta-glycosylated SG, in a total amount that is in the range of 1-99 wt % of the total GSG, wherein the GSG composition contains greater than 5 wt % and less than 60 wt % of mono-glycosylated SG, and wherein the GSG composition contains greater than 5 wt % and less than 60 wt % of di-glycosylated SG.

2. The GSG composition of claim 1, further comprising unreacted steviol glycosides (SGs) in an amount of 0.1-30 wt % of the GSG composition.

3. The GSG composition of claim 2, wherein the unreacted SGs comprise unreacted rebaudioside A or unreacted stevioside.

4. The GSG composition of claim 1, further comprising dextrin and maltodextrin in an amount of 0.1-30 wt % of the GSG composition.

5. The GSG composition of claim 1, wherein the GSG is produced by subjecting a high purity SG (hpSG) to a glycosylation reaction.

6. The GSG composition of claim 1, wherein the GSG is produced by a conversion reaction.

7. A sweetener or flavoring agent composition, comprising the GSG composition of claim 1 in an amount of 0.0001-99.5 wt % of the sweetener or flavoring agent composition.

8. The sweetener or flavoring agent composition of claim 7, further comprising a sugar or a high intensity sweetener (HIS).

9. The sweetener or flavoring agent composition of claim 8, wherein the HIS is selected from the group consisting of *stevia* extracts, steviol glycosides, monk fruit extracts, mogrosides, sweet tea extracts, rubusoside, suaviosides, sucralose, acesulfame K, saccharine, aspartame and licorice extract.

10. A method of reducing calorie of a sugar-based sweetener, comprising the step of adding to the sweetener a GSG composition of claim 1, wherein the addition of the GSG composition maintains the taste profile of the sugar-based sweetener.

11. A Maillard reaction product (RP) composition, prepared from a reaction mixture comprising:

(1) a glycosylated steviol glycoside (GSG) composition, comprising GSG in a total amount of 40-99.9 wt % of the GSG composition; and (2) an amine donor;

wherein the GSG composition contains mono-glycosylated SG, di-glycosylated SG, tri-glycosylated SG, tetra-glycosylated SG, and penta-glycosylated SG, in a total amount that is in the range of 1-99 wt % of the total GSG, wherein the GSG composition contains greater than 5 wt % and less than 60 wt % of mono-glycosylated SG, and wherein the GSG composition contains greater than 5 wt % and less than 60 wt % of di-glycosylated SG.

12. The MRP composition of claim 11, wherein the reaction mixture further comprises a sugar donor.

13. A sweetener or flavoring agent composition, comprising the MRP composition of claim 11 in an amount of 0.0001-99.5 wt % of the sweetener or flavoring composition.

14. The sweetener or flavoring agent composition of claim 13, further comprising a high intensity sweetener (HIS).

15. The sweetener or flavoring agent composition of claim 14, wherein the HIS is selected from the group consisting of *stevia* extracts, steviol glycosides, monk fruit extracts, mogrosides, sweet tea extracts, rubusoside, suaviosides, sucralose, acesulfame K, saccharine, aspartame and licorice extract.

16. A method of reducing calorie of a sugar-based sweetener, comprising the step of adding to the sweetener a MRP composition of claim 11, wherein the addition of the MRP composition maintains the taste profile of the sugar-based sweetener.

* * * * *